United States Patent
Du et al.

(10) Patent No.: US 12,488,246 B2
(45) Date of Patent: *Dec. 2, 2025

(54) PROCESSING METHOD AND ACCELERATING DEVICE

(71) Applicant: Shanghai Cambricon Information Technology Co., Ltd., Pudong New Area (CN)

(72) Inventors: Zidong Du, Pudong New Area (CN); Xuda Zhou, Pudong New Area (CN); Shaoli Liu, Pudong New Area (CN); Tianshi Chen, Pudong New Area (CN)

(73) Assignee: SHANGHAI CAMBRICON INFORMATION TECHNOLOGY CO., LTD., Pudong New Area (CN)

( * ) Notice: Subject to any disclaimer, the term of this patent is extended or adjusted under 35 U.S.C. 154(b) by 1180 days.

This patent is subject to a terminal disclaimer.

(21) Appl. No.: 16/699,027

(22) Filed: Nov. 28, 2019

(65) Prior Publication Data

US 2020/0097826 A1  Mar. 26, 2020

Related U.S. Application Data

(63) Continuation-in-part of application No. PCT/CN2018/088033, filed on May 23, 2018.

(30) Foreign Application Priority Data

May 23, 2017 (CN) .......................... 201710370905.1
May 23, 2017 (CN) .......................... 201710583336.9
(Continued)

(51) Int. Cl.
*G06N 3/082* (2023.01)
*G06F 1/3296* (2019.01)
(Continued)

(52) U.S. Cl.
CPC .......... *G06N 3/082* (2013.01); *G06F 1/3296* (2013.01); *G06F 9/3877* (2013.01);
(Continued)

(58) Field of Classification Search
CPC .......... G06N 3/082; G06N 3/04; G06N 3/044; G06N 3/048; G06N 3/063; G06N 3/084;
(Continued)

(56) References Cited

U.S. PATENT DOCUMENTS 4,422,141 A   12/1983  Shoji
6,360,019 B1   3/2002  Chaddha
(Continued)

FOREIGN PATENT DOCUMENTS

CN  105512723 A  4/2016
CN  106485316 A  3/2017
(Continued)

OTHER PUBLICATIONS

Kadetotad et al. ("Efficient Memory Compression in Deep Neural Networks Using Coarse-Grain Sparsification for Speech Applications", ICCAD '16, Nov. 7-10, 2016) (Year: 2016).*
(Continued)

*Primary Examiner* — Imad Kassim
(74) *Attorney, Agent, or Firm* — Getech Law LLC; Jun Ye

(57) ABSTRACT

The present disclosure provides a processing device including: a coarse-grained pruning unit configured to perform coarse-grained pruning on a weight of a neural network to obtain a pruned weight, an operation unit configured to train the neural network according to the pruned weight. The coarse-grained pruning unit is specifically configured to select M weights from the weights of the neural network through a sliding window, and when the M weights meet a preset condition, all or part of the M weights may be set to
(Continued)

0. The processing device can reduce the memory access while reducing the amount of computation, thereby obtaining an acceleration ratio and reducing energy consumption.

13 Claims, 24 Drawing Sheets

(30) Foreign Application Priority Data

| | | | |
|---|---|---|---|
| Jun. 16, 2017 | (CN) | ......................... | 201710456759.4 |
| Aug. 9, 2017 | (CN) | ......................... | 201710677987.4 |
| Aug. 9, 2017 | (CN) | ......................... | 201710678038.8 |
| Aug. 9, 2017 | (CN) | ......................... | 201710689666.6 |

(51) Int. Cl.

| | |
|---|---|
| G06F 9/38 | (2018.01) |
| G06F 12/0875 | (2016.01) |
| G06F 13/16 | (2006.01) |
| G06F 16/28 | (2019.01) |
| G06N 3/04 | (2023.01) |
| G06N 3/044 | (2023.01) |
| G06N 3/048 | (2023.01) |
| G06N 3/063 | (2023.01) |
| G06N 3/084 | (2023.01) |

(52) U.S. Cl.
CPC .......... *G06F 12/0875* (2013.01); *G06F 13/16* (2013.01); *G06F 16/285* (2019.01); *G06N 3/04* (2013.01); *G06N 3/044* (2023.01); *G06N 3/048* (2023.01); *G06N 3/063* (2013.01); *G06N 3/084* (2013.01); *G06F 2212/452* (2013.01); *G06F 2213/0026* (2013.01)

(58) Field of Classification Search
CPC ..... G06N 3/045; G06F 1/3296; G06F 9/3877; G06F 12/0875; G06F 13/16; G06F 16/285; G06F 2212/452; G06F 2213/0026; G06F 12/0848; G06F 2212/1008; G06F 2212/1032; G06F 2212/1041; G06F 2212/454; G06F 18/23213; Y02D 10/00
See application file for complete search history.

(56) References Cited

U.S. PATENT DOCUMENTS

| | | | |
|---|---|---|---|
| 6,772,126 B1 | 8/2004 | Simpson et al. | |
| 10,127,495 B1 | 11/2018 | Bopardikar et al. | |
| 10,657,439 B2 | 5/2020 | Liu et al. | |
| 11,315,018 B2 | 4/2022 | Molchanov et al. | |
| 2003/0204311 A1 | 10/2003 | Bush | |
| 2004/0180690 A1 | 9/2004 | Song et al. | |
| 2005/0102301 A1 | 5/2005 | Flanagan | |
| 2008/0249767 A1 | 10/2008 | Ertan | |
| 2012/0189047 A1 | 7/2012 | Jiang et al. | |
| 2014/0300758 A1 | 10/2014 | Tran | |
| 2015/0332690 A1 | 11/2015 | Kim et al. | |
| 2016/0358069 A1* | 12/2016 | Brothers | G06F 7/764 |
| 2017/0061328 A1* | 3/2017 | Majumdar | G06N 3/08 |
| 2017/0270408 A1 | 9/2017 | Shi et al. | |
| 2018/0046900 A1* | 2/2018 | Dally | G06F 9/3001 |
| 2018/0075336 A1* | 3/2018 | Huang | G06N 3/045 |
| 2018/0114114 A1 | 4/2018 | Molchanov et al. | |
| 2018/0121796 A1 | 5/2018 | Deisher et al. | |
| 2018/0197081 A1* | 7/2018 | Ji | G06N 3/08 |
| 2018/0285731 A1 | 10/2018 | Heifets et al. | |
| 2018/0300603 A1 | 10/2018 | Ambardekar et al. | |
| 2018/0314940 A1 | 11/2018 | Kundu et al. | |
| 2019/0019311 A1 | 1/2019 | Hu et al. | |
| 2019/0050709 A1 | 2/2019 | Yang et al. | |
| 2019/0362235 A1 | 11/2019 | Xu et al. | |
| 2020/0097806 A1 | 3/2020 | Chen et al. | |
| 2020/0097826 A1 | 3/2020 | Du et al. | |
| 2020/0097827 A1 | 3/2020 | Wang et al. | |
| 2020/0097828 A1 | 3/2020 | Du et al. | |
| 2020/0097831 A1 | 3/2020 | Wang et al. | |
| 2020/0265301 A1* | 8/2020 | Burger | G06N 3/084 |
| 2021/0182077 A1 | 6/2021 | Chen et al. | |
| 2021/0224069 A1 | 7/2021 | Chen et al. | |

FOREIGN PATENT DOCUMENTS

| | | |
|---|---|---|
| CN | 106548234 A | 3/2017 |
| CN | 106919942 A | 7/2017 |
| CN | 106991477 A | 7/2017 |

OTHER PUBLICATIONS

Papandreou et al. ("Modeling Local and Global Deformations in Deep Learning: Epitomic Convolution, Multiple Instance Learning, and Sliding Window Detection", IEEE, CVPR 2015). (Year: 2016).*
Mao et al. ("Exploring the Regularity of Sparse Structure in Convolutional Neural Networks", arXiv, 2017) (Year: 2017).*
Anwar et al. ("Compact Deep Convolutional Neural Networks with Coarse Pruning", ICLR 2016) (Year: 2016).*
Zeng Dan et al.: "Compressing Deep Neural Network for Facial Landmarks Detection", International Conference On Financial Cryptography and Data Security, Nov. 13, 2016, 11 Pages.
Song Han et al; "Deep Compression: Compressing Deep Neural Networks with Pruning, Trained Quantization and Huffman D2 Coding", Internet: URL:https://arxiv.org/pdf/1510.00149v5.pdf; Feb. 15, 2016; 14 pages.
Fujii Tomoya et al; "An FPGA Realization of a Deep Convolutional Neural Network Using a Threshold Neuron Pruning", International Conference On Financial Cryptography and Data Security; Mar. 31, 2017; 13 pages.
Sun Fangxuan et al.; "Intra-layer nonuniform quantization of convolutional neural network" 2016 8th International Conference On Wireless Communications & Signal Processing (WCSP), IEEE, Oct. 13, 2016, 5 pages.
Song Han et al.: "ESE: Efficient Speech Recognition Engine with Sparse LSTM on FPGA", Proceedings of The 2017 ACM/SIGDA International Symposium On Field-Programmable Gate Arrays; Feb. 17, 2017; 10 pages.
Sajid Anwar et al; "Structured Pruning of Deep Convolutional Neural Networks", ACM Journal On Emerging Technologies in Computing Systems; Feb. 9, 2017, 18 pages.
Yunchao Gong et al.; "Compressing Deep Convolutional Networks using Vector Quantization", Internet: URL:https://arxiv.org/pdf/1412.6115.pdf ; Dec. 18, 2014, 10 pages.
Kadetotad Deepak et al.; "Efficient memory compression in deep neural networks using coarse-grain sparsification for speech applications", 2016 IEEE/ACM International Conference On Computer-Aided Design, Nov. 7, 2016, 8 pages.
Song Han et al.; "Leraning both weights and connections for efficient neural networks" Published as a conference paper at NIPS 2015; Internet URL: https://arxiv.org/abs/1506.02626; Oct. 30, 2015; 9 pages.
EP 18806558.5, European Search Report mailed Apr. 24, 2020, 13 pages.
EP 19214007.7, European Search Report mailed Apr. 15, 2020, 12 pages.
EP 19214010.1, European Search Report mailed Apr. 21, 2020, 12 pages.
EP 19214015.0, European Search Report mailed Apr. 21, 2020, 14 pages.
PCT/CN2018/088033—Search Report, mailed Aug. 21, 2018, 11 pages. (no English translation).
Moons, Bert, et al. "Energy-Efficient ConvNets Through Approximate Computing", arXiv: 1603.06777v1, Mar. 22, 2016, 8 pages.
EP 19 214 010.1, Communication pursuant to Article 94(3), mailed Jan. 3, 2022, 11 pages.

(56) References Cited

OTHER PUBLICATIONS

Huang, Hongmei, et al, "Fault Prediction Method Based on RBF Network On-Line Learning", Journal of Nanjing University of Aeronautics & Astronautics, vol. 39 No. 2, Apr. 2007, 4 pages.

CN 201710370905.1—Second Office Action, mailed Mar. 18, 2021,11 pages. (with English translation).

CN 201710583336.9—First Office Action, mailed Apr. 23, 2020, 15 pages. (with English translation).

CN 201710677987.4—Third Office Action, mailed Mar. 30, 2021, 16 pages. (with English translation).

CN 201710678038.8—First Office Action, mailed Oct. 10, 2020, 12 pages. (with English translation).

CN 201710689666.6—First Office Action, mailed Jun. 23, 2020, 19 pages. (with English translation).

CN 201710689666.6—Second Office Action, mailed Feb. 3, 2021, 18 pages. (with English translation).

CN 201710689595 X—First Office Action, mailed Sep. 27, 2020, 21 pages. (with English translation).

Liu, Shaoli, et al., "Cambricon: An Instruction Set Architecture for Neural Networks", ACM/IEEE, 2016, 13 pages.

CN 201710689595.X—Second Office Action, mailed Jun. 6, 2021, 17 pages. (with English translation).

EP 18 806 558.5, Communication pursuant to Article 94(3), mailed Dec. 9, 2021, 11 pages.

EP 19 214 007.7, Communication pursuant to Article 94(3), mailed Dec. 8, 2021, 10 pages.

EP 19 214 015.0, Communication pursuant to Article 94(3), mailed Jan. 3, 2022, 12 pages.

PCT/CN2018/088033—Search Report, mailed Aug. 21, 2018, 19 pages. (with English translation).

U.S. Appl. No. 16/699,049—Final Office Action mailed on Apr. 11, 2024, 27 pages.

U.S. Appl. No. 16/699,055—Final Office Action mailed on Apr. 11, 2024, 31 pages.

Ahalt et al., "Competitive Learning Algorithms for Vector Quantization", Neural Networks, vol. 3, Issue 3, pp. 277-290, 1990.

Choi et al., "Towards the Limit of Network Quantization", ICLR 2017, Apr. 2017, pp. 1-14.

Chu et al., "Vector Quantization of Neural Networks", IEEE Transactions on Neural Networks, vol. 9, No. 6, Nov. 1998, pp. 1235-1245.

Han et al., "EIE: Efficient Inference Engine On Compressed Deep Neural Network", Available online at https://arxiv.org/pdf/1602.01528.pdf, May 3, 2016, 12 Pages.

He et al., "Effective Quantization Methods for Recurrent Neural Networks", Available online at https://arxiv.org/pdf/1611.10176.pdf, Nov. 30, 2016, pp. 1-10.

Judd et al., "Cnvlutin2: Ineffectual-Activation-and-Weight-free Deep Neural Network Computing", Available online at https://arxiv.org/pdf/1705.00125.pdf, Apr. 29, 2017, pp. 1-6.

Lane et al., "Squeezing Deep Learning into Mobile and Embedded Devices", IEEE Pervasive Computing, vol. 16, Issue 3, Jul. 27, 2017, pp. 82-88.

Mao et al., "Exploring the Granularity of Sparsity in Convolutional Neural Networks", 2017 IEEE Conference on Computer Vision and Pattern Recognition Workshops (CVPRW), Jul. 21-26, 2017, pp. 1927-1934.

Parashar et al., "SCNN: An Accelerator for Compressed-sparse Convolutional Neural Networks", 2017 ACM/IEEE 44th Annual International Symposium on Computer Architecture (ISCA), Jun. 24-28, 2017, pp. 27-40.

U.S. Appl. No. 16/699,029—Non-Final Office Action mailed on Oct. 6, 2022, 15 pages.

U.S. Appl. No. 16/699,029—Notice of Allowance mailed on Mar. 14, 2023, 8 pages.

U.S. Appl. No. 16/699,032—Corrected Notice of Allowability mailed on Jan. 9, 2024, 2 pages.

U.S. Appl. No. 16/699,032—Non-Final Office Action mailed on Jul. 1, 2022, 15 pages.

U.S. Appl. No. 16/699,032—Notice of Allowance mailed on Oct. 25, 2023, 5 pages.

U.S. Appl. No. 16/699,046—Non-Final Office Action mailed on Sep. 22, 2022, 15 pages.

U.S. Appl. No. 16/699,046—Notice of Allowance mailed on Mar. 30, 2023, 9 pages.

U.S. Appl. No. 16/699,049—Non-Final Office Action mailed on Jun. 2, 2023, 25 pages.

U.S. Appl. No. 16/699,051—Final Office Action mailed on Feb. 15, 2024, 35 pages.

U.S. Appl. No. 16/699,051—Final Office Action mailed on Sep. 27, 2022, 36 pages.

U.S. Appl. No. 16/699,051—Non-Final Office Action mailed on Mar. 3, 2022, 32 pages.

U.S. Appl. No. 16/699,051—Non-Final Office Action mailed on May 8, 2023, 37 pages.

U.S. Appl. No. 16/699,055—Non-Final Office Action mailed on Jun. 8, 2023, 31 pages.

U.S. Appl. No. 62/486,432—Enhanced Neural Network Designs, filed on Apr. 17, 2017, 69 pages.

Yang et al., "Designing Energy-Efficient Convolutional Neural Networks using Energy-Aware Pruning", 2017 IEEE Conference on Computer Vision and Pattern Recognition (CVPR), Jul. 21-26, 2017, pp. 6071-6079.

Yu et al., "Scalpel: Customizing DNN Pruning to the Underlying Hardware Parallelism", 2017 ACM/IEEE 44th Annual International Symposium on Computer Architecture (ISCA), Jun. 24-28, 2017, pp. 548-560.

Zhou et al., "Cambricon-S: Addressing Irregularity in Sparse Neural Networks through A Cooperative Software/Hardware Approach", 51st Annual IEEE/ACM International Symposium on Microarchitecture, Oct. 20, 2018, pp. 15-28.

EP19214015.0—Communication pursuant to Article 94(3) EPC mailed on Jun. 28, 2024, 7 pages.

U.S. Appl. No. 16/699,049—Non-Final Office Action mailed on Dec. 12, 2024, 29 pages.

U.S. Appl. No. 16/699,055—Non-Final Office Action mailed on Dec. 12, 2024, 33 pages,.

EP19214010.1—Communication pursuant to Article 94(3) EPC mailed on Dec. 9, 2024, 11 pages.

U.S. Appl. No. 16/699,051—Non-Final Office Action mailed on Sep. 9, 2024, 30 pages.

Lee et al., "Adaptive Vector Quantization Using a Self-development Neural Network", IEEE Journal on Selected Areas in Communications, vol. 8, No. 8, Oct. 1990, pp. 1458-1471.

EP19214007.7—Communication pursuant to Article 94(3) EPC mailed on Apr. 23, 2024, 7 pages.

EP18806558.5—Summons to Attend Oral Proceedings mailed on Apr. 11, 2024, 13 pages.

EP19214010.1—Communication pursuant to Article 94(3) mailed on Jun. 28, 2024, 4 pages,.

U.S. Appl. No. 16/699,049—Advisory Action mailed on Jul. 30, 2024, 3 pages.

U.S. Appl. No. 16/699,051—Final Office Action mailed on Jun. 11, 2025, 37 pages.

\* cited by examiner

PROCESSING METHOD AND ACCELERATING DEVICE

CROSS-REFERENCE OF RELATED APPLICATIONS

The present application is a 371 of international Application PCT/CN2018/088033, filed May 23, 2018, which claims priority to the following Chinese Patent Applications, CN 201710370905.1 filed May 23, 2017, CN 201710456759.4, filed Jun. 16, 2017, CN 201710583336.9, filed May 23, 2017, CN 201710678038.8, filed Aug. 9, 2017, CN 201710677987.4, filed Aug. 9, 2017, CN 201710689595.X, filed Aug. 14, 2017, and CN 201710689666.6, filed Aug. 9, 2017. The contents of the applications are incorporated herein by reference in their entireties.

TECHNICAL FIELD

The disclosure relates to a processing method and an accelerating device in the field of computer, particularly to a processing method and an accelerating device for accelerating operation through a weight of pruning neural network.

BACKGROUND

Neural networks have been successfully applied. However, as neural networks that are deeper and larger in scale have been designed, more weights would be introduced, and therefore super large-scale weight may become a huge challenge to neural network application. On the one hand, large-scale weight data imposes higher requirement on storage capacity, and large amount of storage operation will cost high memory access energy consumption. On the other hand, a large number of weights also impose higher requirement on operation units, thus the computing time and energy consumption increase accordingly. Therefore, it becomes an urgent problem to reduce the weights of neural networks on the premise of reducing the computation precision so that the data storage and computational amount could also be reduced.

Most of the current work mainly adopts low-rank matrix decomposition, hash techniques, or the like, however, weights and the amount of computation that may be reduced by using those methods are limited, and the precision of the neural network may also be reduced. Therefore, a more effective method is needed to reduce the weights of neural networks and the amount of computation.

SUMMARY

(1) Technical Problems to be Solved

The disclosure is intended to provide a processing method and an accelerating device to solve at least one of the above-described technical problems.

(2) Technical Solutions

A first aspect of the present disclosure provides a processing device, which may include the following:
a coarse-grained pruning unit configured to perform coarse-grained pruning on a weight of a neural network to obtain a pruned weight;
an operation unit configured to train the neural network according to the pruned weight;
where the coarse-grained pruning unit may be specifically configured to:
select M weights from the weights of the neural network through a sliding window, where M may be an integer greater than 1; and when the M weights meet a preset condition, all or part of the M weights may be set to 0.
Furthermore, the preset condition is:
an information quantity of the M weights may be less than a first given threshold.
Furthermore, an information quantity of the M weights is an arithmetic mean of an absolute value of the M weights, a geometric mean of the absolute value of the M weights or a maximum value of the absolute value of the M weights; the first given threshold is a first threshold, a second threshold or a third threshold; and the information quantity of the M weights being less than the first given threshold may include:
the arithmetic mean of the absolute value of the M weights being less than the first threshold, or the geometric mean of the absolute value of the M weights being less than the second threshold, or the maximum value of the M weights being less than the third threshold.
Furthermore, the coarse-grained pruning unit may be configured to repeat performing coarse-grained pruning on the weights of the neural network and training the neural network according to the pruned weights until no weight meets the preset condition without losing a preset precision.
Furthermore, the preset precision is x %, where x is between 0 and 5.
Furthermore, the neural network may include a fully connected layer, a convolutional layer and/or a LSTM (long and short term memory) layer. The weight of the fully connected layer is a two-dimensional matrix (Nin,Nout), where Nin represents a count of input neurons and Nout represents a count of output neurons, and the fully connected layer has Nin*Nout weights; the weight of the convolutional layer is a four-dimensional matrix (Nfin,Nfout,Kx,Ky), where Nfin represents a count of input feature maps, Nfout represents a count of output feature maps, (Kx,Ky) is the size of a convolution kernel, and the convolutional layer has Nfin*Nfout*Kx*Ky weights; the weight of the LSTM layer is composed of m weights of the fully connected layer, where m is a positive integer greater than 0, and an $i^{th}$ weight of the fully connected layer (Nin_i, Nout_i), where i is a positive integer greater than 0 and less than or equal to m, Nin_i represents a count of input neurons of the $i^{th}$ weight of the fully connected layer and Nout_i represents a count of output neurons of the $i^{th}$ weight of the fully connected layer. The coarse-grained pruning unit may be configured to:
perform coarse-grained pruning on the weight of the fully connected layer, where a size of a sliding window is Bin*Bout, Bin is a positive integer greater than 0 and less than or equal to Nin, and Bout is a positive integer greater than 0 and less than or equal to Nout; make the sliding window slide Sin stride in the direction of Bin, or slide Sout stride in the direction of Bout, where Sin is a positive integer greater than 0 and less than or equal to Bin, and Sout is a positive integer greater than 0 and less than or equal to Bout; select M weights from the Nin*Nout weights through the sliding window, and when the M weights meet the preset condition, all or part of the M weights may be set to 0, where M=Bin*Bout;

perform coarse-grained pruning on the weights of the convolutional layer, where the sliding window is a four-dimensional sliding window with the size of Bfin*Bfout*Bx*By, Bfin is a positive integer greater than 0 and less than or equal to Nfin, Bfout is a positive integer greater than 0 and less than or equal to Nfout, Bx is a positive integer greater than 0 and less than or equal to Kx, and By is a positive integer greater than 0 and less than or equal to Ky; make the sliding window slide Sfin stride in the direction of Bfin, or slide Sfout stride in the direction of Bfout, or slide S stride in the direction of Bx, or slide Sy stride in the direction of By, where Sfin is a positive integer greater than 0 and less than or equal to Bfin, Sfout is a positive integer greater than 0 and less than or equal to Bfout, Sx is a positive integer greater than 0 and less than or equal to Bx, and Sy is a positive integer greater than 0 and less than or equal to By; select M weights from the Nfin*Nfout*Kx*Ky weights through the sliding window, and when the M weights meet the preset condition, all or part of the M weights may be set to 0, where M=Bfin*Bfout*Bx*By; and perform coarse-grained pruning on the weights of the LSTM layer, where the size of the sliding window is Bin_i*Bout_i, Bin_i is a positive integer greater than 0 and less than or equal to Nin_i, and Bout_i is a positive integer greater than 0 and less than or equal to Nout_i; make the sliding window slide Sin_i stride in the direction of Bin_i, or slide Sout_i stride in the direction of Bout_i, where Sin_i is a positive integer greater than 0 and less than or equal to Bin_i, and Sout_i is a positive integer greater than 0 and less than or equal to Bout_i; select M weights from the Bin_i*Bout_i weights through the sliding window, and when the M weights meet the preset condition, all or part of the M weights may be set to 0, where M=Bin_i*Bout_i.

Furthermore, the operation unit may be specifically configured to perform retraining by a back-propagation algorithm according to the pruned weight.

Furthermore, the processing device may also include:
a quantization unit configured to quantize the weight of the neural network and/or perform a first operation on the weight of the neural network after the coarse-grained pruning unit performs coarse-grained pruning on the weight of the neural network, and before the operation unit trains the neural network according to the pruned weight to reduce the bits of the weight.

A second aspect of the present disclosure provides an accelerating device, which may include the following:
a storage unit configured to store an input neuron and output neuron of the neural network, a weight and an instruction of the pruned neural network, where the neural network is a trained neural network model after the pruned weight is trained;
a coarse-grained pruning unit configured to perform coarse-grained pruning on the weight of the neural network to obtain a pruned weight and store the pruned weight into the storage unit;
a coarse-grained selection unit configured to receive an input neuron and the position information of a target weight and select a neuron corresponding to the target weight, where the absolute value of the target weight is greater than a second given threshold;
an operation unit configured to receive an input target weight and a corresponding neuron of the weight, perform an operation according to the target weight and the corresponding neuron of the weight, and transmit an output neuron back to the storage unit.

The storage unit may be further configured to store an intermediate result generated by the operation unit during operation.

Furthermore, the accelerating device may also include:
an instruction control unit configured to receive and decode the instruction to obtain control information so as to control the operation unit.

Furthermore, the storage unit may be configured to store the target weight and the position information of the target weight.

Furthermore, the accelerating device may also include:
a pre-processing unit configured to preprocess original data and input the preprocessed data into the storage unit, where the original data may include input neuron, output neuron, and weight.

Furthermore, the pre-processing may include data segmentation, Gaussian filter, binarization, regularization, and/or normalization.

Furthermore, the accelerating device may also include:
an instruction caching unit configured to cache the instruction, where the instruction caching unit is an on-chip caching unit.

Furthermore, the accelerating device may also include:
a target weight caching unit configured to cache a target weight, where the target weight caching unit is an on-chip caching unit.

Furthermore, the accelerating device may also include:
a target weight position caching unit configured to cache the position information of a target weight, where the target weight position caching unit is an on-chip caching unit.

Furthermore, the accelerating device may also include:
an input neuron caching unit configured to cache an input neuron, where the input neuron caching unit is an on-chip caching unit.

Furthermore, the accelerating device may also include:
an output neuron caching unit configured to cache an output neuron, where the output neuron caching unit is an on-chip caching unit.

Furthermore, the target weight position caching unit may be configured to cache the position information of the target weight, and map each connection weight in the input data to the corresponding input neuron one-to-one.

Furthermore, the accelerating device may also include:
a direct memory access (DMA) unit configured to read and write data or instruction between the storage unit and the instruction caching unit, the coarse-grained pruning unit, the target weight caching unit, the target weight position caching unit, the input neuron caching unit, or the output neuron caching unit.

Furthermore, the operation unit may include at least one of the following: a multiplier configured to multiply first input data and second input data to obtain a product; an adder tree configured to add third input data step by step, or add third input data and fourth input data to obtain a sum; and an activation function unit configured to get the output data by performing action function on fifth data, where the activation function may include sigmoid, tan h, relu or softmax.

Furthermore, the operation unit may also include a pooling unit configured to perform a pooling operation on sixth input data to obtain the output data after pooling operation. The pooling operation may include mean pooling, maximum pooling, or median pooling.

A third aspect of the present disclosure provides an accelerating device, which may include the following:
- a storage unit configured to store an input neuron and output neuron of the neural network, a weight and an instruction of the pruned neural network, where the neural network is a trained neural network model after the pruned weight is trained;
- a coarse-grained pruning unit configured to perform coarse-grained pruning on the weight of the neural network to obtain a pruned weight and store the pruned weight into the storage unit;
- an operation unit configured to train the neural network according to the pruned weight to obtain the pruned neural network;
- a coarse-grained selection unit configured to receive an input neuron and the position information of a target weight and select an input neuron corresponding to the target weight, where the absolute value of the target weight is greater than a second given threshold and the target value is the trained weight; and
- an operation unit configured to receive an input target weight and a corresponding input neuron of the weight, perform an operation according to the target weight and the corresponding input neuron of the weight, and transmit the output neuron back to the storage unit.

The storage unit may be further configured to store an intermediate result generated by the operation unit during operation.

Furthermore, the accelerating device may also include:
- an instruction control unit configured to receive and decode the instruction to obtain control information so as to control the operation unit.

Furthermore, the storage unit may be configured to store the target weight and the position information of the target weight.

Furthermore, the accelerating device may also include:
- a pre-processing unit configured to preprocess original data and input the preprocessed data into the storage unit, where the original data may include input neurons, output neurons and weights of the trained neural network.

Furthermore, the pre-processing may include data segmentation, Gaussian filter, binarization, regularization, and/or normalization processing.

Furthermore, the accelerating device may also include:
- an instruction caching unit configured to cache the instruction and the instruction caching unit is an on-chip caching unit.

Furthermore, the accelerating device may also include:
- a target weight caching unit configured to cache a target weight, where the target weight caching unit is an on-chip caching unit.

Furthermore, the accelerating device may also include:
- a target weight position caching unit configured to cache the position information of a target weight, where the target weight position caching unit is an on-chip caching unit.

Furthermore, the accelerating device may also include:
- an input neuron caching unit configured to cache an input neuron, where the input neuron caching unit is an on-chip caching unit.

Furthermore, the accelerating device may also include:
- an output neuron caching unit configured to cache an output neuron, where the output neuron caching unit is an on-chip caching unit.

Furthermore, the target weight position caching unit may be configured to cache the position information of the target weight, and map each connection weight in the input data to the corresponding input neuron one-to-one.

Furthermore, the accelerating device may also include:
- a DMA unit configured to read and write data or instruction between the storage unit and the instruction caching unit, the coarse-grained pruning unit, the target weight caching unit, the target weight position caching unit, the input neuron caching unit, or the output neuron caching unit.

Furthermore, the operation unit may include at least one of the following: a multiplier configured to multiply first input data and second input data to obtain a product; an adder tree configured to add third input data step by step, or add third input data and fourth input data to obtain a sum; and an activation function unit configured to get the output data by performing action function on fifth data, where the activation function may include sigmoid, tan h, relu or softmax.

Furthermore, the operation unit may also include a pooling unit configured to perform a pooling operation on sixth input data to obtain the output data after pooling operation. The pooling operation may include mean pooling, maximum pooling, or median pooling.

A fourth aspect of the present disclosure provides a processing method, which may include the following:
- performing coarse-grained pruning on a weight of the neural network to obtain the pruned weight;
- training the neural network according to the pruned weight.

The performing coarse-grained pruning on a weight of the neural network to obtain the pruned weight may include:
- selecting M weights from the weights of the neural network through a sliding window, in which the M is an integer greater than 1;
- when the M weights meet a preset condition, setting all or part of the M weights to 0 to obtain the pruned weight.

Furthermore, the preset condition is:
the information quantity of the M weights is less than a first given threshold.

Furthermore, the information quantity of the M weights is an arithmetic mean of an absolute value of the M weights, a geometric mean of the absolute value of the M weights or a maximum value of the M weights; the first given threshold is a first threshold, a second threshold or a third threshold; and the information quantity of the M weights being less than the first given threshold may include:
the arithmetic mean of the absolute value of the M weights being less than the first threshold, or the geometric mean of the absolute value of the M weights being less than the second threshold, or the maximum value of the M weights being less than the third threshold.

Furthermore, the method may also include:
repeating performing coarse-grained pruning on the weights of neural network and training the neural network according to the pruned weight until no weight meets the preset condition without losing a preset precision.

Furthermore, the preset precision is x %, where x is between 0 and 5.

Furthermore, the neural network may include a fully connected layer, a convolutional layer and/or a LSTM layer. The weight of the fully connected layer is a two-dimensional matrix (Nin,Nout), where Nin represents a count of input neurons and Nout represents a count of output neurons, and the fully connected layer has Nin*Nout weights; the weight of the convolutional layer is a four-dimensional matrix (Nfin,Nfout,Kx,Ky), where Nfin represents a count of input feature maps, Nfout represents a count of output feature maps, (Kx,Ky) is the size of a convolution kernel, and the convolutional layer has Nfin*Nfout*Kx*Ky weights; the weight of LSTM layer is composed of m weights of the fully connected layer, where m is a positive integer greater than 0, and an $i^{th}$ weight of the fully connected layer is (Nin_i, Nout_i), where i is a positive integer greater than 0 and less than or equal to m, Nin_i represents a count of input neurons of the $i^{th}$ weight of the fully connected layer and Nout_i represents a count of output neurons of the $i^{th}$ weight of the fully connected layer. The performing coarse-grained pruning on the neural network may include:

performing coarse-grained pruning on the weight of the fully connected layer, where the sliding window is a two-dimensional sliding window with the size of Bin*Bout, Bin is a positive integer greater than 0 and less than or equal to Nin, and Bout is a positive integer greater than 0 and less than or equal to Nout;

making the sliding window slide Sin stride in the direction of Bin, or slide Sout stride in the direction of Bout, where Sin is a positive integer greater than 0 and less than or equal to Bin, and Sout is a positive integer greater than 0 and less than or equal to Bout;

selecting M weights from the Nin*Nout weights through the sliding window, and when the M weights meet the preset condition, setting all or part of the M weights to 0, where M=Bin*Bout;

performing coarse-grained pruning on the weight of the convolutional layer, where the sliding window is a four-dimensional sliding window with the size of Bfin*Bfout*Bx*By, Bfin is a positive integer greater than 0 and less than or equal to Nfin, Bfout is a positive integer greater than 0 and less than or equal to Nfout, Bx is a positive integer greater than 0 and less than or equal to Kx, and By is a positive integer greater than 0 and less than or equal to Ky;

making the sliding window slide Sfin stride in the direction of Bfin, or slide Sfout stride in the direction of Bfout, or slide S stride in the direction of Bx, or slide Sy stride in the direction of By, where Sfin is a positive integer greater than 0 and less than or equal to Bfin, Sfout is a positive integer greater than 0 and less than or equal to Bfout, Sx is a positive integer greater than 0 and less than or equal to Bx, and Sy is a positive integer greater than 0 and less than or equal to By; and selecting M weights from the Nfin*Nfout*Kx*Ky weights through the sliding window, and when the M weights meet the preset condition, setting all or part of the M weights to 0, where M=Bfin*Bfout*Bx*By;

performing coarse-grained pruning on the weight of the LSTM layer of the neural network, the size of the sliding window is Bin_i*Bout_i, where Bin_i is a positive integer greater than 0 and less than or equal to Nin_i, and Bout_i is a positive integer greater than 0 and less than or equal to Nout_i; the performing coarse-grained pruning on the weight of the LSTM layer of the neural network may include:

making the sliding window slide Sin_i stride in the direction of Bin_i, or slide Sout_i stride in the direction of Bout_i, where Sin_i is a positive integer greater than 0 and less than or equal to Bin_i, and Sout_i is a positive integer greater than 0 and less than or equal to Bout_i; and selecting M weights from the Bin_i*Bout_i weights through the sliding window, and when the M weights meet the preset condition, setting all or part of the M weights to 0, where M=Bin_i*Bout_i.

Furthermore, the retraining the neural network according to the pruned weight may particularly include:

retraining the neural network by a back-propagation algorithm according to the pruned weight.

Furthermore, between the performing coarse-grained pruning and the retraining on the neural network, the method may further include:

quantizing the weight of the neural network and/or perform a first operation on the weight of the neural network to reduce the weight bits of the neural network.

A fifth aspect of the present disclosure provides a neural network operation device, which may include one or a plurality of the accelerating devices as described in the first aspect, the second aspect or the third aspect. The neural network operation device may be configured to obtain data to be operated and control information from other processing devices and execute specified neural network operation, and transfer the execution results to other processing devices through an I/O interface;

when the neural network operation device includes a plurality of computation devices, the plurality of computation devices can be interconnected and transfer data through a specific structure;

where the plurality of computation devices may be interconnected through the Peripheral Component Interconnect Express (PCIE) bus and transfer data to support operations of the larger scale neural network; the plurality of computation devices share a same control system or have their own control systems; the plurality of computation devices share a same memory or have their own memories; and an interconnection manner of the plurality of computation devices is arbitrary interconnection topology.

A sixth aspect of the present disclosure provides a neural network chip, which may include the processing device described in the first aspect, the accelerating device described in the second aspect and the third aspect, and/or the neural network operation device described in the fifth aspect.

A seventh aspect of the present disclosure provides a chip package structure including the neural network chip described in the sixth aspect.

An eighth aspect of the present disclosure provides a board card including the neural network chip described in the sixth aspect or the chip package structure described in the seventh aspect.

A ninth aspect of the present disclosure provides an electronic device including the board card described in the eighth aspect.

Furthermore, the electronic devices may include data processing devices, robots, computers, printers, scanners, tablets, smart terminals, mobile phones, driving recorders, navigators, sensors, cameras, servers, cloud servers, cameras, cameras, projectors, watches, headphones, mobile storage, wearable devices, vehicles, household appliances, and/or medical devices.

Furthermore, the vehicles may include an aircraft, a ship, and/or a car; the household appliance may include a television, an air conditioner, a microwave oven, a refrigerator, a rice cooker, a humidifier, a washing machine, an electric lamp, a gas stove, a range hood; the medical device may include a nuclear magnetic resonance instrument, a B-ultrasound, and/or an electrocardiograph.

A tenth aspect of the present disclosure provides a processing device including a storage unit, a coarse-grained selection unit, and an operation unit.

A storage unit may be configured to store an input neuron, an output neuron, a weight, and an instruction of a neural network.

A coarse-grained pruning unit may be configured to perform coarse-grained pruning on the weight of the neural network to obtain a pruned weight and store the pruned weight and the position information of a target weight into the storage unit; in which the absolute value of the target weight is greater than a second given threshold. The coarse-grained pruning unit may be specifically configured to:
  select M weights from the weights of neural network through a sliding window, where the M is an integer greater than 1; and
  when the M weights meet a preset condition, all or part of the M weights may be set to 0.

The operation unit may be configured to perform training according to the pruned weight, and the weight that has been set to 0 in the training process remains 0.

The coarse-grained selection unit may be configured to receive an input neuron and the position information of the target weight and select an input neuron corresponding to the target weight according to the position information of the target weight.

The operation unit may be further configured to perform neural network operation according to an input target weight and an input neuron corresponding to the target weight to get an output neuron, and to transmit the output neuron to the storage unit as the input neuron of a next layer.

Furthermore, the preset condition may include:
  the information quantity of the M weights is less than a first given threshold.

Furthermore, the information quantity of the M weights is an arithmetic mean of the absolute value of the M weights, a geometric mean of the absolute value of the M weights or a maximum value of the M weights; the first given threshold is a first threshold, a second threshold or a third threshold; and the information quantity of the M weights being less than the first given threshold may include:
  the arithmetic mean of the absolute value of the M weights being less than the first threshold, or the geometric mean of the absolute value of the M weights being less than the second threshold, or the maximum value of the M weights being less than the third threshold.

Furthermore, the coarse-grained pruning unit and the operation unit may configure to:
  repeat performing coarse-grained pruning on the weights of neural network and training the neural network according to the pruned weight until no weight meets the preset condition without losing a preset precision.

Furthermore, the neural network may include a fully connected layer, a convolutional layer and/or a LSTM layer. The weight of the fully connected layer is a two-dimensional matrix (Nin,Nout), where Nin represents a count of input neurons and Nout represents a count of output neurons, and the fully connected layer has Nin*Nout weights; the weight of the convolutional layer is a four-dimensional matrix (Nfin,Nfout,Kx,Ky), where Nfin represents a count of input feature maps, Nfout represents a count of output feature maps, (Kx,Ky) is the size of a convolution kernel, and the convolutional layer has Nfin*Nfout*Kx*Ky weights; the weight of LSTM layer is composed of m weights of the fully connected layer, where m is a positive integer greater than 0, and an $i^{th}$ weight of the fully connected layer is (Nin_i, Nout_i), where i is a positive integer greater than 0 and less than or equal to m, Nin_i represents a count of input neurons of the $i^{th}$ weight of the fully connected layer and Nout_i represents a count of output neurons of the $i^{th}$ weight of the fully connected layer. The coarse-grained pruning unit is specifically configured to:
  perform coarse-grained pruning on the weight of the fully connected layer, where the sliding window is a two-dimensional sliding window with the size of Bin*Bout, Bin is a positive integer greater than 0 and less than or equal to Nin, and Bout is a positive integer greater than 0 and less than or equal to Nout;
  make the sliding window slide Sin stride in the direction of Bin, or slide Sout stride in the direction of Bout, where Sin is a positive integer greater than 0 and less than or equal to Bin, and Sout is a positive integer greater than 0 and less than or equal to Bout;
  select M weights from the Nin*Nout weights through the sliding window, and when the M weights meet the preset condition, all or part of the M weights may be set to 0, where M=Bin*Bout;
  perform coarse-grained pruning on the weights of the convolutional layer, the sliding window is a four-dimensional sliding window with the size of Bfin*Bfout*Bx*By, where Bfin is a positive integer greater than 0 and less than or equal to Nfin, Bfout is a positive integer greater than 0 and less than or equal to Nfout, Bx is a positive integer greater than 0 and less than or equal to Kx, and By is a positive integer greater than 0 and less than or equal to Ky;
  make the sliding window slide Sfin stride in the direction of Bfin, or slide Sfout stride in the direction of Bfout, or slide S stride in the direction of Bx, or slide Sy stride in the direction of By, where Sfin is a positive integer greater than 0 and less than or equal to Bfin, Sfout is a positive integer greater than 0 and less than or equal to Bfout, Sx is a positive integer greater than 0 and less than or equal to Bx, and Sy is a positive integer greater than 0 and less than or equal to By;
  select M weights from the Nfin*Nfout*Kx*Ky weights through the sliding window, and when the M weights meet the preset condition, all or part of the M weights may be set to 0, where M=Bfin*Bfout*Bx*By;
  perform coarse-grained pruning on the weights of the LSTM layer, the size of the sliding window is Bin_i*Bout_i, where Bin_i is a positive integer greater than 0 and less than or equal to Nin_i, and Bout_i is a positive integer greater than 0 and less than or equal to Nout_i;
  make the sliding window slide Sin_i stride in the direction of Bin_i, or slide Sout_i stride in the direction of Bout_i, where Sin_i is a positive integer greater than 0 and less than or equal to Bin_i, and Sout_i is a positive integer greater than 0 and less than or equal to Bout_i; and
  select M weights from the Bin_i*Bout_i weights through the sliding window, and when the M weights meet the preset condition, all or part of the M weights may be set to 0, where M=Bin_i*Bout_i.

Furthermore, the processing device may also include an instruction control unit configured to receive the instruction and generate a control instruction to control the operation unit after decoding.

Furthermore, the storage unit may be configured to store the target weight and the data of the target weight position.

Furthermore, the processing device may also include a pre-processing unit configured to preprocess an input neuron and a weight, and input the preprocessed data to the storage unit.

Furthermore, the pre-processing may include data segmentation, Gaussian filter, binarization, regularization, and/or normalization processing.

Furthermore, the processing device may also include an instruction caching unit configured to cache the instruction.

Furthermore, the processing device may also include a target weight caching unit configured to cache data of the target weight.

Furthermore, the processing device may also include a target weight position caching unit configured to cache the position information of the target weight.

Furthermore, the processing device may also include an input neuron caching unit configured to cache an input neuron.

Furthermore, the processing device may also include an output neuron caching unit configured to cache an output neuron.

Furthermore, the instruction caching unit, the target weight caching unit, the target weight position caching unit, the input neuron cache or the output neuron cache is an on-chip caching unit.

Furthermore, the target weight position caching unit may be configured to cache the position information of the target weight, and map each connection weight in the input data to the corresponding input neuron one-to-one.

Furthermore, the processing device may also include a DMA unit configured to read and write data or instruction between the storage unit and the instruction caching unit, the target weight caching unit, the target weight position caching unit, the input neuron caching unit, or the output neuron caching unit.

Furthermore, the operation unit may include at least one of the following:
  a multiplier configured to multiply first input data and second input data to obtain a product;
  one or more adders configured to add third input data step by step;
  an activation function unit configured to get the output data by performing action function on fifth data, where the activation function may include sigmoid, tan h, relu or softmax.

Furthermore, the operation unit may include a plurality of adders, and the plurality of adders compose an adder tree configured to add third input data step by step.

Furthermore, the operation unit may also include a pooling unit configured to perform a pooling operation on input data to obtain the output data after pooling operation. The pooling operation may include mean pooling, maximum pooling, or median pooling.

Furthermore, the operation unit may also configure to repeat training the pruned neural network until no weight can be set to 0 without losing a preset precision.

An eleventh aspect of the present disclosure provides a data quantization method including the following steps:
  grouping the weights of a neural network;
  performing a clustering operation on each group of weights by using a clustering algorithm, dividing a group of weights into m classes, computing a center weight for each class, and replacing all the weights in each class by the center weights, where m is a positive integer; and
  encoding the center weight to get a weight codebook and a weight dictionary.

Furthermore, the method may also include:
  retraining the neural network, where only the weight codebook is trained, and the weight dictionary remains unchanged.

Furthermore, the retraining may adopt a back-propagation algorithm.

Furthermore, the grouping may include grouping into a group, layer-type-based grouping, inter-layer-based grouping, and/or intra-layer-based grouping.

Furthermore, the clustering algorithm may include K-means, K-medoids, Clara, and/or Clarans.

Furthermore, the grouping is grouping into one group, which may include:
  all weights of the neural network are grouped into one group.

Furthermore, the neural network may include a total of t different types of layers such as i convolutional layers, j fully connected layers, and m LSTM layers, where i, j, m are integers greater than or equal to 0, and satisfy i+j+m≥1, t is an integer greater than or equal to 1 and satisfies t=i+j+m, and the grouping being a layer-type-based grouping may include:
  grouping the weights of neural network into t groups.

Furthermore, the grouping being inter-layer-based grouping may include:
  grouping the weights of one or a plurality of convolutional layers, one or a plurality of fully connected layers and one or a plurality of LSTM layers in the neural network into one group respectively.

Furthermore, the grouping being intra-layer-based grouping may include:
  determining the convolutional layer of the neural network as a four-dimensional matrix (Nfin, Nfout, Kx, Ky), where Nfin, Nfout, Kx, Ky are positive integers, Nfin represents a count of input feature maps, and Nfout represents a count of output feature maps, (Kx, Ky) represents the size of the convolution kernel; grouping the weights of the convolutional layer into Nfin*Nfout*Kx*Ky/(Bfin*Bfout*Bx*By) different groups according to the group size of (Bfin, Bfout, Bx, By), where Bfin is a positive integer less than or equal to Nfin, Bfout is a positive integer less than or equal to Nfout, Bx is a positive integer less than or equal to Kx, and By is a positive integer less than or equal to Ky; or
  determining the fully connected layer of the neural network as a two-dimensional matrix (NM, Nout), where NM, Nout are positive integers, Nin represents a count of input neurons, Nout represents a count of output neurons, and a count of weight is Nin*Nout; the weights of fully connected layer are divided into (Nin*Nout)/(Bin*Bout) different groups according to the group size of (Bin, Bout), where Bin is a positive integer less than or equal to Nin, and Bout is a positive integer less than or equal to Nout; or
  determining the weights of the LSTM layer of the neural network as a combination of the weights of a plurality of fully connected layers, where the weights of the LSTM layer are composed of the weights of n fully connected layers, n is a positive integer, therefore each fully connected layer can be grouped according to the grouping mode of the fully connected layer.

Furthermore, the grouping method may be grouping into one group, inter-layer-based grouping, and intra-layer-based grouping, and the grouping method may specifically include:
  grouping the convolutional layer into one group, grouping the fully connected layers by the intra-layer-based grouping method, and grouping the LSTM layers by the inter-layer-based grouping method.

Further, a center weight selection method of a class is: minimizing the cost function $J(w,w_0)$.

Furthermore, the cost function is:

$$J(w, w_0) = \sum_{i=1}^{n} (w_i - w_0)^2$$

where w is the weight of a class, w0 is the center weight of the class, n is a count of weights in the class, n is a positive integer, wi is the $i^{th}$ weight of the class, i is a positive integer, and $1 \le i \le n$.

A twelfth aspect of the present disclosure provides a data quantization device including:
a memory configured to store an operation instruction; and
a processor configured to perform the operation instruction stored in the memory in accordance with all or part of the quantization method described in the eleven aspect.

Further, the operation instruction is a binary number including an operation code and an address code, where the operation code indicates an operation to be performed by the processor, and the address code indicates an address in the memory where the processor reads data participating in the operation.

A thirteenth aspect of the present disclosure provides a processing device, which may include:
a control unit configured to receive an instruction and decode the instruction to generate search and control information and operation control information;
a lookup table unit configured to receive the search and control information, a weight dictionary and a weight codebook, and perform a table lookup operation on the weight dictionary and the weight codebook to obtain a quantized weight according to the search and control information; and
an operation unit configured to receive the operation control information and input neuron, and perform an operation on the quantized weight and input neuron according to the operation control information to obtain an output neuron and output the output neuron.

Furthermore, the processing device may also include:
a pre-processing unit configured to pre-process external input information to obtain the input neuron, weight dictionary, weight codebook, and instruction;
a storage unit configured to store the input neuron, weight dictionary, weight codebook and instruction, and receive the output neuron;
a caching unit configured to cache the instruction, input neuron, output neuron, weight dictionary, and weight codebook; and
a DMA unit configured to read/write data or instruction between the storage unit and the caching unit.

Furthermore, the pre-processing unit pre-processing external input information may include: segmentation, Gaussian filter, binarization, regularization, and/or normalization.

Further, the caching unit may include:
an instruction caching unit configured to cache the instruction;
an input neuron caching unit configured to cache the input neuron; and
an output neuron caching unit configured to cache the output neuron.

Further, the caching unit may further include:
a weight dictionary caching unit configured to cache the weight dictionary; and
a weight codebook caching unit configured to cache the code book.

Further, the instruction is a neural network dedicated instruction including:
a control instruction configured to control an execution process of the neural network;
a data transfer instruction configured to perform data transfer between different storage media, where a data format may include a matrix format, a vector format, and a scalar format;
an operation instruction configured to perform an arithmetic operation on the neural network including a matrix operation instruction, a vector operation instruction, a scalar operation instruction, a convolutional neural network operation instruction, a fully connected neural network operation instruction, a pooling neural network operation instruction, a Restricted Boltzmann Machine (RBM) neural network operation instruction, a Local Response Normalization (LRN) neural network operation instruction, a Local Contrast Normalization (LCN) neural network operation instruction, a Long Short-Term Memory (LSTM) neural network operation instruction, a Recurrent Neural Networks (RNN) operation instruction, a Rectified Linear Unit (RELU) neural network operation instruction, a Parametric Rectified Linear Unit (PRELU) neural network operation instruction, a SIGMOID neural network operation instruction, a TAN H neural network operation instruction and a MAXOUT neural network operation instruction; and
a logical instruction configured to perform the neural network logical operation including a vector logical operation instruction and a scalar logical operation instruction.

Furthermore, the neural network dedicated instruction may include at least a Cambricon instruction composed of an operation code and an operand, and the Cambricon instruction may include:
a Cambricon control instruction, including a jump instruction and a conditional branch instruction, configured to control an execution process;
a Cambricon data transfer instruction, including a loading instruction, a storage instruction, and a moving instruction, configured to transfer data between different storage media; where the loading instruction may be configured to load data from a main memory to a cache; the storage instruction may be configured to store data from the cache to the main memory; and the moving instruction may be configured to move data from the cache to another cache or from the cache to a register or from the register to another register;
a Cambricon operation instruction, including a Cambricon matrix operation instruction, a Cambricon vector operation instruction, and a Cambricon scalar operation instruction, configured to perform a neural network arithmetic operation; where the Cambricon matrix operation instruction may be configured to complete a matrix operation in the neural network, and the Cambricon matrix operation may include a matrix-vector multiplication operation, a vector multiply matrix operation, a matrix multiply scalar operation, an outer product operation, a matrix-add-matrix operation, and a matrix-subtract-matrix operation; the Cambricon vector operation instruction may be configured to complete a vector operation in the neural network, and the Cambricon vector operation may include a vector elementary operation, a vector transcendental function operation, a dot product operation, a random vector generation operation, and an operation of maximum/minimum of a vector; and the Cambricon scalar operation instruction may be configured to complete a scalar operation in the neural network, and the Cambricon scalar operation may include a scalar elementary operation and a scalar transcendental function; and a Cambricon logical instruction, including a Cambricon vector logical operation instruction and a Cambricon scalar logical operation instruction, configured for the logical operation of the neural network; where the Cambricon vector logical operation instruction may be configured for a vector comparing operation and a vector logical operation, the vector logical operation may include AND, OR, and NOT, and the Cambricon scalar logical operation instruction may be configured for a scalar comparing operation and a scalar logical operation.

In an embodiment, the Cambricon data transfer instruction may support one or more of the following data organization manners: matrix, vector, and scalar;

the vector elementary operation may include vector addition, subtraction, multiplication, and division;

the vector transcendental function may refer to a function which does not meet any polynomial equation taking polynomials as coefficients, and the function may include an exponential function, a logarithmic function, a trigonometric function, and an anti-trigonometric function;

the scalar elementary operation may include scalar addition, subtraction, multiplication, and division; the scalar transcendental function may refer to a function which does not meet any polynomial equation taking polynomials as coefficients, and the scalar transcendental function may include an exponential function, a logarithmic function, a trigonometric function, and an anti-trigonometric function;

the vector comparing operation may include greater than, smaller than, equal to, greater than or equal to ($\geq$), less than or equal to ($\leq$), and unequal to;

the vector logical operation may include AND, OR, and NOT;

the scalar comparing operation may include but may be not limited to greater than, smaller than, equal to, greater than or equal to ($\geq$), less than or equal to ($\leq$), and unequal to; and the scalar logical operation may include AND, OR, and NOT.

Furthermore, the storage unit may be configured to store an unquantized weight, which is directly output to the operation unit.

The operation unit may include:

a first operation part configured to multiply the weight and the input neuron; and/or a second operation part including one or a plurality of adders configured to add the weight and input neuron by one or a plurality of adders; and/or a third operation part configured to perform a nonlinear function on the weight and input neuron, where the nonlinear function may include an activation function, and the activation function may include sigmoid, tan h, relu and/or softmax; and/or a fourth operation part configured to perform a pooling operation on the weight and input neuron, where the pooling operation may include average pooling, maximum pooling, and/or median pooling, and the weight may include the unquantized weight and/or quantized weight.

Furthermore, the second operation part may include a plurality of adders, and the plurality of adders may constitute an adder tree to realize the addition of the weight and input neuron step by step.

A fourteenth aspect of the present disclosure provides a processing method including the following steps:

receiving the input neuron, the weight dictionary, the weight codebook and the instruction;

decoding the instruction to generate the search and control information and operation control information; and looking up the weight dictionary and the weight codebook to obtain the quantized weight according to the search and control information, and performing operation on the quantized weight and input neuron according to the operation control information to obtain an output neuron and output the output neuron.

In an embodiment, before receiving the input neuron, weight dictionary, weight codebook and instruction, the method may further include the following step:

pre-processing the external input information to obtain the input neuron, weight dictionary, weight codebook, and instruction.

After receiving the input neuron, weight dictionary, weight codebook and instruction, the method may further include the following step:

storing the input neuron, weight dictionary, weight codebook, instruction and output neuron, and caching the instruction, input neuron and output neuron.

Further, after receiving the input neuron, weight dictionary, weight codebook and instruction, the method may further include: caching the weight dictionary and weight codebook.

In an embodiment, the pre-processing may include segmentation, Gaussian filter, binarization, regularization, and/or normalization.

Further, the instruction is a neural network dedicated instruction, which may include:

a control instruction configured to control the execution process of the neural network;

a data transfer instruction configured to perform data transfer between different storage media, where a data format may include a matrix format, a vector format, and a scalar format;

an operation instruction configured to perform an arithmetic operation on the neural network including a matrix operation instruction, a vector operation instruction, a scalar operation instruction, a convolutional neural network operation instruction, a fully connected neural network operation instruction, a pooling neural network operation instruction, a Restricted Boltzmann Machine (RBM) neural network operation instruction, a Local Response Normalization (LRN) neural network operation instruction, a Local Contrast Normalization (LCN) neural network operation instruction, a Long Short-Term Memory (LSTM) neural network operation instruction, a Recurrent Neural Networks (RNN) operation instruction, a Rectified Linear Unit (RELU) neural network operation instruction, a Parametric Rectified Linear Unit (PRELU) neural network operation instruction, a SIGMOID neural network operation instruction, a TAN H neural network operation instruction and a MAXOUT neural network operation instruction; and a logical instruction configured to perform the neural network logical operation including a vector logical operation instruction and a scalar logical operation instruction.

Furthermore, the neural network dedicated instruction may include at least a Cambricon instruction composed of an operation code and an operand, and the Cambricon instruction may include:

a Cambricon control instruction, including a jump instruction and a conditional branch instruction, configured to control the execution process;

a Cambricon data transfer instruction, including a loading instruction, a storage instruction, and a moving instruction, configured to transfer data between different storage media; where the loading instruction may be configured to load data from a main memory to a cache; the storage instruction may be configured to store data from the cache to the main memory; and the moving instruction may be configured to move data from the cache to another cache or from the cache to a register or from the register to another register;

a Cambricon operation instruction, including a Cambricon matrix operation instruction, a Cambricon vector operation instruction, and a Cambricon scalar operation instruction, configured to perform a neural network arithmetic operation; where the Cambricon matrix operation instruction may be configured to complete a matrix operation in the neural network, and the Cambricon matrix operation may include a matrix-vector multiplication operation, a vector multiply matrix operation, a matrix multiply scalar operation, an outer product operation, a matrix-add-matrix operation, and a matrix-subtract-matrix operation; the Cambricon vector operation instruction may be configured to complete a vector operation in the neural network, and the Cambricon vector operation may include a vector elementary operation, a vector transcendental function operation, a dot product operation, a random vector generation operation, and an operation of maximum/minimum of a vector; and the Cambricon scalar operation instruction may be configured to complete a scalar operation in the neural network, and the Cambricon scalar operation may include a scalar elementary operation and a scalar transcendental function; and a Cambricon logical instruction, including a Cambricon vector logical operation instruction and a Cambricon scalar logical operation instruction, configured for the logical operation of the neural network; where the Cambricon vector logical operation instruction may be configured for a vector comparing operation and a vector logical operation, the vector logical operation may include AND, OR, and NOT, and the Cambricon scalar logical operation instruction may include a scalar comparing operation instruction and a scalar logical operation instruction.

In an embodiment, the Cambricon data transfer instruction may support one or more of the following data organization manners: matrix, vector, and scalar;

the vector elementary operation may include vector addition, subtraction, multiplication, and division;

the vector transcendental function may refer to a function which does not meet any polynomial equation taking polynomials as coefficients, and the function may include an exponential function, a logarithmic function, a trigonometric function, and an anti-trigonometric function;

the scalar elementary operation may include scalar addition, subtraction, multiplication, and division; the scalar transcendental function may refer to a function which does not meet any polynomial equation taking polynomials as coefficients, and the scalar transcendental function may include an exponential function, a logarithmic function, a trigonometric function, and an anti-trigonometric function;

the vector comparing operation may include greater than, smaller than, equal to, greater than or equal to ($\geq$), less than or equal to ($\leq$), and unequal to;

the vector logical operation may include AND, OR, and NOT;

the scalar comparing operation may include greater than, smaller than, equal to, greater than or equal to ($\geq$), less than or equal to ($\leq$), and unequal to; and the scalar logical operation may include AND, OR, and NOT.

Furthermore, the method may further include the following steps: receiving an unquantized weight, and performing operation on the unquantized weight and input neuron to obtain and an output neuron and output the output neuron.

Further, the operation may include:

adding the weight and input neuron; and/or multiplying the weight and input neuron; and/or performing a nonlinear function on the weight and input neuron, where the nonlinear function may include an activation function, and the activation function may include sigmoid, tan h, relu and/or softmax; and/or performing a pooling operation on the weight and input neuron, where the pooling operation may include average pooling, maximum pooling, and/or median pooling, and the weight may include the unquantized weight and/or quantized weight.

In an embodiment, one or a plurality of adders are configured to add the weight and input neuron.

Further, a plurality of adders may constitute an adder tree to realize the addition of the weight and input neuron step by step.

A fifteenth aspect of the present disclosure provides a processing device, which may include:

a control unit configured to receive an instruction and decode the instruction to generate search and control information and operation control information;

a lookup table unit configured to receive the search and control information, a weight dictionary and a weight codebook, and perform a table lookup operation on the weight dictionary and the weight codebook to obtain a quantized weight according to the search and control information; and an operation unit configured to receive the operation control information and input neuron, and perform an operation on the quantized weight and input neuron according to the operation control information to obtain an output neuron and output the output neuron.

Furthermore, the processing device may also include:

a pre-processing unit configured to pre-process external input information to obtain the input neuron, weight dictionary, weight codebook, and instruction;

a storage unit configured to store the input neuron, weight dictionary, weight codebook and instruction, and receive the output neuron;

a caching unit configured to cache the instruction, input neuron, output neuron, weight dictionary, and weight codebook; and a DMA unit configured to read/write data or instruction between the storage unit and the caching unit.

Furthermore, the pre-processing unit pre-processing external input information may include: segmentation, Gaussian filter, binarization, regularization, and/or normalization.

Further, the caching unit may include:

an instruction caching unit configured to cache the instruction;

an input neuron caching unit configured to cache the input neuron; and an output neuron caching unit configured to cache the output neuron.

Further, the caching unit may further include:

a weight dictionary caching unit configured to cache the weight dictionary; and a weight codebook caching unit configured to cache the code book.

Further, the instruction is a neural network dedicated instruction, which may include:

a control instruction configured to control the execution process of the neural network;

a data transfer instruction configured to perform data transfer between different storage media, where a data format may include a matrix format, a vector format, and a scalar format;

an operation instruction configured to perform an arithmetic operation on the neural network including a matrix operation instruction, a vector operation instruction, a scalar operation instruction, a convolutional neural network operation instruction, a fully connected neural network operation instruction, a pooling neural network operation instruction, a Restricted Boltzmann Machine (RBM) neural network operation instruction, a Local Response Normalization (LRN) neural network operation instruction, a Local Contrast Normalization (LCN) neural network operation instruction, a Long Short-Term Memory (LSTM) neural network operation instruction, a Recurrent Neural Networks (RNN) operation instruction, a Rectified Linear Unit (RELU) neural network operation instruction, a Parametric Rectified Linear Unit (PRELU) neural network operation instruction, a SIGMOID neural network operation instruction, a TAN H neural network operation instruction and a MAXOUT neural network operation instruction; and a logical instruction configured to perform the neural network logical operation including a vector logical operation instruction and a scalar logical operation instruction.

Furthermore, the neural network dedicated instruction may include at least a Cambricon instruction composed of an operation code and an operand, and the Cambricon instruction may include:

a Cambricon control instruction, including a jump instruction and a conditional branch instruction, configured to control the execution process;

a Cambricon data transfer instruction, including a loading instruction, a storage instruction, and a moving instruction, configured to transfer data between different storage media; where the loading instruction may be configured to load data from a main memory to a cache; the storage instruction may be configured to store data from the cache to the main memory; and the moving instruction may be configured to move data from the cache to another cache or from the cache to a register or from the register to another register;

a Cambricon operation instruction, including a Cambricon matrix operation instruction, a Cambricon vector operation instruction, and a Cambricon scalar operation instruction, configured to perform a neural network arithmetic operation; where the Cambricon matrix operation instruction may be configured to complete a matrix operation in the neural network, and the Cambricon matrix operation may include a matrix-vector multiplication operation, a vector multiply matrix operation, a matrix multiply scalar operation, an outer product operation, a matrix-add-matrix operation, and a matrix-subtract-matrix operation; the Cambricon vector operation instruction may be configured to complete a vector operation in the neural network, and the Cambricon vector operation may include a vector elementary operation, a vector transcendental function operation, a dot product operation, a random vector generation operation, and an operation of maximum/minimum of a vector; and the Cambricon scalar operation instruction may be configured to complete a scalar operation in the neural network, and the Cambricon scalar operation may include a scalar elementary operation and a scalar transcendental function; and a Cambricon logical instruction, including a Cambricon vector logical operation instruction and a Cambricon scalar logical operation instruction, configured for the logical operation of the neural network; where the Cambricon vector logical operation instruction may be configured for a vector comparing operation and a vector logical operation, the vector logical operation may include AND, OR, and NOT, and the Cambricon scalar logical operation instruction may be configured for a scalar comparing operation and a scalar logical operation.

In an embodiment, the Cambricon data transfer instruction may support one or more of the following data organization manners: matrix, vector, and scalar;

the vector elementary operation may include vector addition, subtraction, multiplication, and division;

the vector transcendental function may refer to a function which does not meet any polynomial equation taking polynomials as coefficients, and the function may include an exponential function, a logarithmic function, a trigonometric function, and an anti-trigonometric function;

the scalar elementary operation may include scalar addition, subtraction, multiplication, and division; the scalar transcendental function may refer to a function which does not meet any polynomial equation taking polynomials as coefficients, and the scalar transcendental function may include an exponential function, a logarithmic function, a trigonometric function, and an anti-trigonometric function;

the vector comparing operation may include greater than, smaller than, equal to, greater than or equal to ($\geq$), less than or equal to ($\leq$), and unequal to;

the vector logical operation may include AND, OR, and NOT;

the scalar comparing operation may include greater than, smaller than, equal to, greater than or equal to ($\geq$), less than or equal to ($\leq$), and unequal to; and the scalar logical operation may include AND, OR, and NOT.

Furthermore, the storage unit may be configured to store an unquantized weight, which is directly output to the operation unit.

The operation unit may include:
- a first operation part configured to multiply the weight and the input neuron; and/or
- a second operation part including one or a plurality of adders configured to add the weight and input neuron by one or a plurality of adders; and/or
- a third operation part configured to perform a nonlinear function on the weight and input neuron, where the nonlinear function may include an activation function, and the activation function may include sigmoid, tan h, relu and/or softmax; and/or
- a fourth operation part configured to perform a pooling operation on the weight and input neuron, where the pooling operation may include average pooling, maximum pooling, and/or median pooling, and the weight may include the unquantized weight and/or quantized weight.

Furthermore, the second operation part may include a plurality of adders, and the plurality of adders may constitute an adder tree to realize the addition of the weight and input neuron step by step.

A sixteenth aspect of the present disclosure provides a processing method including the following steps:
- receiving the input neuron, weight dictionary, weight codebook and instruction;
- decoding the instruction to generate the search and control information and operation control information; and
- looking up the weight dictionary and the weight codebook to obtain the quantized weight according to the search and control information, and performing operation on the quantized weight and input neuron according to the operation control information to obtain an output neuron and output the output neuron.

In an embodiment, before receiving the input neuron, weight dictionary, weight codebook and instruction, the method may further include the following step:
- pre-processing the external input information to obtain the input neuron, weight dictionary, weight codebook, and instruction.

After receiving the input neuron, weight dictionary, weight codebook and instruction, the method may further include the following step:
- storing the input neuron, weight dictionary, weight codebook, instruction and output neuron, and caching the instruction, input neuron and output neuron.

Further, after receiving the input neuron, weight dictionary, weight codebook and instruction, the method may further include: caching the weight dictionary and weight codebook.

In an embodiment, the pre-processing may include segmentation, Gaussian filter, binarization, regularization, and/or normalization.

Further, the instruction is a neural network dedicated instruction, which may include:
- a control instruction configured to control the execution process of the neural network;
- a data transfer instruction configured to perform data transfer between different storage media, where a data format may include a matrix format, a vector format, and a scalar format;
- an operation instruction configured to perform an arithmetic operation on the neural network including a matrix operation instruction, a vector operation instruction, a scalar operation instruction, a convolutional neural network operation instruction, a fully connected neural network operation instruction, a pooling neural network operation instruction, a Restricted Boltzmann Machine (RBM) neural network operation instruction, a Local Response Normalization (LRN) neural network operation instruction, a Local Contrast Normalization (LCN) neural network operation instruction, a Long Short-Term Memory (LSTM) neural network operation instruction, a Recurrent Neural Networks (RNN) operation instruction, a Rectified Linear Unit (RELU) neural network operation instruction, a Parametric Rectified Linear Unit (PRELU) neural network operation instruction, a SIGMOID neural network operation instruction, a TAN H neural network operation instruction and a MAXOUT neural network operation instruction; and
- a logical instruction configured to perform the neural network logical operation including a vector logical operation instruction and a scalar logical operation instruction.

Furthermore, the neural network dedicated instruction may include at least a Cambricon instruction composed of an operation code and an operand, and the Cambricon instruction may include:
- a Cambricon control instruction, including a jump instruction and a conditional branch instruction, configured to control the execution process;
- a Cambricon data transfer instruction, including a loading instruction, a storage instruction, and a moving instruction, configured to transfer data between different storage media; where the loading instruction may be configured to load data from a main memory to a cache; the storage instruction may be configured to store data from the cache to the main memory; and the moving instruction may be configured to move data from the cache to another cache or from the cache to a register or from the register to another register;
- a Cambricon operation instruction, including a Cambricon matrix operation instruction, a Cambricon vector operation instruction, and a Cambricon scalar operation instruction, configured to perform a neural network arithmetic operation; where the Cambricon matrix operation instruction may be configured to complete a matrix operation in the neural network, and the Cambricon matrix operation may include a matrix-vector multiplication operation, a vector multiply matrix operation, a matrix multiply scalar operation, an outer product operation, a matrix-add-matrix operation, and a matrix-subtract-matrix operation; the Cambricon vector operation instruction may be configured to complete a vector operation in the neural network, and the Cambricon vector operation may include a vector elementary operation, a vector transcendental function operation, a dot product operation, a random vector generation operation, and an operation of maximum/minimum of a vector; and the Cambricon scalar operation instruction may be configured to complete a scalar operation in the neural network, and the Cambricon scalar operation may include a scalar elementary operation and a scalar transcendental function; and
- a Cambricon logical instruction, including a Cambricon vector logical operation instruction and a Cambricon scalar logical operation instruction, configured for the logical operation of the neural network; where the Cambricon vector logical operation instruction may be configured for a vector comparing operation and a vector logical operation, the vector logical operation may include AND, OR, and NOT, and the Cambricon scalar logical operation instruction may be configured for a scalar comparing operation and a scalar logical operation.

In an embodiment, the Cambricon data transfer instruction may support one or more of the following data organization manners: matrix, vector, and scalar;

the vector elementary operation may include vector addition, subtraction, multiplication, and division;

the vector transcendental function may refer to a function which does not meet any polynomial equation taking polynomials as coefficients, and the function may include an exponential function, a logarithmic function, a trigonometric function, and an anti-trigonometric function;

the scalar elementary operation may include scalar addition, subtraction, multiplication, and division; the scalar transcendental function may refer to a function which does not meet any polynomial equation taking polynomials as coefficients, and the scalar transcendental function may include an exponential function, a logarithmic function, a trigonometric function, and an anti-trigonometric function;

the vector comparing operation may include greater than, smaller than, equal to, greater than or equal to ($\geq$), less than or equal to ($\leq$), and unequal to;

the vector logical operation may include AND, OR, and NOT;

the scalar comparing operation may include greater than, smaller than, equal to, greater than or equal to ($\geq$), less than or equal to ($\leq$), and unequal to; and the scalar logical operation may include AND, OR, and NOT.

Furthermore, the method may further include the following steps: receiving an unquantized weight, and performing operation on the unquantized weight and input neuron to obtain and an output neuron and output the output neuron.

Further, the operation may include:
adding the weight and input neuron; and/or
multiplying the weight and input neuron; and/or
performing a nonlinear function on the weight and input neuron, where the nonlinear function may include an activation function, and the activation function may include sigmoid, tan h, relu and/or softmax; and/or
performing a pooling operation on the weight and input neuron, where the pooling operation may include average pooling, maximum pooling, and/or median pooling, and the weight may include the unquantized weight and/or quantized weight.

In an embodiment, one or a plurality of adders are configured to add the weight and input neuron.

Further, a plurality of adders may constitute an adder tree to realize the addition of the weight and input neuron step by step.

A seventeenth aspect of the present disclosure provides a data quantization method including the following steps:
grouping the weight of a neural network;
performing a clustering operation on each group of weights by using a clustering algorithm, dividing a group of weights into m classes, computing a center weight for each class, and replacing all the weights in each class by the center weights, where m is a positive integer; and
encoding the center weight to obtain a weight codebook and a weight dictionary.

Furthermore, the method may also include:
retraining the neural network, where only the weight codebook is trained, and the weight dictionary remains unchanged.

Furthermore, the retraining may adopt a back-propagation algorithm.

Furthermore, the grouping may include grouping into one group, layer-type-based grouping, inter-layer-based grouping, and/or intra-layer-based grouping.

Furthermore, the clustering algorithm may include K-means, K-medoids, Clara, and/or Clarans.

Furthermore, the grouping is grouping into one group, which may include:
all weights of the neural network are grouped into one group.

Furthermore, the neural network may include a total of t different types of layers such as i convolutional layers, j fully connected layers, and m LSTM layers, where i, j, m are integers greater than or equal to 0, and satisfy i+j+m$\geq$1, t is an integer greater than or equal to 1 and satisfies t=i+j+m, and the grouping being a layer-type-based grouping may include:
grouping the weights of neural network into t groups.

Furthermore, the grouping being inter-layer-based grouping may include:
grouping the weights of one or a plurality of convolutional layers, one or a plurality of fully connected layers and one or a plurality of LSTM layers in the neural network into one group respectively.

Furthermore, the grouping being intra-layer-based grouping may include:
determining the weights in the convolutional layers of the neural network as a four-dimensional matrix (Nfin, Nfout, Kx, Ky), where Nfin, Nfout, Kx, Ky are positive integers, Nfin represents a count of input feature maps, and Nfout represents a count of output feature maps, (Kx, Ky) represents the size of the convolution kernel; grouping the weights of the convolutional layers into Nfin*Nfout*Kx*Ky/(Bfin*Bfout*Bx*By) different groups according to the group size of (Bfin, Bfout, Bx, By), where Bfin is a positive integer less than or equal to Nfin, Bfout is a positive integer less than or equal to Nfout, Bx is a positive integer less than or equal to Kx, and By is a positive integer less than or equal to Ky; or
determining the weights in the fully connected layers of the neural network as a two-dimensional matrix (NM, Nout), where NM, Nout are positive integers, Nin represents a count of input neurons, Nout represents a count of output neurons, and a count of weight is Nin*Nout; grouping the weights of the fully connected layers into (Nin*Nout)/(Bin*Bout) different groups according to the group size of (Bin, Bout), where Bin is a positive integer less than or equal to Nih, and Bout is a positive integer less than or equal to Nout; or
determining the weights in the LSTM layers of the neural network as a combination of the weights of a plurality of fully connected layers, where the weights of the LSTM layer are composed of the weights of n fully connected layers, n is a positive integer, therefore each fully connected layer can be grouped according to the grouping mode of the fully connected layer.

Furthermore, the grouping may be grouping into one group, inter-layer-based grouping, and intra-layer-based grouping may include:
grouping the convolutional layer into one group, grouping the fully connected layers according to intra-layer-based grouping, and grouping the LSTM layers according to inter-layer-based grouping.

Further, the center weight selection method of a class is: minimizing the cost function $J(w,w_0)$.

Furthermore, the cost function is:

$$J(w, w_0) = \sum_{i=1}^{n} (w_i - w_0)^2$$

where w is all the weights of a class, w0 is the center weight of the class, n is a count of weights in the class, wi is the $i^{th}$ weight of the class, and i is a positive integer greater than 0 and less than or equal to n.

An eighteenth aspect of the present disclosure provides a data quantization device including:
  a memory configured to store an operation instruction; and
  a processor configured to perform the operation instruction stored in the memory in accordance with all or part of the quantization method described in the seventeen aspect.

Further, the operation instruction is a binary number composed of an operation code and an address code, where the operation code indicates an operation to be performed by the processor, and the address code indicates an address in the memory where the processor reads data participating in the operation.

A nineteenth aspect of the present disclosure provides a processing device, which may include
  a control unit configured to receive an instruction and decode the instruction to generate search and control information and operation control information;
  a lookup table unit configured to receive the search and control information, a weight dictionary and a weight codebook, and perform a table lookup operation on the weight dictionary and the weight codebook to obtain a quantized weight according to the search and control information; and
  an operation unit configured to receive the operation control information and input neuron, and perform an operation on the quantized weight and input neuron according to the operation control information to obtain an output neuron and output the output neuron.

Furthermore, the processing device may also include:
  a pre-processing unit configured to pre-process external input information to obtain the input neuron, weight dictionary, weight codebook, and instruction;
  a storage unit configured to store the input neuron, weight dictionary, weight codebook and instruction, and receive the output neuron;
  a caching unit configured to cache the instruction, input neuron, output neuron, weight dictionary, and weight codebook; and
  a DMA unit configured to read/write data or instruction between the storage unit and the caching unit.

Furthermore, the pre-processing unit pre-processing external input information may include: segmentation, Gaussian filter, binarization, regularization, and/or normalization.

Further, the caching unit may include:
  an instruction caching unit configured to cache the instruction;
  an input neuron caching unit configured to cache the input neuron; and
  an output neuron caching unit configured to cache the output neuron.

Further, the caching unit may further include:
  a weight dictionary caching unit configured to cache the weight dictionary; and
  a weight codebook caching unit configured to cache the code book.

Further, the instruction may be a neural network dedicated instruction, and the neural network dedicated instruction may include:
  a control instruction configured to control the execution process of the neural network;
  a data transfer instruction configured to perform data transfer between different storage media, where a data format may include a matrix format, a vector format, and a scalar format;
  an operation instruction configured to perform an arithmetic operation on the neural network including a matrix operation instruction, a vector operation instruction, a scalar operation instruction, a convolutional neural network operation instruction, a fully connected neural network operation instruction, a pooling neural network operation instruction, a Restricted Boltzmann Machine (RBM) neural network operation instruction, a Local Response Normalization (LRN) neural network operation instruction, a Local Contrast Normalization (LCN) neural network operation instruction, a Long Short-Term Memory (LSTM) neural network operation instruction, a Recurrent Neural Networks (RNN) operation instruction, a Rectified Linear Unit (RELU) neural network operation instruction, a Parametric Rectified Linear Unit (PRELU) neural network operation instruction, a SIGMOID neural network operation instruction, a TAN H neural network operation instruction and a MAXOUT neural network operation instruction; and
  a logical instruction configured to perform the neural network logical operation including a vector logical operation instruction and a scalar logical operation instruction.

Furthermore, the neural network dedicated instruction may include at least a Cambricon instruction composed of an operation code and an operand, and the Cambricon instruction may include:
  a Cambricon control instruction, including a jump instruction and a conditional branch instruction, configured to control the execution process;
  a Cambricon data transfer instruction, including a loading instruction, a storage instruction, and a moving instruction, configured to transfer data between different storage media; where the loading instruction may be configured to load data from a main memory to a cache; the storage instruction may be configured to store data from the cache to the main memory; and the moving instruction may be configured to move data from the cache to another cache or from the cache to a register or from the register to another register;
  a Cambricon operation instruction, including a Cambricon matrix operation instruction, a Cambricon vector operation instruction, and a Cambricon scalar operation instruction, configured to perform a neural network arithmetic operation; where the Cambricon matrix operation instruction may be configured to complete a matrix operation in the neural network, and the Cambricon matrix operation may include a matrix-vector multiplication operation, a vector multiply matrix operation, a matrix multiply scalar operation, an outer product operation, a matrix-add-matrix operation, and a matrix-subtract-matrix operation; the Cambricon vector operation instruction may be configured to complete a vector operation in the neural network, and the Cambricon vector operation may include a vector elementary operation, a vector transcendental function operation, a dot product operation, a random vector generation operation, and an operation of maximum/minimum of a vector; and the Cambricon scalar operation instruction may be configured to complete a scalar operation in the neural network, and the Cambricon scalar operation may include a scalar elementary operation and a scalar transcendental function; and a Cambricon logical instruction, including a Cambricon vector logical operation instruction and a Cambricon scalar logical operation instruction, configured for the logical operation of the neural network; where the Cambricon vector logical operation instruction may be configured for a vector comparing operation and a vector logical operation, the vector logical operation may include AND, OR, and NOT, and the Cambricon scalar logical operation instruction may be configured for a scalar comparing operation and a scalar logical operation.

In an embodiment, the Cambricon data transfer instruction may support one or more of the following data organization manners: matrix, vector, and scalar;

the vector elementary operation may include vector addition, subtraction, multiplication, and division;

the vector transcendental function may refer to a function which does not meet any polynomial equation taking polynomials as coefficients, and the function may include an exponential function, a logarithmic function, a trigonometric function, and an anti-trigonometric function;

the scalar elementary operation may include scalar addition, subtraction, multiplication, and division; the scalar transcendental function may refer to a function which does not meet any polynomial equation taking polynomials as coefficients, and the scalar transcendental function may include an exponential function, a logarithmic function, a trigonometric function, and an anti-trigonometric function;

the vector comparing operation may include greater than, smaller than, equal to, greater than or equal to ($\geq$), less than or equal to ($\leq$), and unequal to;

the vector logical operation may include AND, OR, and NOT;

the scalar comparing operation may include greater than, smaller than, equal to, greater than or equal to ($\geq$), less than or equal to ($\leq$), and unequal to; and the scalar logical operation may include AND, OR, and NOT.

Furthermore, the storage unit may be configured to store an unquantized weight, which is directly output to the operation unit.

The operation unit may include:

a first operation part configured to multiply the weight and the input neuron; and/or a second operation part including one or a plurality of adders configured to add the weight and input neuron by one or a plurality of adders; and/or a third operation part configured to perform a nonlinear function on the weight and input neuron, where the nonlinear function may include an activation function, and the activation function may include sigmoid, tan h, relu and/or softmax; and/or a fourth operation part configured to perform a pooling operation on the weight and input neuron, where the pooling operation may include average pooling, maximum pooling, and/or median pooling, and the weight may include the unquantized weight and/or quantized weight.

Furthermore, the second operation part may include a plurality of adders, and the plurality of adders may constitute an adder tree to realize the addition of the weight and input neuron step by step.

A twentieth aspect of the present disclosure provides a processing method including the following steps:

receiving the input neuron, weight dictionary, weight codebook and instruction;

decoding the instruction to generate the search and control information and operation control information; and looking up the weight dictionary and the weight codebook to obtain the quantized weight according to the search and control information, and performing operation on the quantized weight and input neuron according to the operation control information to obtain an output neuron and output the output neuron.

In an embodiment, before receiving the input neuron, weight dictionary, weight codebook and instruction, the method may further include the following step:

pre-processing the external input information to obtain the input neuron, weight dictionary, weight codebook, and instruction.

After receiving the input neuron, weight dictionary, weight codebook and instruction, the method may further include the following step:

storing the input neuron, weight dictionary, weight codebook, instruction and output neuron, and caching the instruction, input neuron and output neuron.

Further, after receiving the input neuron, weight dictionary, weight codebook and instruction, the method may further include: caching the weight dictionary and weight codebook.

In an embodiment, the pre-processing may include segmentation, Gaussian filter, binarization, regularization, and/or normalization.

Further, the instruction may be a neural network dedicated instruction, and the neural network dedicated instruction may include:

a control instruction configured to control the execution process of the neural network;

a data transfer instruction configured to perform data transfer between different storage media, where a data format may include a matrix format, a vector format, and a scalar format;

an operation instruction configured to perform an arithmetic operation on the neural network including a matrix operation instruction, a vector operation instruction, a scalar operation instruction, a convolutional neural network operation instruction, a fully connected neural network operation instruction, a pooling neural network operation instruction, a Restricted Boltzmann Machine (RBM) neural network operation instruction, a Local Response Normalization (LRN) neural network operation instruction, a Local Contrast Normalization (LCN) neural network operation instruction, a Long Short-Term Memory (LSTM) neural network operation instruction, a Recurrent Neural Networks (RNN) operation instruction, a Rectified Linear Unit (RELU) neural network operation instruction, a Parametric Rectified Linear Unit (PRELU) neural network operation instruction, a SIGMOID neural network operation instruction, a TAN H neural network operation instruction and a MAXOUT neural network operation instruction; and a logical instruction configured to perform the neural network logical operation including a vector logical operation instruction and a scalar logical operation instruction.

Furthermore, the neural network dedicated instruction may include at least a Cambricon instruction composed of an operation code and an operand, and the Cambricon instruction may include:

a Cambricon control instruction, including a jump instruction and a conditional branch instruction, configured to control the execution process;

a Cambricon data transfer instruction, including a loading instruction, a storage instruction, a moving instruction, configured to transfer data between different storage; where the loading instruction may be configured to load data from a main memory to a cache; the storage instruction may be configured to store data from the cache to the main memory; and the moving instruction may be configured to move data from the cache to another cache or from the cache to a register or from the register to another register;

a Cambricon operation instruction, including a Cambricon matrix operation instruction, a Cambricon vector operation instruction, and a Cambricon scalar operation instruction, configured to perform a neural network arithmetic operation; where the Cambricon matrix operation instruction may be configured to complete a matrix operation in the neural network, and the Cambricon matrix operation may include a matrix-vector multiplication operation, a vector multiply matrix operation, a matrix multiply scalar operation, an outer product operation, a matrix-add-matrix operation, and a matrix-subtract-matrix operation; the Cambricon vector operation instruction may be configured to complete a vector operation in the neural network, and the Cambricon vector operation may include a vector elementary operation, a vector transcendental function operation, a dot product operation, a random vector generation operation, and an operation of maximum/minimum of a vector; and the Cambricon scalar operation instruction may be configured to complete a scalar operation in the neural network, and the Cambricon scalar operation may include a scalar elementary operation and a scalar transcendental function; and a Cambricon logical instruction, including a Cambricon vector logical operation instruction and a Cambricon scalar logical operation instruction, configured for the logical operation of the neural network; where the Cambricon vector logical operation instruction may be configured for a vector comparing operation and a vector logical operation, the vector logical operation may include AND, OR, and NOT, and the Cambricon scalar logical operation instruction may be configured for a scalar comparing operation and a scalar logical operation.

In an embodiment, the Cambricon data transfer instruction may support one or more of the following data organization manners: matrix, vector, and scalar;

the vector elementary operation may include vector addition, subtraction, multiplication, and division;

the vector transcendental function may refer to a function which does not meet any polynomial equation taking polynomials as coefficients, and the function may include an exponential function, a logarithmic function, a trigonometric function, and an anti-trigonometric function;

the scalar elementary operation may include scalar addition, subtraction, multiplication, and division; the scalar transcendental function may refer to a function which does not meet any polynomial equation taking polynomials as coefficients, and the scalar transcendental function may include an exponential function, a logarithmic function, a trigonometric function, and an anti-trigonometric function;

the vector comparing operation may include greater than, smaller than, equal to, greater than or equal to ($\geq$), less than or equal to ($\leq$), and unequal to;

the vector logical operation may include AND, OR, and NOT;

the scalar comparing operation may include greater than, smaller than, equal to, greater than or equal to ($\geq$), less than or equal to ($\leq$), and unequal to; and the scalar logical operation may include AND, OR, and NOT.

Furthermore, the method may further include the following steps: receiving an unquantized weight, and performing operation on the unquantized weight and input neuron to obtain and an output neuron and output the output neuron.

Further, the operation may include:

adding the weight and the input neuron; and/or multiplying the weight and the input neuron; and/or performing a nonlinear function on the weight and input neuron, where the nonlinear function may include an activation function, and the activation function may include sigmoid, tan h, relu and/or softmax; and/or performing a pooling operation on the weight and input neuron, where the pooling operation may include average pooling, maximum pooling, and/or median pooling, and the weight may include the unquantized weight and/or quantized weight.

In an embodiment, one or a plurality of adders are configured to add the weight and input neuron.

Further, a plurality of adders may constitute an adder tree to realize the addition of the weight and input neuron step by step.

A twenty-first aspect of the present disclosure provides a data compression method including:

performing coarse-grained pruning on a weight of a neural network, which may include: selecting M weights from the neural network through a sliding window, setting all or part of the M weights to 0 when the M weights meet a preset condition, where the M is an positive integer greater than 0; performing a first retraining on the neural network, where the weight which has been set to 0 in the retraining process remains 0, and quantizing the weight of the neural network, which may include: grouping the weights of the neural network; performing a clustering operation on each group of weights by using a clustering algorithm, computing a center weight of each class, and replacing all the weights in each class by the center weights.

Furthermore, after quantizing the weight of the neural network, the method may also include:

encoding the center weight to obtain a weight codebook and a weight dictionary.

Furthermore, after encoding the center weight, the method may also include:

performing a second retraining on the neural network.

Furthermore, only the weight codebook is trained during the second retraining of the neural network, and the weight dictionary remains unchanged.

Furthermore, the preset condition is:
the information quantity of the M weights is less than a first given threshold.

Furthermore, the information quantity of the M weights is an arithmetic mean of an absolute value of the M weights, a geometric mean of the absolute value of the M weights or a maximum value of the M weights; the first given threshold is a first threshold, a second threshold or a third threshold; and the information quantity of the M weights being less than the first given threshold may include:
the arithmetic mean of the absolute value of the M weights being less than the first threshold, or the geometric mean of the absolute value of the M weights being less than the second threshold, or the maximum value of the M weights being less than the third threshold.

Furthermore, the method may also include:
repeating selecting M weights from the neural network through the sliding window, setting all or part of the M weights to 0 when the M weights meet the preset condition; and performing the first retraining on the neural network until no weight can be set to 0 without losing a preset precision.

Furthermore, the preset precision is x %, where x is between 0-5.

In an embodiment, the neural network may include a fully connected layer, a convolutional layer and/or a LSTM layer. The weight of the fully connected layer is a two-dimensional matrix (Nin,Nout), where Nin represents a count of input neurons and Nout represents a count of output neurons, and the fully connected layer has Nin*Nout weights; the weight of the convolutional layer is a four-dimensional matrix (Nfin, Nfout, Kx, Ky), where Nfin represents a count of input feature maps, Nfout represents a count of output feature maps, (Kx,Ky) is the size of a convolution kernel, and the convolutional layer has Nfin*Nfout*Kx*Ky weights; the weight of LSTM layer is composed of m weights of the fully connected layer, where m is a positive integer greater than 0, and an $i^{th}$ weight of the fully connected layer is (Nin_i, Nout_i), where i is a positive integer greater than 0 and less than or equal to m, Nin_i represents a count of input neurons of the weight of the fully connected layer and Nout_i represents a count of output neurons of the $i^{th}$ weight of the fully connected layer. The coarse-grained pruning unit may be specifically configured to:
perform coarse-grained pruning on the weight of the fully connected layer, where the sliding window is a sliding window with the size of Bin*Bout, Bin is a positive integer greater than 0 and less than or equal to Nin, and Bout is a positive integer greater than 0 and less than or equal to Nout;
make the sliding window slide Sin stride in the direction of Bin, or slide Sout stride in the direction of Bout, where Sin is a positive integer greater than 0 and less than or equal to Bin, and Sout is a positive integer greater than 0 and less than or equal to Bout;
select M weights from the Nin*Nout weights through the sliding window, and when the M weights meet the preset condition, all or part of the M weights may be set to 0, where M=Bin*Bout;
perform coarse-grained pruning on the weight of the convolutional layer, the sliding window is a four-dimensional sliding window with the size of Bfin*Bfout*Bx*By, where Bfin is a positive integer greater than 0 and less than or equal to Nfin, Bfout is a positive integer greater than 0 and less than or equal to Nfout, Bx is a positive integer greater than 0 and less than or equal to Kx, and By is a positive integer greater than 0 and less than or equal to Ky;
make the sliding window slide Sfin stride in the direction of Bfin, or slide Sfout stride in the direction of Bfout, or slide S stride in the direction of Bx, or slide Sy stride in the direction of By, where Sfin is a positive integer greater than 0 and less than or equal to Bfin, Sfout is a positive integer greater than 0 and less than or equal to Bfout, Sx is a positive integer greater than 0 and less than or equal to Bx, and Sy is a positive integer greater than 0 and less than or equal to By;
select M weights from the Nfin*Nfout*Kx*Ky weights through the sliding window, and when the M weights meet the preset condition, all or part of the M weights may be set to 0, where M=Bfin*Bfout*Bx*By;
perform coarse-grained pruning on the weight of the LSTM layer, the size of the sliding window is Bin_i*Bout_i, where Bin_i is a positive integer greater than 0 and less than or equal to Nin_i, and Bout_i is a positive integer greater than 0 and less than or equal to Nout_i;
make the sliding window slide Sin_i stride in the direction of Bin_i, or slide Sout_i stride in the direction of Bout_i, where Sin_i is a positive integer greater than 0 and less than or equal to Bin_i, and Sout_i is a positive integer greater than 0 and less than or equal to Bout_i; and
select M weights from the Bin_i*Bout_i weights through the sliding window, and when the M weights meet the preset condition, all or part of the M weights may be set to 0, where M=Bin_i*Bout_i.

In an embodiment, the first retraining adopts a back-propagation algorithm, and the weight which has been set to 0 in the retraining process remains 0.

Furthermore, the grouping method of the weights of the neural network may include:
grouping the weights of the neural network into one group, and/or;
grouping the weights of the neural network according to the layer-type-based grouping method, and/or;
grouping the weights of the neural network by an inter-layer-based grouping method or an intra-layer-based grouping method.

Furthermore, grouping the weights of the neural network according to the layer-type-based grouping method may include:
grouping the weights of all convolutional layers, all fully connected layers and all LSTM layers in the neural network into one group respectively.

Furthermore, grouping the weights of the neural network by an inter-layer-based grouping method may include:
grouping the weights of one or a plurality of convolutional layers, one or a plurality of fully connected layers and one or a plurality of LSTM layers in the neural network into one group respectively.

Furthermore, grouping the weights of the neural network by an intra-layer-based grouping method may include:
segmenting the weights in one layer of the neural network, where each segmented part forms a group.

Furthermore, the clustering algorithm may include K-means, K-medoids, Clara, and/or Clarans.

In an embodiment, the center weight selection method of a class is: minimizing the cost function $J(w, w_0)$.

Furthermore, the cost function meets the condition:

$$J(w, w_0) = \sum_{i=1}^{n} (w_i - w_0)^2$$

where w is all the weights of a class, w0 is the center weight of the class, n is a count of weights in the class, wi is the $i^{th}$ weight of the class, and i is a positive integer greater than 0 and less than or equal to n.

Further, the second retraining performed on the neural network after clustering and encoding may include:
performing retraining on the neural network after clustering and encoding by using the back-propagation algorithm, where the weights that have been set to 0 in the retraining process remain 0 all the time, and only the weight codebook is retrained, and the weight dictionary is not retrained.

A twenty-second aspect of the present disclosure provides a data compression device including:
a memory configured to store an operation instruction; and
a processor configured to perform the operation instruction stored in the memory in accordance with all or part of the data compression method described in the twenty-first aspect.

A twenty-third aspect of the present disclosure provides a data compression method including:
performing coarse-grained pruning on a weight of a neural network, which may include: selecting M weights from the neural network through a sliding window, setting all or part of the M weights to 0 when the M weights meet a preset condition, where the M is an positive integer greater than 0; performing a first retraining on the neural network, where the weight which has been set to 0 in the retraining process remains 0, and
quantizing the weight of the neural network, which may include: grouping the weights of the neural network; performing a clustering operation on each group of weights by using a clustering algorithm, computing a center weight of each class, and replacing all the weights in each class by the center weights.

Furthermore, after quantizing the weight of the neural network, the method may also include:
encoding the center weight to obtain a weight codebook and a weight dictionary.

Furthermore, after encoding the center weight, the method may also include:
performing a second retraining on the neural network.

Furthermore, only the weight codebook is trained during the second retraining of the neural network, and the weight dictionary remains unchanged.

Furthermore, the preset condition is:
the information quantity of the M weights is less than a first given threshold.

Furthermore, the information quantity of the M weights is an arithmetic mean of an absolute value of the M weights, a geometric mean of the absolute value of the M weights or a maximum value of the M weights; the first given threshold is a first threshold, a second threshold or a third threshold; and the information quantity of the M weights being less than the first given threshold may include:
the arithmetic mean of the absolute value of the M weights being less than the first threshold, or the geometric mean of the absolute value of the M weights being less than the second threshold, or the maximum value of the M weights being less than the third threshold.

Furthermore, the method may also include:
repeating selecting M weights from the neural network through the sliding window, setting all or part of the M weights to 0 when the M weights meet a preset condition; and performing the first retraining on the neural network until no weight can be set to 0 without losing a preset precision.

Furthermore, the preset precision is x %, where x is between 0 and 5.

Further, performing coarse-grained pruning on the weight of the neural network may include:
performing coarse-grained pruning on the weight of a fully connected layer of the neural network, or performing coarse-grained pruning on the weight of a convolutional layer of the neural network, or performing coarse-grained pruning on the weight of a LSTM layer of the neural network.

In an embodiment, the weight of the fully connected layer is a two-dimensional matrix (Nin, Nout), where Nin represents a count of input neurons and Nout represents a count of output neurons, and the fully connected layer has Nin*Nout weights; the size of the sliding window is Bin*Bout, where Bin is a positive integer greater than 0 and less than or equal to Nin, and Bout is a positive integer greater than 0 and less than or equal to Nout.

The performing coarse-grained pruning on the weight of the fully connected layer of the neural network may include:
making the sliding window slide Sin stride in the direction of Bin, or slide Sout stride in the direction of Bout, where Sin is a positive integer greater than 0 and less than or equal to Bin, and Sout is a positive integer greater than 0 and less than or equal to Bout; and
selecting M weights from the Nin*Nout weights through the sliding window, and when the M weights meet the preset condition, all or part of the M weights may be set to 0, where M=Bin*Bout.

Further, the weight of the convolutional layer of the neural network is a four-dimensional matrix (Nfin,Nfout,Kx,Ky), where Nfin represents a count of input feature maps, Nfout represents a count of output feature maps, (Kx,Ky) is the size of a convolution kernel, and the convolutional layer has Nfin*Nfout*Kx*Ky weights; the sliding window is a four-dimensional sliding window with the size of Bfin*Bfout*Bx*By, where Bfin is a positive integer greater than 0 and less than or equal to Nfin, Bfout is a positive integer greater than 0 and less than or equal to Nfout, Bx is a positive integer greater than 0 and less than or equal to Kx, and By is a positive integer greater than 0 and less than or equal to Ky.

The performing coarse-grained pruning on the weight of the convolutional layer of the neural network may include:
making the sliding window slide Sfin stride in the direction of Bfin, or slide Sfout stride in the direction of Bfout, or slide S stride in the direction of Bx, or slide Sy stride in the direction of By, where Sfin is a positive integer greater than 0 and less than or equal to Bfin, Sfout is a positive integer greater than 0 and less than or equal to Bfout, Sx is a positive integer greater than 0 and less than or equal to Bx, and Sy is a positive integer greater than 0 and less than or equal to By; and
selecting M weights from the Nfin*Nfout*Kx*Ky weights through the sliding window, and when the M weights meet the preset condition, all or part of the M weights may be set to 0, where M=Bfin*Bfout*Bx*By.

Further, the weight of the LSTM layer is composed of m weights of the fully connected layer, where m is a positive integer greater than 0, and an $i^{th}$ weight of the fully connected layer is a two-dimensional matrix (Nin_i, Nout_i), where i is a positive integer greater than 0 and less than or equal to m, Nin_i represents a count of input neurons of the $i^{th}$ weight of the fully connected layer and Nout_i represents a count of output neurons of the $i^{th}$ weight of the fully connected layer; the size of the sliding window is Bin_i*Bout_i, Bin_i is a positive integer greater than 0 and less than or equal to Nin_i, and Bout_i is a positive integer greater than 0 and less than or equal to Nout_i.

Further, performing the coarse-grained pruning on the weight of the LSTM layer of the neural network may include:
  making the sliding window slide Sin_i stride in the direction of Bin_i, or slide Sout_i stride in the direction of Bout_i, where Sin_i is a positive integer greater than 0 and less than or equal to Bin_i, and Sout_i is a positive integer greater than 0 and less than or equal to Bout_i; and
  selecting M weights from the Bin_i*Bout_i weights through the sliding window, and when the M weights meet the preset condition, all or part of the M weights may be set to 0, where M=Bin_i*Bout_i.

Furthermore, the first retraining adopts a back-propagation algorithm, and the weight that has been set to 0 in the retraining process remains 0.

Furthermore, the grouping method of the weights of the neural network may include:
  grouping the weights of the neural network into one group, and/or;
  grouping the weights of the neural network according to the layer-type-based grouping method, and/or;
  grouping the weights of the neural network by an inter-layer-based grouping method or an intra-layer-based grouping method.

Furthermore, grouping the weights of the neural network according to the layer-type-based grouping method may include:
  grouping the weights of all convolutional layers, all fully connected layers and all LSTM layers in the neural network into one group respectively.

Furthermore, grouping the weights of the neural network by an inter-layer-based grouping method may include:
  grouping the weights of one or a plurality of convolutional layers, one or a plurality of fully connected layers and one or a plurality of LSTM layers in the neural network into one group respectively.

Furthermore, grouping the weights of the neural network by an intra-layer-based grouping method may include:
  segmenting the weights in one layer of the neural network, where each segmented part forms a group.

Furthermore, the clustering algorithm may include K-means, K-medoids, Clara, and/or Clarans.

In an embodiment, the center weight selection method of a class is: minimizing the cost function $J(w, w_0)$.

Furthermore, the cost function meets the condition:

$$J(w, w_0) = \sum_{i=1}^{n} (w_i - w_0)^2$$

where w is all the weights of a class, w0 is the center weight of the class, n is a count of weights in the class, wi is the $i^{th}$ weight of the class, and i is a positive integer greater than 0 and less than or equal to n.

Further, the second retraining performed on the neural network after clustering and encoding may include:
  performing retraining on the neural network after clustering and encoding by using the back-propagation algorithm, where the weights that have been set to 0 in the retraining process remain 0 all the time, and only the weight codebook is retrained, and the weight dictionary is not retrained.

A twenty-fourth aspect of the present disclosure provides a compression device for data of a neural network including:
  a memory configured to store an operation instruction; and
  a processor configured to perform the operation instruction stored in the memory in accordance with the data compression method described in any of the above aspects.

A twenty-fifth aspect of the present disclosure provides a processing device including:
  a coarse-grained selection unit configured to input position information of a neuron and a target weight, and select a neuron to be computed, where the target weight is a weight whose absolute value is greater than a second given threshold;
  a lookup table unit configured to receive a quantized target weight dictionary and a quantized target weight codebook, perform a table lookup operation to obtain and output a target weight of a neural network; and
  an operation unit configured to receive the selected neuron and target weight, perform an operation on the neural network, and output the neuron.

In an embodiment, the lookup table unit may be further configured to transmit an unquantized target weight directly to the operation unit by a bypass.

The processing device may further include an instruction control unit configured to receive and decode the instruction to obtain control information to control the operation unit, and a storage unit configured to store a neuron, a weight and an instruction of the neural network.

In an embodiment, the storage unit may be further configured to store the target weight and position information of the target weight, and store the quantized target weight codebook and the quantized target weight dictionary.

Further, the operation unit may include at least one of the following:
  a multiplier configured to multiply first input data and second input data to obtain a product;
  an adder tree configured to add third input data step by step, or add the third input data to fourth input data to obtain a sum; and
  an activation function unit configured to perform an activation function on fifth data to obtain output data, where the activation function may include sigmoid, tan h, relu or softmax.

Further, the operation unit may further include a pooling unit configured to perform a pooling operation on sixth input data to obtain output data, where the pooling operation may include average pooling, maximum pooling, and median pooling.

In an embodiment, the processing device may further include:
  an instruction control unit configured to receive and decode the instruction in the storage unit to generate control information, where the instruction control unit controls the coarse-grained selection unit to perform a selection operation, controls the lookup table unit to perform the table lookup operation, and controls the operation unit to perform a computation operation.

Further, the instruction is a neural network dedicated instruction including a control instruction, a data transfer instruction, an operation instruction, and a logical instruction.

In an embodiment, the neural network dedicated instruction is a Cambricon instruction set, and each instruction in the Cambricon instruction set has a length of 64 bits, and the instruction may be composed of an operation code and an operand.

Further, the control instruction may be configured to control the execution process of the neural network, and the control instruction may include a jump instruction and a conditional branch instruction.

Further, the data transfer instruction may be configured to transfer data between different storage media, and the data transfer instruction may include a loading instruction, a storage instruction, and a moving instruction.

Further, the operation instruction may be configured to perform a neural network arithmetic operation, and the operation instruction may include a matrix operation instruction, a vector operation instruction, a scalar operation instruction, a convolutional neural network operation instruction, a fully connected neural network operation instruction, a pooling neural network operation instruction, an RBM neural network operation instruction, an LRN neural network operation instruction, an LCN neural network operation instruction, an LSTM neural network operation instruction, an RNN operation instruction, an ReLU neural network operation instruction, a PReLU neural network operation instruction, a SIGMOID neural network operation instruction, a TAN H neural network operation instruction, and a MAXOUT neural network operation instruction.

Further, the logical instruction may be configured to perform a logical operation of the neural network, and the logical instruction may include a vector logical operation instruction and a scalar logical operation instruction.

In an embodiment, the vector logical operation instruction may include a vector comparing operation and a vector logical operation, preferably, the vector comparing operation may include but not be limited to greater than, less than, equal to, greater than or equal to ($\geq$), less than or equal to ($\leq$), and not equal to; and the vector logical operation may include AND, OR, and NOT.

The scalar logical operation may include a scalar comparing operation, a scalar logical operation; preferably, the scalar comparing operation may include but not be limited to, greater than, less than, equal to, greater than or equal to ($\geq$), less than or equal to ($\leq$), and not equal to; the scalar logical operation may include AND, OR, and NOT.

Further, the processing device may further include an instruction caching unit configured to cache the instruction, where the instruction caching unit is an on-chip caching unit.

In an embodiment, the processing device may further include a target weight codebook caching unit configured to cache a target weight codebook, and the target weight codebook caching unit is an on-chip caching unit.

In an embodiment, the processing device may further include a target weight dictionary caching unit configured to cache a target weight dictionary, where the target weight dictionary caching unit is an on-chip caching unit.

In an embodiment, the processing device may further include a target weight position caching unit configured to cache a position of a target weight, and map each connection weight in the input data to the corresponding input neuron, where the target weight position caching unit is an on-chip caching unit.

Further, the target weight position caching unit mapping each connection weight in the input data to the corresponding input neuron may include: 1 indicating that the weight is connected to the input neuron, 0 indicating that the weight is not connected to the input neuron, and a connection status of the input and output of each group forming a string of 0 and 1 to indicate the connection relationship of the output.

Further, the target weight position caching unit mapping each connection weight in the input data to the corresponding input neuron may include: combining a distance from the input neuron where a first connection is located in a first group to a first input neuron, a distance from the input neuron where a second connection is located to a previous connection in the input neuron, a distance from the input neuron where a third connection is located to the previous connection in the input neuron, . . . , and so on, until all the input neurons connected to the output neuron are exhausted, into a connection array of the output.

In an embodiment, the processing device may further include an input neuron caching unit configured to cache an input neuron input to the coarse-grained selection unit, where the input neuron caching unit is an on-chip caching unit.

In an embodiment, the processing device may further include an output neuron caching unit configured to cache an output neuron, where the output neuron caching unit is an on-chip caching unit.

Further, the processing device may further include a DMA unit configured to read/write data or instruction in the storage unit, the instruction caching unit, the target weight codebook caching unit, the target weight dictionary caching unit, the target weight position caching unit, the input neuron caching unit, and the output neuron caching unit.

Further, the processing device may further include a pre-processing unit configured to pre-process original data, and input pre-processed data into the storage unit.

A twenty-sixth aspect of the present disclosure provides a processing method including:
  inputting position information of a neuron and a target weight, selecting the neuron that needs to be computed;
  receiving a quantized target weight dictionary and a quantized target weight codebook, performing a table lookup operation, and generating and outputting the target weight of the neural network; and
  receiving the selected neuron and target weight, performing an operation on the neural network, and generating and outputting the neuron.

In an embodiment, the processing method may include: receiving an unquantized target weight for neural network operation.

In an embodiment, the processing method may further include: receiving and decoding an instruction to generate control information for controlling the neural network operation.

Further, the operation may include at least one of the following: a multiplication operation multiplying first input data and second input data to obtain a product; an addition operation adding third input data through a adder tree step by step, or adding the third input data to fourth input data to obtain a sum; an activation function performing an activation function on fifth data to obtain output data, where the activation function may include sigmoid, tan h, relu or softmax.

Furthermore, the operation may also include a pooling operation performed on sixth input data to obtain an output data, where the pooling operation may include average pooling, maximum pooling, and median pooling.

Furthermore, the instruction is a neural network dedicated instruction including a control instruction, a data transfer instruction, an operation instruction, and a logical instruction.

Further, the control instruction may be configured to control the execution process of the neural network, and the control instruction may include a jump instruction and a conditional branch instruction.

Further, the data transfer instruction may be configured to transfer data between different storage media, and the data transfer instruction may include a loading instruction, a storage instruction, and a moving instruction.

Further, the operation instruction may be configured to perform a neural network arithmetic operation, and the operation instruction may include a matrix operation instruction, a vector operation instruction, a scalar operation instruction, a convolutional neural network operation instruction, a fully connected neural network operation instruction, a pooling neural network operation instruction, an RBM neural network operation instruction, an LRN neural network operation instruction, an LCN neural network operation instruction, an LSTM neural network operation instruction, an RNN operation instruction, an ReLU neural network operation instruction, a PReLU neural network operation instruction, a SIGMOID neural network operation instruction, a TAN H neural network operation instruction, and a MAXOUT neural network operation instruction.

In an embodiment, the neural network dedicated instruction is a Cambricon instruction set, and the instruction may be composed of an operation code and an operand.

Each instruction in the Cambricon instruction set has a fixed length, for example, each instruction in the Cambricon instruction set has a length of 64 bits.

Further, the logical instruction may be configured to perform a logical operation of the neural network, and the logical instruction may include a vector logical operation instruction and a scalar logical operation instruction.

In an embodiment, the vector logical operation instruction may include a vector comparing operation and a vector logical operation, preferably, the vector comparing operation may include but not be limited to greater than, less than, equal to, greater than or equal to ($\geq$), less than or equal to ($\leq$), and not equal to; and the vector logical operation may include AND, OR, and NOT.

The scalar logical operation may include a scalar comparing operation, a scalar logical operation; preferably, the scalar comparing operation may include but not be limited to greater than, less than, equal to, greater than or equal to ($\geq$), less than or equal to ($\leq$), and not equal to; the scalar logical operation may include AND, OR, and NOT.

Further, the processing method may further include a step: pre-processing position information of the input neuron and target weight, where the pre-processing may include segmentation, Gaussian filter, binarization, regularization, and/or normalization.

In an embodiment, after receiving the selected neuron and the target weight, the processing method may further include the steps: storing the input neuron, the weight dictionary, the weight codebook and the instruction, and storing the output neuron; and caching the instruction, the input neuron, and the output neuron.

A twenty-seventh aspect of the present disclosure provides an electronic device including a robot, a computer, a printer, a scanner, a tablet computer, an intelligent terminal, a mobile phone, an automobile data recorder, a navigator, a sensor, a webcam, a cloud server, a camera, a video camera, a projector, a watch, an earphone, a mobile storage, a wearable device, a vehicle, a household electrical appliance, and/or a medical device.

The vehicles may include an airplane, a ship, and/or a car. The household electrical appliance may include a television, an air conditioner, a microwave oven, a refrigerator, an electric rice cooker, a humidifier, a washing machine, an electric lamp, a gas cooker, and a range hood. The medical device may include a nuclear magnetic resonance spectrometer, a B-ultrasonic scanner, and/or an electrocardiograph.

A twenty-eighth aspect of the present disclosure provides a processing device including:
- a coarse-grained selection unit configured to input position information of a neuron and a target weight, and select a neuron to be computed, where the target weight is a weight whose absolute value is greater than a given threshold;
- a lookup table unit configured to receive a quantized target weight dictionary and a quantized target weight codebook, perform a table lookup operation to obtain and output a target weight of a neural network; and
- an operation unit configured to receive the selected neuron and target weight, perform an operation on the neural network, and output the neuron.

In an embodiment, the lookup table unit may be further configured to transmit an unquantized target weight directly to the operation unit by a bypass.

The processing device may further include an instruction control unit configured to receive and decode the instruction to obtain control information to control the operation unit, and a storage unit configured to store a neuron, a weight and an instruction of the neural network.

In an embodiment, the storage unit may be further configured to store the target weight and the position information of the target weight, and store the quantized target weight codebook and the target weight dictionary.

Further, the operation unit may include at least one of the following:
- a multiplier configured to multiply first input data and second input data to obtain a product;
- an adder tree configured to add third input data step by step, or add the third input data to fourth input data to obtain a sum; and
- an activation function unit configured to perform an activation function on fifth data to obtain output data, where the activation function may include sigmoid, tan h, relu or softmax.

Further, the operation unit may further include a pooling unit configured to perform a pooling operation on sixth input data to obtain output data, where the pooling operation may include average pooling, maximum pooling, and median pooling.

In an embodiment, the processing device may further include:
- an instruction control unit configured to receive and decode the instruction in the storage unit to generate control information, where the instruction control unit controls the coarse-grained selection unit to perform a selection operation, controls the lookup table unit to perform the table lookup operation, and controls the operation unit to perform a computation operation.

Further, the instruction is a neural network dedicated instruction including a control instruction, a data transfer instruction, an operation instruction, and a logical instruction.

In an embodiment, the neural network dedicated instruction is a Cambricon instruction set.

Further, the processing device may further include an instruction caching unit configured to cache the instruction, where the instruction caching unit is an on-chip caching unit.

In an embodiment, the processing device may further include a target weight codebook caching unit configured to cache a target weight codebook, and the target weight codebook caching unit is an on-chip caching unit.

In an embodiment, the processing device may further include a target weight dictionary caching unit configured to cache a target weight dictionary, where the target weight dictionary caching unit is an on-chip caching unit.

In an embodiment, the processing device may further include a target weight position caching unit configured to cache a position of a target weight, and map each connection weight in the input data to the corresponding input neuron, where the target weight position caching unit is an on-chip caching unit.

Further, the target weight position caching unit mapping each connection weight in the input data to the corresponding input neuron may include: 1 indicating that the weight is connected to the input neuron, 0 indicating that the weight is not connected to the input neuron, and a connection status of the input and output of each group forming a string of 0 and 1 to indicate the connection relationship of the output.

Further, the target weight position caching unit mapping each connection weight in the input data to the corresponding input neuron may include: combining a distance from the input neuron where a first connection is located in a first group to a first input neuron, a distance from the input neuron where a second connection is located to a previous connection in the input neuron, a distance from the input neuron where a third connection is located to the previous connection in the input neuron, . . . , and so on, until all the input neurons connected to the output neuron are exhausted, into a connection array of the output.

In an embodiment, the processing device may further include an input neuron caching unit configured to cache an input neuron input to the coarse-grained selection unit, where the input neuron caching unit is an on-chip caching unit.

In an embodiment, the processing device may further include an output neuron caching unit configured to cache an output neuron, where the output neuron caching unit is an on-chip caching unit.

Further, the processing device may further include a DMA unit configured to read/write data or instruction in the storage unit, the instruction caching unit, the target weight codebook caching unit, the target weight dictionary caching unit, the target weight position caching unit, the input neuron caching unit, and the output neuron caching unit.

Further, the processing device may further include a pre-processing unit configured to pre-process original data, and input pre-processed data into the storage unit.

A twenty-ninth aspect of the present disclosure provides a processing method including:

inputting position information of a neuron and a target weight, selecting the neuron that needs to be computed, where the target weight is a weight whose absolute value is greater than a given threshold;

receiving a quantized target weight dictionary and a target weight codebook, performing a table lookup operation, and generating and outputting the target weight of the neural network; and receiving the selected neuron and target weight, performing an operation on the neural network, and generating and outputting the neuron.

In an embodiment, the processing method may include: receiving an unquantized target weight for neural network operation.

In an embodiment, the processing method may further include: receiving and decoding an instruction to generate control information for controlling the neural network operation.

Further, the operation may include at least one of the following: a multiplication operation multiplying first input data and second input data to obtain a product; an addition operation adding third input data through a adder tree step by step, or adding the third input data to fourth input data to obtain a sum; an activation function performing an activation function on fifth data to obtain output data, where the activation function may include sigmoid, tan h, relu or softmax.

Furthermore, the operation may also include a pooling operation performed on sixth input data to obtain an output data, where the pooling operation may include average pooling, maximum pooling, and median pooling.

Furthermore, the instruction is a neural network dedicated instruction including a control instruction, a data transfer instruction, an operation instruction, and a logical instruction.

In an embodiment, the neural network dedicated instruction is a Cambricon instruction set, and each instruction in the Cambricon instruction set has a length of 64 bits, and the instruction may be composed of an operation code and an operand.

Further, the processing method may include:

pre-processing position information of the input neuron and target weight, where the pre-processing may include segmentation, Gaussian filter, binarization, regularization, and/or normalization.

In an embodiment, after receiving the selected neuron and the target weight, the processing method may further include the steps: storing the input neuron, the weight dictionary, the weight codebook and the instruction, and storing the output neuron; and caching the instruction, the input neuron, and the output neuron.

A thirtieth aspect of the present disclosure provides a data compression method including:

performing coarse-grained pruning on a weight of a neural network, which may include: selecting M weights from the neural network through a sliding window, setting all or part of the M weights to 0 when the M weights meet a preset condition; performing a first retraining on the neural network, where the weight which has been set to 0 in the retraining process remains 0, and quantizing the weight of the neural network, which may include: grouping the weights of the neural network; performing a clustering operation on each group of weights by using a clustering algorithm, computing a center weight of each class, and replacing all the weights in each class by the center weights; encoding the center weight to obtain a weight codebook and a weight dictionary; performing a second retraining on the neural network, where only the weight codebook is trained during the second retraining of the neural network, and the weight dictionary remains unchanged.

Furthermore, the preset condition is:

the information quantity of the M weights is less than a first given threshold.

Furthermore, the information quantity of the M weights is an arithmetic mean of an absolute value of the M weights, a geometric mean of the absolute value of the M weights or a maximum value of the M weights; the first given threshold is a first threshold, a second threshold or a third threshold; and the information quantity of the M weights being less than the first given threshold may include:

the arithmetic mean of the absolute value of the M weights being less than the first threshold, or the geometric mean of the absolute value of the M weights being less than the second threshold, or the maximum value of the M weights being less than the third threshold.

Furthermore, the method may also include:

repeating selecting M weights from the neural network through the sliding window, setting all or part of the M weights to 0 when the M weights meet a preset condition; and performing the first retraining on the neural network until no weight can be set to 0 without losing a preset precision.

Furthermore, the preset precision is x %, where x is between 0 and 5.

Furthermore, the neural network may include a fully connected layer, a convolutional layer and a LSTM layer; selecting M weights from the neural network through the sliding window may include:

the weight of the fully connected layer is a two-dimensional matrix (NM, Nout), where Nin represents a count of input neurons and Nout represents a count of output neurons, and the fully connected layer has Nin*Nout weights; the size of the sliding window is Bin*Bout, where Bin is a positive integer greater than 0 and less than or equal to Nin, and Bout is a positive integer greater than 0 and less than or equal to Nout.

The processing device performing coarse-grained pruning on the weight of the fully connected layer of the neural network may include:

making the sliding window slide Sin stride in the direction of Bin, or slide Sout stride in the direction of Bout, where Sin is a positive integer greater than 0 and less than or equal to Bin, and Sout is a positive integer greater than 0 and less than or equal to Bout; and selecting M weights from the Nin*Nout weights through the sliding window, where M=Bin*Bout.

The processing device selecting M weights from the convolutional layer of the neural network may include:

the weight of the convolutional layer of the neural network is a four-dimensional matrix (Nfin,Nfout,Kx,Ky), where Nfin represents a count of input feature maps, Nfout represents a count of output feature maps, (Kx, Ky) is the size of a convolution kernel, and the convolutional layer has Nfin*Nfout*Kx*Ky weights; the sliding window is a four-dimensional sliding window with the size of Bfin*Bfout*Bx*By, where Bfin is a positive integer greater than 0 and less than or equal to Nfin, Bfout is a positive integer greater than 0 and less than or equal to Nfout, Bx is a positive integer greater than 0 and less than or equal to Kx, and By is a positive integer greater than 0 and less than or equal to Ky;

making the sliding window slide Sfin stride in the direction of Bfin, or slide Sfout stride in the direction of Bfout, or slide S stride in the direction of Bx, or slide Sy stride in the direction of By, where Sfin is a positive integer greater than 0 and less than or equal to Bfin, Sfout is a positive integer greater than 0 and less than or equal to Bfout, Sx is a positive integer greater than 0 and less than or equal to Bx, and Sy is a positive integer greater than 0 and less than or equal to By; and selecting M weights from the Nfin*Nfout*Kx*Ky weights through the sliding window, where M=Bfin*Bfout*Bx*By.

The processing device selecting M weights from the LSTM layer of the neural network may include:

the weight of the LSTM layer is composed of m weights of the fully connected layer, where m is a positive integer greater than 0, and an $i^{th}$ weight of the fully connected layer is (Nin_i, Nout_i), where i is a positive integer greater than 0 and less than or equal to m, Nin_i represents a count of input neurons of the $i^{th}$ weight of the fully connected layer and Nout_i represents a count of output neurons of the $i^{th}$ weight of the fully connected layer; the size of the sliding window is Bin_i*Bout_i, Bin_i is a positive integer greater than 0 and less than or equal to Nin_i, and Bout_i is a positive integer greater than 0 and less than or equal to Nout_i;

making the sliding window slide Sin_i stride in the direction of Bin_i, or slide Sout_i stride in the direction of Bout_i, where Sin_i is a positive integer greater than 0 and less than or equal to Bin_i, and Sout_i is a positive integer greater than 0 and less than or equal to Bout_i; and selecting M weights from the Bin_i*Bout_i weights through the sliding window, where M=Bin_i*Bout_i.

Furthermore, the first retraining adopts a back-propagation algorithm, and the weight that has been set to 0 in the retraining process remains 0.

Furthermore, the grouping method of the weights of the neural network may include:

grouping the weights of the neural network into one group, and/or;

grouping the weights of the neural network according to the layer-type-based grouping method, and/or;

grouping the weights of the neural network by an inter-layer-based grouping method or an intra-layer-based grouping method.

Furthermore, grouping the weights of the neural network according to the layer-type-based grouping method may include:

grouping the weights of all convolutional layers, all fully connected layers and all LSTM layers in the neural network into one group respectively.

Furthermore, grouping the weights of the neural network by an inter-layer-based grouping method may include:

grouping the weights of one or a plurality of convolutional layers, one or a plurality of fully connected layers and one or a plurality of LSTM layers in the neural network into one group respectively.

Furthermore, grouping the weights of the neural network by an intra-layer-based grouping method may include:

segmenting the weights in one layer of the neural network, where each segmented part forms a group.

Furthermore, the clustering algorithm may include K-means, K-medoids, Clara, and/or Clarans.

In an embodiment, the center weight selection method of a class is: minimizing the cost function $J(w, w_0)$.

Furthermore, the cost function meets the condition:

$$J(w, w_0) = \sum_{i=1}^{n} (w_i - w_0)^2$$

where w is all the weights of a class, w0 is the center weight of the class, n is a count of weights in the class, wi is the $i^{th}$ weight of the class, and i is a positive integer greater than 0 and less than or equal to n.

Further, the second retraining performed on the neural network after clustering and encoding may include:
performing retraining on the neural network after clustering and encoding by using the back-propagation algorithm, where the weights that have been set to 0 in the retraining process remain 0 all the time, and only the weight codebook is retrained, and the weight dictionary is not retrained.

A thirty-first aspect of the present disclosure provides a compression device for data of a neural network including:
a memory configured to store an operation instruction; and
a processor configured to perform the operation instruction stored in the memory in accordance with the data compression method described in any of the above aspects.

A thirty-second aspect of the present disclosure provides a processing device including:
a coarse-grained selection unit configured to input position information of a neuron and a target weight, and select a neuron to be computed, where the target weight is a weight whose absolute value is greater than a second given threshold;
a lookup table unit configured to receive a quantized target weight dictionary and a quantized target weight codebook, perform a table lookup operation to obtain and output a target weight of a neural network; and
an operation unit configured to receive the selected neuron and target weight, perform an operation on the neural network, and output the neuron.

In an embodiment, the lookup table unit may be further configured to transmit an unquantized target weight directly to the operation unit by a bypass.

The processing device may further include an instruction control unit configured to receive and decode the instruction to obtain control information to control the operation unit, and a storage unit configured to store a neuron, a weight and an instruction of the neural network.

In an embodiment, the storage unit may be further configured to store the target weight and position information of the target weight, and store the quantized target weight codebook and the quantized target weight dictionary.

Further, the operation unit may include at least one of the following:
a multiplier configured to multiply first input data and second input data to obtain a product;
an adder tree configured to add third input data step by step, or add the third input data to fourth input data to obtain a sum; and
an activation function unit configured to perform an activation function on fifth data to obtain output data, where the activation function may include sigmoid, tan h, relu or softmax.

Further, the operation unit may further include a pooling unit configured to perform a pooling operation on sixth input data to obtain output data, where the pooling operation may include average pooling, maximum pooling, and median pooling.

In an embodiment, the processing device may further include:
an instruction control unit configured to receive and decode the instruction in the storage unit to generate control information, where the instruction control unit controls the coarse-grained selection unit to perform a selection operation, controls the lookup table unit to perform the table lookup operation, and controls the operation unit to perform a computation operation.

Further, the instruction is a neural network dedicated instruction including a control instruction, a data transfer instruction, an operation instruction, and a logical instruction.

In an embodiment, the neural network dedicated instruction is a Cambricon instruction set, and each instruction in the Cambricon instruction set has a length of 64 bits, and the instruction may be composed of an operation code and an operand.

Further, the control instruction may be configured to control the execution process of the neural network, and the control instruction may include a jump instruction and a conditional branch instruction.

Further, the data transfer instruction may be configured to transfer data between different storage media, and the data transfer instruction may include a loading instruction, a storage instruction, and a moving instruction.

Further, the operation instruction may be configured to perform a neural network arithmetic operation, and the operation instruction may include a matrix operation instruction, a vector operation instruction, a scalar operation instruction, a convolutional neural network operation instruction, a fully connected neural network operation instruction, a pooling neural network operation instruction, an RBM neural network operation instruction, an LRN neural network operation instruction, an LCN neural network operation instruction, an LSTM neural network operation instruction, an RNN operation instruction, an ReLU neural network operation instruction, a PReLU neural network operation instruction, a SIGMOID neural network operation instruction, a TAN H neural network operation instruction, and a MAXOUT neural network operation instruction.

Further, the logical instruction may be configured to perform a logical operation of the neural network, and the logical instruction may include a vector logical operation instruction and a scalar logical operation instruction.

In an embodiment, the vector logical operation instruction may include a vector comparing operation and a vector logical operation, preferably, the vector comparing operation may include but not be limited to greater than, less than, equal to, greater than or equal to ($\geq$), less than or equal to ($\leq$), and not equal to; and the vector logical operation may include AND, OR, and NOT.

The scalar logical operation may include a scalar comparing operation, a scalar logical operation; preferably, the scalar comparing operation may include but not be limited to greater than, less than, equal to, greater than or equal to ($\geq$), less than or equal to ($\leq$), and not equal to; the scalar logical operation may include AND, OR, and NOT.

Further, the processing device may further include an instruction caching unit configured to cache the instruction, where the instruction caching unit is an on-chip caching unit.

In an embodiment, the processing device may further include a target weight codebook caching unit configured to cache a target weight codebook, and the target weight codebook caching unit is an on-chip caching unit.

In an embodiment, the processing device may further include a target weight dictionary caching unit configured to cache a target weight dictionary, where the target weight dictionary caching unit is an on-chip caching unit.

In an embodiment, the processing device may further include a target weight position caching unit configured to cache a position of a target weight, and map each connection weight in the input data to the corresponding input neuron, where the target weight position caching unit is an on-chip caching unit.

Further, the target weight position caching unit mapping each connection weight in the input data to the corresponding input neuron may include: 1 indicating that the output neuron is connected to the input neuron by the weight, 0 indicating that the output neuron is not connected to the input neuron by the weight, and a connection status of the input neuron and output neuron of each group forming a string of 0 and 1 to indicate the connection relationship of the output neuron.

Further, the target weight position caching unit mapping each connection weight in the input data to the corresponding input neuron may include: combining a distance from the input neuron where a first connection is located in a first group to a first input neuron, a distance from the input neuron where a second connection is located to a previous connection in the input neuron, a distance from the input neuron where a third connection is located to the previous connection in the input neuron, . . . , and so on, until all the input neurons connected to the output neuron are exhausted, into a connection array of the output.

In an embodiment, the processing device may further include an input neuron caching unit configured to cache an input neuron input to the coarse-grained selection unit, where the input neuron caching unit is an on-chip caching unit.

In an embodiment, the processing device may further include an output neuron caching unit configured to cache an output neuron, where the output neuron caching unit is an on-chip caching unit.

Further, the processing device may further include a DMA unit configured to read/write data or instruction in the storage unit, the instruction caching unit, the target weight codebook caching unit, the target weight dictionary caching unit, the target weight position caching unit, the input neuron caching unit, and the output neuron caching unit.

Further, the processing device may further include a pre-processing unit configured to pre-process original data, and input pre-processed data into the storage unit.

A thirty-third aspect of the present disclosure provides a processing method including:

inputting position information of a neuron and a target weight, selecting the neuron that needs to be computed, where the target weight is a weight whose absolute value is greater than a given threshold;

receiving a quantized target weight dictionary and a quantized target weight codebook, performing a table lookup operation, and generating and outputting the target weight of the neural network; and receiving the selected neuron and target weight, performing an operation on the neural network, and generating and outputting the neuron.

In an embodiment, the processing method may include: receiving an unquantized target weight for neural network operation.

In an embodiment, the processing method may further include: receiving and decoding an instruction to generate control information for controlling the neural network operation.

Further, the operation may include at least one of the following: a multiplication operation multiplying first input data and second input data to obtain a product; an addition operation adding third input data through an adder tree step by step, or adding the third input data to fourth input data to obtain a sum; an activation function performing an activation function on fifth data to obtain output data, where the activation function may include sigmoid, tan h, relu or softmax.

Furthermore, the operation may also include a pooling operation performed on sixth input data to obtain an output data, where the pooling operation may include average pooling, maximum pooling, and median pooling.

Furthermore, the instruction is a neural network dedicated instruction including a control instruction, a data transfer instruction, an operation instruction, and a logical instruction.

Further, the control instruction may be configured to control the execution process of the neural network, and the control instruction may include a jump instruction and a conditional branch instruction.

Further, the data transfer instruction may be configured to transfer data between different storage media, and the data transfer instruction may include a loading instruction, a storage instruction, and a moving instruction.

Further, the operation instruction may be configured to perform a neural network arithmetic operation, and the operation instruction may include a matrix operation instruction, a vector operation instruction, a scalar operation instruction, a convolutional neural network operation instruction, a fully connected neural network operation instruction, a pooling neural network operation instruction, an RBM neural network operation instruction, an LRN neural network operation instruction, an LCN neural network operation instruction, an LSTM neural network operation instruction, an RNN operation instruction, an ReLU neural network operation instruction, a PReLU neural network operation instruction, a SIGMOID neural network operation instruction, a TAN H neural network operation instruction, and a MAXOUT neural network operation instruction.

In an embodiment, the neural network dedicated instruction is a Cambricon instruction set, and each instruction in the Cambricon instruction set has a length of 64 bits, and the instruction may be composed of an operation code and an operand.

Further, the logical instruction may be configured to perform a logical operation of the neural network, and the logical instruction may include a vector logical operation instruction and a scalar logical operation instruction.

In an embodiment, the vector logical operation instruction may include a vector comparing operation and a vector logical operation, preferably, the vector comparing operation may include but not be limited to greater than, less than, equal to, greater than or equal to ($\geq$), less than or equal to ($\leq$), and not equal to; and the vector logical operation may include AND, OR, and NOT.

The scalar logical operation may include a scalar comparing operation, a scalar logical operation; preferably, the scalar comparing operation may include but not be limited to greater than, less than, equal to, greater than or equal to ($\geq$), less than or equal to ($\leq$), and not equal to; the scalar logical operation may include AND, OR, and NOT.

Further, the processing method may further include a step: pre-processing position information of the input neuron and target weight, where the pre-processing may include segmentation, Gaussian filter, binarization, regularization, and/or normalization.

In an embodiment, after receiving the selected neuron and the target weight, the processing method may further include the steps: storing the input neuron, the weight dictionary, the weight codebook and the instruction, and storing the output neuron; and caching the instruction, the input neuron, and the output neuron.

A thirty-fourth aspect of the present disclosure provides an electronic device including a robot, a computer, a printer, a scanner, a tablet computer, an intelligent terminal, a mobile phone, an automobile data recorder, a navigator, a sensor, a webcam, a cloud server, a camera, a video camera, a projector, a watch, an earphone, a mobile storage, a wearable device, a vehicle, a household electrical appliance, and/or a medical device.

The vehicles may include an airplane, a ship, and/or a car. The household electrical appliance may include a television, an air conditioner, a microwave oven, a refrigerator, an electric rice cooker, a humidifier, a washing machine, an electric lamp, a gas cooker, and a range hood. The medical device may include a nuclear magnetic resonance spectrometer, a B-ultrasonic scanner, and/or an electrocardiograph.

A thirty-fifth aspect of the present disclosure provides an operation device including:
 a filtering unit (400) configured to select a feature map and a weight corresponding to the feature map participating in subsequent operations according to a connection array of the feature map composed of the output neuron and an input neuron, and output the feature map and the weight corresponding to the feature map to an operation unit (600); and/or configured to select a row of the feature map and a row of weight corresponding to the row of the feature map according to a connection array of each row in the feature map composed of an output neuron and an input neuron, and output the row of the feature map and the row of weight corresponding to the row of the feature map to the operation unit (600); and/or configured to select a column of the feature map and a weight column corresponding to the column of the feature map according to a connection array of each column in the feature map composed of an output neuron and an input neuron, and output the column of the feature map and the weight column of the column of the feature map to an operation unit (600).

In an embodiment, the operation unit (600) may be configured to perform a corresponding artificial neural network operation supporting structure clipping on data output by the filtering unit (400) according to an instruction to obtain an output neuron.

Furthermore, a selecting process of the filtering unit (400) may include:
 if the weight has not been selected offline, selecting out the feature map and the corresponding weight of the feature map according to the connection array of the feature map composed of the output neuron and the input neuron, and outputting the selected feature map and the corresponding weight of the feature map to the operation unit, and/or selecting out a row/column of feature map and the corresponding row/column of the weight according to the connection array of row/column of the feature map composed of the output neuron and the input neuron, and outputting the selected row/column of feature map and the corresponding row/column of the weight to the operation unit;
 if the weight has been selected offline, selecting out the feature map according to the connection array of the feature map composed of the output neuron and the input neuron, and outputting the selected feature map to the operation unit, meanwhile, directly outputting the weight after selecting offline to the operation unit without passing by the filtering unit; and/or selecting the row/column of feature map and the corresponding row/column of the weight according to the connection array of row/column of the feature map composed of the output neuron and the input neuron, and outputting the selected row/column of feature map and the corresponding row/column of the weight to the operation unit.

Furthermore, the connection array may be configured to represent the connection status between the output neuron and the input neuron, and the representations of the connection array may include:
 a first representation: taking numbers "0" and "1" to represent the connection status, where "1" means that the output neuron is connected to the input neuron, and "0" means that the output neuron is not connected to the input neuron; or "0" means that the output neuron is connected to the input neuron, and "1" means that the output neuron is not connected to the input neuron; the connection array of the feature map composed of the output neuron and the input neuron is a connection array composed of "0" and "1" of the feature map composed of each output neuron and all input neurons; the connection array of row/column of the feature map composed of the output neuron and the input neuron is a connection array composed of "0" and "1" of the row/column of feature map composed of each output neuron and all input neurons;
 a second representation: taking distance to represent the connection status, the connection array of the feature map composed of the output neuron and the input neuron is an array combining of a distance from the input neuron where a first connection is located to a first input neuron, a distance from the input neuron where a second connection is located to a previous connection in the input neuron, a distance from the input neuron where a third connection is located to the previous connection in the input neuron, . . . , and so on, until all the input neurons connected to the output neuron are exhausted, where the connection array is used to represent the corresponding connection status of the output neuron.

Furthermore, elements in the array of the second representation method are non-negative integers.

Furthermore, the feature map and the corresponding weight of the feature map selected for computation by using the connection array of the feature map composed of the output neuron and the input neuron or the connection array of the row/column of the feature map composed of the output neuron and the input neuron, or the row/column of the feature map and the corresponding row/column of the weights meet the following conditions:
 the first representation: the elements in the connection array corresponding to the feature map and the corresponding weight of the feature map selected for computing the output neuron are numbers indicating having a connection relation; and/or the elements in the connection array corresponding to the row/column of the feature map and the corresponding row/column of the weight selected for computing the output neuron are numbers indicating having a connection relation;

the second representation: for the connection array Index A corresponding to each output neuron $O_j$, a value of each bit is a non-negative integer, and all the input neurons are $I_1, I_2, \ldots, I_N$, let the input neurons connected to the output neuron be 1 $I_{k_1}, I_{k_2}, \ldots, I_{k_n}$, $n \leq N, k_1, k_2, \ldots, k_n \in \{1, 2, \ldots N\}$, and the values are unknown, then Index A has n bits, a value of a first bit is $A_1$, which indicates the distance from the input neuron where the first connection is located to $I_1$; a value of $p^{th}$ bit is $A_P$, p=2, 3, . . . , n, which indicates the distance from the input neuron where the current connection is located to the input neuron where the previous connection is located, therefore the selected input neurons for computing the output neuron $O_j$ are $I_{k_1}, I_{k_2}, \ldots, I_{k_n}$, and the corresponding weights are $W_{k_1 j}, W_{k_2 j}, \ldots, W_{k_n j}$, where $k_1 = A_1 + 1$, $k_p = A_p + k_{p-1}$.

In an embodiment, the operation device may further include a storage unit (100) configured to store data and an instruction, where the data stored in the storage unit (100) may include:

the feature map composed of the input neuron, the weight, the connection array of the feature map composed of the output neuron and the input neuron, the connection array for each row in the feature map composed of the output neuron and the input neuron, the connection array for each column in the feature map composed of the output neuron and the input neuron, the feature map composed of the output neuron, and other data and parameters required for the artificial neural network operation.

In an embodiment, the operation unit (600) may include:

a first part: a multiplier configured to multiply first input data and second input data to obtain a product;

a second part: one or a plurality of adders configured to add the product step by step to obtain a sum, where bias processing may or may not be performed on the sum as needed; and a third part: an activation function configured to perform an activation operation on the sum to obtain an output neuron.

Furthermore, the one or a plurality of adders constitute an adder tree.

Further, the operation unit (600) may include a pooling unit configured to perform a pooling operation on input data.

Further, the operation device may include a caching unit (300) configured to cache data and an instruction.

(3) Technical Effects

The processing method and the accelerating device provided by the disclosure at least have the following advantages.

Compared with the prior arts, the processing method of the present disclosure performs coarse-grained pruning on the weight of the neural network, which can regularize the sparsification of the neural network, facilitate accelerating by using hardware, and reduce the storage space of a target weight position, where the target weight is a weight whose absolute value is greater than or equal to the second given threshold.

The processing device of the present disclosure can realize the processing method of the present disclosure, the coarse-grained pruning unit may be configured to perform coarse-grained pruning on the neural network, and the operation unit may be configured to retrain the pruned neural network.

By setting up the neural network capable of accelerating the processing of coarse-grained pruning, the accelerating device of the present disclosure can fully explore the characteristics of coarse-grained sparse, reduce access and computation, so as to realize acceleration and reduce energy consumption.

The storage unit of the accelerating device of the present disclosure may store the target weight and the position information of the weight, which can reduce the storage overhead and the memory access overhead, and the coarse-grained selection unit can select the neurons that need to participate in the operation according to the target weight position information, which may reduce the amount of computation; by adopting a dedicated SIMD instruction and a customized operation unit for a multi-layer artificial neural network operation aiming at coarse-grained sparsification, the problem that the CPU (Central Processing Unit) and GPU (General Processing Unit) have inadequate operational performance and the front-end decoding overhead is high may be solved, and the support for a multi-layer artificial neural network operation algorithm may be effectively improved; by adopting a dedicated on-chip cache for the multi-layer artificial neural network operation algorithm, the reuse of input neurons and weight data may be fully exploited, which avoids repeatedly reading these data into memory, reduces memory access bandwidth. Therefore, the memory bandwidth may no longer be bottleneck of the performance of multi-layer artificial neural network operations and training algorithms.

The above mentioned eleventh to twentieth aspects, compared with the prior arts, have the following technical effects:

1. The data quantization method of the present disclosure does not have the problem that quantization may be only performed with a layer of a neural network as a unit. By using the similarity of the inter-layer-based weights and the local similarity of the intra-layer-based weights of the neural network, the method may exploit the weight distribution characteristics of the neural network to perform low bit quantization, and reduce a count of bits of each weight, which may thereby reduce the weight storage overhead and the memory access overhead.

2. The data quantization method of the present disclosure retrains the neural network, where only the weight codebook needs to be retrained and the weight dictionary does not need to be retrained, which may simplify the retraining.

3. The processing device of the present disclosure performs a plurality of operations on the quantized and unquantized weights simultaneously, which can realize the diversification of operations.

4. The present disclosure adopts a dedicated instruction and a flexible operation unit for a multi-layer artificial neural network operation aiming at local quantization, to solve the problem that the CPU and GPU have inadequate operational performance and the front-end decoding overhead is high, therefore the support for the multi-layer artificial neural network operation algorithm may be effectively improved.

5. The present disclosure adopts a dedicated on-chip cache for the multi-layer artificial neural network operation algorithm, fully exploits the reuse of input neurons and weight data, which may avoid repeatedly reading these data into memory, reducing memory access bandwidth. Therefore, the memory bandwidth may no longer be a bottleneck of the performance of multi-layer artificial neural network operations and training algorithms.

The above mentioned twenty-first to thirty-fourth aspects, compared with the prior arts, have the following technical effects:

Compared with the prior arts, the present disclosure performs coarse-grained pruning and local quantization on the weight of the neural network, which can regularize the sparsification of the neural network, facilitate accelerating by using hardware, and reduce the storage space of the target weight position; local quantization can fully exploit the weight distribution characteristics of the neural network, and reduce a count of bits of each weight, which may thereby further reduce storage overhead and memory access overhead.

A neural network processor of the present disclosure is capable of fully exploiting the characteristics of coarse-grained sparsification and local quantization, reducing the memory access and the amount of computation, which may thereby obtain an acceleration ratio and reduce energy consumption; the coarse-grained selection unit can select neurons that need to participate in computation according to the target weight position information, which may reduce the amount of computation; and the lookup table can look up the target weight according to the target weight dictionary and the target weight codebook, which may reduce the memory access.

With respect to the thirty-fifth aspect, it can be seen from the above technical solutions that the operation device, the operation method and the chip provided by the present disclosure have at least one of the following technical effects:

1. Through the filtering unit, the present disclosure realizes a structural clipping, and selects the feature map composed of the input neurons participating in subsequent operation in the artificial neural network after structural clipping and the corresponding weights of the feature map, which may thereby avoid the computational redundancy and memory access redundancy caused by all input neurons and weights participating in network operations, and solve the problem that the CPU and GPU have inadequate operational performance and the front-end decoding overhead is high, therefore the support for the multi-layer artificial neural network operation algorithm may be effectively improved.

2. The present disclosure adopts a dedicated on-chip cache for the multi-layer artificial neural network operation algorithm to fully exploits the reuse of input neurons and weight data, which may avoid repeatedly reading these data into memory, reduce memory access bandwidth, therefore, memory bandwidth may no longer be a bottleneck of the performance of multi-layer artificial neural network operations and training algorithms.

DETAILED DESCRIPTION OF THE EMBODIMENTS

In order to make the purpose, technical solutions, and advantages of the disclosure clearer, the disclosure will further be described below in combination with specific embodiments and with reference to the accompanied drawings in detail.

All of the modules in the embodiment of the disclosure may be hardware structures. Physical implementation of the hardware structures may include but not be limited to physical device, and the physical device may include but not be limited to transistors, memristors, and Deoxyribonucleic Acid (DNA) computers.

It should be noted that "first", "second", "third", etc., used in the present disclosure are only used to distinguish different objects, and do not imply that there is any particular sequential relationship between these objects.

It should be noted that the coarse-grained pruning (or coarse-grained sparsification) refers to obtaining at least two data (weight or neuron), and when the at least two data meet a preset condition, all or part of the at least two data may be set to 0.

According to the basic conception of this disclosure, a processing method performing coarse-grained pruning and sparsification on a neural network, a processing device, and an accelerating device are provided to reduce weight storage and computation.

Figure 1:
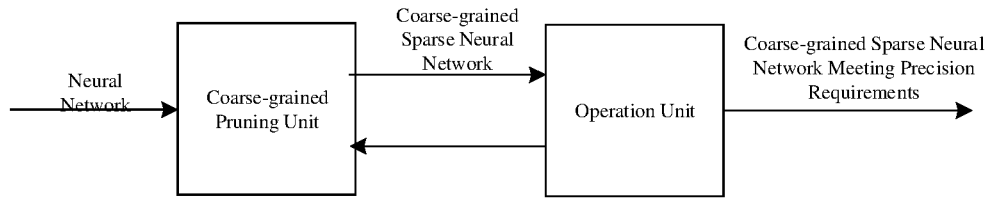
FIG. 1 is a schematic structure diagram of a processing device for performing coarse-grained pruning and sparsification on a neural network according to an embodiment of the disclosure.

FIG. 1 is a schematic structure diagram of a processing device performing coarse-grained pruning and sparsification on a neural network according to an embodiment of the disclosure. As shown in FIG. 1, the processing device may include:

a coarse-grained pruning unit configured to perform coarse-grained pruning on the weight of the neural network to obtain a pruned weight.

The coarse-grained pruning unit is specifically configured to:

select M weights from the weights of the neural network through a sliding window, where M may be an integer greater than 1; and when the M weights meet a preset condition, all or part of the M weights may be set to 0;

where the preset condition is:

an information quantity of the M weights meets a preset judgment condition.

In an embodiment, the preset judgment condition may include a threshold judgment condition, where the threshold judgment condition may include one or some condition within or outside a given range of values: less than a given threshold, less than or equal to the given threshold, greater than the given threshold, greater than or equal to the given threshold.

Specifically, the information quantity of the M weights is less than the given threshold, where the information quantity of the M weights may include but not be limited to an arithmetic mean of an absolute value of the M weights, a geometric mean of the absolute value of the M weights, or a maximum value of the absolute value of the M weights. The arithmetic mean of the absolute value of the M weights is less than a first threshold; or the geometric mean of the absolute value of the M weights is less than a second threshold; or the maximum value of the absolute value of the M weights is less than a third threshold. The first threshold, the second threshold, and the third threshold may be preset according to a situation, or be obtained by a computation of changing an input parameter in a preset formula, or be obtained by machine learning by those skilled in the art. The present disclosure does not specifically limit the method of obtaining the first threshold, the second threshold and the third threshold.

In an optional embodiment, the preset judgment condition may include a function mapping judgment condition which judges whether the M weights satisfy the given condition after a function transformation.

Figure 2:
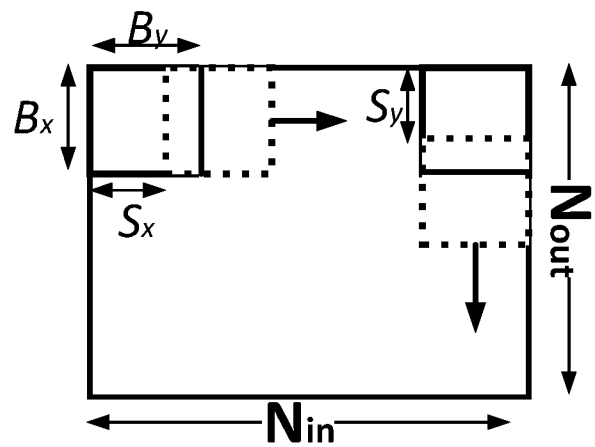
FIG. 2 is a schematic diagram of performing coarse-grained pruning on a fully connected layer of a neural network according to an embodiment of the disclosure.
Figure 3:
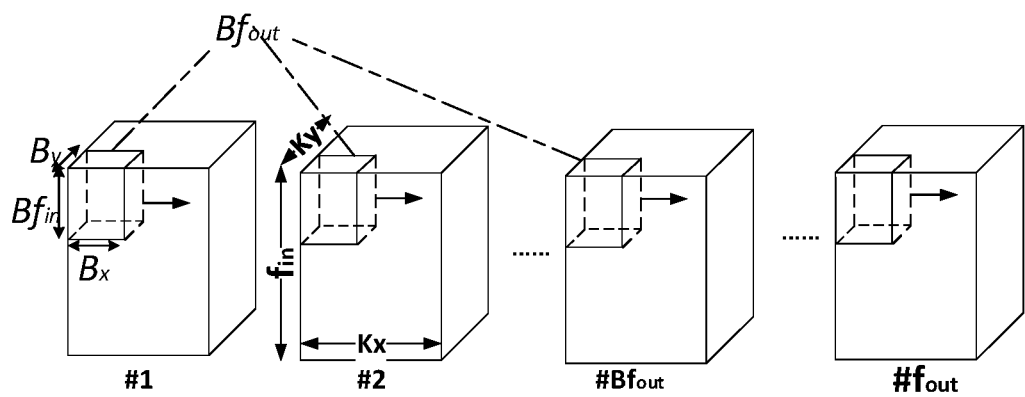
FIG. 3 is a schematic diagram of performing coarse-grained pruning on a convolutional layer of a neural network according to an embodiment of the disclosure.

Furthermore, the neural network may include a fully connected layer, a convolutional layer; and/or a LSTM (long and short term memory) layer. The weight of the fully connected layer is a two-dimensional matrix (Nin,Nout), where Nin represents a count of input neurons and Nout represents a count of output neurons, and the fully connected layer has Nin*Nout weights; the weight of the convolutional layer is a four-dimensional matrix (Nfin,Nfout,Kx,Ky), where Nfin represents a count of input feature maps, Nfout represents a count of output feature maps, (Kx,Ky) is the size of a convolution kernel, and the convolutional layer has Nfin*Nfout*Kx*Ky weights; the weight of the LSTM layer is composed of m weights of the fully connected layer, where m is a positive integer greater than 0, and an i$^{th}$ weight of the fully connected layer is a two-dimensional matrix (Nin_i, Nout_i), where i is a positive integer greater than 0 and less than or equal to m, Nin_i represents a count of input neurons of the i$^{th}$ weight of the fully connected layer and Nout_i represents a count of output neurons of the i$^{th}$ weight of the fully connected layer. The coarse-grained pruning unit may be specifically configured to:

perform coarse-grained pruning on the weight of the fully connected layer, where a sliding window is a sliding window with the size of Bin*Bout, Bin is a positive integer greater than 0 and less than or equal to Nin, and Bout is a positive integer greater than 0 and less than or equal to Nout; make the sliding window slide according to a stride Sin in the direction of Bin, or slide Sout stride in the direction of Bout, where Sin is a positive integer greater than 0 and less than or equal to Bin, and Sout is a positive integer greater than 0 and less than or equal to Bout; select M weights from the Nin*Nout weights through the sliding window, and when the M weights meet the preset condition, all or part of the M weights may be set to 0, where M=Bin*Bout, please refer to FIG. 2 for a specific process;

perform coarse-grained pruning on the weights of the convolutional layer, where the sliding window is a four-dimensional sliding window with the size of Bfin*Bfout*Bx*By, Bfin is a positive integer greater than 0 and less than or equal to Nfin, Bfout is a positive integer greater than 0 and less than or equal to Nfout, Bx is a positive integer greater than 0 and less than or equal to Kx, and By is a positive integer greater than 0 and less than or equal to Ky; make the sliding window slide Sfin stride in the direction of Bfin, or slide Sfout stride in the direction of Bfout, or slide S stride in the direction of Bx, or slide Sy stride in the direction of By, where Sfin is a positive integer greater than 0 and less than or equal to Bfin, Sfout is a positive integer greater than 0 and less than or equal to Bfout, Sx is a positive integer greater than 0 and less than or equal to Bx, and Sy is a positive integer greater than 0 and less than or equal to By; select M weights from the Nfin*Nfout*Kx*Ky weights through the sliding window, and when the M weights meet the preset condition, all or part of the M weights may be set to 0, where M=Bfin*Bfout*Bx*By; please refer to FIG. 3 for a specific process; and perform coarse-grained pruning on the weights of the LSTM layer, where the size of the sliding window is Bin_i*Bout_i, Bin_i is a positive integer greater than 0 and less than or equal to Nin_i, and Bout_i is a positive integer greater than 0 and less than or equal to Nout_i; make the sliding window slide Sin_i stride in the direction of Bin_i, or slide Sout_i stride in the direction of Bout_i, where Sin_i is a positive integer greater than 0 and less than or equal to Bin_i, and Sout_i is a positive integer greater than 0 and less than or equal to Bout_i; select M weights from the Bin_i*Bout_i weights through the sliding window, and when the M weights meet the preset condition, all or part of the M weights may be set to 0, where M=Bin_i*Bout_i.

Furthermore, the M weights are the weights included in the sliding window during the sliding process. The setting, by the coarse-grained pruning unit, all or part of the M weights to 0 may include:

the coarse-grained pruning unit setting all the weights (i.e., M weights) in the sliding window to 0; or setting the weight on the diagonal in the sliding window to 0; or setting a part of the middle weights in the sliding window to 0, for example, if a size of the sliding window is 5*5, the coarse-grained pruning unit sets 3*3 weights in the middle of the 5*5 sliding window to 0; or randomly selects at least one weight from the sliding window to set to 0. The above operation may be advantageous for providing precision of subsequent training operations.

Furthermore, the coarse-grained pruning unit and the operation unit may be configured to repeat performing coarse-grained pruning on the neural network and training the neural network according to the pruned weight until no weight meets the preset condition without losing a preset precision.

The preset precision is x %, where x is between 0-100, and x may have different choices depending on different neural networks and different disclosures.

In an optional embodiment, the range of X is 0-5.

Further, the processing device may include:

a quantization unit configured to quantize the weight of the neural network and/or perform a first operation on the weight of the neural network after the coarse-grained pruning unit performs coarse-grained pruning on the weight of the neural network, and before the operation unit retrains the neural network according to the pruned weight to reduce a count of weight bits of the neural network.

In an embodiment, the weight of the neural network is specifically quantized by using a weight W0 to replace a weight W1 that satisfies a requirement, and the requirement is $|W1-W0| \le \nabla W$, where $\nabla W$ is a preset value.

The first operation may be reducing the value range of a data format corresponding to the weight or reducing the precision range of the data format corresponding to the weight.

Further, the operation unit may be specifically configured to:

retrain the neural network by a back-propagation algorithm according to a pruned weight.

Specifically, the operation unit may be configured to perform a backward training algorithm on the neural network, receive the pruned neural network, and train the neural network adopting the back-propagation algorithm, where the pruned weight always remains 0 during the training process. The operation unit may transmit the trained neural network to the coarse-grained pruning unit for further pruning operation or directly outputs the trained neural network.

Specifically, the operation unit performs reverse computation on each layer of the neural network in the order opposite to the forward computation, and updates the weight by a gradient of the weight obtained by computation. The above process is the sequential iteration of neural network training. The whole training process needs to repeat this process several times. The reverse operation of each layer requires two operations: one is to obtain a weight gradient by using an output neuron gradient and the input neuron, and the other is to obtain an input neuron gradient by using the output neuron gradient and the weight (used as the output neuron gradient of the next layer in the reverse operation for it to perform the reverse operation); After performing the reverse operation of the neural network, the weight gradient of each layer is computed, and the operation unit updates the weight according to the weight gradient.

It should be pointed out that, during the training process of the neural network by the operation unit, the weight set to 0 remains 0 all the time.

In an embodiment of the present disclosure, the coarse-grained pruning unit of the processing device performs a coarse-grained pruning operation on the weight of the neural network to obtain the pruned weight, and the operation unit retrains the neural network according to the pruned weight. By performing coarse-grained pruning on the weight of the neural network, the storage and access of the subsequent values are reduced, and the subsequent computation is reduced as well, which improves the operation efficiency and reduces the power consumption.

Figure 4:
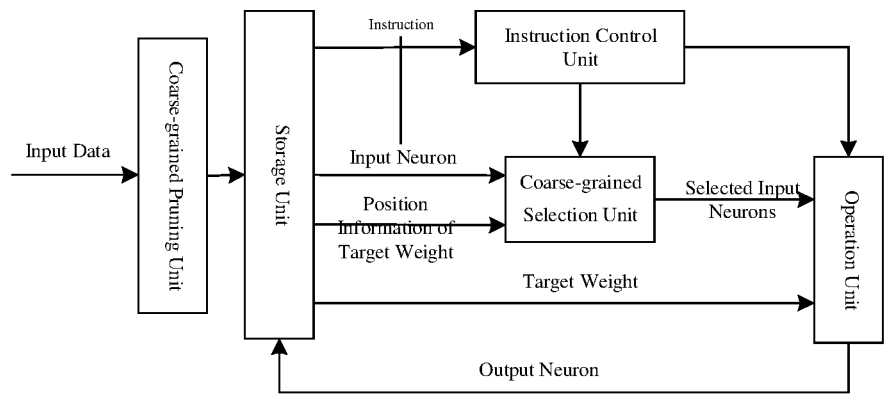
FIG. 4 is a schematic structure diagram of an accelerating device according to an embodiment of the disclosure.

FIG. 4 is a schematic structure diagram of an accelerating device according to an embodiment of the disclosure. As shown in FIG. 4, the accelerating device may include:
- a storage unit configured to store an input neuron, an output neuron, a weight, and an instruction of a neural network;
- a coarse-grained pruning unit configured to perform coarse-grained pruning on the weight of the neural network to obtain a pruned weight, and store the pruned weight and target weight position information into the storage unit.

It needs to be explained that the detailed process of the coarse-grained pruning unit performing the coarse-grained pruning operation on the weight of the neural network mentioned above will not be described here. For details, please refer to the relevant description of the embodiment shown in FIG. 1.

The accelerating device may further include:
- an operation unit configured to perform training on the neural network according to the pruned weight;
- a coarse-grained selection unit configured to receive an input neuron and a position information of a target weight, and select the target weight and the corresponding input neuron of the weight, where an absolute value of the target weight is greater than a second given threshold.

Furthermore, the coarse-grained selection unit only selects the target weight and the corresponding neuron of the target to transmit to the operation unit.

The operation unit may be also configured to receive the input target weight and the corresponding neuron of the weight, complete the neural network operation by a multiplying and adding operation unit according to the target weight and the corresponding neuron of the weight to obtain the output neuron, and then transmit the output neuron back to the storage unit.

The storage unit may be also configured to store the intermediate results produced in the process of the neural network operation performed by the operation unit.

The accelerating device may further include:
- an instruction control unit configured to receive and decode the instruction to obtain control information, so as to control the coarse-grained selection unit to perform selection operation and control the operation unit to perform an operation.

Further, when the storage unit stores the weight, only the target weight and the position information of the target weight are stored.

It should be noted that the storage unit, the coarse-grained pruning unit, the instruction control unit, the coarse-grained selection unit, and the operation unit are all physical hardware devices, not functional software units.

Figure 5:
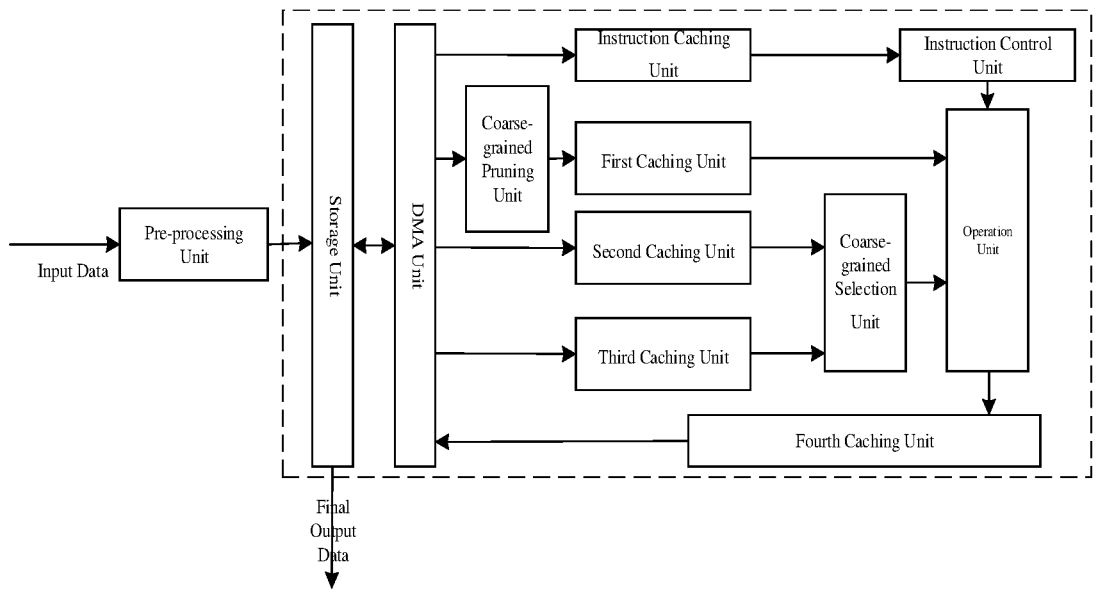
FIG. 5 is a schematic structure diagram of another accelerating device according to an embodiment of the disclosure.

FIG. 5 is a schematic structure diagram of another accelerating device according to an embodiment of the disclosure. As shown in FIG. 5, the accelerating device may further include: a pre-processing unit, a storage unit, a direct memory access (DMA) unit, an instruction caching unit, an instruction control unit, a coarse-grained pruning unit, a first caching unit, a second caching unit, a third caching unit, a coarse-grained selection unit, an operation unit, and a fourth caching unit.

The pre-processing unit may be configured to preprocess original data and input the preprocessed data into the storage unit, where the original data may include an input neuron, an output neuron, and weight.

Furthermore, the pre-processing may include data segmentation, Gaussian filter, binarization, regularization, and/or normalization.

The storage unit may be configured to store neurons, weights, and instructions of the neural network, where only the target weight and the position information of the target weight are stored when the storage unit stores weights of the neural network.

The DMA unit may be configured to read/write data or instruction between the storage unit and the instruction caching unit, the coarse-grained pruning unit, the first caching unit, the second caching unit, the third caching unit, or the fourth caching unit.

The coarse-grained pruning unit may be configured to obtain the weight of the neural network from the storage unit through the DMA unit, and then perform coarse-grained pruning on the weight of the neural network to obtain the pruned weight. The coarse-grained pruning unit may store the pruned weight into the first caching unit.

It needs to be explained that the detailed process of the coarse-grained pruning unit performing the coarse-grained pruning operation on the weight of the neural network mentioned above will not be described here. For details, please refer to the relevant description of the embodiment shown in FIG. 1.

The instruction caching unit may be configured to cache the instruction.

The first caching unit may be configured to cache a target weight whose absolute value is greater than the second given threshold.

The second caching unit may be configured to cache position data of the target weight; and the target weight position caching unit corresponds each connection weight in the input data to the corresponding input neuron one-to-one.

Optionally, a one-to-one cache method adopted by the target weight position caching unit may be: 1 indicating that the output neuron is connected to the input neuron by the weight, 0 indicating that the output neuron is not connected to the input neuron by the weight, and a connection status of the input neuron and output neuron of each group forming a string of 0 and 1 to indicate the connection relationship of the output neuron.

Optionally, the one-to-one cache method adopted by the target weight position caching unit may be: 1 indicating that the output neuron is connected to the input neuron by the weight, 0 indicating that the output neuron is not connected to the input neuron by the weight, and the connection status of the input neuron and output neuron of each group forming a string of 0 and 1 to indicate the connection relationship of the output neuron.

Optionally, the one-to-one cache method adopted by the target weight position caching unit may be: combining a distance from the input neuron where a first connection is located in a first group to a first input neuron, a distance from the input neuron where a second connection is located to a previous connection in the input neuron, a distance from the input neuron where a third connection is located to the previous connection in the input neuron, . . . , and so on, until all the input of the output are exhausted, to represent the corresponding connection status of the output.

The third caching unit may be configured to cache an input neuron input to the coarse-grained selection unit.

The fourth caching unit may be configured to cache an output neuron output by the operation unit and an output neuron gradient obtained according to the output neuron.

The instruction control unit may be configured to receive an instruction in an instruction caching unit, and decode the instruction to generate control information to control the operation unit to perform a computation operation.

The coarse-grained selection unit may be configured to receive input neuron and target weight position information, and according to the target weight position information, select the input neuron that needs to be operated. The coarse-grained selection unit only selects a neuron corresponding to the target weight and transmits the neuron to the operation unit.

The operation unit may be configured to perform an operation on the input neuron and target weight according to the control information transmitted by the instruction control unit to obtain the output neuron, which is stored in the fourth caching unit; the output neuron gradient is obtained according to the output neuron, and the output neuron gradient is stored in the fourth caching unit.

Specifically, the coarse-grained selection unit may be configured to select the input neuron corresponding to the target weight from the input neuron of the input neuron caching unit according to the position information of the target weight, and then transmit the target weight and the corresponding input neuron of the weight to the operation unit.

In an embodiment, the operation unit may include a plurality of processing units to enable parallel computation to obtain different output neurons and store the output neurons into an output neuron caching unit. Each of the plurality of processing units contains a local weight selector module for further processing of dynamic coarse-grained sparse data. The coarse-grained selection unit may be configured to process the static sparsity by selecting the required input neurons. The working process of the coarse-grained selection unit is not described here, for details, please refer to FIG. 6.

Figure 6:
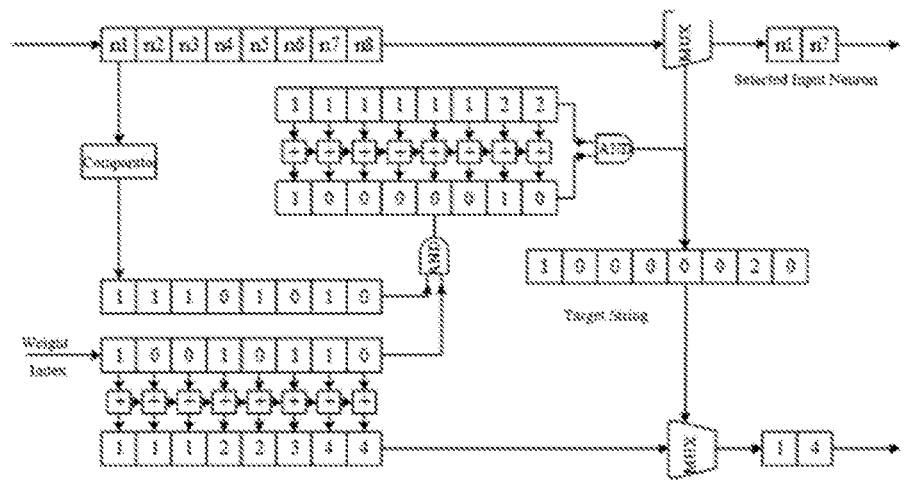
FIG. 6 is a flowchart of working process of a coarse-grained selection unit according to an embodiment of the disclosure.

Referring to FIG. 6, firstly, the coarse-grained selection unit may generate a neuron index according to the value of the input neuron, where each index indicates whether the corresponding neuron is useful ("0"); secondly, the coarse-grained selection unit may perform an "AND" operation on the generated neuron index and the position information of the weight (i.e., weight index) to obtain a neuron marker, where each bit of the neuron marker indicates whether the corresponding neuron is selected or not; thirdly, the coarse-grained selection unit may add each bit of the neuron marker to get a cumulative string, and then perform the "AND" operation between the cumulative string and the neuron marker to produce a target string used to select the input neuron; finally, the coarse-grained selection unit may use the target string to select the actual input neuron for subsequent computations in the operation unit. At the same time, the coarse-grained selection unit may produce an index string according to the target string and a cumulative string of weight index (i.e., position information of the weight) and pass the index string to the operation unit.

Figure 7:
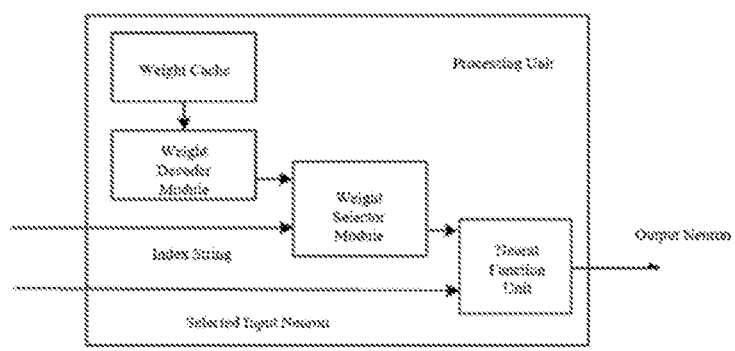
FIG. 7 is a schematic structure diagram of a processing unit according to an embodiment of the disclosure.

The operation unit may be mainly configured to process dynamic sparsity and effectively perform all operations of the neural network. The operation unit may include a plurality of processing units. As shown in FIG. 7, each processing unit may include a weight cache, a weight decoder module, a weight selector module, and a neuron function unit. Each processing unit may load weights from a local weight cache, because weights are independent between different output neurons, different processing for the weights are independent. A weight decoder module with a lookup table is placed next to the weight cache to extract the actual weight based on the weight codebook used in the local quantization and the compressed value in the weight dictionary.

Figure 8A:
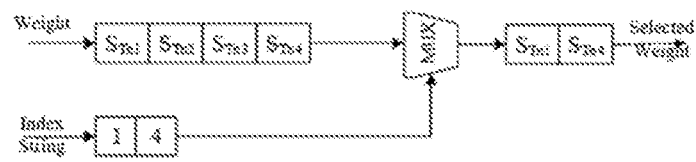
FIG. 8a is a schematic diagram of coarse-grained selection according to an embodiment of the disclosure.
Figure 8B:
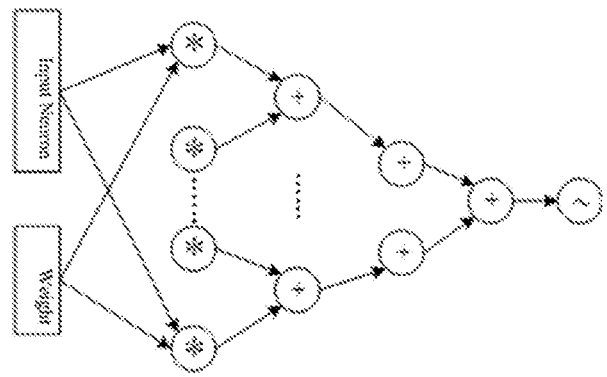
FIG. 8b is a schematic diagram of coarse-grained selection according to an embodiment of the disclosure.

As shown in FIG. 8*a*, the weight selector module may receive the index string and weight from the weight decoder module to select useful weights for computing the neuron function units of the processing unit. As shown in FIG. 8*b*, the neuron function unit of each processing unit may consist of a Tm multiplier, an adder tree and a non-linear function module. The neuron function unit may map the neural network to the processing unit using a time-sharing method, that is, each processing unit may process the output neuron in parallel, and M/Tm cycles are needed to compute the output neurons that require M multiplications because the processing unit can implement Tm multiplication in one cycle. And then, the neuron function unit may collect and assemble the output of all processing units for subsequent computation, or store the output to the output neuron caching unit.

The weight selector module may select the required weight only when considering dynamic sparse because the weight cache may store the weight compactly to achieve static sparsity. Referring to FIG. 8*a*, based on the index string of the neuron selector module containing the weight position information, the weights may be further filtered and the weights required for the computation may be selected. Each processing unit may work on a different output neuron to produce different weight. Therefore, the internal processing unit may use the weight selector module and the weight cache to avoid high bandwidth and delay.

It should be pointed out that dynamic sparse generally refers to input neuron sparse because the value of the input neurons changes as the input changes. The dynamic sparse may be mainly derived from the activation function of relu, because the function sets the input neuron whose absolute value is less than the threshold to 0. Static sparse generally refers to weight sparse, because a topology is no longer changed after the weight is pruned.

The instruction caching unit, the input neuron caching unit, the target weight caching unit, the target weight position caching unit, and the output neuron caching unit are all on-chip caching unit.

Specifically, the operation unit may include but not be limited to three parts: a first part is a multiplier, a second part is an adder tree, and a third part is an activation function unit. The first part may multiply first input data (in1) and second input data (in2) to get first output data (out1), where the process is: out=in1*in2. The second part may add third input data in3 through the adder tree to obtain second output data (out2), where in3 is a vector of length N, N is greater than 1, the process is: out2=in3[1]+In3[2]+ . . . +in3[N], and/or add third input data (in3) by the adder tree and add fourth input data (in4) to obtain the second output data (out2), where the process is: out=in3[1]+in3[2]+ . . . +in3[N]+in4, or add the third input data (in3) and the fourth input data (in4) to obtain the second output data (out2), where the process is: out2=in3+in4. The third part may perform the activation function on fifth input data (in5) to obtain active output data (out), where the process is out3=active(in5), and the activation function may include sigmoid, tan h, relu, softmax, and the like; in addition to the active operation, the third part may further implement other non-linear functions, for example, the third part may perform an operation (f) on input data (in) to obtain the output data (out), where the process is: out=f(in).

Further, the operation unit may include a pooling unit, and the pooling unit obtains the output data (out) after performing a pooling operation on the input data (in), and the process is: out=pool(in), where pool represents the pooling operation, and the pooling operation may include but not be limited to: mean pooling, maximum pooling, or median pooling. The input data in is the data in a pooling core associated with the output data(out).

The operations performed by the operation unit may include the following parts: the first part multiplies first input data and second input data to obtain a product; the second part performs an adder tree operation, that is, the second part adds third input data through an adder tree step by step, or adds the third input data to fourth input data to obtain a sum; the third part performs an activation function on fifth data to obtain output data. The above several parts of the operations can be freely combined, so as to achieve a variety of different functions of the operations.

It should be noted that the pre-processing unit, the storage unit, the DMA unit, the coarse-grained pruning unit, the instruction caching unit, the instruction control unit, the first caching unit, the second caching unit, the third caching unit, the fourth caching unit, the coarse-grained selection unit, and the operation unit are all physical hardware devices, not functional software units.

Figure 9:
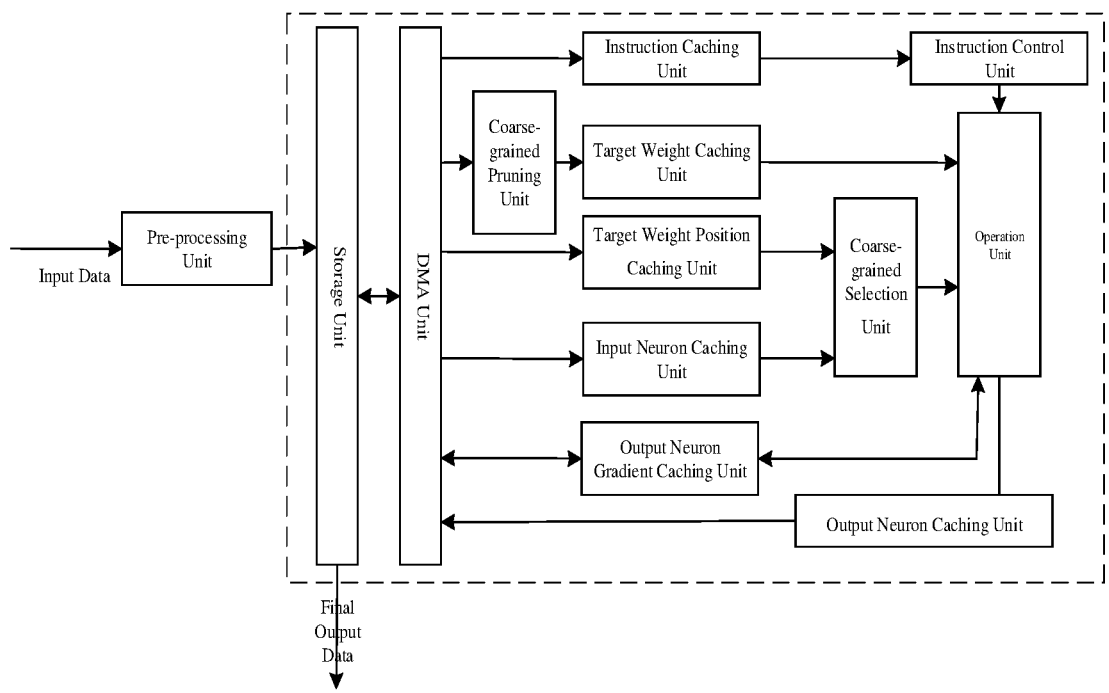
FIG. 9 is a schematic structure diagram of another accelerating device according to an embodiment of the disclosure.

FIG. 9 is a schematic structure diagram of another accelerating device according to an embodiment of the disclosure. As shown in FIG. 9, the accelerating device may further include: a pre-processing unit, a storage unit, a DMA unit, an instruction caching unit, an instruction control unit, a coarse-grained pruning unit, a target weight caching unit, a target weight position caching unit, an input neuron caching unit, a coarse-grained selection unit, an operation unit, an output neuron caching unit, and an output neuron gradient caching unit.

The pre-processing unit may be configured to preprocess original data and input the preprocessed data into the storage unit, where the original data may include input neuron, output neuron, and weight, and the pre-processing may include data segmentation, Gaussian filter, binarization, regularization, and/or normalization.

The storage unit may be configured to store neurons, weights, and instructions of the neural network, where only the target weight and the position information of the target weight are stored when the storage unit stores weights of the neural network.

The DMA unit may be configured to read/write data or instruction between the storage unit and the instruction caching unit, the coarse-grained pruning unit, the target weight position caching unit, the input neuron caching unit, or the output neuron caching unit.

The coarse-grained pruning unit may be configured to obtain the weight of the neural network from the storage unit through the DMA unit, and then perform coarse-grained pruning on the weight of the neural network to obtain the pruned weight. The coarse-grained pruning unit may store the pruned weight into the target weight caching unit.

It needs to be explained that the detailed process of the coarse-grained pruning unit performing the coarse-grained pruning operation on the weight of the neural network mentioned above will not be described here. For details, please refer to the relevant description of the embodiment shown in FIG. 1.

The instruction caching unit may be configured to cache the instruction.

The target weight caching unit may be configured to cache the target weight.

The target weight position caching unit may be configured to cache position data of the target weight, and map each connection weight in the input data to the corresponding input neuron one-to-one.

Optionally, the one-to-one cache method adopted by the target weight position caching unit may be: 1 indicating that the output neuron is connected to the input neuron by the weight, 0 indicating that the output neuron is not connected to the input neuron by the weight, and a connection status of the input neuron and output neuron of each group forming a string of 0 and 1 to indicate the connection relationship of the output neuron.

Optionally, the one-to-one cache method adopted by the target weight position caching unit may be: 1 indicating that the input neuron is connected to the output neuron by the weight, 0 indicating that the input neuron is not connected to the output neuron by the weight, the connection status of the input and output of each group forming a string of 0 and 1 to indicate the connection relationship of the output neuron.

Optionally, the one-to-one cache method adopted by the target weight position caching unit may be: combining a distance from the input neuron where a first connection is located in a first group to a first input neuron, a distance from the input neuron where a second connection is located to a previous connection in the input neuron, a distance from the input neuron where a third connection is located to the previous connection in the input neuron, . . . , and so on, until all the input of the output are exhausted, to represent the corresponding connection status of the output.

The input neuron caching unit may be configured to cache input neurons input to the coarse-grained selection unit.

The output neuron caching unit may be configured to cache the output neuron output by the operation unit.

The output neuron gradient caching unit may be configured to cache the gradient of the output neuron.

The instruction control unit may be configured to receive the instruction in the caching unit and decode the instruction to obtain control information, so as to control the operation unit to perform an operation.

The coarse-grained selection unit may be configured to receive the input neuron and the position information of the target weight and select the input neuron to be operated according to the target weight position information. The coarse-grained selection unit only selects the neurons corresponding to the target weight and transmits the selected neurons to the operation unit.

The operation unit may be configured to perform an operation according to the target weight and the corresponding input neuron of the weight obtained from the target weight caching unit to obtain the output neuron, and cache the output neuron into the output neuron caching unit.

The operation unit may be further configured to perform training according to the output neuron gradient and the pruned weight.

It should be noted that the functions of each unit of the accelerating device will not be described here. For details, please refer to the related description of the embodiment shown in FIG. 5.

It should be noted that the pre-processing unit, the storage unit, the DMA unit, the coarse-grained pruning unit, the instruction caching unit, the instruction control unit, the target weight caching unit, the target weight position caching unit, the input neuron caching unit, the output neuron gradient caching unit, the output neuron caching unit, the coarse-grained selection unit, and the operation unit are all physical hardware devices, not functional software units.

Figure 10:
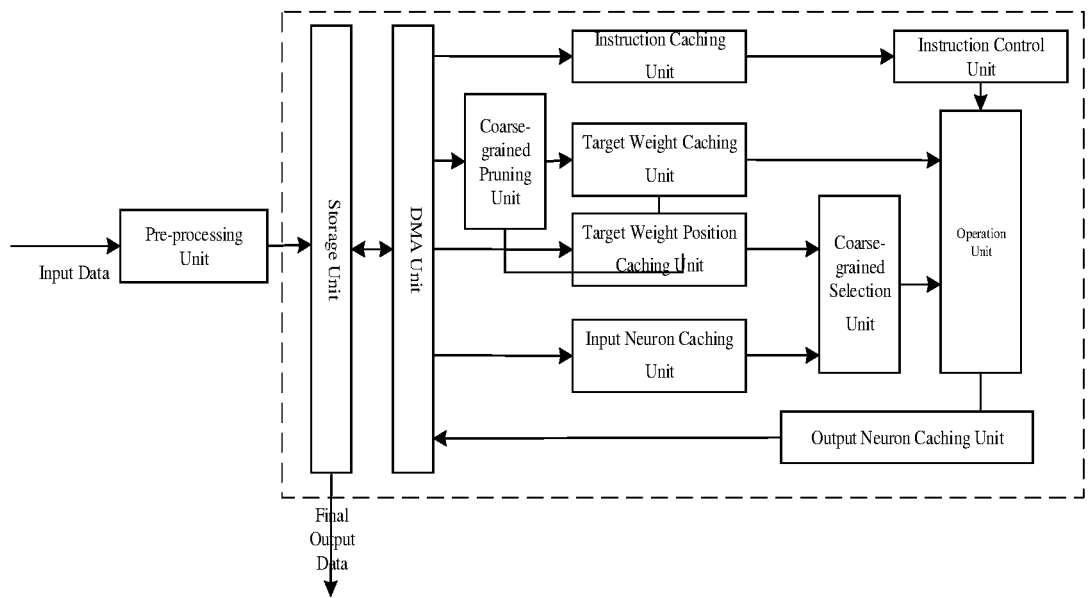
FIG. 10 is a schematic structure diagram of another accelerating device according to an embodiment of the disclosure.

FIG. 10 is a schematic structure diagram of another accelerating device according to an embodiment of the disclosure. As shown in FIG. 10, the accelerating device may further include:

the pre-processing unit, the storage unit, the DMA unit, the instruction caching unit, the instruction control unit, the coarse-grained pruning unit, the target weight caching unit, the target weight position caching unit, the input neuron caching unit, the coarse-grained selection unit, the operation unit, and the output neuron caching unit.

The pre-processing unit may be configured to preprocess original data and input the preprocessed data into the storage unit, where the original data may include input neuron, output neuron, and weight, and the pre-processing may include data segmentation, Gaussian filter, binarization, regularization, and/or normalization.

The storage unit may be configured to store neurons, weights, and instructions of the neural network, where only the target weight and the position information of the target weight are stored when the storage unit stores weights of the neural network.

The DMA unit may be configured to read/write data or instruction between the storage unit and the instruction caching unit, the coarse-grained pruning unit, the target weight position caching unit, the input neuron caching unit, or the output neuron caching unit.

The coarse-grained pruning unit may be configured to obtain the weight of the neural network from the storage unit through the DMA unit, and then perform coarse-grained pruning on the weight of the neural network to obtain the pruned weight. The coarse-grained pruning unit may store the pruned weight into the target weight caching unit.

It needs to be explained that the detailed process of the coarse-grained pruning unit performing the coarse-grained pruning operation on the weight of the neural network mentioned above will not be described here. For details, please refer to the relevant description of the embodiment shown in FIG. 1.

The instruction caching unit may be configured to cache the instruction.

The target weight caching unit may be configured to cache the target weight.

The target weight position caching unit may be configured to cache target weight position data; the target weight position caching unit maps each connection weight in the input data to the corresponding input neuron one-to-one.

Optionally, the one-to-one cache method adopted by the target weight position caching unit may be: 1 indicating that the output neuron is connected to the input neuron by the weight, 0 indicating that the output neuron is not connected to the input neuron by the weight, and a connection status of the input neuron and output neuron of each group forming a string of 0 and 1 to indicate the connection relationship of the output neuron.

Optionally, the one-to-one cache method adopted by the target weight position caching unit may be: 1 indicating that the input neuron is connected to the output neuron by the weight, 0 indicating that the input neuron is not connected to the output neuron by the weight, the connection status of all the input and output of each group forming a string of 0 and 1 to indicate the connection relationship of the output neuron.

Optionally, the one-to-one cache method adopting by the target weight position caching unit may be: combining a distance from the input neuron where a first connection is located in a first group to a first input neuron, a distance from the input neuron where a second connection is located to a previous connection in the input neuron, a distance from the input neuron where a third connection is located to the previous connection in the input neuron, . . . , and so on, until all the input of the output are exhausted, to represent the corresponding connection status of the output.

The input neuron caching unit may be configured to cache the input neuron input to the coarse-grained selection unit.

The output neuron caching unit may be configured to cache the output neuron output by the operation unit.

The output neuron gradient caching unit may be configured to cache the gradient of the output neuron.

The instruction control unit may be configured to receive the instruction in the caching unit and decode the instruction to obtain control information, so as to control the operation unit to perform an operation.

The coarse-grained selection unit may be configured to receive the input neuron and the position information of the target weight and select the input neuron to be operated according to the target weight position information. The coarse-grained selection unit only selects the neurons corresponding to the target weight and transmits the selected neurons to the operation unit.

The operation unit may be configured to perform an operation according to the target weight and the corresponding input neuron of the weight obtained from the target weight caching unit to obtain the output neuron, and cache the output neuron into the output neuron caching unit.

It should be noted that the functions of each unit of the accelerating device will not be described here. For details, please refer to the relevant description of the embodiment shown in FIG. 5.

It should be noted that the pre-processing unit, the storage unit, the DMA unit, the coarse-grained pruning unit, the instruction caching unit, the instruction control unit, the target weight caching unit, the target weight position caching unit, the input neuron caching unit, the output neuron gradient caching unit, the output neuron caching unit, the coarse-grained selection unit, and the operation unit are all physical hardware devices, not functional software units.

The processing method of the present disclosure will be specifically described by exemplifying the embodiments of a neural network processor in the following, but it should be understood that it is not intended to limit the present disclosure. The equivalent structure or equivalent process transformations made by the specific embodiments, or directly or indirectly applied in other related technical fields, are equally included in the scope of protection of the present disclosure.

Figure 11:
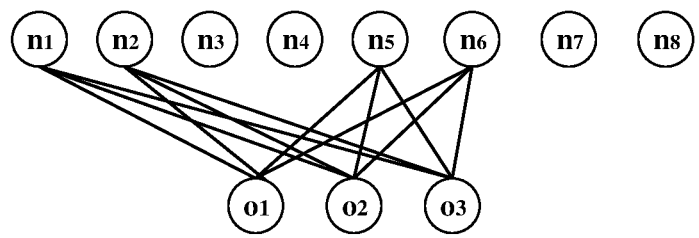
FIG. 11 is a schematic diagram of a specific embodiment of a processing method according to an embodiment of the disclosure.

FIG. 11 is a schematic diagram of a specific embodiment of a processing method according to an embodiment of the disclosure. FIG. 11 shows the result of a fully connected layer of a neural network after coarse-grained pruned. The fully connected layer has a total of 8 input neurons n1~n8 and 3 output neurons o1~o3, where the weights between the 4 input neurons n3, n4, n7, n8 and the 3 output neurons of o1, o2, o3 are set to 0 by coarse-grained sparsification; n1 is connected with o1, o2 and o3 by 3 weights of s11, s12 and s13; n2 is connected with o1, o2, o3 by 3 weights of s21, s22, s23; n5 is connected with o1, o2, o3 by 3 weights of s31, s32, s33; n6 is connected with o1, o2, o3 by 3 weights of s41, s42, s43. The bit string of 11001100 may be used to represent the connection status between the input neuron and the output neuron, that is, the first case of indicating the position information of the target weight, 1 represents that the input neuron is connected with the three output neurons, and 0 represents that the input neuron is not connected with any one of the three output neurons. Table 1 describes the information of neurons and weights in the embodiment, and Formula 1 describes an operation formula of the three output neurons of o1, o2, and o3. It can be seen from Formula 1 that o1, o2, and o3 will receive the same neuron for operation.

Fine-grained pruning refers to taking each weight as an independent object, if a weight meets a preset condition, it will be pruned; coarse-grained pruning refers to grouping the weights in a certain way, where each group includes a plurality of weights, if a group of weights meets a preset condition, the group of weights will be completely pruned.

TABLE 1

| Input Neuron | Output Neuron | | | Position of A Target Weight |
| --- | --- | --- | --- | --- |
| | o1 | o2 | o3 | |
| n1 | s11 | s21 | s31 | 1 |
| n2 | s12 | s22 | s32 | 1 |
| n3 | 0 | 0 | 0 | 0 |
| n4 | 0 | 0 | 0 | 0 |
| n5 | s13 | s23 | s33 | 1 |
| n6 | s14 | s24 | s34 | 1 |
| n7 | 0 | 0 | 0 | 0 |
| n8 | 0 | 0 | 0 | 0 |

Formula 1—operation formula of the output neuron:

$$o1=n1*s11+n2*s12+n5*s13+n6*s14$$

$$o2=n1*s21+n2*s22+n5*s23+n6*s24$$

$$o3=n1*s31+n2*s32+n5*s33+n6*s34$$

The processing device may transmit the position information of the 8 input neurons, 12 weights, 8 bits, and corresponding instructions to the storage unit. The coarse-grained selection unit may receive the position of the 8 input neurons and the target weight, and may select 4 neurons of n1, n2, n5, n6 that need to participate in the operation. The operation unit may receive the 4 selected neurons and weights, complete the operation of the output neuron by Formula 1, and then transmit the output neuron back to the storage unit.

In some embodiments of the present disclosure, an accelerating device is provided, which may include a memory storing executable instructions, a processor configured to perform the executable instructions in the storage unit in accordance with the processing method.

The processor may be a single processing unit, but may also include two or more processing units. In addition, the processor may also include a General Processing Unit (CPU) or a Graphic Processing Unit (GPU); it may also include a Field Programmable Gate Array (FPGA) or a Disclosure Specific Integrated Circuit (ASIC) to set and operate the neural network. The processor may also include an on-chip memory for caching (i.e., memory in the processing device).

The embodiments of the present disclosure also provide a neural network operation device which may include the accelerating device or the processing device described in the present disclosure, where the neural network operation device may be configured to acquire data to be operated and control information from other processing devices, perform specified neural network operation and/or training, and transmit the execution result to peripheral devices through an I/O interface. The peripheral devices may include a camera, a display, a mouse, a keyboard, a network card, a Wireless Fidelity (WIFI) interface, a server. When one or more computation devices are included, the computation devices can link and transfer data through a dedicated structure, for example, the plurality of operation devices conduct interconnect through Peripheral Component Interconnect-Express (PCIE) bus and transmit data to support operation/or training on a larger-scale neural network; the plurality of operation devices share the same control system or have their own control systems; the plurality of the operation devices share a memory or have their own memories; and the interconnection manner of the plurality of operation devices is an arbitrary interconnection topology.

The neural network operation device has high compatibility and can be connected to various types of servers through a PCIE interface.

Figure 12:
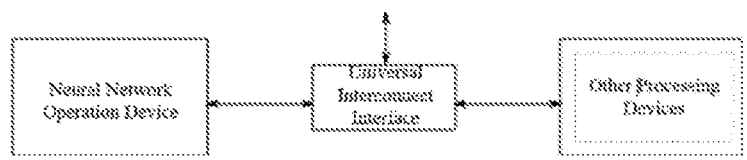
FIG. 12 is a schematic structure diagram of a combined processing device according to an embodiment of the disclosure.

The embodiments of the present disclosure provide a combined processing device which may include the neural network operation device, a universal interconnect interface, and other processing devices. The neural network operation device interacts with other processing devices to perform user-specified operations. FIG. 12 is a schematic structure diagram of the combined processing device.

The other processing devices may include one or more types of general-purpose/dedicated processor such as a CPU (Central Processing Unit), a GPU (Graphics Processing Unit), a neural network processor, and the like. A count of processors included in other processing devices is not limited. The other processing devices may serve as an interface between the neural network operation device and external data, and complete basic control such as data moving, opening and stopping of the neural network operation device; the other processing devices may also cooperate with the neural network operation device to complete the operation task.

The universal interconnect interface may be configured to transmit data and control instruction between the neural network operation device and other processing devices. The neural network operation device may acquire the needed input data from other processing devices and write them into the on-chip storage unit of the neural network operation device, acquire the control instruction from other processing devices and write them into an on-chip control cache of the neural network operation device, and acquire the data in the storage unit of the neural network operation device and then transmit them to other processing devices.

Figure 13:
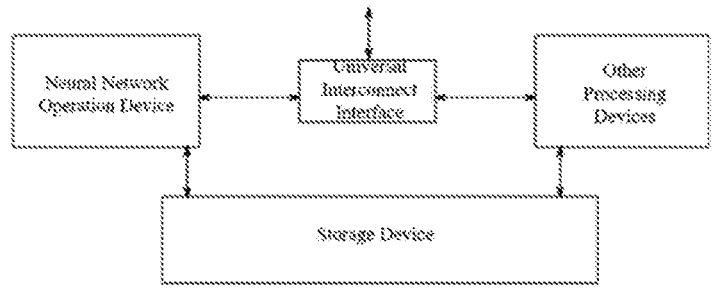
FIG. 13 is a schematic structure diagram of another combined processing device according to an embodiment of the disclosure.

Optionally, as shown in FIG. 13, the combined processing device may further include a storage device, which may be respectively connected to the neural network operation device and the other processing devices. The storage device may be configured to store data in the neural network operation device and the other processing devices, and may be particularly suitable for storing the data needed to be operated that cannot be stored completely in the internal storage part of the neural network operation device or other processing devices.

The combined processing device may be served as an SOC on-chip system for mobile phones, robots, drones, video monitoring devices, etc., effectively reducing the core area of the control part, increasing the processing speed, and reducing the overall power consumption. In this case, the universal interconnect interface of the combined processing device is connected with some components of the device, such as a camera, a display, a mouse, a keyboard, a network card, and a wifi interface.

In some embodiments, the present disclosure provides a neural network processor, which may include the neural network operation device or the combined processing device.

In some embodiments, the present disclosure provides a chip, which may include the neural network processor.

In some embodiments, the present disclosure provides a chip package structure, which may include the chip.

In some embodiments, the present disclosure provides a board card, which may include the chip package structure.

In some embodiments, the present disclosure provides an electronic device, which may include the board card.

Figure 14:
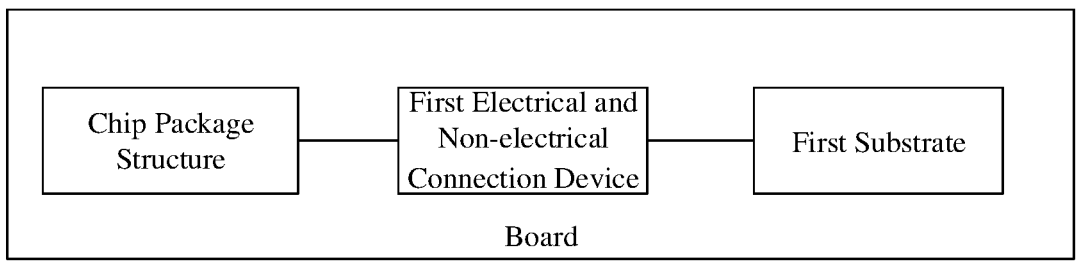
FIG. 14 is a schematic structure diagram of a neural network processor board card according to an embodiment of the disclosure.

FIG. 14 is a schematic structure diagram of a neural network processor board card according to an embodiment of the disclosure. As shown in FIG. 14, the neural network processor board card may include the chip package structure, a first electrical and non-electrical connection device, and a first substrate.

Figure 15:
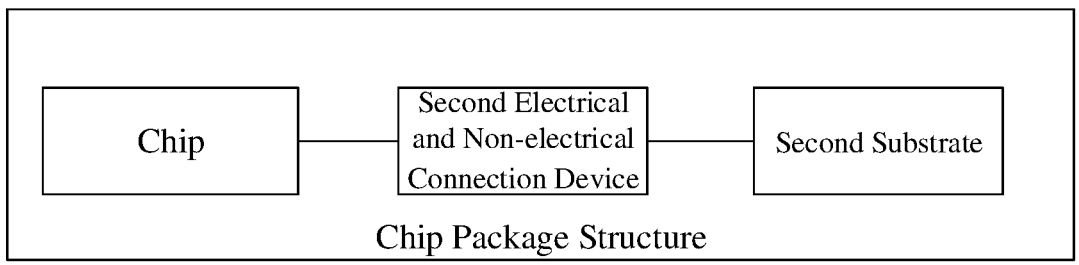
FIG. 15 is a schematic structure diagram of a chip package according to an embodiment of the disclosure.

The specific structure of the chip package structure is not limited in the disclosure. Optionally, as shown in FIG. 15, the chip package structure may include the chip, a second electrical and non-electrical connection device, and a second substrate.

The specific form of the chip in the present disclosure is not limited. The chip may include but not be limited to a neural network wafer integrated with a neural network processor, and the wafer may be made of silicon material, germanium material, quantum material or molecular material. The neural network wafer may be packaged according to the actual situation (for example, a harsh environment) and different disclosure requirements, so that most of the neural network wafer may be wrapped, and pins on the neural network wafer may be connected to the outside of the packaging structure through conductors such as gold wire, which can be used for circuit connection with the outer layer.

The types of the first substrate and the second substrate are not limited in the present disclosure, which may be a printed circuit board (PCB) or a printed wiring board (PWB), and other circuit boards. There are no limitations on the materials used to make the PCB.

The second substrate according to the present disclosure may be configured to carry the chip, and the chip package structure obtained by connecting the chip and the second substrate through the second electrical and non-electrical connection device is used for protecting the chip to facilitate further packaging of the chip package structure and the first substrate.

The specific package method and the corresponding structure of the second electrical and non-electrical connection device are not limited, and the appropriate package method can be selected and simply improved according to the actual situation and different disclosure requirements, such as Flip Chip Ball Grid Array Package (FCBGAP), Low-profile Quad Flat Package (LQFP), Quad Flat Package with Heat Sink (HQFP), Quad Flat Non-lead Package (QFN), or a Fine-Pitch Ball Grid Package (FBGA) and other package methods.

The Flip Chip may be suitable for the case where the requirement on the area after packaging is high or an inductor of a conductive wire and a transmission time of a signal are sensitive. In addition, Wire Bonding method may be adopted to reduce the cost and increase the flexibility of the package structure.

Ball Grid Array may provide more pins, and the average length of the pin of the conductive wire is short, which has the function of transmitting signals at high speed, where Pin Grid Array (PGA), 0 Insertion Force (ZIF), Single Edge Contact Connection (SECC), Land Grid Array (LGA) and other package method may be adopted.

Figure 16:
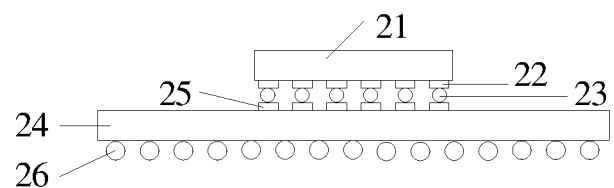
FIG. 16 is a schematic structure diagram of another chip package according to an embodiment of the disclosure.

Optionally, the package method of Flip Chip Ball Grid Array may be adopted to package the neural network chip and the second substrate. Please refer to FIG. 16 for a specific schematic diagram of package structure of the neural network chip. As shown in FIG. 16, the chip package structure may include a chip 21, a pad 22, a bump 23, a second substrate 24, a connection point 25 on the second substrate 24, and a pin 26.

The pad 22 is connected to the chip 21, and the bump 23 is formed by welding between the pad 22 and the connection point 25 on the second substrate 24 to connect the neural network chip 21 and the second substrate 24, thereby realizing the package of chip 21.

The pin 26 may be configured to connect with an external circuit of the package structure (for example, the first substrate on the board card) to transmit external data and internal data, which may facilitate data processing by the chip 21 or the corresponding neural network processor of the chip 21. The type and quantity of pins are not limited in this present disclosure. Different pin types can be selected according to different packaging technologies, and are arranged according to certain rules.

Optionally, the neural network chip package structure may further include an insulating filler disposed in the gap between the pad 22, the bump 23, and the connection point 25 for preventing interference between bumps, where the material of the insulating filler may be silicon nitride, silicon oxide or silicon oxynitride; the interference may include electromagnetic interference, inductance interference and the like.

Optionally, the neural network chip package structure may further include a heat dissipation device for dissipating heat of the neural network chip 21 during operation, where the heat dissipation device may be a piece of metal with good thermal conductivity, a heat sink or a radiator, for example, a fan.

Figure 17:
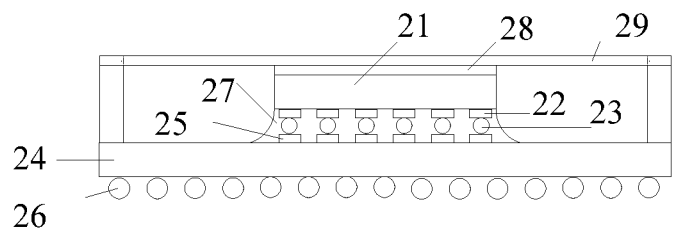
FIG. 17 is a schematic structure diagram of another chip package according to an embodiment of the disclosure.

For example, as shown in FIG. 17, the chip package structure may include a chip 21, a pad 22, a bump 23, a second substrate 24, a connection point 25 on the second substrate 24, a pin 26, an insulating filler 27, thermal compound 28, and a fin 29 with metal housing. Among them, the thermal compound 28 and the fin 29 with metal housing are configured to dissipate the heat of the chip 21 during operation.

Optionally, the chip package structure may further include a reinforcing structure, which is connected to the pad 22, and is buried in the bump 23 to enhance the connection strength between the bump 23 and the pad 22. The reinforcing structure may be a metal wire structure or a columnar structure, which is not limited herein.

The specific form of the first electrical and non-electrical device is not limited in the present disclosure. Please refer to the description of the second electrical and non-electrical device, that is, the chip package structure may be packaged by welding, or by connecting the second substrate and the first substrate through a connecting line or inserting method, so as to subsequently replace the first substrate or the chip package structure.

Optionally, the first substrate may include a memory unit interface for expanding a storage capacity, for example, a Synchronous Dynamic Random Access Memory (SDRAM), and a Double Date Rate (DDR) SDRAM. etc., by expanding the memory, the processing capacity of the neural network processor is improved.

The first substrate 13 may further include a Peripheral Component Interconnect-Express (PCI-E or PCIe) interface, a Small Form-factor Pluggable (SFP) interface, and an Ethernet interface, a Controller Area Network (CAN) interface, etc., used for data transmission between the package structure and external circuits, which can improve the speed and convenience of operation.

The neural network processor is packaged into a chip, the chip is packaged into a chip package structure, and the chip package structure is packaged into a board card. Data interaction with an external circuit (for example, a computer motherboard) may be performed through an interface (slot or ferrule) on the board card, that is, the function of the neural network processor may be implemented by directly using a neural network processor board card, which may also protect the chip. And other modules may be added to the neural network processor board card, which improves the disclosure range and computational efficiency of the neural network processor.

The electronic device may include a data processing device, a robot, a computer, a printer, a scanner, a tablet computer, an intelligent terminal, a mobile phone, an automobile data recorder, a navigator, a sensor, a webcam, a cloud server, a camera, a video camera, a projector, a watch, an earphone, a mobile storage, wearable equipment, a vehicle, a household electrical appliance and/or medical equipment.

The vehicles may include an airplane, a ship and/or a car. The household electrical appliance includes a television, an air conditioner, a microwave oven, a refrigerator, an electric rice cooker, a humidifier, a washing machine, an electric lamp, a gas cooker and a range hood. The medical equipment includes a nuclear magnetic resonance spectrometer, a B-ultrasonic scanner and/or an electrocardiograph.

Figure 18:
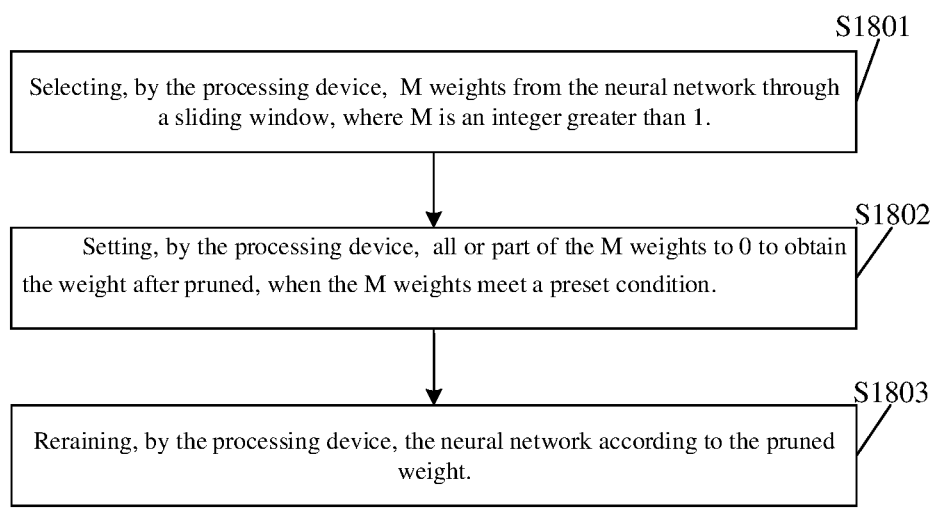
FIG. 18 is a flowchart of a processing method according to an embodiment of the disclosure.

FIG. 18 is a flowchart of a processing method according to an embodiment of the disclosure. The processing method is used for sparsification of the neural network, as shown in FIG. 11, the processing method may include:

in step S1801, selecting, by the processing device, M weights from the neural network through the sliding window, where M may be an integer greater than 1.

The neural network may include a fully connected layer, a convolutional layer, and a LSTM layer.

The processing device selecting M weights from the fully connected layer of the neural network may include that:

as shown in FIG. 2, the weight of the fully connected layer is a two-dimensional matrix (Nin, Nout), where Nin represents a count of input neurons and Nout represents a count of output neurons, and the fully connected layer has Nin*Nout weights; the size of the sliding window is Bin*Bout, where Bin is a positive integer greater than 0 and less than or equal to Nin, and Bout is a positive integer greater than 0 and less than or equal to Nout;

making the sliding window slide Sin stride in the direction of Bin, or slide Sout stride in the direction of Bout, where Sin is a positive integer greater than 0 and less than or equal to Bin, and Sout is a positive integer greater than 0 and less than or equal to Bout; and selecting M weights from the Nin*Nout weights through the sliding window, where M=Bin*Bout.

The processing device selecting M weights from the convolutional layer of the neural network may include:

as shown in FIG. 3, the weight of the convolutional layer is a four-dimensional matrix (Nfin,Nfout,Kx,Ky), where Nfin represents a count of input feature maps, Nfout represents a count of output feature maps, (Kx, Ky) is the size of a convolution kernel, and the convolutional layer has Nfin*Nfout*Kx*Ky weights; the sliding window is a four-dimensional sliding window with the size of Bfin*Bfout*Bx*By, where Bfin is a positive integer greater than 0 and less than or equal to Nfin, Bfout is a positive integer greater than 0 and less than or equal to Nfout, Bx is a positive integer greater than 0 and less than or equal to Kx, and By is a positive integer greater than 0 and less than or equal to Ky;

making the sliding window slide Sfin stride in the direction of Bfin, or slide Sfout stride in the direction of Bfout, or slide S stride in the direction of Bx, or slide Sy stride in the direction of By, where Sfin is a positive integer greater than 0 and less than or equal to Bfin, Sfout is a positive integer greater than 0 and less than or equal to Bfout, Sx is a positive integer greater than 0 and less than or equal to Bx, and Sy is a positive integer greater than 0 and less than or equal to By; and selecting M weights from the Nfin*Nfout*Kx*Ky weights through the sliding window, where M=Bfin*Bfout*Bx*By.

The processing device selecting M weights from the LSTM layer of the neural network may include:

the weight of the LSTM layer is composed of m weights of the fully connected layer, where m is a positive integer greater than 0, and an $i^{th}$ weight of the fully connected layer is (Nin_i, Nout_i), where i is a positive integer greater than 0 and less than or equal to m, Nin_i represents a count of input neurons of the $i^{th}$ weight of the fully connected layer and Nout_i represents a count of output neurons of the $i^{th}$ weight of the fully connected layer; the size of the sliding window is Bin_i*Bout_i, Bin_i is a positive integer greater than 0 and less than or equal to Nin_i, and Bout_i is a positive integer greater than 0 and less than or equal to Nout_i;

making the sliding window slide Sin_i stride in the direction of Bin_i, or slide Sout_i stride in the direction of Bout_i, where Sin_i is a positive integer greater than 0 and less than or equal to Bin_i, and Sout_i is a positive integer greater than 0 and less than or equal to Bout_i; and selecting M weights from the Bin_i*Bout_i weights through the sliding window, where M=Bin_i*Bout_i.

In step S1802, setting, by the processing device, all or part of the M weights to 0 when the M weights meet the preset condition, to obtain the pruned weights.

The preset condition is: an information quantity of the M weights meets a preset judgment condition.

In an embodiment, the preset judgment condition may include a threshold judgment condition, where the threshold judgment condition may include one or some condition within or outside a given range of values: less than a given threshold, less than or equal to the given threshold, greater than the given threshold, greater than or equal to the given threshold.

Specifically, the information quantity of the M weights is less than the given threshold, where the information quantity of the M weights may include but not be limited to an arithmetic mean of an absolute value of the M weights, a geometric mean of an absolute value of the M weights or a maximum value of the absolute value of the M weights. The arithmetic mean of the absolute value of the M weights is less than a first threshold; or the geometric mean of the absolute value of the M weights is less than a second threshold; or the maximum value of the absolute value of the M weights is less than a third threshold. The first threshold, the second threshold, and the third threshold may be preset according to a situation, or be obtained by a computation of changing an input parameter in a preset formula, or be obtained by machine learning by those skilled in the art. The present disclosure does not specifically limit the method of obtaining the first threshold, the second threshold and the third threshold.

In an optional embodiment, the preset judgment condition may include a function mapping judgment condition which judges whether the M weights satisfy the given condition after a function transformation.

It should be noted that the steps S1801 and S1802 can be regarded as the process of the processing device performing coarse-grained pruning on the neural network until no weight meets the preset condition without losing a preset precision.

Further, the processing device may repeatedly perform coarse-grained pruning on the weight of the neural network and perform training according to the pruned weight. The preset precision is x %, where x is between 0-5.

In step S1803, training, by the processing device, the neural network according to the pruned weight.

Specifically, the processing device performing training on the neural network according to the pruned weight may be:
retraining, by the processing device, the neural network by a back propagation algorithm according to the pruned weight.

Optionally, between performing coarse-grained pruning and retraining on the neural network, the method may further include the following step:
quantizing and/or reducing, by the processing device, bit of the weight.

It should be pointed out that during the training process of the neural network by the processing device, the weights set to 0 remains 0.

In the embodiments provided by the disclosure, it should be understood that the disclosed related devices and methods may be implemented in other manners. For example, the device embodiment described above is only schematic. For example, the units or the modules are hardware set to implement certain specific functions, division of the units or the modules is only logical function division and another division manner may be adopted during practical implementation. For example, a plurality of components or modules may be combined or integrated into a system or some characteristics may be neglected or not executed.

The embodiment of the present disclosure provides a coarse-grained sparsification processing method and corresponding processing device of the neural network, and provides a chip, a chip package structure, a board card, and an electronic device. The coarse-grained sparsification processing method may regularize the sparse neural network, facilitate accelerating by using hardware, and reduce the storage space of a target weight position. The neural network processor may fully exploit the characteristics of coarse-grained sparsification, reduce the memory access and the amount of computation, thereby obtaining an acceleration ratio and reducing energy consumption.

In an embodiment, the target weight is a weight whose absolute value is greater than a second given threshold.

FIG. 18 is a flowchart of a processing method according to an embodiment of the disclosure. In some embodiments of the present disclosure, a processing method is provided for sparsification of the neural network. As shown in FIG. 18, the processing method may include:
in step S1801, selecting, by the processing device, M weights from the neural network through the sliding window, where M may be an integer greater than 1.

The neural network may include a fully connected layer, a convolutional layer, and a LSTM layer.

The processing device selecting M weights from the fully connected layer of the neural network may include that:
as shown in FIG. 2, the weight of the fully connected layer is a two-dimensional matrix (Nin, Nout), where Nin represents a count of input neurons and Nout represents a count of output neurons, and the fully connected layer has Nin*Nout weights; the size of the sliding window is Bin*Bout, where Bin is a positive integer greater than 0 and less than or equal to Nin, and Bout is a positive integer greater than 0 and less than or equal to Nout.

The performing coarse-grained pruning on the weight of the fully connected layer of the neural network may include:
making the sliding window slide Sin stride in the direction of Bin, or slide Sout stride in the direction of Bout, where Sin is a positive integer greater than 0 and less than or equal to Bin, and Sout is a positive integer greater than 0 and less than or equal to Bout; and
selecting M weights from the Nin*Nout weights through the sliding window, where M=Bin*Bout.

The processing device selecting M weights from the convolutional layer of the neural network may include:
as shown in FIG. 3, the weight of the convolutional layer is a four-dimensional matrix (Nfin,Nfout,Kx,Ky), where Nfin represents a count of input feature maps, Nfout represents a count of output feature maps, (Kx, Ky) is the size of a convolution kernel, and the convolutional layer has Nfin*Nfout*Kx*Ky weights; the sliding window is a four-dimensional sliding window with the size of Bfin*Bfout*Bx*By, where Bfin is a positive integer greater than 0 and less than or equal to Nfin, Bfout is a positive integer greater than 0 and less than or equal to Nfout, Bx is a positive integer greater than 0 and less than or equal to Kx, and By is a positive integer greater than 0 and less than or equal to Ky;
making the sliding window slide Sfin stride in the direction of Bfin, or slide Sfout stride in the direction of Bfout, or slide S stride in the direction of Bx, or slide Sy stride in the direction of By, where Sfin is a positive integer greater than 0 and less than or equal to Bfin, Sfout is a positive integer greater than 0 and less than or equal to Bfout, Sx is a positive integer greater than 0 and less than or equal to Bx, and Sy is a positive integer greater than 0 and less than or equal to By; and
selecting M weights from the Nfin*Nfout*Kx*Ky weights through the sliding window, where M=Bfin*Bfout*Bx*By.

The processing device selecting M weights from the LSTM layer of the neural network may include:
the weight of the LSTM layer is composed of m weights of the fully connected layer, where m is a positive integer greater than 0, and an $i^{th}$ weight of the fully connected layer is (Nin_i, Nout_i), where i is a positive integer greater than 0 and less than or equal to m, Nin_i represents a count of input neurons of the $i^{th}$ weight of the fully connected layer and Nout_i represents a count of output neurons of the $i^{th}$ weight of the fully connected layer; the size of the sliding window is Bin_i*Bout_i, Bin_i is a positive integer greater than 0 and less than or equal to Nin_i, and Bout_i is a positive integer greater than 0 and less than or equal to Nout_i;

making the sliding window slide Sin_i stride in the direction of Bin_i, or slide Sout_i stride in the direction of Bout_i, where Sin_i is a positive integer greater than 0 and less than or equal to Bin_i, and Sout_i is a positive integer greater than 0 and less than or equal to Bout_i; and selecting M weights from the Bin_i*Bout_i weights through the sliding window, where M=Bin_i*Bout_i.

In step S1802, setting, by the processing device, all or part of the M weights to 0 when the M weights meet the preset condition, to obtain the pruned weights.

The preset condition is: an information quantity of the M weights meets a preset judgment condition.

In an embodiment, the preset judgment condition may include a threshold judgment condition, where the threshold judgment condition may include one or some condition within or outside a given range of values: less than a given threshold, less than or equal to the given threshold, greater than the given threshold, greater than or equal to the given threshold.

Specifically, the information quantity of the M weights is less than the given threshold, where the information quantity of the M weights may include but not be limited to an arithmetic mean of an absolute value of the M weights, a geometric mean of the absolute value of the M weights or a maximum value of the absolute value of the M weights. The arithmetic mean of the absolute value of the M weights is less than a first threshold; or the geometric mean of the absolute value of the M weights is less than a second threshold; or the maximum value of the absolute value of the M weights is less than a third threshold. The first threshold, the second threshold, and the third threshold may be preset according to a situation, or be obtained by a computation of changing an input parameter in a preset formula, or be obtained by machine learning by those skilled in the art. The present disclosure does not specifically limit the method of obtaining the first threshold, the second threshold and the third threshold.

In an optional embodiment, the preset judgment condition may include a function mapping judgment condition which judges whether the M weights satisfy the given condition after a function transformation.

Further, the processing device may repeatedly perform coarse-grained pruning on the weight of the neural network and perform training according to the pruned weight. The preset precision is x %, where x is between 0-5.

In step S1803, training, by the processing device, the neural network according to the pruned weight.

Specifically, the processing device performing training on the neural network according to the pruned weight may be:

retraining, by the processing device, the neural network by a back propagation algorithm according to the pruned weight.

Further, the processing device may perform an operation based on the trained neural network, and store the output neuron obtained by the operation into the storage device.

FIG. 1 is a schematic structure diagram of a processing device performing coarse-grained pruning and sparsification on a neural network according to an embodiment of the disclosure. As shown in FIG. 1, the processing device may include:

a coarse-grained pruning unit configured to perform coarse-grained pruning on the weight of the neural network to obtain a pruned weight, where the target weight is a weight whose absolute value is greater than a second given threshold.

The coarse-grained pruning unit is specifically configured to:

select M weights from the weights of a neural network through a sliding window, where M may be an integer greater than 1; and when the M weights meet the preset condition, all or part of the M weights may be set to 0;

where the preset condition is:

an information quantity of the M weights meets a preset judgment condition.

In an embodiment, the preset judgment condition may include a threshold judgment condition, where the threshold judgment condition may include one or some condition within or outside a given range of values: less than a given threshold, less than or equal to the given threshold, greater than the given threshold, greater than or equal to the given threshold.

Specifically, the information quantity of the M weights is less than the given threshold, where the information quantity of the M weights may include but not be limited to an arithmetic mean of an absolute value of the M weights, a geometric mean of the absolute value of the M weights or a maximum value of the absolute value of the M weights. The arithmetic mean of the absolute value of the M weights is less than a first threshold; or the geometric mean of the absolute value of the M weights is less than a second threshold; or the maximum value of the absolute value of the M weights is less than a third threshold. The first threshold, the second threshold, and the third threshold may be preset according to a situation, or be obtained by a computation of changing an input parameter in a preset formula, or be obtained by machine learning by those skilled in the art. The present disclosure does not specifically limit the method of obtaining the first threshold, the second threshold and the third threshold.

In an optional embodiment, the preset judgment condition may include a function mapping judgment condition which judges whether the M weights satisfy the given condition after a function transformation.

Furthermore, the neural network may include a fully connected layer, a convolutional layer and/or a LSTM layer. The weight of the fully connected layer is a two-dimensional matrix (Nin,Nout), where Nin represents a count of input neurons and Nout represents a count of output neurons, and the fully connected layer has Nin*Nout weights; the weight of the convolutional layer is a four-dimensional matrix (Nfin,Nfout,Kx,Ky), where Nfin represents a count of input feature maps, Nfout represents a count of output feature maps, (Kx,Ky) is the size of a convolution kernel, and the convolutional layer has Nfin*Nfout*Kx*Ky weights; the weight of the LSTM layer is composed of m weights of the fully connected layer, where m is a positive integer greater than 0, and an $i^{th}$ weight of the fully connected layer is a two-dimensional matrix (Nin_i, Nout_i), where i is a positive integer greater than 0 and less than or equal to m, Nin_i represents a count of input neurons of the $i^{th}$ weight of the fully connected layer and Nout_i represents a count of output neurons of the $i^{th}$ weight of the fully connected layer. The coarse-grained pruning unit may be specifically configured to:

perform coarse-grained pruning on the weight of the fully connected layer, where a sliding window is a two-dimensional sliding window with the size of Bin*Bout, Bin is a positive integer greater than 0 and less than or equal to Nin, and Bout is a positive integer greater than 0 and less than or equal to Nout;

make the sliding window slide Sin stride in the direction of Bin, or slide Sout stride in the direction of Bout, where Sin is a positive integer greater than 0 and less than or equal to Bin, and Sout is a positive integer greater than 0 and less than or equal to Bout;

select M weights from the Nin*Nout weights through the sliding window, and when the M weights meet the preset condition, all or part of the M weights may be set to 0, where M=Bin*Bout;

perform coarse-grained pruning on the weights of the convolutional layer, where the sliding window is a four-dimensional sliding window with the size of Bfin*Bfout*Bx*By, Bfin is a positive integer greater than 0 and less than or equal to Nfin, Bfout is a positive integer greater than 0 and less than or equal to Nfout, Bx is a positive integer greater than 0 and less than or equal to Kx, and By is a positive integer greater than 0 and less than or equal to Ky;

make the sliding window slide Sfin stride in the direction of Bfin, or slide Sfout stride in the direction of Bfout, or slide S stride in the direction of Bx, or slide Sy stride in the direction of By, where Sfin is a positive integer greater than 0 and less than or equal to Bfin, Sfout is a positive integer greater than 0 and less than or equal to Bfout, Sx is a positive integer greater than 0 and less than or equal to Bx, and Sy is a positive integer greater than 0 and less than or equal to By;

select M weights from the Nfin*Nfout*Kx*Ky weights through the sliding window, and when the M weights meet the preset condition, all or part of the M weights may be set to 0, where M=Bfin*Bfout*Bx*By;

perform coarse-grained pruning on the weights of the LSTM layer, where the size of the sliding window is Bin_i*Bout_i, Bin_i is a positive integer greater than 0 and less than or equal to Nin_i, and Bout_i is a positive integer greater than 0 and less than or equal to Nout_i;

make the sliding window slide Sin_i stride in the direction of Bin_i, or slide Sout_i stride in the direction of Bout_i, where Sin_i is a positive integer greater than 0 and less than or equal to Bin_i, and Sout_i is a positive integer greater than 0 and less than or equal to Bout_i; and select M weights from the Bin_i*Bout_i weights through the sliding window, and when the M weights meet the preset condition, all or part of the M weights may be set to 0, where M=Bin_i*Bout_i.

The processing device may further include an operation unit configured to perform training according to the pruned weight, where the weight that has been set to 0 in the training process remains 0.

The operation unit integrates a back propagation training algorithm of the neural network, receives the neural network after coarse-grained pruned, and adopts the back propagation training algorithm to train, where the pruned weight in the retraining process remains 0. The operation unit transmits the trained neural network to the coarse-grained pruning unit for further pruning operations, or directly outputs the trained neural network.

The present disclosure provides a processing device (for example, an artificial neural network chip), and FIG. 4 is a schematic structure diagram of a processing device according to an embodiment of the disclosure. As shown in FIG. 4, the processing device may speed up the processing of the coarse-grained sparsification neural network, and fully explore the characteristics of coarse-grained sparsification, reduce access and computation, thereby obtaining an acceleration ratio and reducing energy consumption.

The processing device may include a storage unit, an instruction control unit, a coarse-grained pruning unit, a coarse-grained selection unit, and an operation unit. The processing device may be used for neural network processing.

The storage unit may be configured to store the neuron, the weight and the instruction of the neural network.

The coarse-grained pruning unit may be configured to perform coarse-grained pruning on the weight of the neural network to obtain the pruned weight and store the pruned weight and the position information of the target weight into the storage unit, where the target weight is a weight whose absolute value is greater than a second given threshold. The coarse-grained pruning unit may be specifically configured to:

select M weights from the weights of a neural network through a sliding window, where M may be an integer greater than 1; and when the M weights meet the preset condition, all or part of the M weights may be set to 0.

The information quantity of the M weights is less than the first given threshold.

Furthermore, the information quantity of the M weights is an arithmetic mean of an absolute value of the M weights, a geometric mean of the absolute value of the M weights or a maximum value of the absolute value of the M weights; the first given threshold is a first threshold, a second threshold, or a third threshold; and the information quantity of the M weights being less than the first given threshold may include:

the arithmetic mean of the absolute value of the M weights being less than the first threshold, or the geometric mean of the absolute value of the M weights being less than the second threshold, or the maximum value of the M weights being less than the third threshold.

Furthermore, the coarse-grained pruning unit and the operation unit may be configured to repeat performing coarse-grained pruning on the weights of the neural network and training the neural network according to the pruned weights until no weight meets the preset condition without losing a preset precision.

Furthermore, the neural network may include a fully connected layer, a convolutional layer and/or a LSTM (long and short term memory) layer. The weight of the fully connected layer is a two-dimensional matrix (Nin,Nout), where Nin represents a count of input neurons and Nout represents a count of output neurons, and the fully connected layer has Nin*Nout weights; the weight of the convolutional layer is a four-dimensional matrix (Nfin,Nfout,Kx,Ky), where Nfin represents a count of input feature maps, Nfout represents a count of output feature maps, (Kx,Ky) is the size of a convolution kernel, and the convolutional layer has Nfin*Nfout*Kx*Ky weights; the weight of the LSTM layer is composed of m weights of the fully connected layer, where m is a positive integer greater than 0, and an $i^{th}$ weight of the fully connected layer is a two-dimensional matrix (Nin_i, Nout_i), where i is a positive integer greater than 0 and less than or equal to m, Nin_i represents a count of input neurons of the $i^{th}$ weight of the fully connected layer and Nout_i represents a count of output neurons of the $i^{th}$ weight of the fully connected layer. The coarse-grained pruning unit may be specifically configured to:

perform coarse-grained pruning on the weight of the fully connected layer, where a sliding window is a two-dimensional sliding window with the size of Bin*Bout, Bin is a positive integer greater than 0 and less than or equal to Nin, and Bout is a positive integer greater than 0 and less than or equal to Nout; make the sliding window slide Sin stride in the direction of Bin, or slide Sout stride in the direction of Bout, where Sin is a positive integer greater than 0 and less than or equal to Bin, and Sout is a positive integer greater than 0 and less than or equal to Bout; select M weights from the Nin*Nout weights through the sliding window, and when the M weights meet the preset condition, all or part of the M weights may be set to 0, where M=Bin*Bout;

perform coarse-grained pruning on the weights of the convolutional layer, where the sliding window is a four-dimensional sliding window with the size of Bfin*Bfout*Bx*By, Bfin is a positive integer greater than 0 and less than or equal to Nfin, Bfout is a positive integer greater than 0 and less than or equal to Nfout, Bx is a positive integer greater than 0 and less than or equal to Kx, and By is a positive integer greater than 0 and less than or equal to Ky; make the sliding window slide Sfin stride in the direction of Bfin, or slide Sfout stride in the direction of Bfout, or slide S stride in the direction of Bx, or slide Sy stride in the direction of By, where Sfin is a positive integer greater than 0 and less than or equal to Bfin, Sfout is a positive integer greater than 0 and less than or equal to Bfout, Sx is a positive integer greater than 0 and less than or equal to Bx, and Sy is a positive integer greater than 0 and less than or equal to By; select M weights from the Nfin*Nfout*Kx*Ky weights through the sliding window, and when the M weights meet the preset condition, all or part of the M weights may be set to 0, where M=Bfin*Bfout*Bx*By; and perform coarse-grained pruning on the weights of the LSTM layer, where the size of the sliding window is Bin_i*Bout_i, Bin_i is a positive integer greater than 0 and less than or equal to Nin_i, and Bout_i is a positive integer greater than 0 and less than or equal to Nout_i; make the sliding window slide Sin_i stride in the direction of Bin_i, or slide Sout_i stride in the direction of Bout_i, where Sin_i is a positive integer greater than 0 and less than or equal to Bin_i, and Sout_i is a positive integer greater than 0 and less than or equal to Bout_i; select M weights from the Bin_i*Bout_i weights through the sliding window, and when the M weights meet the preset condition, all or part of the M weights may be set to 0, where M=Bin_i*Bout_i.

The operation unit may be configured to perform training according to the pruned weight, and the weight that has been set to 0 during the training remains 0.

The instruction control unit may be configured to receive the instruction in the storage unit, and decode the instruction to obtain the control information so as to control the coarse-grained selection unit performing selection operation and the operation unit performing computation.

The coarse-grained selection unit may be configured to receive the input neuron and the position information of the target weight, select a group of weights of the neural network through the sliding window, set the selected weights to 0, and select the neurons corresponding to the target weight.

The operation unit may be configured to receive the selected input neuron and the target weight, complete the neural network operation by a multiplying and adding operation unit, obtain the output neuron, and retransmit the output neuron to the storage unit.

Further, when the storage unit stores the weight, only the target weight and the position data of the weight are stored.

Further, the coarse-grained selection unit only selects the neuron corresponding to the target weight and transmits them to the operation unit.

As shown in FIG. 10, the processing device may further include the pre-processing unit, which pre-processes the original data, and the pre-processing may include data segmentation, Gaussian filter, binarization, regularization, normalization, and the like.

The processing device may further include a DMA unit.

Further, the processing device may further include an instruction caching unit, an input neuron caching unit, a target weight caching unit, a target weight position caching unit, and an output neuron caching unit.

The storage unit may be mainly configured to store the neuron, the weight and the instruction of the neural network, when the storage unit stores the weight, only the target weight and the position data of the weight are stored.

The DMA unit may be configured to read/write data or instruction between the storage unit and the instruction caching unit, the target weight caching unit, the target weight position caching unit, the input neuron caching unit, and the output neuron caching unit.

The instruction caching unit may be configured to store a dedicated instruction.

The target weight caching unit may be configured to cache the target weight.

The target weight position caching unit may be configured to cache the position information of the target weight, and map each connection weight in the input data to the corresponding input neuron one-to-one.

In one case, a one-to-one cache method adopted by the target weight position caching unit may be: 1 indicating that the input neuron is connected to the output neuron by the weight, 0 indicating that the input neuron is not connected to the output neuron by the weight, the connection status of all the input neurons and output neuron of each group forming a string of 0 and 1 to indicate the connection relationship of the output neuron. In another case, the one-to-one cache method adopting by the target weight position caching unit may be: 1 indicating that the input neuron is connected to the output neuron by the weight, 0 indicating that the input neuron is not connected to the output neuron by the weight, the connection status of all the out neurons and input neuron of each group forming a string of 0 and 1 to indicate the connection relationship of the input neuron. In another case, the one-to-one cache method adopted by the target weight position caching unit may be: combining a distance from the input neuron where a first connection is located in a first group to a first input neuron, a distance from the input neuron where a second connection is located to a previous connection in the input neuron, a distance from the input neuron where a third connection is located to the previous connection in the input neuron, . . . , and so on, until all the input of the output are exhausted, where the connection array is used to represent the corresponding connection status of the output neuron.

The input neuron caching unit may be configured to cache the input neuron input to the coarse-grained selection unit.

The output neuron caching unit may be configured to cache the output neuron output by the operation unit.

The operation unit may be configured to perform corresponding operations on the data according to the instruction stored in the storage unit.

The operation unit may include but not be limited to three parts: a first part is a multiplier, a second part is an adder tree, and a third part is an activation function unit. The first part may multiply first input data (in1) and second input data (in2) to get first output data (out1), where the process is: out=in1*in2. The second part may add third input data in3 through the adder tree to obtain second output data (out2), where in3 is a vector of length N, N is greater than 1, the process is: out2=in3[1]+In3[2]+ . . . +in3[N], and/or add the third input data (in3) by the adder tree and add fourth input data (in4) to obtain the second output data (out2), where the process is: out=in3[1]+in3[2]+ . . . +in3[N]+in4, or add the third input data (in3) and the fourth input data (in4) to obtain the second output data (out2), where the process is: out2=in3+in4. The third part may perform the activation function on fifth input data (in5) to obtain active output data (out), where the process is out3=active(in5), and the activation function may include sigmoid, tan h, relu, softmax, and the like; in addition to the active operation, the third part may further implement other non-linear functions, for example, the third part may perform an operation (f) on input data (in) to obtain the output data (out), where the process is: out=f(in).

Further, the operation unit may include a pooling unit, and the pooling unit obtains the output data (out) after performing a pooling operation on the input data (in), and the process is: out=pool(in), where pool represents the pooling operation, and the pooling operation may include but not be limited to: mean pooling, maximum pooling, or median pooling. The input data in is the data in a pooling core associated with the output data(out).

The operations performed by the operation unit may include the following parts: the first part multiplies first input data and second input data to obtain a product; the second part performs an adder tree operation, that is, the second part adds third input data through an adder tree step by step, or adds the third input data to fourth input data to obtain a sum; the third part performs an activation function on fifth data to obtain output data. The above several parts of the operations can be freely combined, so as to achieve a variety of different functions of the operations.

It should be noted that the pre-processing unit, the storage unit, the DMA unit, the coarse-grained pruning unit, the instruction caching unit, the instruction control unit, the target weight position caching unit, the input neuron caching unit, the output neuron caching unit, the coarse-grained selection unit and the operation unit are all physical hardware devices, not functional software units.

The processing method of the present disclosure will be specifically described by exemplifying the embodiments of a neural network processor in the following, but it should be understood that it is not intended to limit the present disclosure. The equivalent structure or equivalent process transformations made by the specific embodiments, or directly or indirectly applied in other related technical fields, are equally included in the scope of protection of the present disclosure.

FIG. 11 is a schematic diagram of a specific embodiment of a processing method according to an embodiment of the disclosure. FIG. 11 shows the result of a fully connected layer of a neural network after coarse-grained pruned. The fully connected layer has a total of 8 input neurons n1~n8 and 3 output neurons o1~o3, where the weights between the 4 input neurons n3, n4, n7, n8 and the 3 output neurons of o1, o2, o3 are set to 0 by coarse-grained sparsification; n1 is connected with o1, o2 and o3 by 3 weights of s11, s12 and s13; n2 is connected with o1, o2, o3 by 3 weights of s21, s22, s23; n5 is connected with o1, o2, o3 by 3 weights of s31, s32, s33; n6 is connected with o1, o2, o3 by 3 weights of s41, s42, s43. The bit string of 11001100 may be used to represent the connection status between the input neuron and the output neuron, that is, the first case of indicating the position information of the target weight, 1 represents that the input neuron is connected with the three output neurons, and 0 represents that the input neuron is not connected with any one of the three output neurons. Table 1 describes the information of neurons and weights in the embodiment, and Formula 1 describes an operation formula of the three output neurons of o1, o2, and o3. It can be seen from Formula 1 that o1, o2, and o3 will receive the same neuron for operation.

Fine-grained pruning refers to taking each weight as an independent object, if a weight meets a preset condition, it will be pruned; coarse-grained pruning refers to grouping the weights in a certain way, where each group includes a plurality of weights, if a group of weights meets a preset condition, the group of weights will be completely pruned.

TABLE 2

| Input Neuron | Output Neuron | | | Position of A Target Weight |
|---|---|---|---|---|
| | o1 | o2 | o3 | |
| n1 | s11 | s21 | s31 | 1 |
| n2 | s12 | s22 | s32 | 1 |
| n3 | 0 | 0 | 0 | 0 |
| n4 | 0 | 0 | 0 | 0 |
| n5 | s13 | s23 | s33 | 1 |
| n6 | s14 | s24 | s34 | 1 |
| n7 | 0 | 0 | 0 | 0 |
| n8 | 0 | 0 | 0 | 0 |

Formula 1—operation formula of the output neuron:

$$o1=n1*s11+n2*s12+n5*s13+n6*s14$$

$$o2=n1*s21+n2*s22+n5*s23+n6*s24$$

$$o3=n1*s31+n7*s32+n5*s33+n6*s34$$

The processing device may transmit the position information of the 8 input neurons, 12 weights, 8 bits, and corresponding instructions to the storage unit. The coarse-grained selection unit may receive the position of the 8 input neurons and the target weight, and may select 4 neurons of n1, n2, n5, n6 that need to participate in the operation. The operation unit may receive the 4 selected neurons and weights, complete the operation of the output neuron by Formula 1, and then transmit the output neuron back to the storage unit.

In some embodiments of the present disclosure, a processing device is provided, which may include a memory storing executable instructions, a processor configured to perform the executable instructions in the storage unit in accordance with the processing method.

The processor may be a single processing unit, but may also include two or more processing units. In addition, the processor may also include a General Processing Unit (CPU) or a Graphic Processing Unit (GPU); it may also include a Field Programmable Gate Array (FPGA) or a Disclosure Specific Integrated Circuit (ASIC) to set and operate the neural network. The processor may also include an on-chip memory for caching (i.e., memory in the processing device).

In some embodiments, the present disclosure provides a chip, which may include the processing device.

In some embodiments, the present disclosure provides a chip package structure, which may include the chip.

In some embodiments, the present disclosure provides a board card, which may include the chip package structure.

In some embodiments, the present disclosure provides an electronic device, which may include the board card.

The electronic device may include a data processing device, a robot, a computer, a printer, a scanner, a tablet computer, an intelligent terminal, a mobile phone, an automobile data recorder, a navigator, a sensor, a webcam, a cloud server, a camera, a video camera, a projector, a watch, an earphone, a mobile storage, wearable equipment, a vehicle, a household electrical appliance and/or medical equipment.

The vehicles may include an airplane, a ship and/or a car. The household electrical appliance includes a television, an air conditioner, a microwave oven, a refrigerator, an electric rice cooker, a humidifier, a washing machine, an electric lamp, a gas cooker and a range hood. The medical equipment includes a nuclear magnetic resonance spectrometer, a B-ultrasonic scanner and/or an electrocardiograph.

In the prior art, quantization is performed only with a layer of a neural network as a unit. In order to improve the prior art, the present disclosure provides a data quantization method, which includes: grouping weights of the neural network by adopting a grouping method and a clustering operation, dividing the weights of each group into m classes, and computing a center weight of each class, where all the weights in each group are replaced by the center weight of the corresponding group, and encoding the center weights to obtain a weight codebook and a weight dictionary.

In the present disclosure, the neural network may be retrained, where only the weight codebook needs to be retrained, the weight dictionary remains unchanged, which reduces the workload. The quantized weight obtained by the data quantization method may be applied to the processing device provided by the present disclosure, and a lookup table unit is added, therefore, the quantized weight may be obtained just by looking up the weight dictionary and the weight codebook according to a search and control instruction, while it is not necessary to input the weight, which makes the operation more systematized. By fully exploiting a distribution characteristic of the weight of the neural network, a low bit quantized weight is obtained, which greatly improves the processing speed and reduces the weight storage overhead and the memory access overhead.

Some embodiments of the present disclosure will be described more comprehensively with reference to the description of the accompanied drawings later, where some but not all embodiments will be shown. In fact, the embodiments of this disclosure may be implemented in many different forms, the described embodiments are merely some rather than all embodiments of the present disclosure. The provision of these embodiments enables the disclosure to meet applicable legal requirements.

In the present specification, the following embodiments for describing the principle of the present disclosure are merely illustrative and should not be construed in any way as limiting the scope of the disclosure. The following description with reference to the accompanied drawings is provided to assist in a comprehensive understanding of the exemplary embodiments of the present disclosure as defined by the claims and the equivalents of the claims. The following description includes various specific details to facilitate the understanding, but these details should be regarded as merely exemplary. Therefore, those of ordinary skill in the art should realize that various changes and modifications of the embodiments described herein can be made without departing from the scope and spirit of the present disclosure.

In addition, descriptions of well-known functions and structures are omitted for clarity and conciseness. Moreover, same reference numerals are used for similar functions and operations throughout the drawings. In the present disclosure, the terms "include" and "contain" and derivatives thereof are intended to be inclusive but not limiting.

In order to make the object, technical solution and advantages of the present disclosure more apparent, the present disclosure will be further described in detail below with reference to the drawings in conjunction with specific embodiments thereof.

Figure 19:
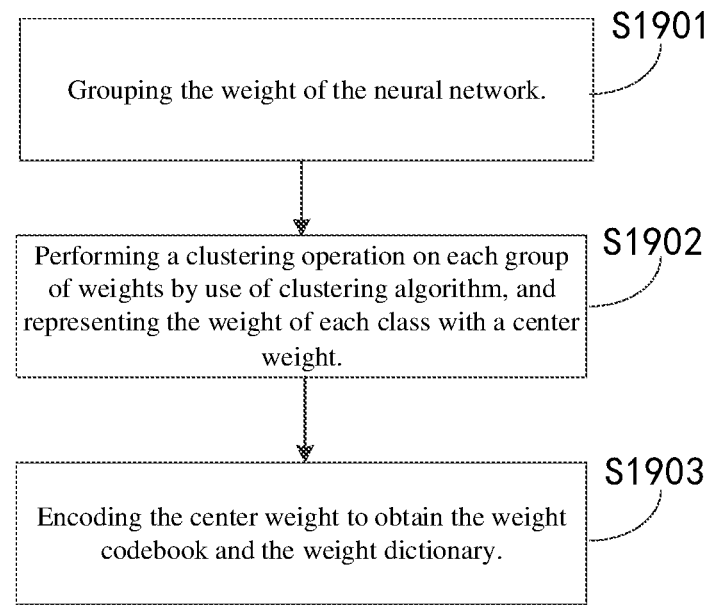
FIG. 19 is a flowchart of a data quantization method according to an embodiment of the disclosure.

An aspect of the present disclosure provides a data quantization method. FIG. 19 is a flowchart of a data quantization method according to an embodiment of the disclosure. As shown in FIG. 19, the method may include the following steps.

In S1901 step, grouping a weight of a neural network, where the grouping methods may include grouping into a group, layer-type-based grouping, inter-layer-based grouping, intra-layer-based grouping, mixed grouping, and the like.

In S1902 step, performing the clustering operation on each group of weights by using a clustering algorithm, and representing the weight of each class with a center weight, specifically, grouping the weights of each group into m classes, computing the center weight of each class, and replacing all the weights of each class by the center weight corresponding to the class.

The clustering algorithm may include but not be limited to K-means, K-medoids, Clara, and Clarans.

Further, a center weight selection method of a class is: minimizing the cost function $J(w,w_0)$.

Furthermore, the cost function is:

$$J(w, w_0) = \sum_{i=1}^{n} (w_i - w_0)^2$$

where w is the weight of a class, w0 is the center weight of the class, n is a count of weights in the class, n is a positive integer, wi is the $i^{th}$ weight of the class, i is a positive integer, and $1 \le i = n$.

In step S1903, encoding the center weight to obtain the weight codebook and the weight dictionary.

The data quantization may further achieve retraining on the neural network, where only the weight codebook needs to be retrained, the weight dictionary remains unchanged. Specifically, a back-propagation algorithm may be adopted to retrain the neural network.

Figure 20:
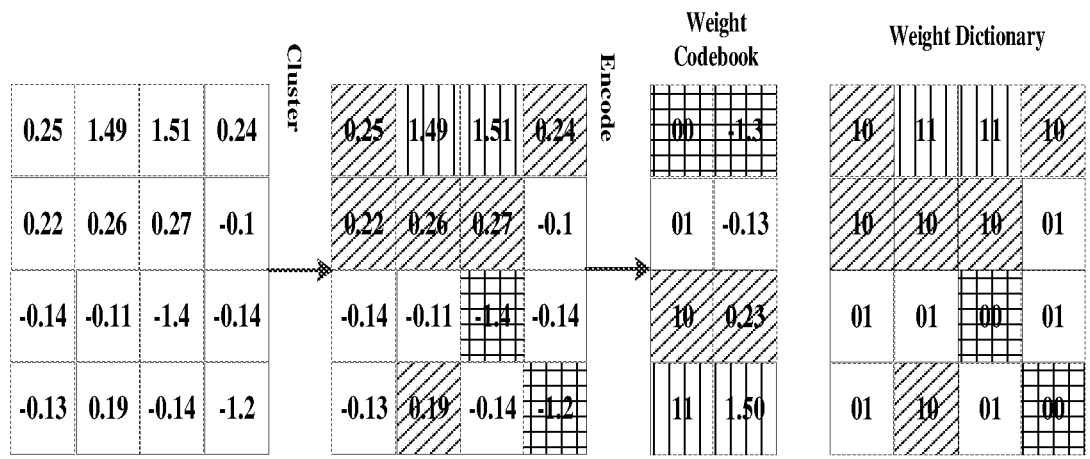
FIG. 20 is a flowchart of quantizing data according to an embodiment of the disclosure.

FIG. 20 is a flowchart of quantizing data according to an embodiment of the disclosure. As shown in FIG. 20, the weights of the neural network are grouped to obtain an ordered matrix of weights. Then, the intra-group sampling and the clustering operation are performed on the grouped weight matrix, so that the weights with similar values are classified into the same class, and the four center weights of 1.50, −0.13, −1.3, and 0.23 are obtained, where the four center weights are corresponding to the weights of four classes. Next, the center weight is encoded, where the class with a center weight of −1.3 is encoded as 00, the class with a center weight of −0.13 is encoded as 01, the class with a center weight of 0.23 is encoded as 10, and the class with a weight of 1.50 is encoded as 11, and 00, 01, 10, 11 are the content of the weight codebook. In addition, the encoding contents (00, 01, 10 and 11) corresponding to the four center weight respectively represent the weights in the corresponding classes, so as to obtain the weight dictionary.

The quantization process fully exploits the similarity of the inter-layer-based weights and the local similarity of the intra-layer-based weights of the neural network, and obtains the weight distribution characteristics of the neural network to perform low-bit quantization, which may reduce a count of bits representing each weight, and reducing the weight storage overhead and the memory access overhead.

Next, embodiments are given to illustrate the data quantization method of the neural network.

Embodiment 1: all the weights of the neural network may be grouped into one group, K-means clustering algorithm may be adopted to cluster each group of weights, a center weight of each class may be computed, and all the weights of each class may be replaced by the center weights. Then, the weight dictionary and the weight codebook are generated according to the quantized weights, and the neural network is retrained. In the retraining process, only the weight codebook is trained, while the weight dictionary remains unchanged. Specifically, the back propagation algorithm may be adopted for retraining.

Embodiment 2: the weights of the neural network are grouped according to layer-type-based. For example, the neural network may include a fully connected layer, a convolutional layer, and/or a LSTM layer. The weights in the convolutional layers are grouped into one group, the weights in the fully connected layers are grouped into one group, and the weights in the LSTM layers are grouped into one group.

If a neural network has a total of t different types of layers such as i convolutional layers, j fully connected layers, and m LSTM layers, where i, j, m are integers greater than or equal to 0 and satisfy i+j+m>=1, t is an integer greater than or equal to 1 and satisfies t=i+j+m, and the weight of the neural network will be divided into t groups. The K-medoids clustering algorithm may be adopted to cluster each group of weights of the t groups, and the center weight of each class may be computed, all the weights of each class may be replaced by the center weight corresponding to the class. Then, the weight dictionary and the weight codebook are generated according to the quantized weights, and the neural network is retrained. In the retraining process, only the weight codebook is trained, while the weight dictionary remains unchanged. Specifically, the back propagation algorithm may be adopted for retraining.

Embodiment 3: the weights of the neural network are grouped according to inter-layer-based structure.

Specifically, the one or more successive convolutional layers are grouped into one group, the one or more successive fully connected layers are grouped into one group, and the one or more successive LSTM layers are grouped into one group. The Clara clustering algorithm may be adopted to cluster each group of weights, where the weights with similar values may be grouped into the same class, and the center weight of each class may be computed, all the weights of each class may be replaced by the center weight corresponding to the class. Then, the weight dictionary and the weight codebook are generated according to the quantized weights, and the neural network is retrained. In the retraining process, only the weight codebook is trained, while the weight dictionary remains unchanged. Specifically, the back propagation algorithm may be adopted for retraining.

Embodiment 4: the weights of the neural network are grouped according to intra-layer-based structure.

Specifically, the convolutional layers of the neural network may be regarded as a four-dimensional matrix (Nfin, Nfout, Kx, Ky), where Nfin, Nfout, Kx, Ky are positive integers, Nfin represents a count of input feature maps, and Nfout represents a count of output feature maps, (Kx, Ky) represents the size of the convolution kernel. The weights of the convolutional layers are grouped into Nfin*Nfout*Kx*Ky/(Bfin*Bfout*Bx*By) different groups according to the group size of (Bfin, Bfout, Bx, By), where Bfin is an integer less than or equal to Nfin, Bfout is an integer less than or equal to Nfout, Bx is an integer less than or equal to Kx, and By is an integer less than or equal to Ky.

The weights in the fully connected layers of the neural network are regarded as a two-dimensional matrix (Nin, Nout), where Nin, Nout are positive integers, Nin represents a count of input neurons, Nout represents a count of output neurons, and a count of weight is Nin*Nout. The weights of fully connected layer are grouped into (Nin*Nout)/(Bin*Bout) different groups according to the group size of (Bin, Bout), where Bin is an integer less than or equal to Nin, and Bout is an integer less than or equal to Nout.

The weights in the LSTM layers of the neural network are regarded as a combination of the weights of a plurality of fully connected layers, where the weights of the LSTM layer are composed of the weights of n fully connected layers, n is a positive integer, therefore each fully connected layer can be grouped according to the grouping mode of the fully connected layer.

The Clarans clustering algorithm may be adopted to cluster each group of weights, and the center weight of each class may be computed, all the weights of each class may be replaced by the center weight corresponding to the class. Then, the weight dictionary and the weight codebook are generated according to the quantized weights, and the neural network is retrained. In the retraining process, only the weight codebook is trained, while the weight dictionary remains unchanged. Specifically, the back propagation algorithm may be adopted for retraining.

Embodiment 5: the weights of the neural network are grouped in a mixed manner. For example, all the convolutional layers are grouped into one group, all the fully connected layers are grouped according to inter-layer-based structure, and all the LSTM layers are grouped according to intra-layer-based structure. The Clarans clustering algorithm may be adopted to cluster each group of weights, and the center weight of each class may be computed, all the weights of each class may be replaced by the center weight corresponding to the class. Then, the weight dictionary and the weight codebook are generated according to the quantized weights, and the neural network is retrained. In the retraining process, only the weight codebook is trained, while the weight dictionary remains unchanged. Specifically, the back propagation algorithm may be adopted for retraining.

Figure 21:
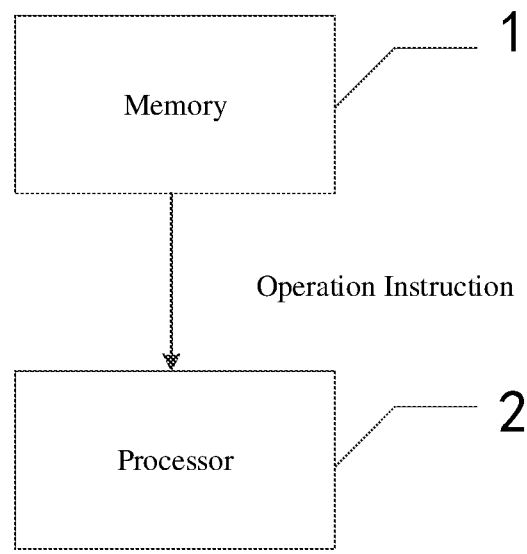
FIG. 21 is a schematic structure diagram of a data quantization device according to an embodiment of the disclosure.

Another aspect of the present disclosure provides a data quantization device. FIG. 21 is a schematic structure diagram of a data quantization device according to an embodiment of the disclosure. As shown in FIG. 21, the data quantization device may include:

a memory 1 configured to store an operation instruction, where the operation instruction is a binary number composed of an operation code and an address code, the operation code indicates an operation to be performed by a processor 2, and the address code indicates the address of the memory 1 where the processor 2 reads data participating in the operation;

a processor 2 configured to execute an operation instruction in the memory 1 in accordance with the data quantization method.

By executing the operation instruction in the memory 1 in accordance with the data quantization method, the processor 2 may quantize the disordered weights to obtain low bit and normalized quantized weight. The data quantization device of the present disclosure may fully exploit the similarity of the inter-layer-based weights and the local similarity of the intra-layer-based weights of the neural network, and obtain the weight distribution characteristics of the neural network to perform low-bit quantization, which may reduce a count of bits representing each weight, and reducing the weight storage overhead and the memory access overhead.

Figure 22:
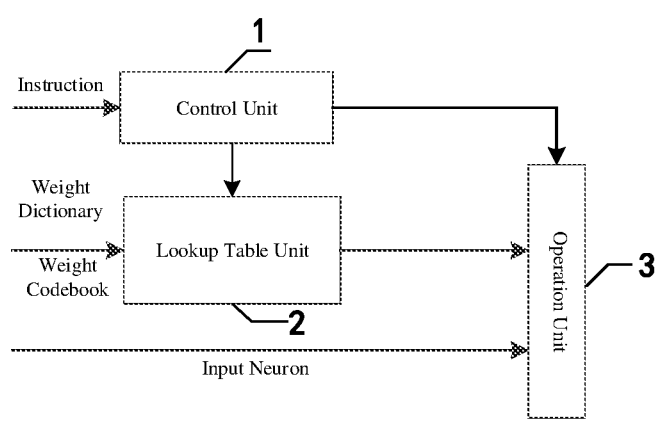
FIG. 22 is a schematic structure diagram of a processing device according to an embodiment of the disclosure.

Another aspect of the present disclosure provides a processing device. FIG. 22 is a schematic structure diagram of a processing device according to an embodiment of the disclosure. As shown in FIG. 22, the processing device may include a control unit 1, a lookup table unit 2, and an operation device 3.

The control unit 1 may be configured to receive an instruction and decode the instruction to generate search and control information and operation control information, where the instruction may be a neural network dedicated instruction including all instructions dedicated to completing artificial neural network operations. The dedicated instruction may include but not be limited to a control instruction, a data transfer instruction, an operation instruction, and a logical instruction, where the control instruction may be configured to control the neural network execution process.

The data transfer instruction may be configured to transfer data between different storage media, and the data format may include but not be limited to matrix, vector, and scalar.

The operation instruction may be configured to perform a neural network arithmetic operation, and the operation instruction may include but not be limited to a matrix operation instruction, a vector operation instruction, a scalar operation instruction, a convolutional neural network operation instruction, a fully connected neural network operation instruction, a pooling neural network operation instruction, an RBM neural network operation instruction, an LRN neural network operation instruction, an LCN neural network operation instruction, an LSTM neural network operation instruction, an RNN operation instruction, an ReLU neural network operation instruction, a PReLU neural network operation instruction, a SIGMOID neural network operation instruction, a TAN H neural network operation instruction, and a MAXOUT neural network operation instruction.

The logical instruction may be configured to perform a logical operation of the neural network, and the logical instruction may include but not be limited to a vector logical operation instruction and a scalar logical operation instruction.

Where, the RBM neural network operation instruction may be configured to implement an RBM neural network operation.

The LRN neural network operation instruction may be configured to implement an LRN neural network operation.

The LCN neural network operation instruction may be configured to implement an LCN neural network operation.

The LSTM neural network operation instruction may be configured to implement an LSTM neural network operation.

The RNN neural network operation instruction may be configured to implement an RNN neural network operation.

The RELU neural network operation instruction may be configured to implement an RELU neural network operation.

The PRELU neural network operation instruction may be configured to implement a PRELU neural network operation.

The SIGMOID neural network operation instruction may be configured to implement a SIGMOID neural network operation.

The TAN H neural network operation instruction may be configured to implement a TAN H neural network operation.

The MAXOUT neural network operation instruction may be configured to implement a MAXOUT neural network operation.

Furthermore, the neural network dedicated instruction may include a Cambricon instruction set.

The Cambricon instruction set may include at least one kind of Cambricon instruction, and the length of the Cambricon instruction may be 64 bits, or may be changed according to actual needs. The Cambricon instruction may be composed of an operation code and an operand. The Cambricon instruction may include four types of instructions: a Cambricon control instruction, a Cambricon data transfer instruction, a Cambricon operation instruction, and a Cambricon logical instruction.

The Cambricon control instruction may be configured to control the execution process, and the Cambricon control instruction may include a jump instruction and a conditional branch instruction.

The Cambricon data transfer instruction may be configured to transfer data between different storage media, and the Cambricon data transfer instruction may include a loading instruction, a storage instruction, and a moving instruction; where the loading instruction may be configured to load data from a main memory to a cache; the storage instruction may be configured to store data from the cache to the main memory; and the moving instruction may be configured to move data from the cache to another cache or from the cache to a register or from the register to another register. The data transfer instruction may support three different ways of organizing data including matrix, vector, and scalar.

The Cambricon operation instruction may be configured to perform a neural network arithmetic operation, and the Cambricon operation instruction may include a Cambricon matrix operation instruction, a Cambricon vector operation instruction, and a Cambricon scalar operation instruction.

The Cambricon matrix operation instruction may be configured to complete a matrix operation in the neural network, and the Cambricon matrix operation may include a matrix-vector multiplication operation, a vector multiply matrix operation, a matrix multiply scalar operation, an outer product operation, a matrix-add-matrix operation, and a matrix-subtract-matrix operation.

The Cambricon vector operation instruction may be configured to complete a vector operation in the neural network, and the Cambricon vector operation may include a vector elementary operation, a vector transcendental function operation, a dot product operation, a random vector generation operation, and an operation of maximum/minimum of a vector. The vector elementary operation may include addition, subtraction, multiplication, and division; the vector transcendental function may refer to a function which does not meet any polynomial equation taking polynomials as coefficients, and the function may include but not be limited to an exponential function, a logarithmic function, a trigonometric function, and an anti-trigonometric function.

The Cambricon scalar operation instruction may be configured to complete a scalar operation in the neural network, and the Cambricon scalar operation may include a scalar elementary operation and a scalar transcendental function. The scalar elementary operation may include addition, subtraction, multiplication, and division; the scalar transcendental function may refer to a function which does not meet any polynomial equation taking polynomials as coefficients, and the function may include but not be limited to an exponential function, a logarithmic function, a trigonometric function, and an anti-trigonometric function.

The Cambricon logical instruction may be configured for the logical operation of the neural network, and the Cambricon logical instruction may include a Cambricon vector logical operation instruction and a Cambricon scalar logical operation instruction.

The Cambricon vector logical operation instruction may include vector comparing, and vector logical operation. The vector comparing may include but not be limited to greater than, smaller than, equal to, greater than or equal to (≥), less than or equal to (≤), and unequal to. The vector logical operation may include AND, OR, and NOT.

The Cambricon scalar logical operation instruction may include a scalar comparing operation instruction and a scalar logical operation instruction. The scalar comparing operation may include but not be limited to greater than, smaller than, equal to, greater than or equal to (≥), less than or equal to (≤), and unequal to. The scalar logical operation may include AND, OR, and NOT.

A lookup table unit 2 may be configured to receive the search and control information, a weight dictionary and a weight codebook, and perform a table lookup operation on the weight dictionary and the weight codebook to obtain a quantized weight according to the search and control information An operation unit 3 may be configured to receive the operation control information and input neuron, and perform an operation on the quantized weight and input neuron according to the operation control information to obtain an output neuron and output the output neuron.

The operation unit 3 may include four operation parts:
a first operation part configured to multiply the quantized weight and the input neuron;
a second part configured to add the quantized weight and the input neuron through one or a plurality of adders (further, the plurality of adders may constitute an adder tree to implement the operation function of the different levels of the adder tree);
a third part configured to perform a nonlinear function operation on the quantized weight and the input neuron;
a fourth part configured to perform a pooling operation on the quantized weight and the input neuron.

By adopting a dedicated SIMD instruction and a customized operation unit 3 for a multi-layer artificial neural network operation aiming at local quantization, the problem that the CPU (Central Processing Unit) and GPU (General Processing Unit) have inadequate operational performance and the front-end decoding overhead is high may be solved, and the support for a multi-layer artificial neural network operation algorithm may be effectively improved.

Figure 23:
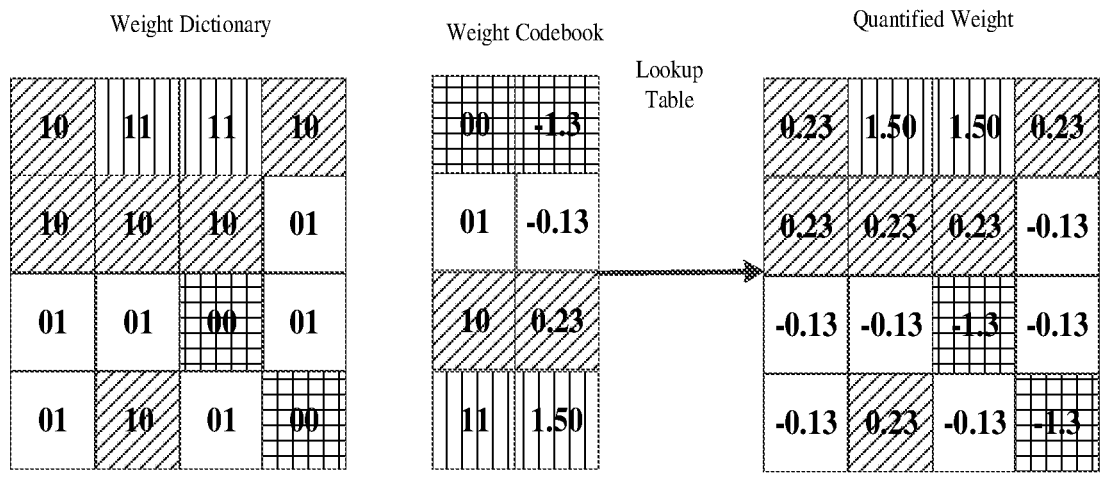
FIG. 23 is a flowchart of a table lookup operation according to an embodiment of the disclosure.

FIG. 23 is a flowchart of a table lookup operation according to an embodiment of the disclosure. As shown in FIG. 23, the quantized weights are grouped into four classes according to the weight codebook, where the class with a center weight of −1.30 is encoded as 00, the class with a center weight of −0.13 is encoded as 01, the class with a center weight of 0.23 is encoded as 10, and the class with a weight of 1.50 is encoded as 11. At the same time, referring to the weight dictionary, the distribution of the weights in the same class may be obtained, and the quantized weights may be obtained by replacing the corresponding codes in the weight dictionary with the center weights of each class.

The above operation fully exploits the similarity of the inter-layer-based weights and the local similarity of the intra-layer-based weights of the neural network, and table lookup operation is performed by using the weight dictionary and the weight codebook obtained during quantization to restore the quantized weight, which has good operability and standardization.

In order to optimize the processing device of the present disclosure, a storage unit 4, a pre-processing unit 5, and a caching unit 7 are added to make the processing data more orderly and facilitate the processing operations of the processing device.

Figure 24:
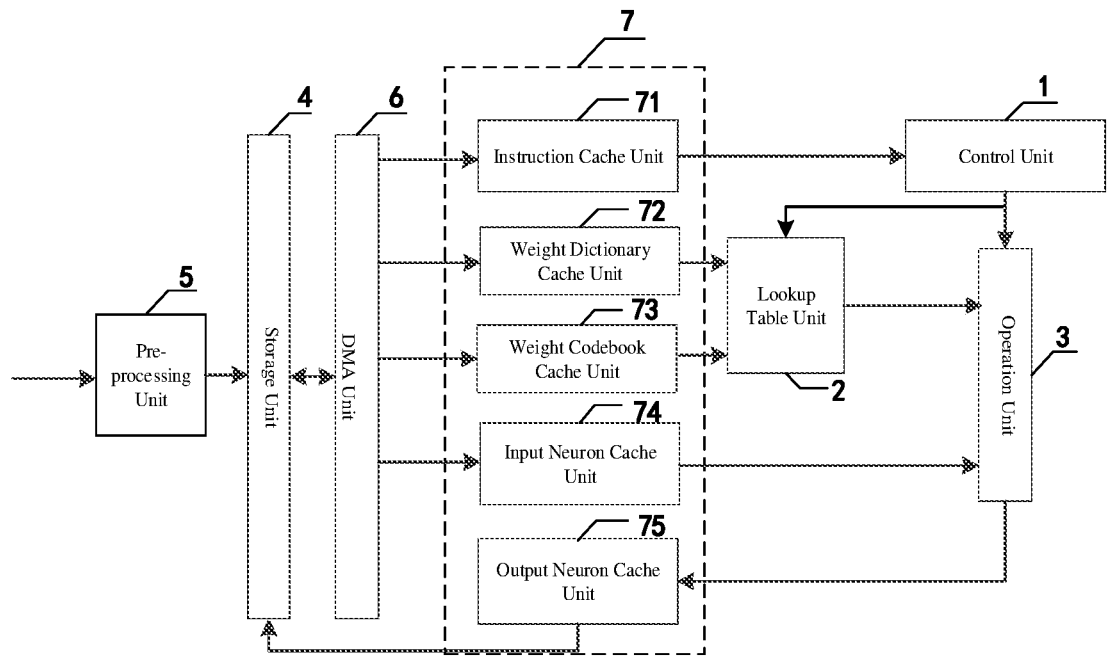
FIG. 24 is a schematic structure diagram of a specific embodiment of a processing device according to an embodiment of the disclosure.

FIG. 24 is a schematic structure diagram of a specific embodiment of a processing device according to an embodiment of the disclosure. As shown in FIG. 24, the processing device may further include a storage unit 4, a pre-processing unit 5, a DMA unit 6, and a caching unit 7 on the basis of the original structure shown in FIG. 24

The storage unit 4 may be configured to store an external input neuron, a weight dictionary, a weight codebook, and an instruction, and an output neuron output by the operation unit 3.

The storage unit 4 may further store an unquantized weight, which is directly output to the operation unit 3 through a bypass. It can be seen that the processing device of the present disclosure can process not only the quantized weight but also the unquantized weight according to different actual needs.

The pre-processing unit 5 may be configured to pre-process the external input information to obtain the input neuron, the weight dictionary, the weight codebook, and the instruction. The pre-processing may include segmentation, Gaussian filter, binarization, regularization, and/or normalization.

The caching unit 7 may include:
an instruction caching unit 71 configured to cache the instruction;
a weight dictionary caching unit 72 configured to cache the weight dictionary;
a weight codebook caching unit 73 configured to cache the weight codebook;
an input neuron caching unit 74 configured to cache the input neuron;
an output neuron caching unit 75 configured to cache the output neuron.

After the external input data is pre-processed by the pre-processing unit 5, the input neuron, the weight dictionary, the codebook, and the instruction are obtained and output to the storage unit 4. The DMA unit 6 may directly read the input neuron, the weight dictionary, the weight codebook, and the instruction from the storage unit 4, output the instruction to the instruction caching unit 71, output the weight dictionary to the weight dictionary caching unit 72, output the weight codebook to the weight codebook caching unit 73, and output the input neuron to the input neuron caching unit 74 for caching.

The control unit 1 may decode the received instructions to obtain and output a table lookup control information and an operation control information. The lookup table unit 2 may perform a table lookup operation on the weight dictionary and the weight codebook based on the received table lookup control information, obtain the quantized weight, and output the quantized weight to the operation unit 3. The operation unit 3 may select the operation part and the order of each operation part according to the received operation control information, and perform an operation on the quantized weight and the input neuron to obtain an output neuron and output it to the output neuron caching unit 75. Finally, the output neuron caching unit 75 may output the output neuron to the storage unit 4.

The operation of the first operation part is: multiplying first input data (in1) and second input data (in2) to get first output data (out1), where the process is: out=in1*in2.

The second operation part may be composed of one or a plurality of adders to achieve an addition operation. Further, the plurality of adders may constitute an adder tree to implement the operation function of the different levels of the adder tree. The second part may add first input data in1 step by step through the adder tree to obtain output data (out1), where in1 is a vector of length N, N is greater than 1, the process is: out1=in1[1]+in1[2]+ . . . +in1[N]; or add the first input data in1 step by step through the adder tree to obtain output data (out1), where in1 is a vector of length N, N is greater than 1, and then add the out1 and an second input data in2 to obtain output data out2, the process is: out2=in1[1]+in1[2]+ . . . +in1[N]+in2; or add the input data in1 and the input data in2 to obtain output data out3, where both in1 and in2 are numerical values, the process is out3=in1+in2.

The third operation part may perform a non-linear function (f) on the input data (in) to obtain different function operations, thereby obtaining the output data (out), and the process is: out=f(in). The non-linear function may include an activation function, and the process is out=active(in). The activation function may include but not be limited to sigmoid, tan h, relu, and/or softmax.

The fourth operation part may perform the pooling operation on the input data (in) to obtain the output data (out), and the process is out=pool(in), where pool represents the pooling operation. The pooling operation may include but not be limited to: mean pooling, maximum pooling, or median pooling. The input data in is the data in a pooling core associated with the output data(out).

One or more operation parts may be freely selected in different orders to achieve the operations with various functions. The operation unit 3 of the present disclosure may include but not be limited to the four operation parts, and may further include logical operations such as XOR, XNOR, OR and so on. The operation control information may control one or more operation parts in different combination orders to achieve the operations with various functions.

Figure 25:
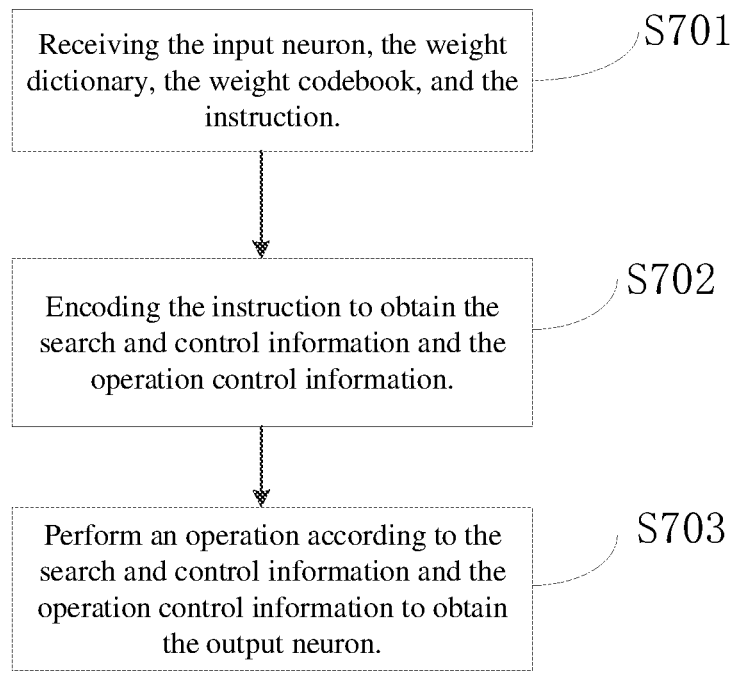
FIG. 25 is a flowchart of a processing method according to an embodiment of the disclosure.

Another aspect of the present disclosure provides a processing method. FIG. 25 is a flowchart of a processing method according to an embodiment of the disclosure. As shown in FIG. 25, the processing method may include the following steps.

In step S701, receiving the input neuron, the weight dictionary, the weight codebook, and the instruction; where the input neuron, the weight dictionary, the weight codebook, and the instruction may be the obtained information after pre-processing the external information, and the pre-processing may include but not be limited to segmentation, Gaussian filter, binarization, regularization, normalization, and the like.

In step S702, encoding the instruction to obtain the lookup control information and operation control information; where the instruction may be a neural network dedicated instruction including all instructions dedicated to completing artificial neural network operations.

The dedicated instruction may include but not be limited to a control instruction, a data transfer instruction, an operation instruction, and a logical instruction, where the control instruction may be configured to control the neural network execution process.

The data transfer instruction may be configured to transfer data between different storage media, and the data format may include but not be limited to matrix, vector and scalar.

The operation instruction may be configured to perform a neural network arithmetic operation, and the operation instruction may include but not be limited to a matrix operation instruction, a vector operation instruction, a scalar operation instruction, a convolutional neural network operation instruction, a fully connected neural network operation instruction, a pooling neural network operation instruction, an RBM neural network operation instruction, an LRN neural network operation instruction, an LCN neural network operation instruction, an LSTM neural network operation instruction, an RNN operation instruction, an ReLU neural network operation instruction, a PReLU neural network operation instruction, a SIGMOID neural network operation instruction, a TAN H neural network operation instruction, and a MAXOUT neural network operation instruction.

The logical instruction may be configured to perform a logical operation of the neural network, and the logical instruction may include but not be limited to a vector logical operation instruction and a scalar logical operation instruction.

Where, the RBM neural network operation instruction may be configured to implement an RBM neural network operation.

The LRN neural network operation instruction may be configured to implement an LRN neural network operation.

The LCN neural network operation instruction may be configured to implement an LCN neural network operation.

The LSTM neural network operation instruction may be configured to implement an LSTM neural network operation.

The RNN neural network operation instruction may be configured to implement an RNN neural network operation.

The RELU neural network operation instruction may be configured to implement an RELU neural network operation.

The PRELU neural network operation instruction may be configured to implement a PRELU neural network operation.

The SIGMOID neural network operation instruction may be configured to implement a SIGMOID neural network operation.

The TAN H neural network operation instruction may be configured to implement a TAN H neural network operation.

The MAXOUT neural network operation instruction may be configured to implement a MAXOUT neural network operation.

Furthermore, the neural network dedicated instruction may include a Cambricon instruction set.

The Cambricon instruction set may include at least one kind of Cambricon instruction, and the length of the Cambricon instruction may be 64 bits. The Cambricon instruction may be composed of an operation code and an operand. The Cambricon instruction may include four types of instructions: a Cambricon control instruction, a Cambricon data transfer instruction, a Cambricon operation instruction, and a Cambricon logical instruction.

The Cambricon control instruction may be configured to control the execution process, and the Cambricon control instruction may include a jump instruction and a conditional branch instruction.

The Cambricon data transfer instruction may be configured to transfer data between different storage media, and the Cambricon data transfer instruction may include a loading instruction, a storage instruction, and a moving instruction; where the loading instruction may be configured to load data from a main memory to a cache; the storage instruction may be configured to store data from the cache to the main memory; and the moving instruction may be configured to move data from the cache to another cache or from the cache to a register or from the register to another register. The data transfer instruction may support three different ways of organizing data including matrix, vector, and scalar.

The Cambricon operation instruction may be configured to perform a neural network arithmetic operation and the Cambricon operation instruction may include a Cambricon matrix operation instruction, a Cambricon vector operation instruction, and a Cambricon scalar operation instruction; where the Cambricon matrix operation instruction may be configured to complete a matrix operation in the neural network, and the Cambricon matrix operation may include a matrix-vector multiplication operation, a vector multiply matrix operation, a matrix multiply scalar operation, an outer product operation, a matrix-add-matrix operation, and a matrix-subtract-matrix operation; the Cambricon vector operation instruction may be configured to complete a vector operation in the neural network, and the Cambricon vector operation may include a vector elementary operation, a vector transcendental function operation, a dot product operation, a random vector generation operation, and an operation of maximum/minimum of a vector. The vector elementary operation may include addition, subtraction, multiplication, and division; the vector transcendental function may refer to a function which does not meet any polynomial equation taking polynomials as coefficients, and the function may include an exponential function, a logarithmic function, a trigonometric function, and an anti-trigonometric function.

The Cambricon scalar operation instruction may be configured to complete a scalar operation in the neural network, and the Cambricon scalar operation may include a scalar elementary operation and a scalar transcendental function operation. The vector elementary operation may include addition, subtraction, multiplication, and division; the scalar transcendental function may refer to a function which does not meet any polynomial equation taking polynomials as coefficients, and the scalar transcendental function may include an exponential function, a logarithmic function, a trigonometric function, and an anti-trigonometric function.

The Cambricon logical instruction may be configured for the logical operation of the neural network, and the Cambricon logical instruction may include a Cambricon vector logical operation instruction and a Cambricon scalar logical operation instruction. The Cambricon vector logical operation instruction may include vector comparing and vector logical operation. The vector comparing may include but not be limited to greater than, smaller than, equal to, greater than or equal to ($\geq$), less than or equal to ($\leq$), and unequal to. The vector logical operation may include AND, OR, and NOT. The Cambricon scalar logical operation instruction may include a scalar comparing operation instruction and a scalar logical operation instruction. The scalar comparing operation may include but not be limited to greater than, smaller than, equal to, greater than or equal to ($\geq$), less than or equal to ($\leq$), and unequal to. The scalar logical operation may include AND, OR, and NOT.

In step S703, looking up, according to the lookup control information, the weight dictionary and the weight codebook to obtain the quantized weight; performing operation on the quantized weight and the input neuron according to the operation control information to obtain and output the output neuron.

Moreover, in order to optimize the processing method of the present disclosure to make the processing more conveniently and orderly, steps are added in some embodiments of the present disclosure.

Figure 26:
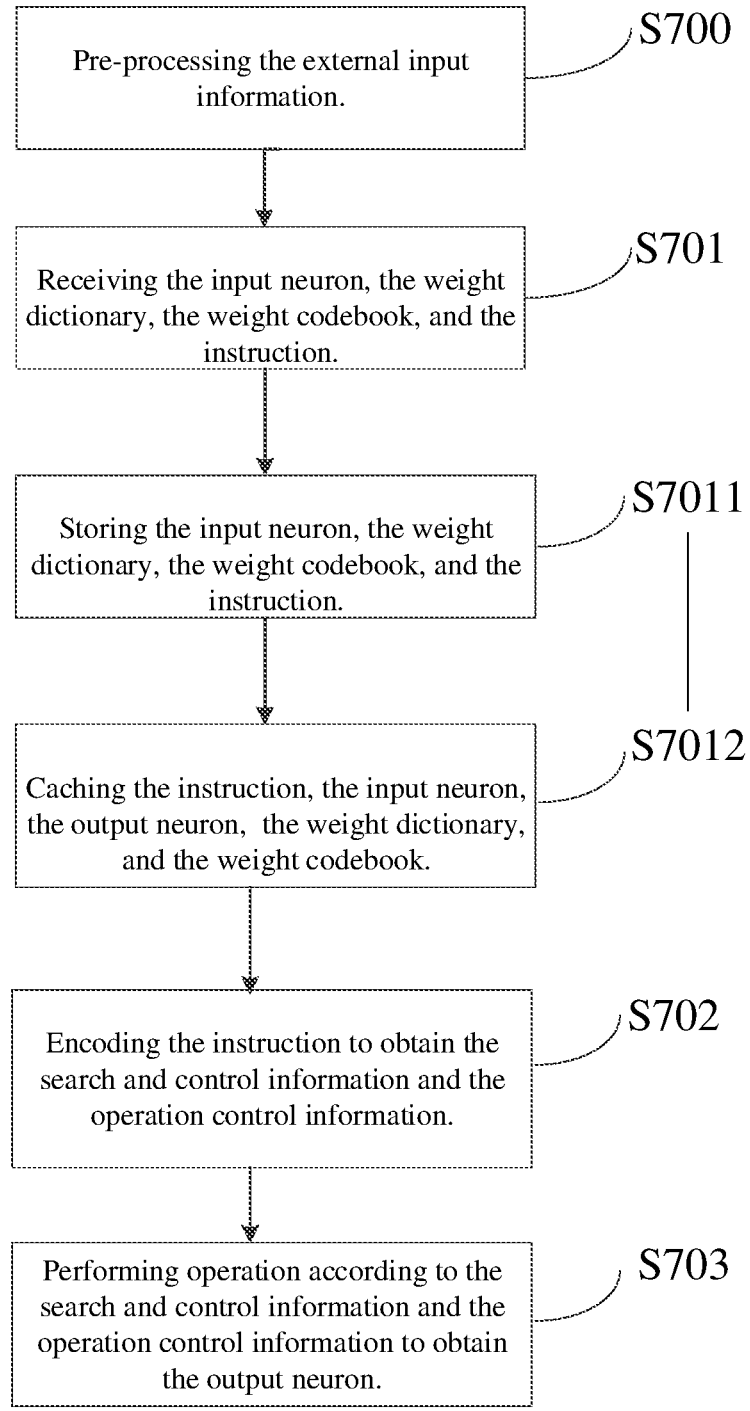
FIG. 26 is a flowchart of a specific embodiment of a processing method according to an embodiment of the disclosure.

FIG. 26 is a flowchart of a specific embodiment of a processing method according to an embodiment of the disclosure. As shown in FIG. 26, before the step S701, the processing method may further include step S700: pre-processing the external input information to obtain the input neuron, the weight dictionary, the weight codebook, and the instruction. Furthermore, the pre-processing may include data segmentation, Gaussian filter, binarization, regularization, normalization, and the like.

After the step S702, the processing method may further include:
  in S7021 step, storing the input neuron, the weight dictionary, the weight codebook, the instruction, and the output neuron;
  in step S7022, caching the input neuron, the weight dictionary, the weight codebook, the instruction, and the output neuron. The subsequent steps are the same as those shown in FIG. 26 and will not be described further here.

The operation may include: adding a weight to an input neuron, where the addition function may be implemented by one or a plurality of adders, and further, the plurality of adders may also constitute an adder tree to add the weight and input neuron step by step, and/or;
  multiplying the weight and the input neuron, and/or;
  performing the non-linear function on the weight and the input neuron, where the non-linear function may include an activation function, and activation function may include sigmoid, tan h, relu, and/or softmax, and/or;
  performing a pooling operation on the weight and the input neuron, where the weight may include the quantized weight and/or unquantized weight, and the pooling operation may include but not be limited to: mean pooling, maximum pooling, or median pooling, the input data in is the data in a pooling core associated with the output data(out).

One or more operation parts may be freely selected in different orders to achieve the operations with various functions. The operation steps of the present disclosure may include but not be limited to the four operations, and may further include logical operations such as XOR, XNOR, OR and so on.

Furthermore, the processing method may be adopted to process the unquantized weight. The unquantized weight and the input neuron may be operated according to the operation control information to obtain and output the output neuron.

In an embodiment, the present disclosure may further provide a chip including the processing device, which is capable of performing a plurality of operations on quantized weight and unquantized weight simultaneously, thereby realizing diversification of operations.

In addition, by adopting a dedicated on-chip cache for the multi-layer artificial neural network operation algorithm, the present disclosure fully exploits the reuse of input neurons and weight data, which avoids repeatedly reading these data into memory, reducing memory access bandwidth, therefore, memory bandwidth is no longer a bottleneck of the performance of multi-layer artificial neural network operations and training algorithms.

In some embodiments, the present disclosure provides a chip package structure, which may include the chip.

In some embodiments, the present disclosure provides a board card, which may include the chip package structure.

In some embodiments, the present disclosure provides an electronic device, which may include the board card.

The electronic device may include a data processing device, a robot, a computer, a printer, a scanner, a tablet computer, an intelligent terminal, a mobile phone, an automobile data recorder, a navigator, a sensor, a webcam, a cloud server, a camera, a video camera, a projector, a watch, an earphone, a mobile storage, wearable equipment, a vehicle, a household electrical appliance and/or medical equipment.

The vehicles may include an airplane, a ship and/or a car. The household electrical appliance includes a television, an air conditioner, a microwave oven, a refrigerator, an electric rice cooker, a humidifier, a washing machine, an electric lamp, a gas cooker and a range hood. The medical equipment includes a nuclear magnetic resonance spectrometer, a B-ultrasonic scanner and/or an electrocardiograph.

All units and modules of the present disclosure may be hardware circuits. Physical implementations of the hardware circuits may include but not be limited to physical devices, and the physical devices may include but not be limited to transistors, memristors, DNA computer, and the like.

In the prior art, quantization is performed only with a layer of a neural network as a unit. In order to improve the prior art, the present disclosure provides a data quantization method, which includes: grouping weights of the neural network by adopting a grouping method and a clustering operation, dividing the weights of each group into m classes and computing a center weight of each class, where all the weights in each group are replaced by the center weight of the corresponding group, and encoding the center weights to obtain a weight codebook and a weight dictionary.

In the present disclosure, the neural network may be retrained, where only the weight codebook needs to be retrained, the weight dictionary remains unchanged, which reduces the workload. The quantized weight obtained by the data quantization method may be applied to the processing device provided by the present disclosure, and a lookup table unit is added, therefore, the quantized weight may be obtained just by looking up the weight dictionary and the weight codebook according to a search and control instruction, while it is not necessary to input the weight, which makes the operation more systematized. By fully exploiting a distribution characteristic of the weight of the neural network, a low bit quantized weight is obtained, which greatly improves the processing speed and reduces the weight storage overhead and the memory access overhead.

Some embodiments of the present disclosure will be described more comprehensively with reference to the description of the drawings later, where some but not all embodiments will be shown. In fact, the embodiments of this disclosure may be implemented in many different forms, the described embodiments are merely some rather than all embodiments of the present disclosure. The provision of these embodiments enables the disclosure to meet applicable legal requirements.

In the present specification, the following embodiments for describing the principle of the present disclosure are merely illustrative and should not be construed in any way as limiting the scope of the disclosure. The following description with reference to the drawings is provided to assist in a comprehensive understanding of the exemplary embodiments of the present disclosure as defined by the claims and the equivalents of the claims. The following description includes various specific details to facilitate the understanding, but these details should be regarded as merely exemplary. Therefore, those of ordinary skill in the art should realize that various changes and modifications of the embodiments described herein can be made without departing from the scope and spirit of the present disclosure. In addition, descriptions of well-known functions and structures are omitted for clarity and conciseness. Moreover, same reference numerals are used for similar functions and operations throughout the drawings. In the present disclosure, the terms "comprise" and "contain" and derivatives thereof are intended to be inclusive but not limiting.

In order to make the object, technical solution and advantages of the present disclosure more apparent, the present disclosure will be further described in detail below with reference to the drawings in conjunction with specific embodiments thereof.

An aspect of the present disclosure provides a data quantization method. FIG. 19 is a flowchart of a data quantization method according to an embodiment of the disclosure. As shown in FIG. 19, the method may include the following steps.

In S1901 step, grouping a weight of a neural network, where the grouping methods may include grouping into a group, layer-type-based grouping, inter-layer-based grouping, intra-layer-based grouping, mixed grouping, and the like.

In S1902 step, performing a clustering operation on each group of weights by using a clustering algorithm, and representing the weight of each class with a center weight, specifically, grouping the weights of each group into m classes, computing the center weight of each class, replacing all the weights of each class by the center weight corresponding to the class.

The clustering algorithm may include but not be limited to K-means, K-medoids, Clara and Clarans.

Further, a center weight selection method of a class is: minimizing the cost function $J(w,w_0)$.

Furthermore, the cost function is:

$$J(w, w_0) = \sum_{i=1}^{n} (w_i - w_0)^2$$

where w is the weight of a class, w0 is the center weight of the class, n is a count of weights in the class, n is a positive integer, wi is the $i^{th}$ weight of the class, i is a positive integer, and $1 \le i \le n$.

In step S1903, encoding the center weight to obtain the weight codebook and the weight dictionary.

The data quantization may further achieve retraining on the neural network, where only the weight codebook needs to be retrained, the weight dictionary remains unchanged. Specifically, a back-propagation algorithm may be adopted to retrain the neural network.

FIG. 20 is a flowchart of quantizing data according to an embodiment of the disclosure. As shown in FIG. 20, the weights of the neural network are grouped to obtain an ordered matrix of weights. Then, intra-group sampling and clustering operation are performed on the grouped weight matrix, so that the weights with similar values are classified into the same class, and the four center weights of 1.50, −0.13, −1.3, and 0.23 are obtained, where the four center weights are corresponding to the weights of four classes. Next, the center weight is encoded, where the class with a center weight of −1.3 is encoded as 00, the class with a center weight of −0.13 is encoded as 01, the class with a center weight of 0.23 is encoded as 10, and the class with a weight of 1.50 is encoded as 11, and 00, 01, 10, 11 are the content of the weight codebook. In addition, the encoding contents (00, 01, 10 and 11) corresponding to the four center weight are respectively representing the weights in the corresponding classes, so as to obtain the weight dictionary.

The quantization process fully exploits the similarity of the inter-layer-based weights and the local similarity of the intra-layer-based weights of the neural network, and obtains the weight distribution characteristics of the neural network to perform low-bit quantization, which may reduce a count of bits representing each weight, and reducing the weight storage overhead and the memory access overhead.

Next, embodiments are given to illustrate the data quantization method of the neural network.

Embodiment 1: all the weights of the neural network may be grouped into one group, K-means clustering algorithm may be adopted to cluster each group of weights, and all the weights of each class may be replaced by the center weights. Then, the weight dictionary and the weight codebook are generated according to the quantized weights, and the neural network is retrained. In the retraining process, only the weight codebook is trained, while the weight dictionary remains unchanged. Specifically, the back propagation algorithm may be adopted for retraining.

Embodiment 2: the weights of the neural network are grouped according to layer-type-based. For example, the neural network may include a fully connected layer, a convolutional layer and/or a LSTM layer. The weights in the convolutional layers are grouped into one group, the weights in the fully connected layers are grouped into one group, and the weights in the LSTM layers are grouped into one group.

If a neural network has a total of t different types of layers such as i convolutional layers, j fully connected layers, and m LSTM layers, where i, j, m are integers greater than or equal to 0 and satisfy i+j+m>=1, t is an integer greater than or equal to 1 and satisfies t=i+j+m, and the weight of the neural network will be divided into t groups. The K-medoids clustering algorithm may be adopted to cluster each group of weights of the t groups, and the center weight of each class may be computed, all the weights of each class may be replaced by the center weight corresponding to the class. Then, the weight dictionary and the weight codebook are generated according to the quantized weights, and the neural network is retrained. In the retraining process, only the weight codebook is trained, while the weight dictionary remains unchanged. Specifically, the back propagation algorithm may be adopted for retraining.

Embodiment 3: the weights of the neural network are grouped according to inter-layer-based structure.

Specifically, the one or more successive convolutional layers are grouped into one group, the one or more successive fully connected layers are grouped into one group, and the one or more successive LSTM layers are grouped into one group. The Clara clustering algorithm may be adopted to cluster each group of weights, where the weights with similar values may be grouped into the same class, and the center weight of each class may be computed, all the weights of each class may be replaced by the center weight corresponding to the class. Then, the weight dictionary and the weight codebook are generated according to the quantized weights, and the neural network is retrained. In the retraining process, only the weight codebook is trained, while the weight dictionary remains unchanged. Specifically, the back propagation algorithm may be adopted for retraining.

Embodiment 4: the weights of the neural network are grouped according to intra-layer-based structure.

Specifically, the convolutional layers of the neural network may be regarded as a four-dimensional matrix (Nfin, Nfout, Kx, Ky), where Nfin, Nfout, Kx, Ky are positive integers, Nfin represents a count of input feature maps, and Nfout represents a count of output feature maps, (Kx, Ky) represents the size of the convolution kernel. The convolutional layers are grouped into Nfin*Nfout*Kx*Ky/ (Bfin*Bfout*Bx*By) different groups according to the group size of (Bfin, Bfout, Bx, By), where Bfin is a positive integer less than or equal to Nfin, Bfout is a positive integer less than or equal to Nfout, Bx is a positive integer less than or equal to Kx, and By is a positive integer less than or equal to Ky.

The weights in the fully connected layers of the neural network are regarded as a two-dimensional matrix (Nin, Nout), where Nin, Nout are positive integers, Nin represents a count of input neurons, Nout represents a count of output neurons, and a count of weight is Nin*Nout. The weights of fully connected layer are grouped into (Nin*Nout)/ (Bin*Bout) different groups according to the group size of (Bin, Bout), where Bin is a positive integer less than or equal to Nin, and Bout is a positive integer less than or equal to Nout.

The weights in the LSTM layers of the neural network are regarded as a combination of the weights of a plurality of fully connected layers, where the weights of the LSTM layer are composed of the weights of n fully connected layers, n is a positive integer, therefore each fully connected layer can be grouped according to the grouping mode of the fully connected layer.

The Clarans clustering algorithm may be adopted to cluster each group of weights, and the center weight of each class may be computed, all the weights of each class may be replaced by the center weight corresponding to the class. Then, the weight dictionary and the weight codebook are generated according to the quantized weights, and the neural network is retrained. In the retraining process, only the weight codebook is trained, while the weight dictionary remains unchanged. Specifically, the back propagation algorithm may be adopted for retraining.

Embodiment 5: the weights of the neural network are grouped in a mixed manner. For example, all the convolutional layers are grouped into one group, all the fully connected layers are grouped according to inter-layer-based structure, and all the LSTM layers are grouped according to intra-layer-based structure. The Clarans clustering algorithm may be adopted to cluster each group of weights, and the center weight of each class may be computed, all the weights of each class may be replaced by the center weight corresponding to the class. Then, the weight dictionary and the weight codebook are generated according to the quantized weights, and the neural network is retrained. In the retraining process, only the weight codebook is trained, while the weight dictionary remains unchanged. Specifically, the back propagation algorithm may be adopted for retraining.

Another aspect of the present disclosure provides a data quantization device. FIG. 21 is a schematic structure diagram of a data quantization device according to an embodiment of the disclosure. As shown in FIG. 21, the data quantization device may include:

a memory 1 configured to store an operation instruction, where the operation instruction is a binary number composed of an operation code and an address code, the operation code indicates an operation to be performed by a processor 2, and the address code indicates the address of the memory 1 where the processor 2 reads data participating in the operation.

a processor 2 configured to execute an operation instruction in the memory 1 in accordance with the data quantization method.

By executing the operation instruction in the memory 1 in accordance with the data quantization method, the processor 2 may quantize the disordered weights to obtain low bit and normalized quantized weight. The data quantization device of the present disclosure may fully exploit the similarity of the inter-layer-based weights and the local similarity of the intra-layer-based weights of the neural network, and obtain the weight distribution characteristics of the neural network to perform low-bit quantization, which may reduce a count of bits representing each weight, and reducing the weight storage overhead and the memory access overhead.

Another aspect of the present disclosure provides a processing device. FIG. 22 is a schematic structure diagram of a processing device according to an embodiment of the disclosure. As shown in FIG. 22, the processing device may include a control unit 1, a lookup table unit 2, and an operation device 3.

The control unit 1 may be configured to receive an instruction and decode the instruction to generate search and control information and operation control information, where the instruction may be a neural network dedicated instruction including all instructions dedicated to completing artificial neural network operations. The dedicated instruction may include but not be limited to a control instruction, a data transfer instruction, an operation instruction, and a logical instruction, where the control instruction may be configured to control the neural network execution process.

The data transfer instruction may be configured to transfer data between different storage media, and the data format may include but not be limited to matrix, vector and scalar.

The operation instruction may be configured to perform a neural network arithmetic operation, and the operation instruction may include but not be limited to a matrix operation instruction, a vector operation instruction, a scalar operation instruction, a convolutional neural network operation instruction, a fully connected neural network operation instruction, a pooling neural network operation instruction, an RBM neural network operation instruction, an LRN neural network operation instruction, an LCN neural network operation instruction, an LSTM neural network operation instruction, an RNN operation instruction, an ReLU neural network operation instruction, a PReLU neural network operation instruction, a SIGMOID neural network operation instruction, a TAN H neural network operation instruction, and a MAXOUT neural network operation instruction.

The logical instruction may be configured to perform a logical operation of the neural network, and the logical instruction may include but not be limited to a vector logical operation instruction and a scalar logical operation instruction.

Where, the RBM neural network operation instruction may be configured to implement an RBM neural network operation.

The LRN neural network operation instruction may be configured to implement an LRN neural network operation.

The LCN neural network operation instruction may be configured to implement an LCN neural network operation.

The LSTM neural network operation instruction may be configured to implement an LSTM neural network operation.

The RNN neural network operation instruction may be configured to implement an RNN neural network operation.

The RELU neural network operation instruction may be configured to implement an RELU neural network operation.

The PRELU neural network operation instruction may be configured to implement a PRELU neural network operation.

The SIGMOID neural network operation instruction may be configured to implement a SIGMOID neural network operation.

The TAN H neural network operation instruction may be configured to implement a TAN H neural network operation.

The MAXOUT neural network operation instruction may be configured to implement a MAXOUT neural network operation.

Furthermore, the neural network dedicated instruction may include a Cambricon instruction set.

The Cambricon instruction set may include at least one kind of Cambricon instruction, and the length of the Cambricon instruction may be 64 bits, or may be changed according to actual needs. The Cambricon instruction may be composed of an operation code and an operand. The Cambricon instruction may include four types of instructions: a Cambricon control instruction, a Cambricon data transfer instruction, a Cambricon operation instruction, and a Cambricon logical instruction.

The Cambricon control instruction may be configured to control the execution process, and the Cambricon control instruction may include a jump instruction and a conditional branch instruction.

The Cambricon data transfer instruction may be configured to transfer data between different storage media, and the Cambricon data transfer instruction may include a loading instruction, a storage instruction, and a moving instruction; where the loading instruction may be configured to load data from a main memory to a cache; the storage instruction may be configured to store data from the cache to the main memory; and the moving instruction may be configured to move data from the cache to another cache or from the cache to a register or from the register to another register. The data transfer instruction may support three different ways of organizing data including matrix, vector, and scalar.

The Cambricon operation instruction may be configured to perform a neural network arithmetic operation, and the Cambricon operation instruction may include a Cambricon matrix operation instruction, a Cambricon vector operation instruction, and a Cambricon scalar operation instruction; where the Cambricon matrix operation instruction may be configured to complete a matrix operation in the neural network, and the Cambricon matrix operation may include a matrix-vector multiplication operation, a vector multiply matrix operation, a matrix multiply scalar operation, an outer product operation, a matrix-add-matrix operation, and a matrix-subtract-matrix operation; the Cambricon vector operation instruction may be configured to complete a vector operation in the neural network, and the Cambricon vector operation may include a vector elementary operation, a vector transcendental function operation, a dot product operation, a random vector generation operation, and an operation of maximum/minimum of a vector. The vector elementary operation may include addition, subtraction, multiplication, and division; the vector transcendental function may refer to a function which does not meet any polynomial equation taking polynomials as coefficients, and the function may include an exponential function, a logarithmic function, a trigonometric function, and an anti-trigonometric function.

The Cambricon scalar operation instruction may be configured to complete a scalar operation in the neural network, and the Cambricon scalar operation may include a scalar elementary operation and a scalar transcendental function. The vector elementary operation may include addition, subtraction, multiplication, and division; the scalar transcendental function may refer to a function which does not meet any polynomial equation taking polynomials as coefficients, and the scalar transcendental function may include an exponential function, a logarithmic function, a trigonometric function, and an anti-trigonometric function.

The Cambricon logical instruction may be configured for the logical operation of the neural network, and the Cambricon logical instruction may include a Cambricon vector logical operation instruction and a Cambricon scalar logical operation instruction. The Cambricon vector logical operation instruction may include vector comparing and vector logical operation. The vector comparing may include but not be limited to greater than, smaller than, equal to, greater than or equal to ($\geq$), less than or equal to ($\leq$), and unequal to. The vector logical operation may include AND, OR, and NOT. The Cambricon scalar logical operation instruction may include a scalar comparing operation instruction and a scalar logical operation instruction. The scalar comparing operation may include but not be limited to greater than, smaller than, equal to, greater than or equal to ($\geq$), less than or equal to ($\leq$), and unequal to. The scalar logical operation may include AND, OR, and NOT.

A lookup table unit 2 may be configured to receive the search and control information, a weight dictionary and a weight codebook, and perform a table lookup operation on the weight dictionary and the weight codebook to obtain a quantized weight according to the search and control information An operation unit 3 may be configured to receive the operation control information and input neuron, and perform an operation on the quantized weight and input neuron according to the operation control information to obtain an output neuron and output the output neuron.

The operation unit 3 may include four operation parts:
a first operation part configured to multiply the quantized weight and the input neuron;
a second part configured to add the quantized weight and the input neuron through one or a plurality of adders (further, the plurality of adders may constitute an adder tree to implement the operation function of the different levels of the adder tree);
a third part configured to perform a nonlinear function operation on the quantized weight and the input neuron;
a fourth part configured to perform a pooling operation on the quantized weight and the input neuron.

By adopting a dedicated SIMD instruction and a customized operation unit 3 for a multi-layer artificial neural network operation aiming at local quantization, the problem that the CPU (Central Processing Unit) and GPU (General Processing Unit) have inadequate operational performance and the front-end decoding overhead is high may be solved, and the support for a multi-layer artificial neural network operation algorithm is effectively improved.

FIG. 23 is a flowchart of a table lookup operation according to an embodiment of the disclosure. As shown in FIG. 23, the quantized weights are grouped into four classes according to the weight codebook, where the class with a center weight of −1.3 is encoded as 00, the class with a center weight of −0.13 is encoded as 01, the class with a center weight of 0.23 is encoded as 10, and the class with a weight of 1.50 is encoded as 11. At the same time, referring to the weight dictionary, the distribution of the weights in the same class may be obtained, and the quantized weights may be obtained by replacing the corresponding codes in the weight dictionary with the center weights of each class.

The above operation fully exploits the similarity of the inter-layer-based weights and the local similarity of the intra-layer-based weights of the neural network, and table lookup operation is performed by using the weight dictionary and the weight codebook obtained during quantization to restore the quantized weight, which has good operability and standardization.

In order to optimize the processing device of the present disclosure, a storage unit 4, a pre-processing unit 5, and a caching unit 7 are added to make the processing data more orderly and facilitate the processing operations of the processing device.

FIG. 24 is a schematic structure diagram of a specific embodiment of a processing device according to an embodiment of the disclosure. As shown in FIG. 24, the processing device may further include a storage unit 4, a pre-processing unit 5, a DMA unit 6 and a caching unit 7 on the basis of the original structure shown in FIG. 22.

The storage unit 4 may be configured to store an external input neuron, a weight dictionary, a weight codebook and an instruction, and an output neuron output by the operation unit 3.

The storage unit 4 may further store an unquantized weight, which is directly output to the operation unit 3 through a bypass. It can be seen that the processing device of the present disclosure can process not only the quantized weight but also the unquantized weight according to different actual needs.

The pre-processing unit 5 may be configured to pre-process the external input information to obtain the input neuron, the weight dictionary, the weight codebook, and the instruction. The pre-processing may include segmentation, Gaussian filter, binarization, regularization, and/or normalization.

The caching unit 7 may include:
an instruction caching unit 71 configured to cache the instruction;
an weight dictionary caching unit 72 configured to cache the weight dictionary;
an weight codebook caching unit 73 configured to cache the weight codebook;
an input neuron caching unit 74 configured to cache the input neuron;
an output neuron caching unit 75 configured to cache the output neuron.

After the external input data is pre-processed by the pre-processing unit 5, the input neuron, weight dictionary, weight codebook and instruction are obtained and output to storage unit 4. The DMA unit 6 may directly read the input neuron, the weight dictionary, the weight codebook and the instruction from the storage unit 4, output the instruction to the instruction caching unit 71, output the weight dictionary to the weight dictionary caching unit 72, output the weight codebook to the weight codebook caching unit 73, and output the input neuron to the input neuron caching unit 74.

The control unit 1 may decode the received instructions to obtain and output a table lookup control information and an operation control information. The lookup table unit 2 may perform a table lookup operation on the weight dictionary and the weight codebook based on the received table lookup control information, obtain the quantized weight, and output the quantized weight to the operation unit 3. The operation unit 3 may select the operation part and the order of each operation part according to the received operation control information, and perform an operation on the quantized weight and the input neuron to obtain an output neuron and output it to the output neuron caching unit 75. Finally, the output neuron caching unit 75 may output the output neuron to the storage unit 4.

The operation of the first operation part is: multiplying first input data (in1) and second input data (in2) to get first output data (out1), where the process is: out=in1*in2.

The second operation part may be composed of one or a plurality of adders to achieve addition operation. Further, the plurality of adders may constitute an adder tree to implement the operation function of the different levels of the adder tree. The second part may add first input data in1 step by step through the adder tree to obtain output data (out1), where in1 is a vector of length N, N is greater than 1, the process is: out1=in1[1]+in1[2]+ . . . +in1[N]; or add the first input data in1 step by step through the adder tree to obtain output data (out1), where in1 is a vector of length N, N is greater than 1, and then add the out1 and an second input data in2 to obtain output data out2, the process is: out2=in1[1]+in1[2]+ . . . +in1[N]+in2; or add the input data in1 and the input data in2 to obtain output data out3, where both in1 and in2 are numerical values, the process is out3=in1+in2.

The third operation part may perform a non-linear function (f) on the input data (in) to obtain different function operations, thereby obtaining the output data (out), and the process is: out=f(in). The non-linear function may include an activation function, and the process is out=active(in). The activation function may include but not be limited to sigmoid, tan h, relu, and/or softmax.

The fourth operation part may perform a pooling operation on the input data (in) to obtain the output data (out), and the process is out=pool(in), where pool represents the pooling operation. The pooling operation may include but not be limited to: mean pooling, maximum pooling, or median pooling. The input data in is the data in a pooling core associated with the output data(out).

One or more operations parts may be freely selected in different orders to achieve the operations with various functions. The operation unit 3 of the present disclosure may include but not be limited to the four operation parts, and may further include logical operations such as XOR, XNOR, OR and so on. The operation control information may control one or more operation parts in different combination orders to achieve the operations with various functions.

Another aspect of the present disclosure provides a processing method. FIG. 25 is a flowchart of a processing method according to an embodiment of the disclosure. As shown in FIG. 25, the processing method may include the following steps.

In step S701, receiving the input neuron, the weight dictionary, the weight codebook, and the instruction; where the input neuron, the weight dictionary, the weight codebook, and the instruction may be the obtained information after pre-processing the external information, and the pre-processing may include but not be limited to segmentation, Gaussian filter, binarization, regularization, normalization, and the like.

In step S702, encoding the instruction to obtain the lookup control information and operation control information; where the instruction may be a neural network dedicated instruction including all instructions dedicated to completing artificial neural network operations.

The dedicated instruction may include but not be limited to a control instruction, a data transfer instruction, an operation instruction, and a logical instruction, where the control instruction may be configured to control the neural network execution process.

The data transfer instruction may be configured to transfer data between different storage media, and the data format may include but not be limited to matrix, vector and scalar.

The operation instruction may be configured to perform a neural network arithmetic operation, and the operation instruction may include but not be limited to a matrix operation instruction, a vector operation instruction, a scalar operation instruction, a convolutional neural network operation instruction, a fully connected neural network operation instruction, a pooling neural network operation instruction, an RBM neural network operation instruction, an LRN neural network operation instruction, an LCN neural network operation instruction, an LSTM neural network operation instruction, an RNN operation instruction, an ReLU neural network operation instruction, a PReLU neural network operation instruction, a SIGMOID neural network operation instruction, a TAN H neural network operation instruction, and a MAXOUT neural network operation instruction.

The logical instruction may be configured to perform a logical operation of the neural network, and the logical instruction may include but not be limited to a vector logical operation instruction and a scalar logical operation instruction.

Where, the RBM neural network operation instruction may be configured to implement an RBM neural network operation.

The LRN neural network operation instruction may be configured to implement an LRN neural network operation.

The LCN neural network operation instruction may be configured to implement an LCN neural network operation.

The LSTM neural network operation instruction may be configured to implement an LSTM neural network operation.

The RNN neural network operation instruction may be configured to implement an RNN neural network operation.

The RELU neural network operation instruction may be configured to implement an RELU neural network operation.

The PRELU neural network operation instruction may be configured to implement a PRELU neural network operation.

The SIGMOID neural network operation instruction may be configured to implement a SIGMOID neural network operation.

The TAN H neural network operation instruction may be configured to implement a TAN H neural network operation.

The MAXOUT neural network operation instruction may be configured to implement a MAXOUT neural network operation.

Furthermore, the neural network dedicated instruction may include a Cambricon instruction set.

The Cambricon instruction set may include at least one kind of Cambricon instruction, and the length of the Cambricon instruction may be 64 bits. The Cambricon instruction may be composed of an operation code and an operand. The Cambricon instruction may include four types of instructions: a Cambricon control instruction, a Cambricon data transfer instruction, a Cambricon operation instruction, and a Cambricon logical instruction.

The Cambricon control instruction may be configured to control the execution process, and the Cambricon control instruction may include a jump instruction and a conditional branch instruction.

The Cambricon data transfer instruction may be configured to transfer data between different storage media, and the Cambricon data transfer instruction may include a loading instruction, a storage instruction, and a moving instruction; where the loading instruction may be configured to load data from a main memory to a cache; the storage instruction may be configured to store data from the cache to the main memory; and the moving instruction may be configured to move data from the cache to another cache or from the cache to a register or from the register to another register. The data transfer instruction may support three different ways of organizing data including matrix, vector, and scalar.

The Cambricon operation instruction may be configured to perform a neural network arithmetic operation, and the Cambricon operation instruction may include a Cambricon matrix operation instruction, a Cambricon vector operation instruction, and a Cambricon scalar operation instruction; where the Cambricon matrix operation instruction may be configured to complete a matrix operation in the neural network, and the Cambricon matrix operation may include a matrix-vector multiplication operation, a vector multiply matrix operation, a matrix multiply scalar operation, an outer product operation, a matrix-add-matrix operation, and a matrix-subtract-matrix operation; the Cambricon vector operation instruction may be configured to complete a vector operation in the neural network, and the Cambricon vector operation may include a vector elementary operation, a vector transcendental function operation, a dot product operation, a random vector generation operation, and an operation of maximum/minimum of a vector. The vector elementary operation may include addition, subtraction, multiplication, and division; the vector transcendental function may refer to a function which does not meet any polynomial equation taking polynomials as coefficients, and the function may include an exponential function, a logarithmic function, a trigonometric function, and an anti-trigonometric function.

The Cambricon scalar operation instruction may be configured to complete a scalar operation in the neural network, and the Cambricon scalar operation may include a scalar elementary operation and a scalar transcendental function. The vector elementary operation may include addition, subtraction, multiplication, and division; the scalar transcendental function may refer to a function which does not meet any polynomial equation taking polynomials as coefficients, and the scalar transcendental function may include an exponential function, a logarithmic function, a trigonometric function, and an anti-trigonometric function.

The Cambricon logical instruction may be configured for the logical operation of the neural network, and the Cambricon logical instruction may include a Cambricon vector logical operation instruction and a Cambricon scalar logical operation instruction. The Cambricon vector logical operation instruction may include vector comparing and vector logical operation. The vector comparing may include but not be limited to greater than, smaller than, equal to, greater than or equal ($\geq$), less than or equal ($\leq$), and unequal to. The vector logical operation may include AND, OR, and NOT. The Cambricon scalar logical operation instruction may include a scalar comparing operation instruction and a scalar logical operation instruction. The scalar comparing operation may include but not be limited to greater than, smaller than, equal to, greater than or equal ($\geq$), less than or equal ($\leq$), and unequal to. The scalar logical operation may include AND, OR, and NOT.

In step S703, looking up, according to the lookup control information, the weight dictionary and the weight codebook to obtain the quantized weight; performing operation on the quantized weight and the input neuron according to the operation control information to obtain and output the output neuron.

Moreover, in order to optimize the processing method of the present disclosure to make the processing more convenient and orderly, steps are added in some embodiments of the present disclosure.

FIG. 26 is a flowchart of a specific embodiment of a processing method according to an embodiment of the disclosure. As shown in FIG. 26, before the step S701, the processing method may further include step S700: pre-processing the external input information to obtain the input neuron, the weight dictionary, the weight codebook, and the instruction. Furthermore, the pre-processing may include data segmentation, Gaussian filter, binarization, regularization, normalization, and the like.

After the step S702, the processing method may further include:
   in S7021 step, storing the input neuron, the weight dictionary, the weight codebook, the instruction, and the output neuron;
   in step S7022, caching the input neuron, the weight dictionary, the weight codebook, the instruction, and the output neuron. The subsequent steps are the same as those shown in FIG. 26 and will not be described again here.

The operation may include: adding a weight to an input neuron, where the addition function may be implemented by one or a plurality of adders, and further, the plurality of adders may also constitute an adder tree to add the weight and input neuron step by step, and/or;
   multiplying the weight and the input neuron, and/or;
   performing the non-linear function on the weight and the input neuron, where the non-linear function may include an activation function, and activation function may include sigmoid, tan h, relu, and/or softmax, and/or;
   performing a pooling operation on the weight and the input neuron, where the weight may include the quantized weight and/or unquantized weight, and the pooling operation may include but not be limited to: mean pooling, maximum pooling, or median pooling, the input data in is the data in a pooling core associated with the output data(out).

One or more operations parts may be freely selected in different orders to achieve the operations with various functions. The operation steps of the present disclosure may include but not be limited to the four operations, and may further include logical operations such as XOR, XNOR, OR and so on.

Furthermore, the processing method may be adopted to process the unquantized weight. The unquantized weight and the input neuron may be operated according to the operation control information to obtain and output the output neuron.

In an embodiment, the present disclosure may further provide a chip including the processing device, which is capable of performing a plurality of operations on quantized weight and unquantized weight simultaneously, thereby realizing diversification of operations.

The present disclosure by adopting a dedicated on-chip cache for the multi-layer artificial neural network operation algorithm, fully exploits the reuse of input neurons and weight data, which avoids repeatedly reading these data into memory, reducing memory access bandwidth, therefore, memory bandwidth is no longer a bottleneck of the performance of multi-layer artificial neural network operations and training algorithms.

In some embodiments, the present disclosure provides a chip package structure, which may include the chip.

In some embodiments, the present disclosure provides a board card, which may include the chip package structure.

In some embodiments, the present disclosure provides an electronic device, which may include the board card.

The electronic device may include a data processing device, a robot, a computer, a printer, a scanner, a tablet computer, an intelligent terminal, a mobile phone, an automobile data recorder, a navigator, a sensor, a webcam, a cloud server, a camera, a video camera, a projector, a watch, an earphone, a mobile storage, wearable equipment, a vehicle, a household electrical appliance and/or medical equipment.

The vehicles may include an airplane, a ship and/or a car. The household electrical appliance includes a television, an air conditioner, a microwave oven, a refrigerator, an electric rice cooker, a humidifier, a washing machine, an electric lamp, a gas cooker and a range hood. The medical equipment includes a nuclear magnetic resonance spectrometer, a B-ultrasonic scanner and/or an electrocardiograph.

All units and modules of the present disclosure may be hardware circuits. Physical implementations of the hardware circuits may include but not be limited to physical devices, and the physical devices may include but not be limited to transistors, memristors, DNA computer, and the like.

In order to make the object, technical solution and advantages of the present disclosure more apparent, the present disclosure will be further described in detail below with reference to the drawings in conjunction with specific embodiments thereof.

All units and modules of the present disclosure may be hardware circuits. Physical implementations of the hardware circuits may include but not be limited to physical devices, and the physical devices may include but not be limited to transistors, memristors, DNA computer, and the like.

The present disclosure provides a method of compressing the neural network, which may include the following steps: performing the coarse-grained pruning and the first retraining, as well as local quantization and the second retraining. Compared with the prior arts, the method can regularize the sparsification of the neural network, facilitate accelerating by using hardware, and reduce the storage space of the target weight position; local quantization can fully exploit the weight distribution characteristics of the neural network, reduce a count of bits of each weight, thereby further reducing storage overhead and memory access overhead.

Figure 27:
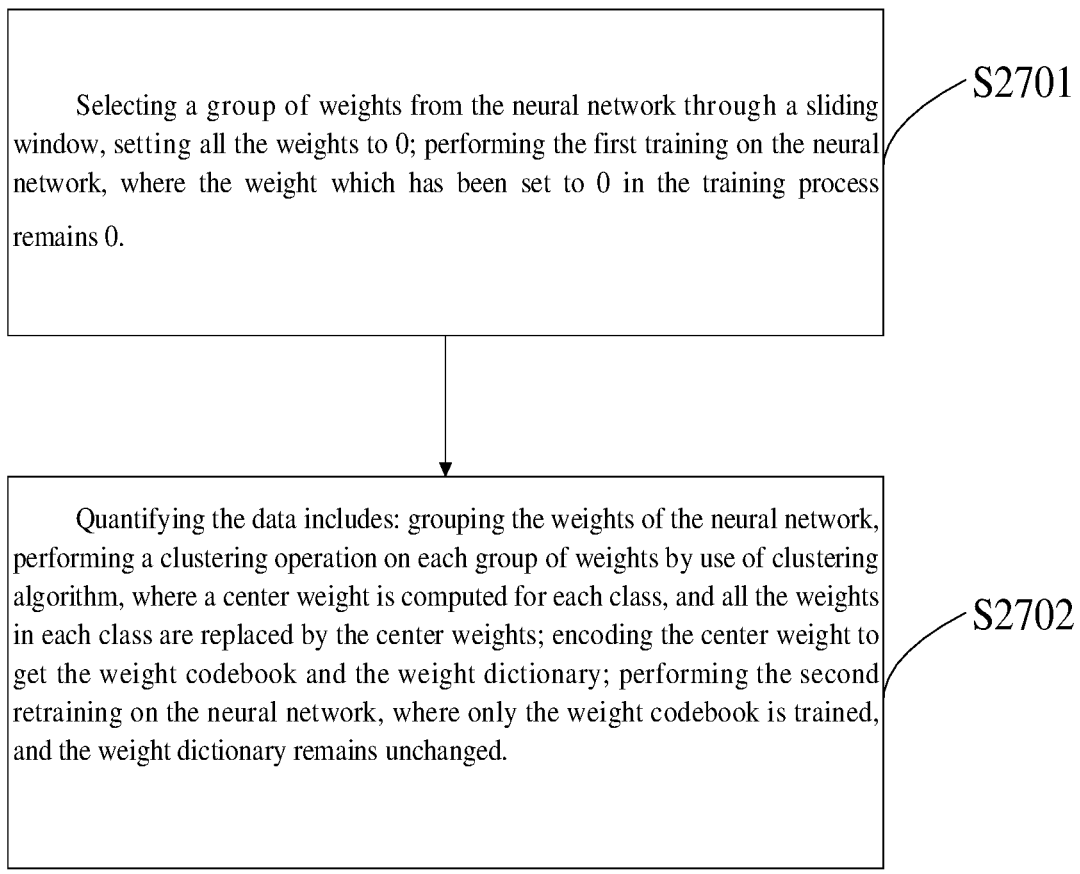
FIG. 27 is a flowchart of a data compression method according to an embodiment of the disclosure.

FIG. 27 is a flowchart of a data compression method according to an embodiment of the disclosure. The data compression method may include the following steps.

In step S2701, selecting M weights from the neural network through a sliding window, where when the M weights meet a preset condition, all or part of the M weights may be set to 0; performing the first retraining on the neural network, where the weight which has been set to 0 in the retraining process remains 0; and in step S2702, grouping the weights of the neural network, clustering and encoding the weights in the groups, and performing the second retraining on the neural network after clustering and encoding.

The step S2701 may be summarized as performing coarse-grained pruning and the first retraining, and specifically include the following steps.

In step S27011, selecting M weights from the retrained neural network through the sliding window.

In step S27012, setting all or part of the M weights to 0 when the M weights meet the preset condition.

The preset condition is:

an information quantity of the M weights meets a preset judgment condition.

In an embodiment, the preset judgment condition may include a threshold judgment condition, where the threshold judgment condition may include one or some condition within or outside a given range of values: less than a given threshold, less than or equal to the given threshold, greater than the given threshold, greater than or equal to the given threshold.

Specifically, the information quantity of the M weights is less than the given threshold, where the information quantity of the M weights may include but not be limited to an arithmetic mean of an absolute value of the M weights, a geometric mean of the absolute value of the M weights or a maximum value of the absolute value of the M weights. The arithmetic mean of the absolute value of the M weights is less than a first threshold; or the geometric mean of the absolute value of the M weights is less than a second threshold; or the maximum value of the absolute value of the M weights is less than a third threshold. The first threshold, the second threshold, and the third threshold may be preset according to a situation, or be obtained by a computation of changing an input parameter in a preset formula, or be obtained by machine learning by those skilled in the art. The present disclosure does not specifically limit the method of obtaining the first threshold, the second threshold and the third threshold.

In an optional embodiment, the preset judgment condition may include a function mapping judgment condition which judges whether the M weights satisfy the given condition after a function transformation.

The weight of the neural network may include the weight in a fully connected layer, the weight in a convolutional layer, and the weight in a LSTM layer.

As shown in FIG. 2, the weights of the fully connected layer may be regarded as a two-dimensional matrix (Nin, Nout), where Nin represents a count of input neurons and Nout represents a count of output neurons, and the fully connected layer has Nin*Nout weights. The size of the sliding window is Bin*Bout, where Bin is a positive integer greater than 0 and less than or equal to Nin, and Bout is a positive integer greater than 0 and less than or equal to Nout. The performing coarse-grained pruning on the weight of the fully connected layer of the neural network may include:
  making the sliding window slide Sin stride in the direction of Bin, or slide Sout stride in the direction of Bout, where Sin is a positive integer greater than 0 and less than or equal to Bin, and Sout is a positive integer greater than 0 and less than or equal to Bout; and
  selecting M weights from the Nin*Nout weights through the sliding window, setting all or part of the M weights to 0 when the M weights meet the preset condition, where M=Bin*Bout.

As shown in FIG. 3, the weight of the convolutional layer may be regarded as a four-dimensional matrix (Nfin, Nfout, Kx, Ky), where Nfin represents a count of input feature maps, and Nfout represents a count of output feature maps, (Kx, Ky) represents the size of the convolution kernel. When the coarse-grained pruning is performed on the weight of the convolutional layer, the sliding window may be determined as a four-dimensional sliding window with the size of Bfin*Bfout*Bx*By, where Bfin is a positive integer greater than 0 and less than or equal to Nfin, Bfout is a positive integer greater than 0 and less than or equal to Nfout, Bx is a positive integer greater than 0 and less than or equal to Kx, and By is a positive integer greater than 0 and less than or equal to Ky. The performing pruning on the weight of the convolutional layer of the neural network may include:

making the sliding window slide Sfin stride in the direction of Bfin, or slide Sfout stride in the direction of Bfout, or slide S stride in the direction of Bx, or slide Sy stride in the direction of By, where Sfin is a positive integer greater than 0 and less than or equal to Bfin, Sfout is a positive integer greater than 0 and less than or equal to Bfout, Sx is a positive integer greater than 0 and less than or equal to Bx, and Sy is a positive integer greater than 0 and less than or equal to By; and selecting M weights from the Nfin*Nfout*Kx*Ky weights through the sliding window, and setting all or part of the M weights to 0 when the M weights meet the preset condition, where M=Bfin*Bfout*Bx*By.

The weights of the LSTM layer of the neural network are composed of a plurality of fully connected layer weights. It is assumed that the weights of the LSTM layer are composed of i weights of the fully connected layer, where i is a positive integer greater than 0. The weight of each fully connected layer is a two-dimensional matrix (Nin_i, Nout_i), where Nin_i represents a count of input neurons of the $i^{th}$ weight of the fully connected layer and Nout_i represents a count of output neurons of the $i^{th}$ weight of the fully connected layer. The size of the sliding window is Bin_i*Bout_i, where Bin_i is a positive integer greater than 0 and less than or equal to Nin_i, and Bout_i is a positive integer greater than 0 and less than or equal to Nout_i. The performing pruning on the weight of the LSTM layer of the neural network may include:

making the sliding window slide Sin_i stride in the direction of Bin_i, or slide Sout_i stride in the direction of Bout_i, where Sin_i is a positive integer greater than 0 and less than or equal to Bin_i, and Sout_i is a positive integer greater than 0 and less than or equal to Bout_i; and selecting M weights from the Nin_i*Nout_i weights through the sliding window, setting all or part of the M weights to 0 when the M weights meet the preset condition, where M=Bin_i*Bout_i.

In step S27013, retraining the pruned neural network by the back propagation algorithm, where the weight that has been set to 0 during the training remains 0.

The first retraining: retraining the pruned neural network by the back propagation algorithm, where the weight that has been set to 0 during the training remains 0; continuously repeating coarse-grained pruning and retraining until no weight can be set to 0 without losing a preset precision, where x is a number greater than 0 and less than 100, x may have different choices depending on different neural networks and different disclosures. In an embodiment, the value of x may be 0-5.

The step S2702 may be summarized as performing quantization and retraining, and specifically include the following steps.

In step S27021, grouping the weight of the neural network.

In step S27022, clustering each group of weights adopting the clustering algorithm, dividing a group of weights into m classes, computing the center weight of each class, replacing all the weights of each class by the center weight corresponding to the class, where m is a positive integer greater than 0.

In step S27023, encoding the center weight to obtain the weight codebook and the weight dictionary.

In step S27024, retraining the neural network by the back propagation algorithm, where the weight that has been set to 0 during the training remains 0, and only the weight codebook is trained, while the weight dictionary is not trained.

The grouping the weights of the neural network in step S27021 may include:

grouping the weights of the neural network into one group, and/or;

grouping the weights of the neural network according to the layer-type-based grouping method, and/or;

grouping the weights of the neural network by an inter-layer-based grouping method or an intra-layer-based grouping method.

As shown in FIG. 23, the weights are grouped according to the above grouping methods to obtain an ordered matrix of weights. Then, the intra-group sampling and clustering operation are performed on the weight matrix after grouping, so that the weights with similar values are classified into the same class, and the four center weights of 1.50, −0.13, −1.3, and 0.23 are obtained, where the four center weights are corresponding to the weights of four classes. Next, the center weight is encoded, where the class with a center weight of −1.3 is encoded as 00, the class with a center weight of −0.13 is encoded as 01, the class with a center weight of 0.23 is encoded as 10, and the class with a weight of 1.50 is encoded as 11, and 00, 01, 10, 11 are the content of the weight codebook. In addition, the encoding contents (00, 01, 10 and 11) corresponding to the four center weight are respectively representing the weights in the corresponding classes, so as to obtain the weight dictionary.

The quantization process fully exploits the similarity of the inter-layer-based weights and the local similarity of the intra-layer-based weights of the neural network, and obtains the weight distribution characteristics of the neural network to perform low-bit quantization, which may reduce a count of bits representing each weight, and reducing the weight storage overhead and the memory access overhead.

The center weight selection method may be: minimizing the cost function $J(w,w_0)$.

Furthermore, the cost function meets the condition:

$$J(w, w_0) = \sum_{i=1}^{n} (w_i - w_0)^2$$

where w is all the weights of a class, w0 is the center weight of the class, n is a count of weights in the class, wi is the $i^{th}$ weight of the class, and i is a positive integer greater than 0 and less than or equal to n.

Furthermore, the weights of the neural network are grouped according to layer-type-based during local quantization. For example, the weights of all convolutional layers are grouped into one group, and the weights of all the fully connected layers are grouped into one group, and the weights of all LSTM layers are divided into one group.

If a neural network has a total of t different types of layers such as i convolutional layers, j fully connected layers, and m LSTM layers, where i, j, m are integers greater than or equal to 0 and satisfy i+j+m>=1, t is an integer greater than or equal to 1 and satisfies t=i+j+m, and the weight of the neural network will be divided into t groups.

Furthermore, the weights of the neural network are grouped by an inter-layer-based grouping method during local quantization. For example, the one or more successive convolutional layers are grouped into one group, the one or more successive fully connected layers are grouped into one group, and the one or more successive LSTM layers are grouped into one group.

Furthermore, the weights of the neural network are grouped by an intra-layer-based grouping method during local quantization. The quantization on the weights in the convolutional layers, the fully connected layers and the LSTM layers of the neural network are grouped internally.

Specifically, the weights in the convolutional layers of the neural network may be regarded as a four-dimensional matrix (Nfin, Nfout, Kx, Ky), where Nfin, Nfout, Kx, Ky are positive integers, Nfin represents a count of input feature maps, and Nfout represents a count of output feature maps, (Kx, Ky) represents the size of the convolution kernel. The weights of the convolutional layers are grouped into Nfin*Nfout*Kx*Ky/(Mfin*Mfout*Mx*My) different groups according to the group size of (Mfin, Mfout, Mx, My), where Mfin is a positive integer less than or equal to Nfin, Mfout is a positive integer less than or equal to Nfout, Mx is a positive integer less than or equal to Kx, and My is a positive integer less than or equal to Ky.

Furthermore, the weight of the fully connected layer may be regarded as a two-dimensional matrix (Nin,Nout), where Nin and Nout are integers greater than 0, Nin represents a count of input neurons and Nout represents a count of output neurons, and the fully connected layer has Nin*Nout weights. The weights of the fully connected layers are grouped into (Nin*Nout)/(Min*Mout) different groups according to the group size of (Mfin, Mfout), where Min is a positive integer greater than 0 and less than or equal to Nin, and Mout is a positive integer greater than 0 and less than or equal to Nout.

Furthermore, the weights in the LSTM layers of the neural network are regarded as a combination of the weights of a plurality of fully connected layers. It is assumed that the weights of the LSTM layer are composed of the weights of n fully connected layers, n is a positive integer, therefore each fully connected layer can be grouped according to the grouping mode of the fully connected layer.

According to another aspect of the present disclosure, the present disclosure provides a neural network data compression device. FIG. 21 is a schematic structure diagram of a data compression device according to an embodiment of the disclosure. As shown in FIG. 21, the data compression device may include:
- a memory 1 configured to store an operation instruction, where the operation instruction is generally a binary number composed of an operation code and an address code, the operation code indicates an operation to be performed by a processor 2, and the address code indicates the address of the memory 1 where the processor 2 reads data participating in the operation;
- a processor 2 configured to execute an operation instruction in the memory 1 in accordance with the data quantization method.

By executing the operation instruction in the memory 1 in accordance with the coarse-grained pruning and quantization method, the processor 2 of the compression device may regularly prune the neural network and reduce a parameter of the neural network, quantize the disordered weights to obtain low bit and normalized quantized weight. The data compression device of the present disclosure may fully exploit the similarity of the inter-layer-based weights and the local similarity of the intra-layer-based weights of the neural network, and obtain the weight distribution characteristics of the neural network to perform low-bit quantization, which may reduce a count of bits representing each weight, and reducing the weight storage overhead and the memory access overhead.

Figure 28:
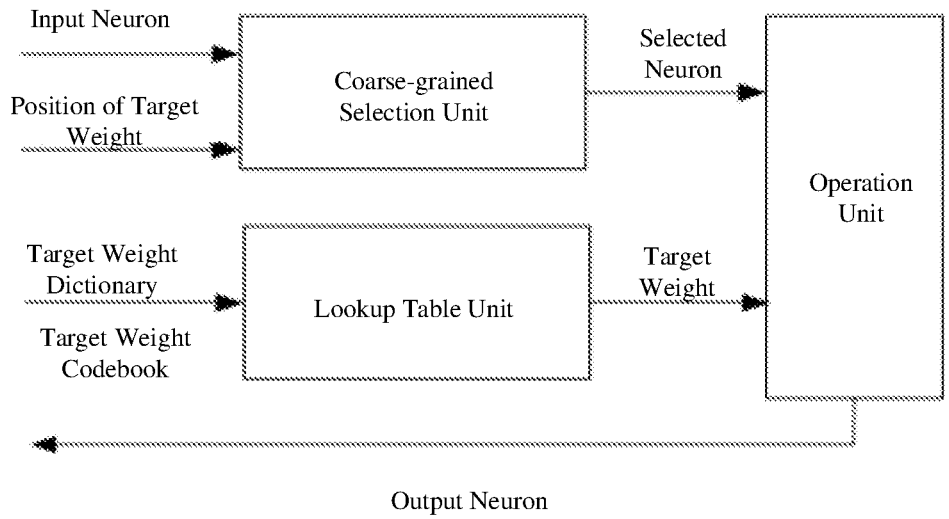
FIG. 28 is a schematic structure diagram of another processing device according to an embodiment of the disclosure.

FIG. 28 is a schematic structure diagram of another processing device according to an embodiment of the disclosure. The present disclosure provides a processing device applied to a neural network processor, so that the neural network processor may fully exploit the characteristics of coarse-grained sparsification and local quantization, reduce the amount of memory access and computation, thereby obtaining an acceleration ratio and reducing energy consumption.

The processing device of the present disclosure may include a coarse-grained selection unit, a lookup table unit and an operation unit.

The coarse-grained selection unit may be configured to receive an input neuron and a position information of a target weight and select a neuron to be computed.

The lookup table unit may be configured to receive a target weight dictionary and a target weight codebook, and perform a table lookup operation to obtain a target weight of the neural network.

The operation unit may be configured to receive the selected neuron and the target weight, complete the neural network operation, and retransmit the output neuron to the storage unit.

Furthermore, the coarse-grained selection unit may be specifically configured to receive the input neuron and the position information of the target weight, and select the neuron corresponding to the target weight (that is, the selected neuron) according to the position information of the target weight and transmit the neuron to the operation unit.

Further, the lookup table unit may be configured to find a quantized target weight based on the weight codebook and the weight dictionary and transmit it to the operation unit. The lookup table unit may be further configured to transmit an unquantized target weight directly to the operation unit by a bypass.

Further, the operations performed by the operation unit may include: the first part multiplies input data 1 and input data 2 to obtain a product; and/or the second part performs an adder tree operation, that is, the second part adds the input data 1 through an adder tree step by step, or adds the input data 1 to the input data 2 to obtain output data; and/or the third part performs an activation function, that is, the third part performs the activation function on the input data to obtain the output data; and/or the fourth part performs pooling operation, and the process is out=pool(in), where pool represents the pooling operation. The pooling operation may include but not be limited to: mean pooling, maximum pooling, or median pooling. The input data in is the data in a pooling core associated with the output data(out). One or more operations parts may be freely selected in different orders to achieve the operations with various functions.

Specifically, the operation unit may include but not be limited to three parts: a first part is a multiplier, a second part is an adder tree, a third part is an activation function unit, and a fourth part is a pooling unit. The first part may multiply the input data 1 (in1) and the input data 2 (in2) to obtain the output data (out), where the process is: out=in1*in2. The second part may add the input data in1 through the adder tree step by step to obtain the output data (out), where in1 is a vector of length N, and N is greater than 1, the process is: out=in1[1]+in1[2]+ . . . +in1[N]; and/or add the input data 1 in1 step by step through the adder tree to obtain a sum, and then add the sum and the input data 2 in2 to obtain the output data(out), the process is: out=in1[1]+in1[2]+ . . . +in1[N]+in2; or add the input data (in1) and the input data (in2) to obtain the output data (out), the process is: out=in1+in2. The third part may perform the active operation on the input data in to obtain the output data(out), the process is out=active (in), where the active operation may include sigmoid, tan h, relu, softmax, and the like; in addition to the active operation, the third part may implement other non-linear functions, that is, the third part perform an operation (f) on the input data (in) to obtain the output data (out), the process is: out=f(in). The fourth part may perform the pooling operation on the input data (in) to obtain the output data (out), the process is out=pool(in), where pool represents the pooling operation, and the pooling operation may include but not be limited to: mean pooling, maximum pooling, or median pooling. The input data in is the data in a pooling core associated with the output data(out).

Figure 29:
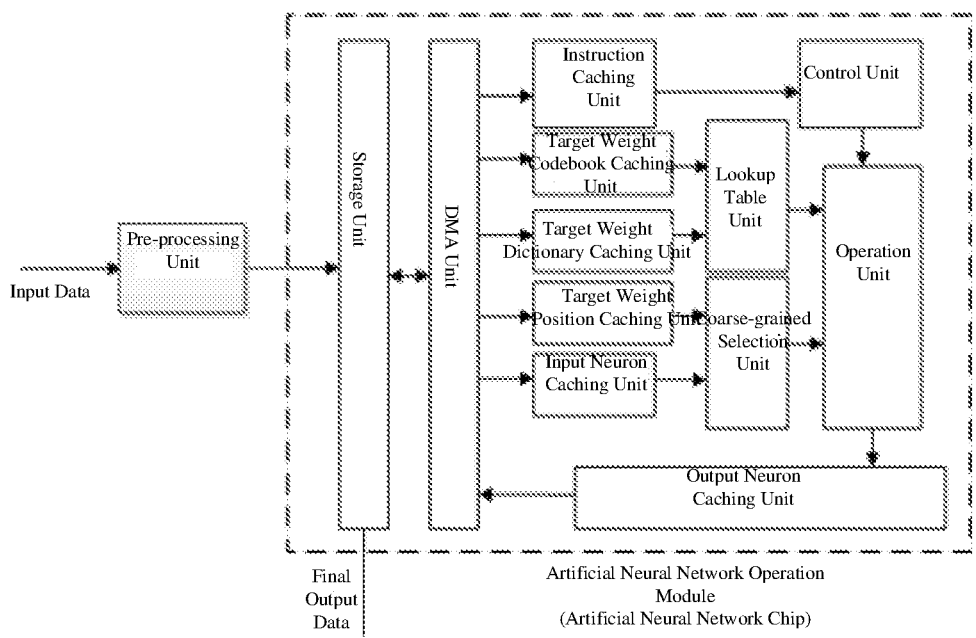
FIG. 29 is a schematic structure diagram of a neural network processor according to an embodiment of the disclosure.

Further, as shown in FIG. 29, the neural network processor may include a pre-processing unit configured to pre-process original data, and the pre-processing operation may include data segmentation, Gaussian filter, binarization, regularization, normalization, and the like.

Further, the processor may include a storage unit configured to store the neuron, weight, and instruction in the neural network.

Further, when the storage unit stores the weight, only the target weight and the position information of the weight are stored. When the storage unit stores the quantized target weight, only the target weight codebook and the target weight dictionary are stored.

The processor may further include an instruction control unit configured to receive the instruction in the storage unit, and decode the instruction to obtain the control information so as to control the coarse-grained selection unit to perform selection operation and the operation unit to perform computation.

Alternatively, the instruction may be neural network dedicated instruction including all instructions dedicated to completing artificial neural network operations.

The neural network dedicated instruction may include but not be limited to a control instruction, a data transfer instruction, an operation instruction, and a logical instruction, where the control instruction may be configured to control the neural network execution process. The data transfer instruction may be configured to transfer data between different storage media, and the data format may include but not be limited to matrix, vector and scalar. The operation instruction may be configured to perform a neural network arithmetic operation, and the operation instruction may include but not be limited to a matrix operation instruction, a vector operation instruction, a scalar operation instruction, a convolutional neural network operation instruction, a fully connected neural network operation instruction, a pooling neural network operation instruction, an RBM neural network operation instruction, an LRN neural network operation instruction, an LCN neural network operation instruction, an LSTM neural network operation instruction, an RNN operation instruction, an ReLU neural network operation instruction, a PReLU neural network operation instruction, a SIGMOID neural network operation instruction, a TAN H neural network operation instruction, and a MAXOUT neural network operation instruction. The logical instruction may be configured to perform a logical operation of the neural network, and the logical instruction may include but not be limited to a vector logical operation instruction and a scalar logical operation instruction.

Specifically, the neural network dedicated instruction may include a Cambricon instruction set.

The Cambricon instruction set is characterized in that each instruction length in the instruction set is a fixed length, for example, the instruction length is 64 bits, and the instruction is composed of an operation code and an operand. The instruction set may include four types of instructions: a control instruction, a data transfer instruction, an operation instruction, and a logical instruction.

The control instruction may be configured to control the execution process, and the control instruction may include a jump instruction and a conditional branch instruction.

The data transfer instruction may be configured to transfer data between different storage media, and the data transfer instruction may include a loading instruction, a storage instruction, and a moving instruction; where the loading instruction may be configured to load data from a main memory to a cache; the storage instruction may be configured to store data from the cache to the main memory; and the moving instruction may be configured to move data from the cache to another cache or from the cache to a register or from the register to another register. The data transfer instruction may support three different ways of organizing data including matrix, vector, and scalar.

The operation instruction may be configured to perform a neural network arithmetic operation, and the operation instruction may include a matrix operation instruction, a vector operation instruction, and a scalar operation instruction.

Further, the matrix operation instruction may be configured to complete a matrix operation in the neural network, and the matrix operation may include a matrix-vector multiplication operation, a vector multiply matrix operation, a matrix multiply scalar operation, an outer product operation, a matrix-add-matrix operation, and a matrix-subtract-matrix operation.

The vector operation instruction may be configured to complete a vector operation in the neural network and the vector operation instruction may include a vector elementary operation, a vector transcendental function operation, a dot product operation, a random vector generation operation, and an operation of maximum/minimum of a vector, where the vector elementary operation may include vector addition, subtraction, multiplication, and division; the vector transcendental function may refer to a function which does not meet any polynomial equation taking polynomials as coefficients, and the function may include an exponential function, a logarithmic function, a trigonometric function, and an anti-trigonometric function.

The scalar operation instruction may be configured to complete a scalar operation in the neural network, and the scalar operation instruction may include a scalar elementary operation instruction and a scalar transcendental function instruction. The scalar elementary operation may include scalar addition, subtraction, multiplication, and division; the scalar transcendental function may refer to a function which does not meet any polynomial equation taking polynomials as coefficients, and the scalar transcendental function may include an exponential function, a logarithmic function, a trigonometric function, and an anti-trigonometric function.

The logical instruction may be configured to complete the neural network logical operation, and the logical instruction may include a vector logical operation instruction and a scalar logical operation instruction.

The vector logical operation instruction may include vector comparing instruction and vector logical operation. The vector comparing operation may include but not be limited to greater than, smaller than, equal to, greater than or equal (≥), less than or equal to (≤), and unequal to. The vector logical operation may include AND, OR, and NOT.

The scalar logical operation may include a scalar comparing operation and a scalar logical operation. The scalar comparing operation may include greater than, smaller than, equal to, greater than or equal (≥), less than or equal (≤), and unequal to. The scalar logical operation may include AND, OR, and NOT.

Furthermore, as shown in FIG. 29, the neural network processor may include a DMA unit.

As shown in FIG. 29, the neural network processor may further include an instruction caching unit, an input neuron caching unit, a target weight codebook caching unit, a target weight dictionary caching unit, a target weight position caching unit, and an output neuron caching unit.

Specifically, the storage unit may be configured to store the neuron, weight, and instruction in the neural network. When the storage unit stores the weight, only the target weight and the position information of the weight are stored. When the storage unit stores the quantized target weight, only the target weight codebook and the target weight dictionary are stored.

The DMA unit may be configured to read/write data or instruction in the storage unit, the instruction caching unit, the target weight codebook caching unit, the target weight dictionary caching unit, the target weight position caching unit, the input neuron caching unit, and the output neuron caching unit.

The instruction caching unit may be configured to store a dedicated instruction.

The target weight codebook caching unit may be configured to cache the target weight codebook.

The target weight dictionary caching unit may be configured to cache the target weight dictionary.

The target weight position caching unit may be configured to cache the position information of the target weight, and map each connection weight in the input data to the corresponding input neuron one-to-one.

In one case, a one-to-one cache method adopted by the target weight position caching unit may be: 1 indicating that the input neuron is connected to the output neuron by the weight, 0 indicating that the input neuron is not connected to the output neuron by the weight, the connection status of all the input neurons and output neuron of each group forming a string of 0 and 1 to indicate the connection relationship of the output neuron. In another case, the one-to-one cache method adopting by the target weight position caching unit may be: 1 indicating that the input neuron is connected to the output neuron by the weight, 0 indicating that the input neuron is not connected to the output neuron by the weight, and the connection status of all the out neurons and input neuron of each group forming a string of 0 and 1 to indicate the connection relationship of the input neuron. In another case, the one-to-one cache method adopted by the target weight position caching unit may be: combining a distance from the input neuron where a first connection is located in a first group to a first input neuron, a distance from the input neuron where a second connection is located to a previous connection in the input neuron, a distance from the input neuron where a third connection is located to the previous connection in the input neuron, . . . , and so on, until all the input of the output are exhausted, where the connection array is used to represent the corresponding connection status of the output neuron.

The input neuron caching unit may be configured to cache the input neuron input to the coarse-grained selection unit.

The output neuron caching unit may be configured to cache the output neuron output by the operation unit.

The lookup table unit may be configured to receive the target weight codebook and the target weight dictionary, perform table lookup operation to obtain the target weight. The lookup table unit may be further configured to transmit an unquantized target weight directly to the operation unit by a bypass.

It should be noted that the pre-processing unit, the storage unit, the DMA unit, the coarse-grained pruning unit, the instruction caching unit, the instruction control unit, the target weight caching unit, the target weight position caching unit, the input neuron caching unit, the output neuron caching unit, the coarse-grained selection unit and the operation unit are all physical hardware devices, not functional software units.

The present disclosure further provides a neural network data compression device including a storage device, an instruction decoding device, and a computation device. The storage device stores an instruction sequence of a compressed neural network, which includes a control instruction, a data transfer instruction, a computation instruction, and the like, and controls the computation device to complete the transformation of the neural network format and corresponding format compression task; the instruction decoding device receives the instruction in the storage device, where the instruction is decoded to generate a control signal to control the computation device; the computation device receives the control signal to perform the coarse-grained pruning and quantization operations on the neural network. The computation device may be configured to execute an executable instruction in the storage device in accordance with the data compression method described above.

Figure 30:
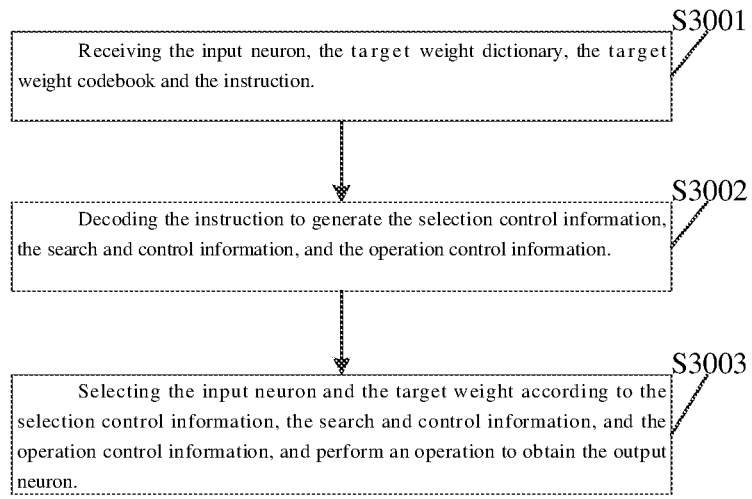
FIG. 30 is a flowchart of a method for processing neural network data according to an embodiment of the disclosure.

The present disclosure also provides a processing method for neural network data, as shown in FIG. 30, the processing method may include the following steps:

in step S3001, receiving the input neuron, the target weight dictionary, the target weight codebook, and instruction, where the target weight is a weight whose absolute value is greater than a given threshold;

in step S3002, decoding the instruction to obtain selection control information, search and control information, and operation control information;

in step S3003, selecting the input neuron and the target weight according to the selection control information, the search and control information, and the operation control information, and computing the input neuron and the target weight to obtain the output neuron.

In some embodiments, the processing method may further include receiving an unquantized target weight for performing the neural network operation.

In some embodiments, the processing method may further include receiving and decoding the instruction to generate the control information to control the operation of the neural network.

In some embodiments, the operation may include at least one of the following: a multiplication operation multiplying first input data and second input data to obtain a product; an addition operation adding third input data through a adder tree step by step, or adding the third input data to fourth input data to obtain a sum; and an activation function performing an activation function on fifth data to obtain output data, where the activation function may include sigmoid, tan h, relu, or softmax.

Furthermore, the operation may also include a pooling operation performed on sixth input data to obtain an output data, where the pooling operation may include average pooling, maximum pooling, and median pooling.

Furthermore, the instruction is a neural network dedicated instruction including a control instruction, a data transfer instruction, an operation instruction, and a logical instruction.

Further, the control instruction may be configured to control the execution process of the neural network, and the control instruction may include a jump instruction and a conditional branch instruction.

Further, the data transfer instruction may be configured to transfer data between different storage media, and the data transfer instruction may include a loading instruction, a storage instruction, and a moving instruction.

In some embodiments, the operation instruction may be configured to perform a neural network arithmetic operation, and the operation instruction may include a matrix operation instruction, a vector operation instruction, a scalar operation instruction, a convolutional neural network operation instruction, a fully connected neural network operation instruction, a pooling neural network operation instruction, an RBM neural network operation instruction, an LRN neural network operation instruction, an LCN neural network operation instruction, an LSTM neural network operation instruction, an RNN operation instruction, an ReLU neural network operation instruction, a PReLU neural network operation instruction, a SIGMOID neural network operation instruction, a TAN H neural network operation instruction, and a MAXOUT neural network operation instruction.

Where, the RBM neural network operation instruction may be configured to implement an RBM neural network operation.

The LRN neural network operation instruction may be configured to implement an LRN neural network operation.

The LCN neural network operation instruction may be configured to implement an LCN neural network operation.

The LSTM neural network operation instruction may be configured to implement an LSTM neural network operation.

The RNN neural network operation instruction may be configured to implement an RNN neural network operation.

The RELU neural network operation instruction may be configured to implement an RELU neural network operation.

The PRELU neural network operation instruction may be configured to implement a PRELU neural network operation.

The SIGMOID neural network operation instruction may be configured to implement a SIGMOID neural network operation.

The TAN H neural network operation instruction may be configured to implement a TAN H neural network operation.

The MAXOUT neural network operation instruction may be configured to implement a MAXOUT neural network operation.

In an embodiment, the neural network dedicated instruction is a Cambricon instruction set. Each instruction in the Cambricon instruction set has a fixed length, for example, each instruction in the Cambricon instruction set has a length of 64 bits, and the instruction may be composed of an operation code and an operand.

In some embodiments, the logical instruction may be configured to perform the logical operation of the neural network, and the logical instruction may include a vector logical operation instruction and a scalar logical operation instruction.

In an embodiment, the vector logical operation instruction may include a vector comparing operation and a vector logical operation, preferably, the vector comparing operation may include but not be limited to greater than, less than, equal to, greater than or equal to ($\geq$), less than or equal to ($\leq$), and not equal to; and the vector logical operation may include AND, OR, and NOT.

The scalar logical operation may include a scalar comparing operation, a scalar logical operation; preferably, the scalar comparing operation may include but not be limited to greater than, less than, equal to, greater than or equal to ($\geq$), less than or equal to ($\leq$), and not equal to; the scalar logical operation may include AND, OR, and NOT.

In some embodiments, the processing method may further include pre-processing the input neuron and the position information of the target weight, where the pre-processing may include segmentation, Gaussian filter, binarization, regularization, and/or normalization.

In some embodiments, after receiving the selected neuron and the target weight, the processing method may further include the steps: storing the input neuron, the weight dictionary, the weight codebook and the instruction, and storing the output neuron; and caching the instruction, the input neuron, and the output neuron.

In some embodiments, the present disclosure provides a chip, which may include the neural network processor.

In some embodiments, the present disclosure provides a chip package structure, which may include the chip.

In some embodiments, the present disclosure provides a board card, which may include the chip package structure.

In some embodiments, the present disclosure provides an electronic device, which may include the board card.

The electronic device may include a robot, a computer, a printer, a scanner, a tablet computer, an intelligent terminal, a mobile phone, an automobile data recorder, a navigator, a sensor, a webcam, a cloud server, a camera, a video camera, a projector, a watch, an earphone, a mobile storage, a wearable device, a vehicle, a household electrical appliance, and/or a medical device.

The vehicles may include an airplane, a ship, and/or a car. The household electrical appliance may include a television, an air conditioner, a microwave oven, a refrigerator, an electric rice cooker, a humidifier, a washing machine, an electric lamp, a gas cooker, and a range hood. The medical device may include a nuclear magnetic resonance spectrometer, a B-ultrasonic scanner, and/or an electrocardiograph.

All of the modules in the embodiment of the disclosure may be hardware structures. Physical implementation of the hardware structures may include but not be limited to physical device, and the physical device may include but not be limited to transistors, memristors, and Deoxyribonucleic Acid (DNA) computers.

With the data compression method and processing method of the present disclosure, the neural network can be compressed regularly with a high compression ratio. The accelerating device may implement a compression method to achieve compression of the neural network. The accelerating device can fully exploit the characteristics of the compressed neural network, reduce the memory and the amount of computation, thereby obtaining an acceleration and reducing the energy consumption.

In order to make the purpose, technical solutions and advantages of the disclosure clearer, the disclosure will further be described below in combination with specific embodiments and with reference to the drawings in detail.

All of the modules in the embodiment of the disclosure may be hardware structures. Physical implementation of the hardware structures may include but not be limited to physical device, and the physical device may include but not be limited to transistors, memristors and Deoxyribonucleic Acid (DNA) computers.

The present disclosure provides a method of compressing the neural network, which may include the following steps: performing the coarse-grained pruning and the first retraining, as well as local quantization and the second retraining. Compared with the prior arts, the method can regularize the sparsification of the neural network, facilitate accelerating by using hardware, and reduce the storage space of the target weight position; local quantization can fully exploit the weight distribution characteristics of the neural network, reduce a count of bits of each weight, thereby further reducing storage overhead and memory access overhead.

FIG. 27 is a flowchart of a data compression method according to an embodiment of the disclosure. The data compression method may include the following steps.

In step S2701, selecting M weights from the neural network through a sliding window, where when the M weights meet a preset condition, all or part of the M weights may be set to 0; performing the first retraining on the neural network, where the weight which has been set to 0 in the retraining process remains 0.

In step S2702, grouping the weights of the neural network, clustering and encoding the weights in the groups, and performing the second retraining on the neural network after clustering and encoding.

The step S2701 may be summarized as performing coarse-grained pruning and the first retraining, and specifically include the following steps.

In step S27011, selecting M weights from the retrained neural network through the sliding window.

In step S27012, setting all or part of the M weights to 0 when the M weights meet the preset condition.

The preset condition is:
an information quantity of the M weights meets a preset judgment condition.

In an embodiment, the preset judgment condition may include a threshold judgment condition, where the threshold judgment condition may include one or some condition within or outside a given range of values: less than a given threshold, less than or equal to the given threshold, greater than the given threshold, greater than or equal to the given threshold.

Specifically, the information quantity of the M weights is less than the given threshold, where the information quantity of the M weights may include but not be limited to an arithmetic mean of an absolute value of the M weights, a geometric mean of the absolute value of the M weights or a maximum value of the absolute value of the M weights. The arithmetic mean of the absolute value of the M weights is less than a first threshold; or the geometric mean of the absolute value of the M weights is less than a second threshold; or the maximum value of the absolute value of the M weights is less than a third threshold. The first threshold, the second threshold, and the third threshold may be preset according to a situation, or be obtained by a computation of changing an input parameter in a preset formula, or be obtained by machine learning by those skilled in the art. The present disclosure does not specifically limit the method of obtaining the first threshold, the second threshold and the third threshold.

In an optional embodiment, the preset judgment condition may include a function mapping judgment condition which judges whether the M weights satisfy the given condition after a function transformation.

The weight of the neural network may include the weight in a fully connected layer, the weight in a convolutional layer and the weight in a LSTM layer.

As shown in FIG. 2, the weights of the fully connected layer may be regarded as a two-dimensional matrix (Nin, Nout), where Nin represents a count of input neurons and Nout represents a count of output neurons, and the fully connected layer has Nin*Nout weights. The size of the sliding window is Bin*Bout, where Bin is a positive integer greater than 0 and less than or equal to Nin, and Bout is a positive integer greater than 0 and less than or equal to Nout. The performing coarse-grained pruning on the weight of the fully connected layer of the neural network may include:
making the sliding window slide Sin stride in the direction of Bin, or slide Sout stride in the direction of Bout, where Sin is a positive integer greater than 0 and less than or equal to Bin, and Sout is a positive integer greater than 0 and less than or equal to Bout; and
selecting M weights from the Nin*Nout weights through the sliding window, setting all or part of the M weights to 0 when the M weights meet the preset condition, where M=Bin*Bout.

As shown in FIG. 3, the weight of the convolutional layer may be regarded as a four-dimensional matrix (Nfin, Nfout, Kx, Ky), where Nfin represents a count of input feature maps, and Nfout represents a count of output feature maps, (Kx, Ky) represents the size of the convolution kernel. When the coarse-grained pruning is performed on the weight of the convolutional layer, the sliding window may be determined as a four-dimensional sliding window with the size of Bfin*Bfout*Bx*By, where Bfin is a positive integer greater than 0 and less than or equal to Nfin, Bfout is a positive integer greater than 0 and less than or equal to Nfout, Bx is a positive integer greater than 0 and less than or equal to Kx, and By is a positive integer greater than 0 and less than or equal to Ky. The performing pruning on the weight of the convolutional layer of the neural network may include:
making the sliding window slide Sfin stride in the direction of Bfin, or slide Sfout stride in the direction of Bfout, or slide S stride in the direction of Bx, or slide Sy stride in the direction of By, where Sfin is a positive integer greater than 0 and less than or equal to Bfin, Sfout is a positive integer greater than 0 and less than or equal to Bfout, Sx is a positive integer greater than 0 and less than or equal to Bx, and Sy is a positive integer greater than 0 and less than or equal to By; and
selecting M weights from the Nfin*Nfout*Kx*Ky weights through the sliding window, and setting all or part of the M weights to 0 when the M weights meet the preset condition, where M=Bfin*Bfout*Bx*By.

The weights of the LSTM layer of the neural network are composed of a plurality of fully connected layer weights. It is assumed that the weights of the LSTM layer are composed of i weights of the fully connected layer, where i is a positive integer greater than 0. The weight of each fully connected layer is a two-dimensional matrix (Nin_i, Nout_i), where Nin_i represents a count of input neurons of the $i^{th}$ weight of the fully connected layer and Nout_i represents a count of output neurons of the $i^{th}$ weight of the fully connected layer.

The size of the sliding window is Bin_i*Bout_i, where Bin_i is a positive integer greater than 0 and less than or equal to Nin_i, and Bout_i is a positive integer greater than 0 and less than or equal to Nout_i. The performing pruning on the weight of the LSTM layer of the neural network may include:
  making the sliding window slide Sin_i stride in the direction of Bin_i, or slide Sout_i stride in the direction of Bout_i, where Sin_i is a positive integer greater than 0 and less than or equal to Bin_i, and Sout_i is a positive integer greater than 0 and less than or equal to Bout_i; and
  selecting M weights from the Nin_i*Nout_i weights through the sliding window, setting all or part of the M weights to 0 when the M weights meet the preset condition, where M=Bin_i*Bout_i.

In step S27013, retraining the pruned neural network by the back propagation algorithm, where the weight that has been set to 0 during the training remains 0.

The first retraining: retraining the pruned neural network by the back propagation algorithm, where the weight that has been set to 0 during the training remains 0; continuously repeating coarse-grained pruning and retraining until no weight can be set to 0 without losing a preset precision, where x is a number greater than 0 and less than 100, x may have different choices depending on different neural networks and different disclosures. In an embodiment, the value of x may be 0-5.

The step S2702 may be summarized as performing quantization and retraining, and specifically include the following steps.

In step S27021, grouping the weight of the neural network.

In step S27022, clustering each group of weights adopting the clustering algorithm, dividing a group of weights into m classes, computing the center weight of each class, replacing all the weights of each class by the center weight corresponding to the class, where m is a positive integer greater than 0.

In step S27023, encoding the center weight to obtain the weight codebook and the weight dictionary.

In step S27024, retraining the neural network by the back propagation algorithm, where the weight that has been set to 0 during the training remains 0, and only the weight codebook is trained, while the weight dictionary is not trained.

The grouping the weights of the neural network in step S27021 may include:
  grouping the weights of the neural network into one group, and/or;
  grouping the weights of the neural network according to the layer-type-based grouping method, and/or;
  grouping the weights of the neural network by an inter-layer-based grouping method or an intra-layer-based grouping method.

As shown in FIG. 23, the weights are grouped according to the above grouping methods to obtain an ordered matrix of weights. Then, the intra-group sampling and clustering operation are performed on the weight matrix after grouping, so that the weights with similar values are classified into the same class, and the four center weights of 1.50, −0.13, −1.3, and 0.23 are obtained, where the four center weights are corresponding to the weights of four classes. Next, the center weight is encoded, where the class with a center weight of −1.3 is encoded as 00, the class with a center weight of −0.13 is encoded as 01, the class with a center weight of 0.23 is encoded as 10, and the class with a weight of 1.50 is encoded as 11, and 00, 01, 10, 11 are the content of the weight codebook. In addition, the encoding contents (00, 01, 10 and 11) corresponding to the four center weight are respectively representing the weights in the corresponding classes, so as to obtain the weight dictionary. The quantization process fully exploits the similarity of the inter-layer-based weights and the local similarity of the intra-layer-based weights of the neural network, and obtains the weight distribution characteristics of the neural network to perform low-bit quantization, which may reduce a count of bits representing each weight, and reducing the weight storage overhead and the memory access overhead.

The center weight selection method may be: minimizing the cost function $J(w,w_0)$.

Furthermore, the cost function meets the condition:

$$J(w, w_0) = \sum_{i=1}^{n} (w_i - w_0)^2$$

where w is all the weights of a class, w0 is the center weight of the class, n is a count of weights in the class, wi is the $i^{th}$ weight of the class, and i is a positive integer greater than 0 and less than or equal to n.

Furthermore, the weights of the neural network are grouped according to layer-type-based during local quantization. For example, the weights of all convolutional layers are grouped into one group, and the weights of all the fully connected layers are grouped into one group, and the weights of all LSTM layers are divided into one group.

If a neural network has a total of t different types of layers such as i convolutional layers, j fully connected layers, and m LSTM layers, where i, j, and m are integers greater than or equal to 0 and satisfy i+j+m>=1, t is an integer greater than or equal to 1 and satisfies t=i+j+m, and the weight of the neural network will be divided into t groups.

Furthermore, the weights of the neural network are grouped by an inter-layer-based grouping method during local quantization. For example, the one or more successive convolutional layers are grouped into one group, the one or more successive fully connected layers are grouped into one group, and the one or more successive LSTM layers are grouped into one group.

Furthermore, the weights of the neural network are grouped by an intra-layer-based grouping method during local quantization. The quantization on the weights in the convolutional layers, the fully connected layers and the LSTM layers of the neural network are grouped internally.

Specifically, the weights in the convolutional layers of the neural network may be regarded as a four-dimensional matrix (Nfin, Nfout, Kx, Ky), where Nfin, Nfout, Kx, Ky are positive integers, Nfin represents a count of input feature maps, and Nfout represents a count of output feature maps, (Kx, Ky) represents the size of the convolution kernel. The weights of the convolutional layers are grouped into Nfin*Nfout*Kx*Ky/(Mfin*Mfout*Mx*My) different groups according to the group size of (Mfin, Mfout, Mx, My), where Mfin is a positive integer less than or equal to Nfin, Mfout is a positive integer less than or equal to Nfout, Mx is a positive integer less than or equal to Kx, and My is a positive integer less than or equal to Ky.

Furthermore, the weight of the fully connected layer may be regarded as a two-dimensional matrix (Nin,Nout), where Nin and Nout are integers greater than 0, Nin represents a count of input neurons and Nout represents a count of output neurons, and the fully connected layer has Nin*Nout weights. The weights of the fully connected layers are grouped into (Nin*Nout)/(Min*Mout) different groups according to the group size of (Mfin, Mfout), where Min is a positive integer greater than 0 and less than or equal to Nin, and Mout is a positive integer greater than 0 and less than or equal to Nout.

Furthermore, the weights in the LSTM layers of the neural network are regarded as a combination of the weights of a plurality of fully connected layers. It is assumed that the weights of the LSTM layer are composed of the weights of n fully connected layers, in which n is a positive integer, therefore each fully connected layer can be grouped according to the grouping mode of the fully connected layer.

According to another aspect of the present disclosure, the present disclosure provides a neural network data compression device. FIG. 21 is a schematic structure diagram of a data compression device according to an embodiment of the disclosure. As shown in FIG. 21, the data compression device may include:
- a memory 1 configured to store an operation instruction, where the operation instruction is generally a binary number composed of an operation code and an address code, the operation code indicates an operation to be performed by a processor 2, and the address code indicates the address of the memory 1 where the processor 2 reads data participating in the operation;
- a processor 2 configured to execute an operation instruction in the memory 1 in accordance with the data quantization method.

By executing the operation instruction in the memory 1 in accordance with the coarse-grained pruning and quantization method, the processor 2 of the compression device may regularly prune the neural network and reduce a parameter of the neural network, quantize the disordered weights to obtain low bit and normalized quantized weight. The data compression device of the present disclosure may fully exploit the similarity of the inter-layer-based weights and the local similarity of the intra-layer-based weights of the neural network, and obtain the weight distribution characteristics of the neural network to perform low-bit quantization, which may reduce a count of bits representing each weight, which may reduce the weight storage overhead and the memory access overhead.

FIG. 28 is a schematic structure diagram of another processing device according to an embodiment of the disclosure. The present disclosure provides a processing device applied to a neural network processor, so that the neural network processor may fully exploit the characteristics of coarse-grained sparsification and local quantization, reduce the amount of memory access and computation, thereby obtaining an acceleration ratio and reducing energy consumption.

The processing device of the present disclosure may include a coarse-grained selection unit, a lookup table unit, and an operation unit.

The coarse-grained selection unit may be configured to receive an input neuron and a position information of a target weight and select a neuron to be computed.

The lookup table unit may be configured to receive a target weight dictionary and a target weight codebook, and perform a table lookup operation to obtain a target weight of the neural network.

The operation unit may be configured to receive the selected neuron and the target weight, complete the neural network operation, and retransmit the output neuron to the storage unit.

Furthermore, the coarse-grained selection unit may be specifically configured to receive the input neuron and the position information of the target weight, and select the neuron corresponding to the target weight (that is, the selected neuron) according to the position information of the target weight and transmit the neuron to the operation unit.

Further, the lookup table unit may be configured to find a quantized target weight based on the weight codebook and the weight dictionary and transmit it to the operation unit. The lookup table unit may be further configured to transmit an unquantized target weight directly to the operation unit by a bypass.

Further, the operations performed by the operation unit may include: the first part multiplies input data 1 and input data 2 to obtain a product; and/or the second part performs an adder tree operation, that is, the second part adds the input data 1 through an adder tree step by step, or adds the input data 1 to the input data 2 to obtain output data; and/or the third part performs an activation function, that is, the third part performs the activation function on the input data to obtain the output data; and/or the fourth part performs pooling operation, and the process is out=pool(in), where pool represents the pooling operation. The pooling operation may include but not be limited to: mean pooling, maximum pooling, or median pooling. The input data in is the data in a pooling core associated with the output data (out). One or more operations parts may be freely selected in different orders to achieve the operations with various functions.

Specifically, the operation unit may include but not be limited to three parts: a first part is a multiplier, a second part is an adder tree, a third part is an activation function unit, and a fourth part is a pooling unit. The first part may multiply the input data 1 (in1) and the input data 2 (in2) to obtain the output data (out), where the process is: out=in1*in2. The second part may add the input data in1 through the adder tree step by step to obtain the output data (out), where in1 is a vector of length N, and N is greater than 1, the process is: out=in1[1]+in1[2]+ . . . +in1[N]; and/or add the input data 1 in1 step by step through the adder tree to obtain a sum, and then add the sum and the input data 2 in2 to obtain the output data(out), the process is: out=in1[1]+in1[2]+ . . . +in1[N]+in2; or add the input data (in1) and the input data (in2) to obtain the output data (out), the process is: out=in1+in2. The third part may perform the active operation on the input data in to obtain the output data(out), the process is out=active (in), where the active operation may include sigmoid, tan h, relu, softmax, and the like; in addition to the active operation, the third part may implement other non-linear functions, that is, the third part may perform an operation (f) on the input data (in) to obtain the output data (out), the process is: out=f(in). The fourth part may perform the pooling operation on the input data (in) to obtain the output data (out), the process is out=pool(in), where pool represents the pooling operation, and the pooling operation may include but not be limited to: mean pooling, maximum pooling, or median pooling. The input data in is the data in a pooling core associated with the output data (out).

Further, as shown in FIG. 29, the neural network processor may include a pre-processing unit configured to pre-process original data, and the pre-processing operation may include data segmentation, Gaussian filter, binarization, regularization, normalization, and the like.

Further, the processor may include a storage unit configured to store the neuron, weight and instruction in the neural network.

Further, when the storage unit stores the weight, only the target weight and the position information of the weight are stored. When the storage unit stores the quantized target weight, only the target weight codebook and the target weight dictionary are stored.

The processor may further include an instruction control unit configured to receive the instruction in the storage unit, and decode the instruction to obtain the control information so as to control the coarse-grained selection unit to perform selection operation and the operation unit to perform computation.

Alternatively, the instruction may be neural network dedicated instruction including all instructions dedicated to completing artificial neural network operations.

The neural network dedicated instruction may include but not be limited to a control instruction, a data transfer instruction, an operation instruction, and a logical instruction, where the control instruction may be configured to control the neural network execution process. The data transfer instruction may be configured to transfer data between different storage media, and the data format may include but not be limited to matrix, vector and scalar. The operation instruction may be configured to perform a neural network arithmetic operation, and the operation instruction may include but not be limited to a matrix operation instruction, a vector operation instruction, a scalar operation instruction, a convolutional neural network operation instruction, a fully connected neural network operation instruction, a pooling neural network operation instruction, an RBM neural network operation instruction, an LRN neural network operation instruction, an LCN neural network operation instruction, an LSTM neural network operation instruction, an RNN operation instruction, an ReLU neural network operation instruction, a PReLU neural network operation instruction, a SIGMOID neural network operation instruction, a TAN H neural network operation instruction, and a MAXOUT neural network operation instruction. The logical instruction may be configured to perform a logical operation of the neural network, and the logical instruction may include but not be limited to a vector logical operation instruction and a scalar logical operation instruction.

Where, the RBM neural network operation instruction may be configured to implement an RBM neural network operation.

The LRN neural network operation instruction may be configured to implement an LRN neural network operation.

The LCN neural network operation instruction may be configured to implement an LCN neural network operation.

The LSTM neural network operation instruction may be configured to implement an LSTM neural network operation.

The RNN neural network operation instruction may be configured to implement an RNN neural network operation.

The RELU neural network operation instruction may be configured to implement an RELU neural network operation.

The PRELU neural network operation instruction may be configured to implement a PRELU neural network operation.

The SIGMOID neural network operation instruction may be configured to implement a SIGMOID neural network operation.

The TAN H neural network operation instruction may be configured to implement a TAN H neural network operation.

The MAXOUT neural network operation instruction may be configured to implement a MAXOUT neural network operation.

Specifically, the neural network dedicated instruction may include a Cambricon instruction set.

The Cambricon instruction set is characterized in that each instruction length in the instruction set is a fixed length, for example, the instruction length is 64 bits, and the instruction is composed of an operation code and an operand. The instruction set may include four types of instructions: a control instruction, a data transfer instruction, an operation instruction, and a logical instruction.

The control instruction may be configured to control the execution process, and the control instruction may include a jump instruction and a conditional branch instruction.

The data transfer instruction may be configured to transfer data between different storage media, and the data transfer instruction may include a loading instruction, a storage instruction, and a moving instruction; where the loading instruction may be configured to load data from a main memory to a cache; the storage instruction may be configured to store data from the cache to the main memory; and the moving instruction may be configured to move data from the cache to another cache or from the cache to a register or from the register to another register. The data transfer instruction may support three different ways of organizing data including matrix, vector, and scalar.

The operation instruction may be configured to perform a neural network arithmetic operation, and the operation instruction may include a matrix operation instruction, a vector operation instruction, and a scalar operation instruction.

Further, the matrix operation instruction may be configured to complete a matrix operation in the neural network including a matrix-vector multiplication operation, a vector multiply matrix operation, a matrix multiply scalar operation, an outer product operation, a matrix-add-matrix operation, and a matrix-subtract-matrix operation.

The vector operation instruction may be configured to complete a vector operation in the neural network including a vector elementary operation, a vector transcendental function operation, a dot product operation, a random vector generation operation, and operation of maximum/minimum of a vector, where the vector elementary operation may include vector addition, subtraction, multiplication, and division; the vector transcendental function may refer to a function which does not meet any polynomial equation taking polynomials as coefficients, and the function may include an exponential function, a logarithmic function, a trigonometric function, and an anti-trigonometric function.

The scalar operation instruction may be configured to complete a scalar operation in the neural network including a scalar elementary operation, and a scalar transcendental function. The scalar elementary operation may include scalar addition, subtraction, multiplication, and division; the scalar transcendental function may refer to a function which does not meet any polynomial equation taking polynomials as coefficients, and the scalar transcendental function may include an exponential function, a logarithmic function, a trigonometric function, and an anti-trigonometric function.

The logical instruction may be configured to complete the neural network logical operation, and the logical instruction may include a vector logical operation instruction and a scalar logical operation instruction.

The vector logical operation instruction may include vector comparing instruction and vector logical operation, and vector greater than merge. The vector comparing operation may include but not be limited to greater than, smaller than, equal to, greater than or equal (≥), less than or equal to (≤), and unequal to. The vector logical operation may include AND, OR, and NOT.

The scalar logical operation may include a scalar comparing operation and a scalar logical operation. The scalar comparing operation may include greater than, smaller than, equal to, greater than or equal (≥), less than or equal (≤), and unequal to. The scalar logical operation may include AND, OR, and NOT.

Furthermore, as shown in FIG. 29, the neural network processor may include a DMA unit.

As shown in FIG. 29, the neural network processor may further include an instruction caching unit, an input neuron caching unit, a target weight codebook caching unit, a target weight dictionary caching unit, a target weight position caching unit, and an output neuron caching unit.

Specifically, the storage unit may be configured to store the neuron, weight and instruction in the neural network. When the storage unit stores the weight, only the target weight and the position information of the weight are stored. When the storage unit stores the quantized target weight, only the target weight codebook and the target weight dictionary are stored.

The DMA unit may be configured to read/write data or instruction in the storage unit, the instruction caching unit, the target weight codebook caching unit, the target weight dictionary caching unit, the target weight position caching unit, the input neuron caching unit, and the output neuron caching unit.

The instruction caching unit may be configured to store a dedicated instruction.

The target weight codebook caching unit may be configured to cache the target weight codebook.

The target weight dictionary caching unit may be configured to cache the target weight dictionary.

The target weight position caching unit may be configured to cache the position information of the target weight, and map each connection weight in the input data to the corresponding input neuron one-to-one.

In one case, a one-to-one cache method adopted by the target weight position caching unit may be: 1 indicating that the input neuron is connected to the output neuron by the weight, 0 indicating that the input neuron is not connected to the output neuron by the weight, the connection status of all the input neurons and output neuron of each group forming a string of 0 and 1 to indicate the connection relationship of the output neuron. In another case, the one-to-one cache method adopting by the target weight position caching unit may be: 1 indicating that the input neuron is connected to the output neuron by the weight, 0 indicating that the input neuron is not connected to the output neuron by the weight, the connection status of all the out neurons and input neuron of each group forming a string of 0 and 1 to indicate the connection relationship of the input neuron. In another case, the one-to-one cache method adopted by the target weight position caching unit may be: combining a distance from the input neuron where a first connection is located in a first group to a first input neuron, a distance from the input neuron where a second connection is located to a previous connection in the input neuron, a distance from the input neuron where a third connection is located to the previous connection in the input neuron, . . . , and so on, until all the input of the output are exhausted, where the connection array is used to represent the corresponding connection status of the output neuron.

The input neuron caching unit may be configured to cache the input neuron input to the coarse-grained selection unit.

The output neuron caching unit may be configured to cache the output neuron output by the operation unit.

The lookup table unit may be configured to receive the target weight codebook and the target weight dictionary, perform table lookup operation to obtain the target weight. The lookup table unit may be further configured to transmit an unquantized target weight directly to the operation unit by a bypass.

The pre-processing unit, the storage unit, the DMA unit, the instruction caching unit, the instruction control unit, the target weight codebook caching unit, the target weight dictionary caching unit, the target weight position caching unit, the input neuron caching unit, and the output neuron caching unit, the lookup table unit, the coarse-grained selection unit and the operation unit are all physical hardware devices, not functional software units.

The present disclosure further provides a neural network data compression device including a storage device, an instruction decoding device and a computation device. The storage device stores an instruction sequence of a compressed neural network, which includes a control instruction, a data transfer instruction, a computation instruction, and the like, and controls the computation device to complete the transformation of the neural network format and corresponding format compression task; the instruction decoding device receives the instruction in the storage device, where the instruction is decoded to generate a control signal to control the computation device; the computation device receives the control signal to perform the coarse-grained pruning and quantization operations on the neural network. The computation device may be configured to execute an executable instruction in the storage device in accordance with the data compression method described above.

The present disclosure also provides a processing method for neural network data, as shown in FIG. 30, the processing method may include the following steps:

in step S3001, receiving the input neuron, the target weight dictionary, the target weight codebook and instruction, where the target weight is a weight whose absolute value is greater than a given threshold;

in step S3001, decoding the instruction to obtain selection control information, search and control information, and operation control information;

in step S3003, selecting the input neuron and the target weight according to the selection control information, the search and control information, and the operation control information, and computing the input neuron and the target weight to obtain the output neuron.

In some embodiments, the processing method may further include receiving an unquantized target weight for performing the neural network operation.

In some embodiments, the processing method may further include receiving and decoding the instruction to generate the control information to control the operation of the neural network.

In some embodiments, the operation may include at least one of the following: a multiplication operation multiplying first input data and second input data to obtain a product; an addition operation adding third input data through a adder tree step by step, or adding the third input data to fourth input data to obtain a sum; and an activation function performing an activation function on fifth data to obtain output data, where the activation function may include sigmoid, tan h, relu or softmax.

Furthermore, the operation may also include a pooling operation performed on sixth input data to obtain an output data, where the pooling operation may include average pooling, maximum pooling, and median pooling.

Furthermore, the instruction is a neural network dedicated instruction including a control instruction, a data transfer instruction, an operation instruction, and a logical instruction.

Further, the control instruction may be configured to control the execution process of the neural network, and the control instruction may include a jump instruction and a conditional branch instruction.

Further, the data transfer instruction may be configured to transfer data between different storage media, and the data transfer instruction may include a loading instruction, a storage instruction, and a moving instruction.

In some embodiments, the operation instruction may be configured to perform a neural network arithmetic operation, and the operation instruction may include a matrix operation instruction, a vector operation instruction, a scalar operation instruction, a convolutional neural network operation instruction, a fully connected neural network operation instruction, a pooling neural network operation instruction, an RBM neural network operation instruction, an LRN neural network operation instruction, an LCN neural network operation instruction, an LSTM neural network operation instruction, an RNN operation instruction, an ReLU neural network operation instruction, a PReLU neural network operation instruction, a SIGMOID neural network operation instruction, a TAN H neural network operation instruction, and a MAXOUT neural network operation instruction.

In some embodiments, the neural network dedicated instruction is a Cambricon instruction set. The length of each instruction in the Cambricon instruction set is 64 bits, and the instruction may be composed of an operation code and an operand.

In some embodiments, the logical instruction may be configured to perform the logical operation of the neural network, and the logical instruction may include a vector logical operation instruction and a scalar logical operation instruction.

In an embodiment, the vector logical operation instruction may include a vector comparing operation and a vector logical operation, preferably, the vector comparing operation may include but not be limited to greater than, less than, equal to, greater than or equal to ($\geq$), less than or equal to ($\leq$), and not equal to; and the vector logical operation may include AND, OR, and NOT.

The scalar logical operation may include a scalar comparing operation, a scalar logical operation; preferably, the scalar comparing operation may include but not be limited to greater than, less than, equal to, greater than or equal to ($\geq$), less than or equal to ($\leq$), and not equal to; the scalar logical operation may include AND, OR, and NOT.

In some embodiments, the processing method may further include pre-processing the input neuron and the position information of the target weight, where the pre-processing may include segmentation, Gaussian filter, binarization, regularization, and/or normalization.

In some embodiments, after receiving the selected neuron and the target weight, the processing method may further include the steps: storing the input neuron, the weight dictionary, the weight codebook and the instruction, and storing the output neuron; and caching the instruction, the input neuron, and the output neuron.

In some embodiments, the present disclosure provides a chip, which may include the neural network processor.

In some embodiments, the present disclosure provides a chip package structure, which may include the chip.

In some embodiments, the present disclosure provides a board card, which may include the chip package structure.

In some embodiments, the present disclosure provides an electronic device, which may include the board card.

The electronic device may include a robot, a computer, a printer, a scanner, a tablet computer, an intelligent terminal, a mobile phone, an automobile data recorder, a navigator, a sensor, a webcam, a cloud server, a camera, a video camera, a projector, a watch, an earphone, a mobile storage, a wearable device, a vehicle, a household electrical appliance, and/or a medical device.

The vehicles may include an airplane, a ship, and/or a car. The household electrical appliance may include a television, an air conditioner, a microwave oven, a refrigerator, an electric rice cooker, a humidifier, a washing machine, an electric lamp, a gas cooker, and a range hood. The medical device may include a nuclear magnetic resonance spectrometer, a B-ultrasonic scanner, and/or an electrocardiograph.

All of the modules in the embodiment of the disclosure may be hardware structures. Physical implementation of the hardware structures may include but not be limited to physical device, and the physical device may include but not be limited to transistors, memristors, and Deoxyribonucleic Acid (DNA) computers.

With the data compression method and processing method of the present disclosure, the neural network can be compressed regularly with a high compression ratio. The accelerating device may implement a compression method to achieve compression of the neural network. The accelerating device can fully exploit the characteristics of the compressed neural network, reduce the memory and the amount of computation, thereby obtaining an acceleration and reducing the energy consumption.

In the present specification, the following embodiments for describing the principle of the present disclosure are merely illustrative and should not be construed in any way as limiting the scope of the disclosure. The following description with reference to the drawings is provided to assist in a comprehensive understanding of the exemplary embodiments of the present disclosure as defined by the claims and the equivalents of the claims. The following description includes various specific details to facilitate the understanding, but these details should be regarded as merely exemplary. Therefore, those of ordinary skill in the art should realize that various changes and modifications of the embodiments described herein can be made without departing from the scope and spirit of the present disclosure. In addition, descriptions of well-known functions and structures are omitted for clarity and conciseness. Moreover, same reference numerals are used for similar functions and operations throughout the drawings. In the present disclosure, the terms "include" and "contain" and derivatives thereof are intended to be inclusive but not limiting.

The meaning of "row/column" in the specification means a row or a column, and a noun with "row/column", a "row" corresponds to a "row", and a "column" corresponds to a "column" For example, the connection array of the row/column of feature map composed of the input neuron and the output neuron selects out the row/column of feature map and the corresponding row/column of weight for computation, where the row/column of feature map and the corresponding weight of the row/column of feature map represent the following meanings: the connection array of the row of the feature map composed of the output neuron and the input neuron selects out the row of the feature map and the corresponding row of the feature map for computation, or the connection array of the column of the feature map composed of the output neuron and the input neuron selects out the row of the feature map and the corresponding column of the feature map for computation.

The present disclosure provides an operation device, an operation method, and a chip. A filtering unit is set between the input neuron and the output neuron, and the structural clipping is implemented by using a connection array of the feature map composed of the output neuron and the input neuron. The feature map and the corresponding weight of the feature map of the artificial neural network participating in the subsequent operations are selected out after structural clipping, which avoids computation redundancy and memory access redundancy caused by all input neurons and weights participating in the network operation, and solves the problem that the CPU and GPU have inadequate operational performance and the front-end decoding overhead is high, and fully exploits the reusability of input neurons and weights, reduces the memory access bandwidth and the amount of computation and memory, and achieves efficient output.

In order to make the purpose, technical solutions and advantages of the disclosure clearer, the disclosure will further be described below in combination with specific embodiments and with reference to the drawings in detail.

Figure 31A:
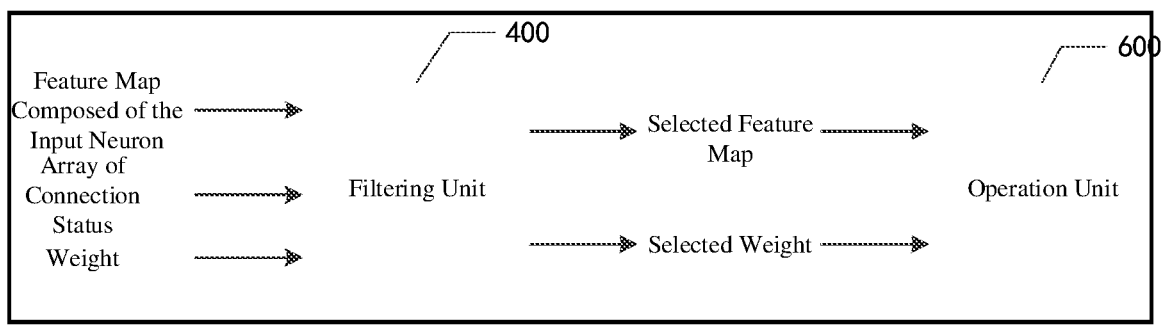
FIG. 31A is a schematic diagram of the function of a filtering unit of an operation device according to an embodiment of the disclosure.
Figure 31B:
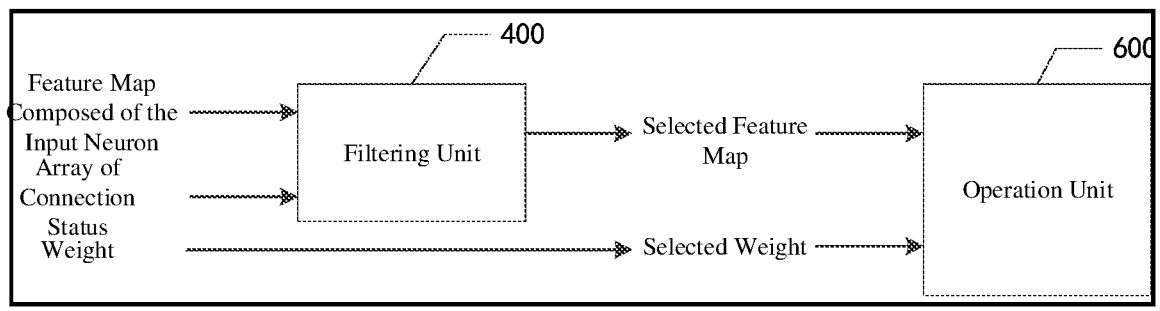
FIG. 31B is a schematic diagram of the function of a filtering unit of an operation device according to another embodiment of the disclosure.
Figure 31C:
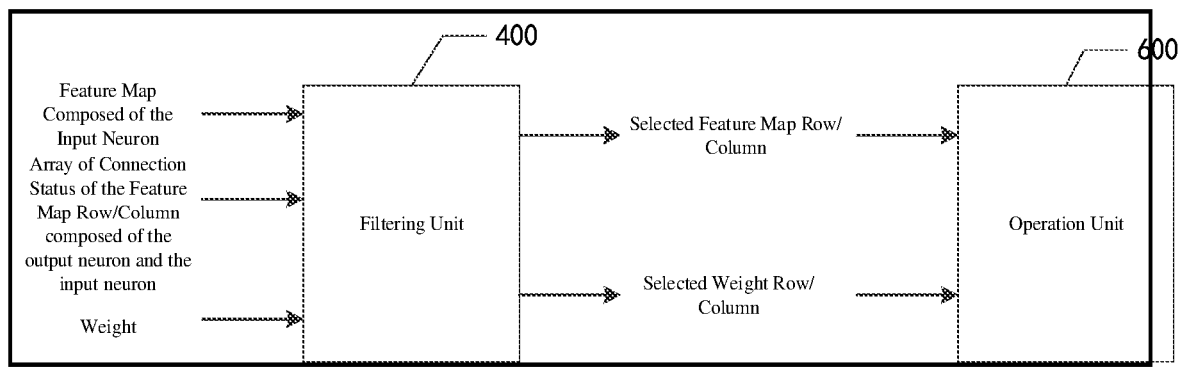
FIG. 31C is a schematic diagram of the function of a filtering unit of an operation device according to another embodiment of the disclosure.
Figure 31D:
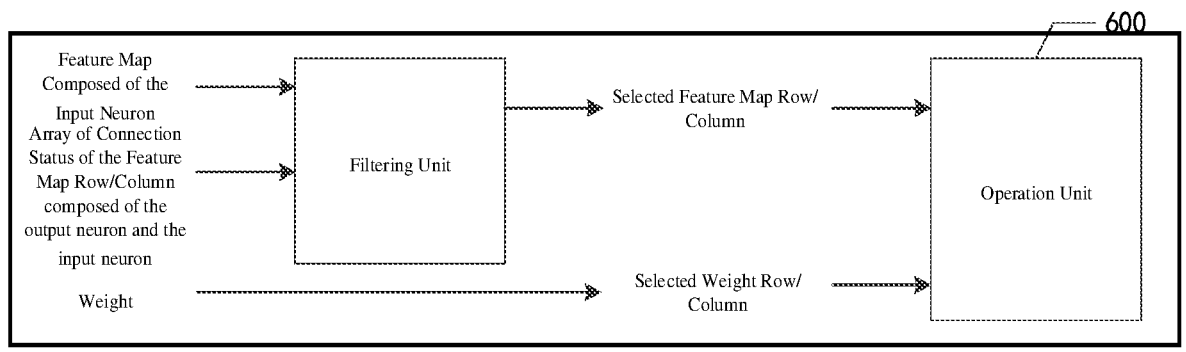
FIG. 31D is a schematic diagram of the function of a filtering unit of an operation device according to another embodiment of the disclosure.
Figure 32A:
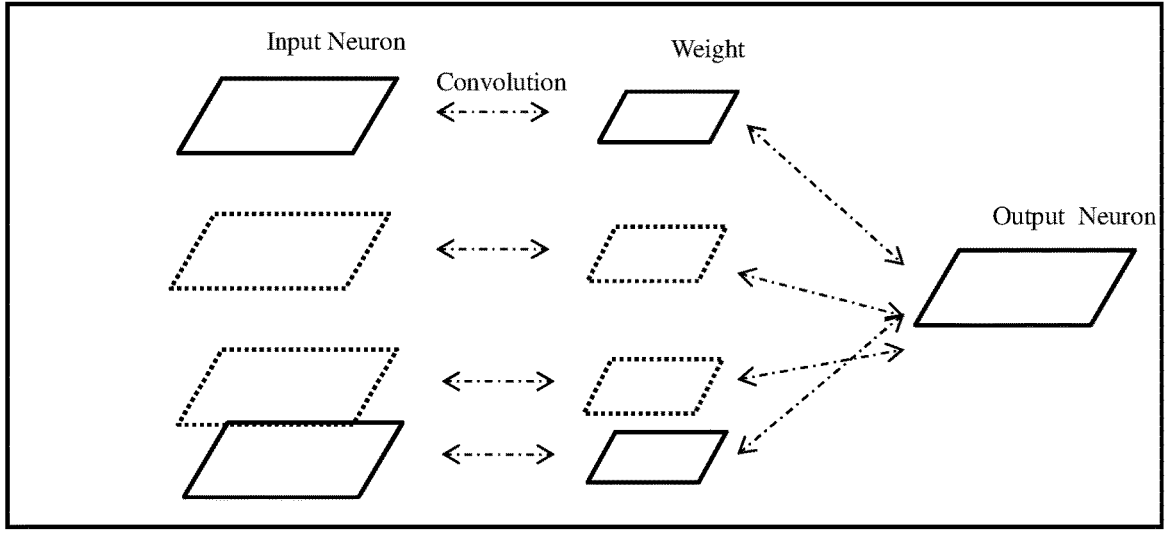
FIG. 32A is a comparative diagram of operations of a convolutional layer in an artificial neural network before structural clipping according to an embodiment of the present disclosure.
Figure 32B:
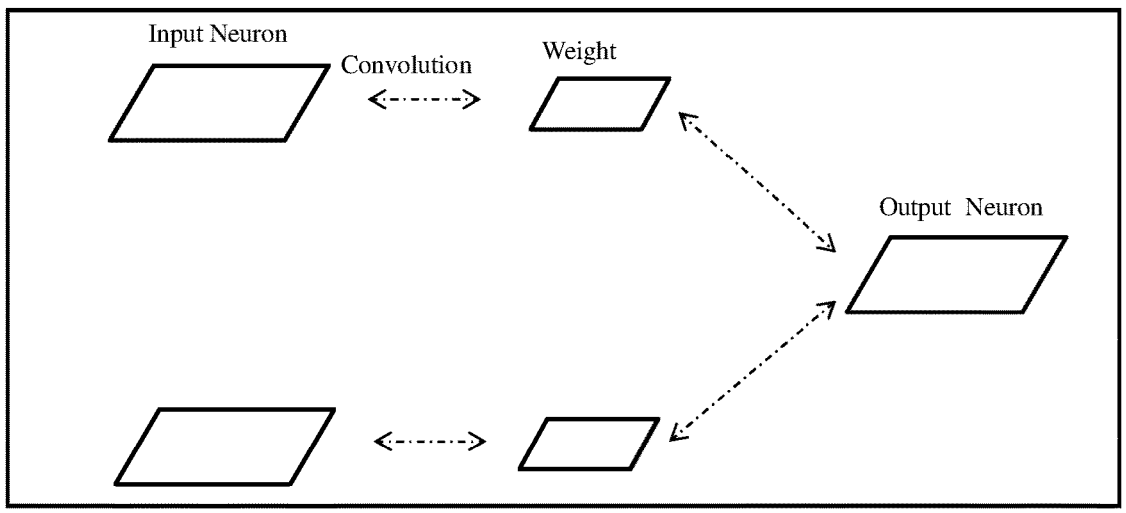
FIG. 32B is a comparative diagram of operations of a convolutional layer in an artificial neural network after structural clipping according to an embodiment of the present disclosure.
Figure 33:
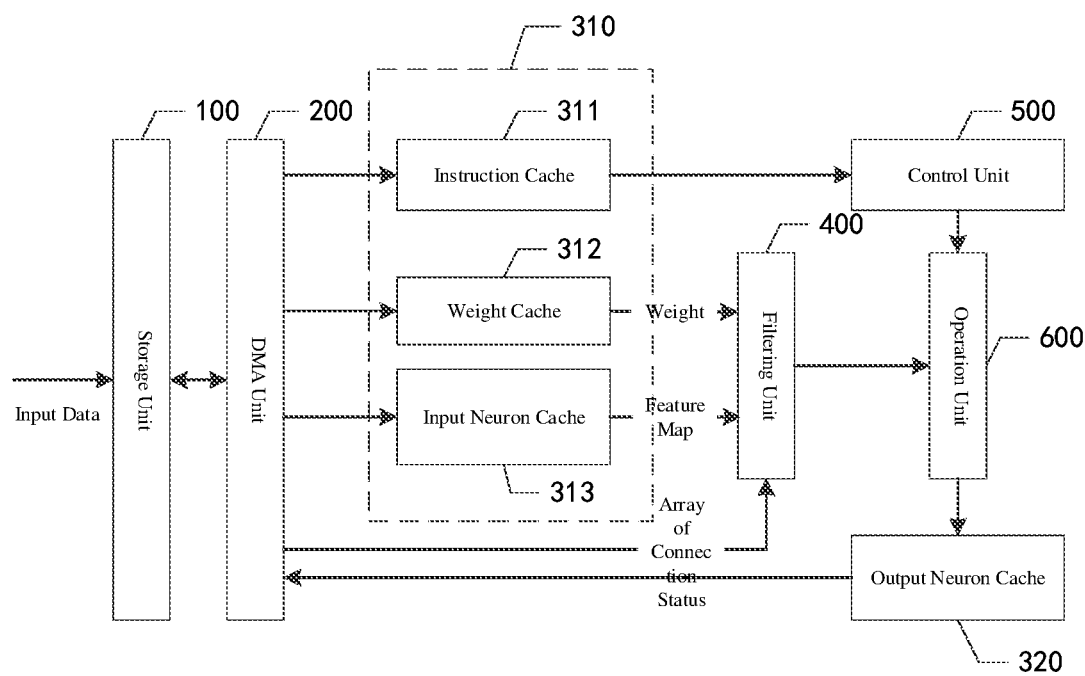
FIG. 33 is a schematic structure diagram of an operation device according to an embodiment of the disclosure.

The present disclosure provides an operation device. FIG. 31A is a schematic diagram of the function of a filtering unit of an operation device according to an embodiment of the disclosure. FIG. 31B is a schematic diagram of the function of a filtering unit of an operation device according to another embodiment of the disclosure. FIG. 31C is a schematic diagram of the function of a filtering unit of an operation device according to another embodiment of the disclosure. FIG. 31D is a schematic diagram of the function of a filtering unit of an operation device according to another embodiment of the disclosure. FIG. 32A is a comparative diagram of operations of a convolutional layer in an artificial neural network before structural clipping according to an embodiment of the present disclosure. FIG. 32B is a comparative diagram of operations of a convolutional layer in an artificial neural network after structural clipping according to an embodiment of the present disclosure. FIG. 33 is a schematic structure diagram of an operation device according to an embodiment of the disclosure.

As shown in FIG. 31A, FIG. 31B, FIG. 31C, FIG. 31D, FIG. 32A, FIG. 32B, and FIG. 33, the operation device may include:
- a storage unit 100 configured to store data and instruction;
- a caching unit 300 including an input caching unit 310 and an output neuron caching unit 320, where the input caching unit 310 may include an instruction caching unit 311, a weight caching unit 312, and an input neuron caching unit 313;
- a filtering unit 400 configured to select a feature map (i.e., input map) and a weight (i.e., kernel) corresponding to the feature map according to a connection array (i.e., index) of the feature map composed of an output neuron and an input neuron, and output the feature map and the weight corresponding to the feature map to an operation unit;
- a control unit 500 configured to read a dedicated instruction from the instruction caching unit 311, and decode the dedicated instruction to an operation instruction and input it to an operation unit;
- an operation unit 600 configured to perform a corresponding operation on input data according to an instruction stored in the storage unit 100; and
- a DMA (direct memory access) unit 200 configured to read/write data or instruction in the storage unit 100, the instruction caching unit 311, the weight caching unit 312, the input neuron caching unit 313, and the output neuron caching unit 320, and transmit the connection array to the filtering unit 400.

The connection array of the feature map composed of the output neuron and the input neuron is transmitted from the storage unit 100 to the filtering unit 400 by the DMA unit 200; the input neuron is sequentially transmitted from the storage unit 100 to the filtering unit 400 via the DMA unit 200 and the input neuron caching unit 313; the weight is sequentially transmitted from the storage unit 100 to the filtering unit 400 via the DMA unit 200 and the weight caching unit 312.

Each part of the operation device will be described in detail below.

The storage unit 100 may be configured to store data including a feature map composed of input neurons, the weight, the connection array, the output neuron, and the like.

The instruction caching unit 311 may be configured to store the dedicated instruction.

The weight caching unit 312 may be configured to cache the weight.

The input neuron caching unit 313 may be configured to cache the input neuron.

The output neuron caching unit 320 may be configured to cache the output neuron.

As shown in FIG. 31A, FIG. 31B, FIG. 31C, and FIG. 31D, the functions of the filtering unit 400 and the operation unit 600 are as follows:
- as shown in FIG. 31A, for the case where the weight has not been selected offline, the filtering unit 400 may select out the feature map participating in the subsequent operations and weights corresponding to the operations according to the connection array of the feature map composed of the output neuron and the input neuron, and transmit the input neuron of the feature map and the corresponding weight of the feature map to the operation unit 600 one time or in batch according to the scale; or
- as shown in FIG. 31C, for the case where the weight has not been selected offline, the filtering unit 400 may select out the row/column of feature map participating in the subsequent operations and the corresponding row/column of the weight according to the connection array of the row/column of feature map composed of the output neuron and the input neuron, and transmit the input neuron of the feature map and the corresponding weight of the feature map to the operation unit 600 one time or in batch according to the scale; or
- as shown in FIG. 31B, for the case where the weight has been selected offline, the filtering unit 400 may select out the feature map participating in the subsequent operations according to the connection array of the feature map composed of the output neuron and the input neuron, and transmit the input neuron of the feature map to the operation unit 600 one time or in batch according to the scale, at the same time, transmit the weight after offline selecting to the operation unit 600 directly; or
- as shown in FIG. 31D, for the case where the weight has been selected offline, the filtering unit 400 may select out the row/column of feature map participating in the subsequent operations according to the connection array of the row/column of feature map composed of the output neuron and the input neuron, and transmit the input neuron of the feature map to the operation unit 600 one time or in batch according to the scale, at the same time, transmit the row/column of the weight after offline selecting to the operation unit 600 directly.

Taking a convolutional layer as an example, the comparative diagrams of operations of a convolutional layer in an artificial neural network before and after structural clipping are shown in FIG. 32A and FIG. 32B. Before structural clipping, all the feature maps and weights participate the operation. While after the filtering unit performs selecting operation, only input neurons that are connected to the output neurons are selected out as valid feature maps for subsequent operations, which reduces the amount of computation and memory access, achieves structural clipping, improves computational efficiency, and reduces memory access bandwidth.

Figure 34:
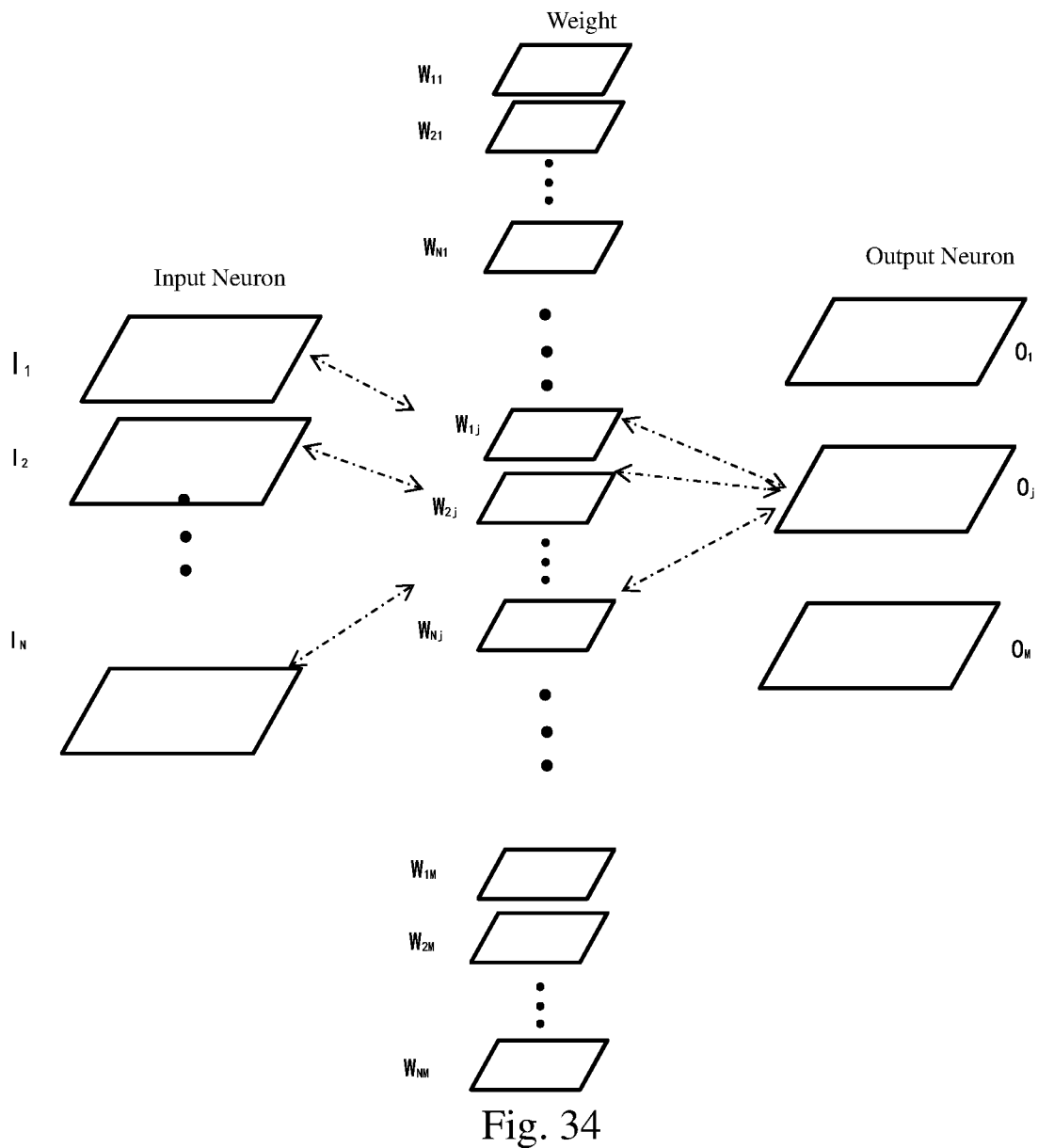
FIG. 34 is a schematic structure diagram of a convolutional layer in a neural network according to an embodiment of the disclosure.
Figure 35:
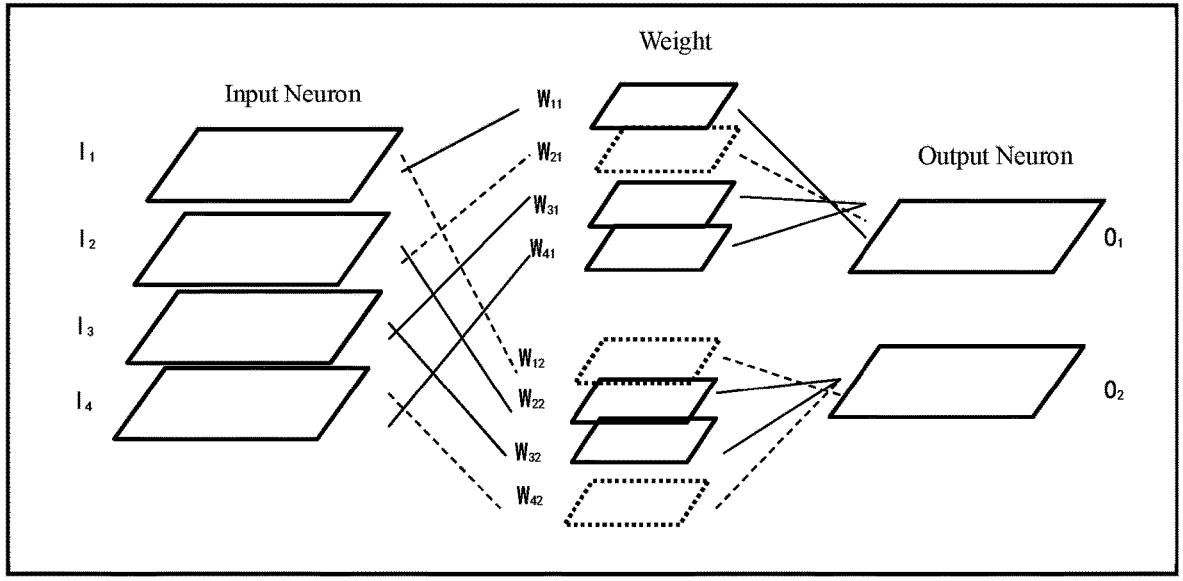
FIG. 35 is a schematic structure diagram of a structural clipping on an artificial neural network by using a filtering unit according to an embodiment of the present disclosure.
Figure 36:
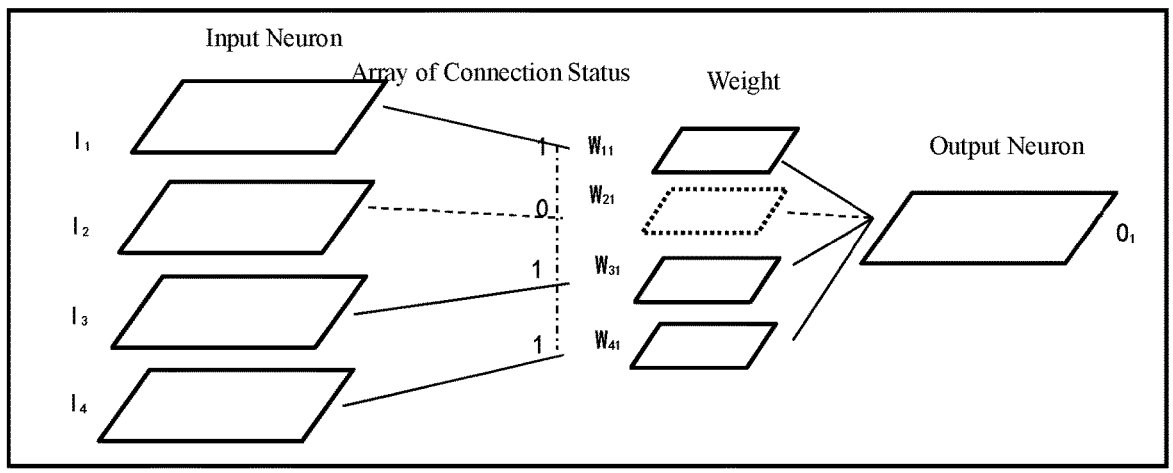
FIG. 36 is a schematic diagram showing an implementation of the structural clipping shown in FIG. 35 by using a connection array according to an embodiment of the present disclosure.
Figure 37:
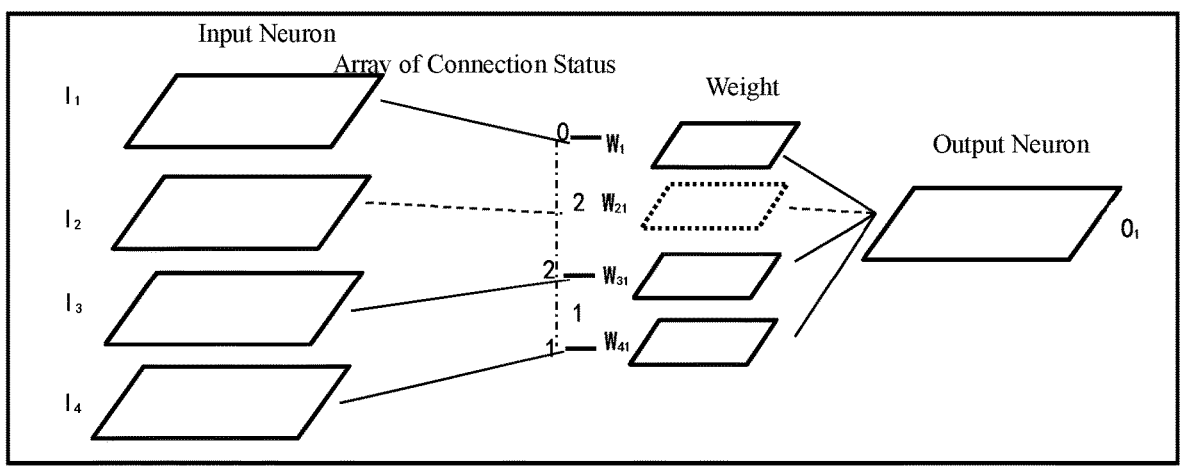
FIG. 37 is a schematic diagram showing another implementation of the structural clipping shown in FIG. 35 by using a connection array according to an embodiment of the present disclosure.

The following is a detailed description of how implements clipping on the structure of the artificial neural network and the representation of the connection array. FIG. 34 is a schematic structure diagram of a convolutional layer in a neural network according to an embodiment of the disclosure. FIG. 35 is a schematic structure diagram of a structural clipping on an artificial neural network by using a filtering unit according to an embodiment of the present disclosure. FIG. 36 is a schematic diagram showing an implementation of the structural clipping shown in FIG. 35 by using a connection array according to an embodiment of the present disclosure. FIG. 37 is a schematic diagram showing another implementation of the structural clipping shown in FIG. 35 by using a connection array according to an embodiment of the present disclosure.

As shown in FIG. 34, the artificial neural network is mainly based on a convolutional operation. Taking the convolutional layer as an example, assuming that the input layer is composed of N input neurons $I_1, I_2, \ldots I_N$, and the output layer is composed of M output neurons $O_1, O_2, \ldots, O_M$, in that way, there are NM weights $W_{ij}$, $i=1, 2, \ldots, N, j=1, 2, \ldots, M$. Before selecting, the output neuron $O_j$ is generated by the feature map composed of all N input neurons and weights $W_{1j}, W_{2j}, \ldots, W_{Nj}$, and the generation process is that $W_{ij}$ may slide on $I_i$ and perform inner product operation to get N feature maps of intermediate results, $i=1, 2, \ldots, N$, where each feature map of intermediate results has the same size as $O_j$, then the N feature maps of intermediate results are added in element-wise manner and accumulated into a feature map composed of output neurons, i.e. $O_j$, where the output neurons in $O_j$ may share a connection array, or each output neuron may correspond to a connection array, and all of NM $W_{ij}$ are weights before selecting.

The weight may be selected by the filtering unit, or may be selected offline beforehand.

The connection array of the feature map composed of the output neuron and the input neuron may have a plurality of representations. Optionally, the first representation is: for the Index A corresponding to each output neuron, A has N bits because that the input layer has N nodes, and the value of each bit is 1 or 0, for example, if the value $A_i$ of $i^{th}$ bit is 1, then $I_i$ is connected to the output neuron by the weight, and if the value $A_i$ of $i^{th}$ bit is 0, then $I_i$ is not connected to the output neuron by the weight; in the filtering unit, the Index is known, and each selected $I_k$ and $W_{kj}$ for computing the output neuron satisfy: $A_k=1$, $k \in \{1, 2, \ldots, N\}$ and the output neuron is in the $O_j$; moreover, 0 may indicate that the output neuron is connected to the input neuron by the weight, and 1 may indicate that the output neuron is not connected to the input neuron by the weight, the analysis is the same as above.

The second representation of the connection array is: for the Index A corresponding to each output neuron, the value of each bit is a non-negative integer, and the feature map composed of the input neuron connected to the output neuron is $I_{k_1}, I_{k_2}, \ldots, I_{k_n}$, $n \leq N$, $k_1, k_2, \ldots, k_n \in \{1, 2, \ldots, N\}$, and the values are unknown. Index A has n bits, the value of the $1^{th}$ bit is $A_1$, which indicates the distance from the input neuron where the first connection is located to $I_1$, the value of $p^{th}$ bit is $A_P$, $p=2, 3, \ldots, n$, which indicates the distance from the input neuron where the current connection is located to the input neuron where the previous connection is located. In the filtering unit, the connection array is known, and the selected feature map composed of input neurons for computing the output neuron is $I_{k_1}, I_{k_2}, \ldots, I_{k_n}$, and the corresponding weights are $W_{k_1 j}, W_{k_2 j}, \ldots, W_{k_n j}$, where $k_1 = A_1 + 1$, $k_P = A_P + k_{p-1}$, and the output neuron is in $O_j$.

It can be understood that in addition to the first and second representations, those skilled in the art can also select other representations to represent the connection array according to requirements.

In order to make it easier to understand the functions of the filtering unit provided by the present disclosure, a specific artificial neural network is taken as an example to introduce the data operation process of the filtering unit. As shown in FIG. 35, taking N=4, M=2 as an example, the input layer is composed of 4 input neurons $I_1, I_2, I_3, I_4$, and the output layer is composed of 2 output neurons $O_1, O_2$.

The convolutional layer has 4 input neurons $I_1, I_2, I_3, I_4$ and 2 output neurons $O_1, O_2$; and the weights before selecting used for generating $O_1, O_2$ are $W_{11}, W_{21}, W_{31}, W_{41}$ and $W_{12}, W_{22}, W_{32}, W_{42}$. It is assumed that all the output neurons in the feature map composed of output neurons share a connection array, the corresponding connection array of $O_1, O_2$ is $A^{(1)}, A^{(2)}$. The dotted square in FIG. 35 indicates the weights that are removed after structural clipping, that is, the selected weight s are $W_{11}, W_{31}, W_{41}$ and $W_{22}, W_{32}$, and the result is shown in FIG. 35.

If the connection array uses the first representation, 1 indicates that the output neuron is connected to the input neuron by the weight, 0 indicates that the output neuron is not connected to the input neuron by the weight.

As shown in FIG. 36, the corresponding Index $A^{(1)}$ of the output neuron in $O_1$ is 1011. Because $A_1^{(1)} = A_3^{(1)} = A_4^{(1)} = 1$, the selected feature maps composed of input neurons used to compute $O_1$ are $I_1, I_3, I_4$, and the corresponding weights are $W_{11}, W_{31}, W_{41}$.

If the connection array uses the second representation:
as shown in FIG. 37, the corresponding Index $A^{(1)}$ of the output neuron in $O_1$ is 021. Therefore, for $O_1$, $k_1=0+1=1$, $k_2=2+1=3$, $k_3=1+3=4$; for $O_2$, $k_1=1+1=2$, $k_2=1+2=3$. The selected feature maps composed of input neurons used to compute $O_1$ are $I_1, I_3, I_4$, and the corresponding weights are $W_{11}, W_{31}, W_{41}$.

The two representations of Index can realize the selecting of feature maps composed of input neurons and weights.

The operation unit 600 may include but not be limited to: a first part, multiplier; a second part, an adder tree; and a third part, an activation function unit.

The first part may multiply input data 1 and input data 2 to obtain output data, the process is: out=in1*in2. The input data 1 is recorded as in1, the input data 2 is recorded as in2, and the output data is recorded as out.

The second part may add the input data in1 through an adder tree step by step to obtain the output data (out), where in1 is a vector of length N, and N is greater than 1, the process is: out'=in1[1]+in1[2]+ . . . +in1[N]; and/or add the input data 1 in1 step by step through the adder tree to obtain a sum, and then add the sum and the input data 2 in2 to obtain the output data (out"), the process is: out"=in1[1]+in1[2]+ . . . +in1[N]+in2; or add the input data (in1) and the input data (in2) to obtain the output data (out'"), the process is: out'"=in1+in2. The out', out", and out'" represent three output results.

The third part may perform an active operation on the input data in to obtain the output data(out), the process is out=active(in), where the active operation may include sigmoid, tan h, relu, softmax, and the like; in addition to the active operation, the third part may implement other non-linear functions, that is, the third part may perform an operation (f) on the input data (in) to obtain the output data (out), the process is: out=f(in).

The fourth part may perform a pooling operation on the input data (in) to obtain the output data (out), the process is out=pool(in), where pool represents the pooling operation, and the pooling operation is implemented by a pooling unit, which is in parallel with the activation function unit in the third part. The pooling operation may include but not be limited to: mean pooling, maximum pooling, or median pooling. The input data is the data in a pooling core associated with the output data.

The operations performed by the operation unit may include a neural network operation, and the network operation may include: the first part multiplies input data 1 and input data 2 to obtain a product; the second part performs an adder tree operation, that is, the second part adds the input data 1 through an adder tree step by step, or adds the input data 1 to the input data 2 to obtain output data; the third part performs an activation function, that is, the third part performs the activation function on the input data to obtain the output data; the fourth part performs pooling operation, and the process is out=pool(in), where pool represents the pooling operation. The pooling operation may include but not be limited to: mean pooling, maximum pooling, or median pooling. The input data in is the data in a pooling core associated with the output data(out). One or more operations parts may be freely selected in different orders to achieve the operations with various functions.

Figure 38A:
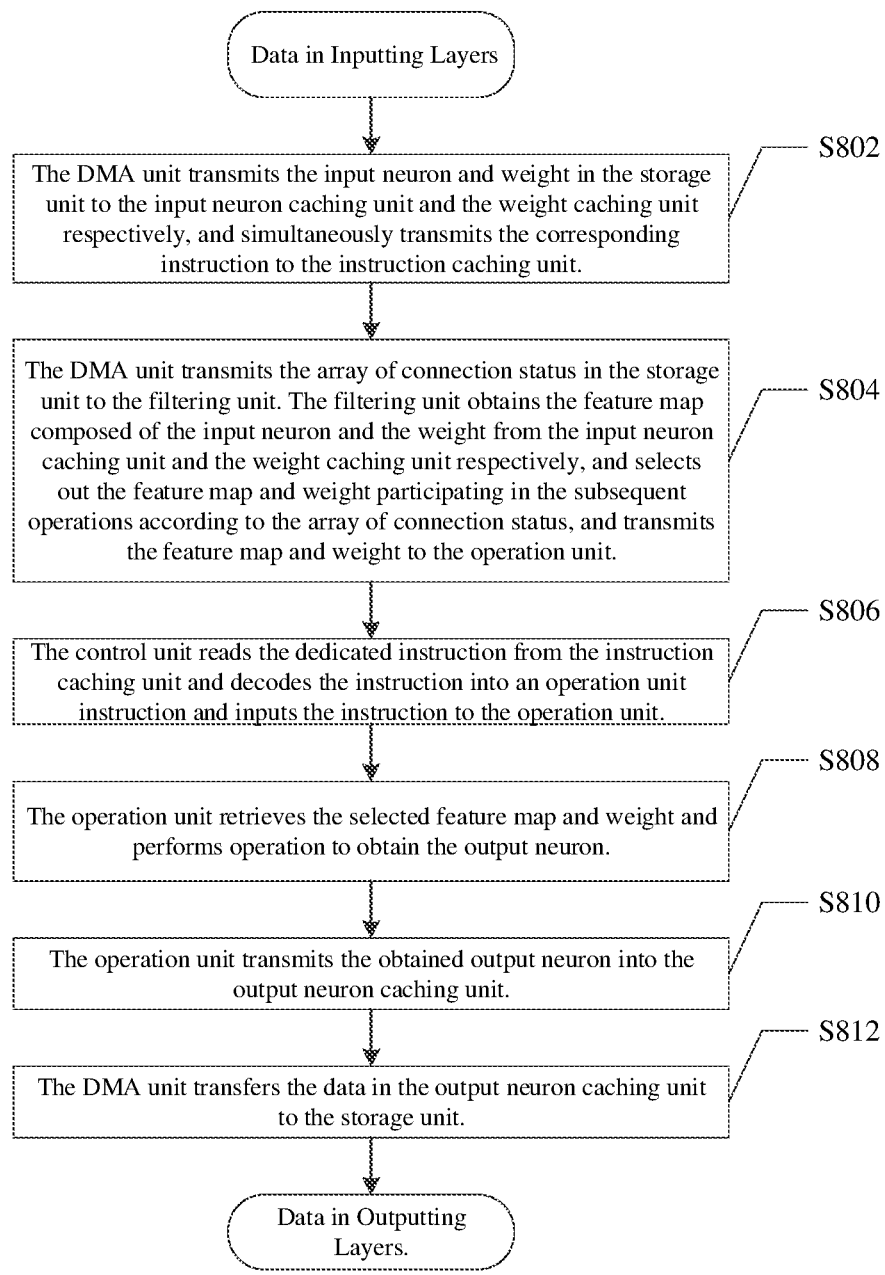
FIG. 38A is a flowchart of an operation method performed by an operation device according to an embodiment of the disclosure.
Figure 38B:
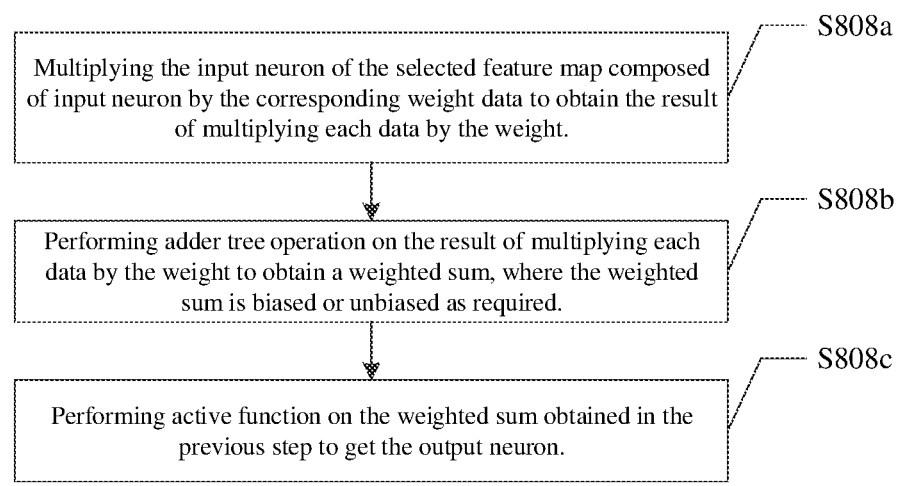
FIG. 38B is a flowchart of sub-steps corresponding to step S808 shown in FIG. 38A according to an embodiment of the disclosure.

FIG. 38A is a flowchart of an operation method performed by an operation device as shown in FIG. 33 according to an embodiment of the disclosure. FIG. 38B is a flowchart of sub-steps corresponding to step S808 shown in FIG. 38A according to an embodiment of the disclosure. As shown in FIG. 33, FIG. 38A, and FIG. 38B, the operation method performed by the operation device may include the following steps.

In step S802, transmitting, by the DMA unit 200, the input neurons and weights in the storage unit 100 to the input neuron caching unit 313 and the weight caching unit 312 respectively, and simultaneously transmitting the corresponding instructions into the instruction caching unit 311.

In step S804, transmitting, by the DMA unit 200, the connection array in the storage unit 100 to the filtering unit 400; obtaining, by the filtering unit 400, the feature map composed of the input neurons and the weight from the input neuron caching unit 313 and the weight caching unit 312 respectively, and selecting out the feature maps and the corresponding weights participating in the follow-up operations corresponding the connection array, and transmitting the feature maps and the weights to the operation unit 600.

In step S806, reading, by the control unit 500, the dedicated instruction from the instruction caching unit 311, and decoding the instruction into the operation unit and transmitting it into the operation unit 600.

In step S808, retrieving, by the operation unit 600, the selected feature maps and weights, and performing operation to obtain the output neuron.

Based on the above steps, the operation process of the operation unit 600 is divided into the following sub-steps:

in sub-step S808a, multiplying the input neurons of the selected feature map composed of input neurons by the corresponding weights to obtain the result of multiplying each data by the weight;

in sub-step S808b, performing an adder tree operation on the result of multiplying each data by the weight to obtain a weighted sum, where the weighted sum is biased or unbiased as required;

in sub-step S808c, performing an activation function on the weighted sum obtained in the previous stride to get the output neuron.

In step S810, transmitting, by the operation unit 600, the obtained output neuron to the output neuron caching unit 320.

In step S812, transferring, by the DMA unit 200, the data in the output neuron caching unit 320 into the storage unit 100.

The above steps may be repeated until the output of the final layer of the network is obtained.

It should be noted that the input neurons mentioned in the present disclosure do not refer to the neurons in the input layer of the entire neural network, but for any two adjacent layers in the network, the neurons in the lower layer of the front end of feed-forward operation of the network are input neurons; and output neurons mentioned in the present disclosure do not refer to the neurons in the output layer of the entire neural network, but for any two adjacent layers in the network, the neurons in the upper layer of the back end of feed-forward operation of the network are output neurons. Specifically, let a convolutional neural network has L layers, K=1, 2, . . . L−1, for the layer K and layer K+1, the layer K may be defined as the input layer, where the neurons in the layer K are the input neurons, and define the layer K+1 as the output layer, where the neurons in the layer K+1 are the output neurons. That is, except for the last layer, each layer can be defined as an input layer, the next layer is the corresponding output layer, and a count of neurons in each layer is predictable.

Figure 39:
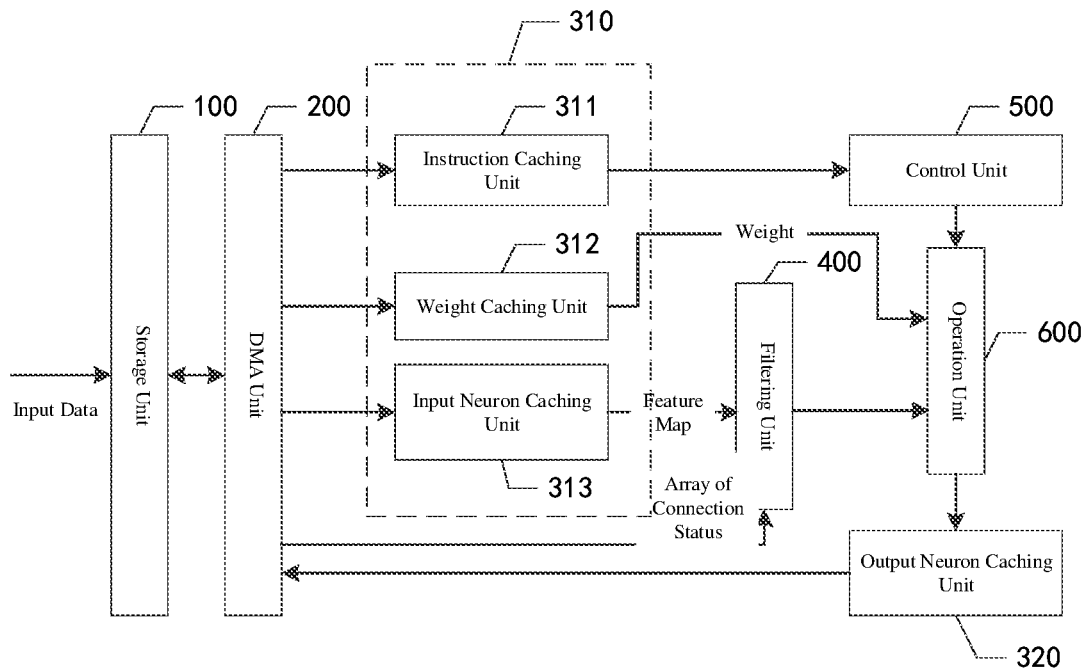
FIG. 39 is a schematic structure diagram of another operation device according to an embodiment of the disclosure.

As mentioned above, the weight may be selected by the filtering unit, or may be selected offline beforehand. In the first embodiment of the present disclosure, the weight may be selected by the filtering unit. In the second embodiment of the present disclosure, another operation device is provided, which is suitable for offline selecting the weights without passing through the filtering unit. FIG. 39 is a schematic structure diagram of another operation device according to an embodiment of the disclosure. As shown in FIG. 39, each module/unit included in the operation device provided in this embodiment is the same. The difference from the first embodiment is that the function of the filtering unit 400 is different. In this embodiment, the weight is not selected by the filtering unit 400, but directly transmitted from the weight caching unit 312 to the operation unit 600.

The operation method performed by the operation device shown in this embodiment, please refer to FIG. 38A and FIG. 38B. The operation method is substantially the same as an operation method in the first embodiment, but only the step S804 is replaced with the following step:

in step 804', transmitting, by the DMA unit 200, the connection array in the storage unit 100 to the filtering unit 400; obtaining, by the filtering unit, the feature map composed of the input neurons form the input neuron caching unit 313, selecting out the feature map participating the follow-up operations according to the connection array, and transmitting the feature map to the operation unit 600; transmitting the selected weight from the weight caching unit 312 to the operation unit 600 simultaneously.

The operation devices shown in the above two embodiments are respectively read the feature map composed of the weight and the input neuron from the weight caching unit 312 and the input neuron caching unit 313 and transmit the feature map to the filtering unit 400. In actual operation, the operation devices may directly read the feature map composed of the weight and the input neuron from the DMA unit 200 and transmit the feature map to the filtering unit 400.

Figure 40:
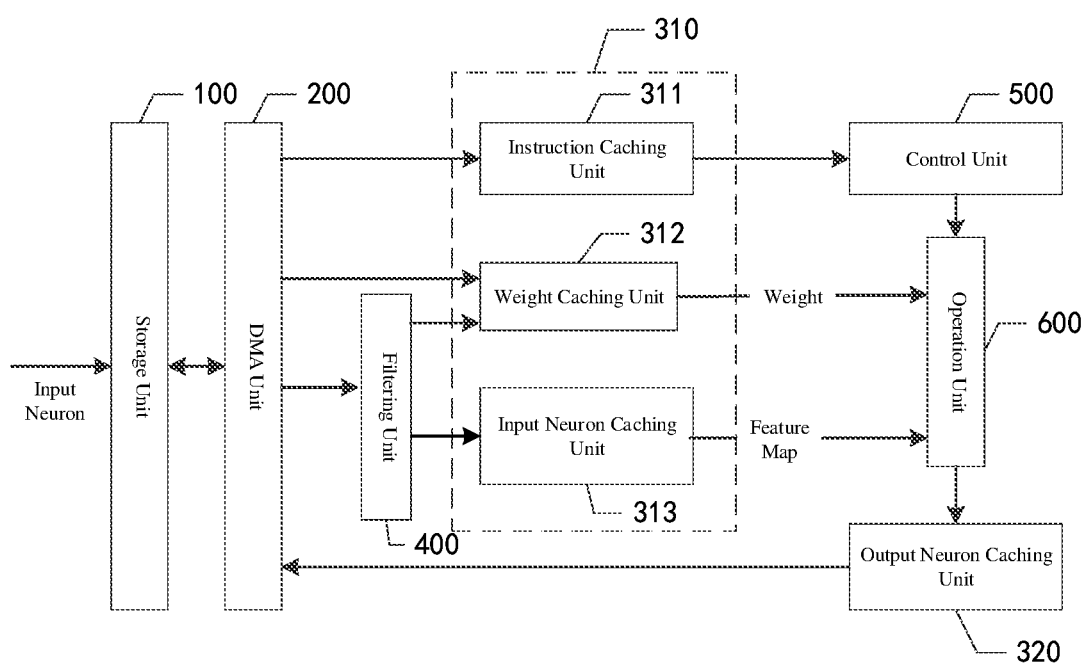
FIG. 40 is a schematic structure diagram of another operation device according to an embodiment of the disclosure.

FIG. 40 is a schematic structure diagram of another operation device according to the third embodiment of the disclosure. As shown in FIG. 40, the operation device provided in this embodiment is the same as the module/unit of the first embodiment, and the difference from the first embodiment lies in the following points.

1. The difference in position setting compared to the first embodiment is that the filtering unit 400 is set directly connected to the DMA unit 200, and directly transfers the weight and the feature map composed of the input neurons from the DMA unit 200 to the filtering unit 400. Then, the selected weight and the feature map composed of the input neurons by the filtering unit 400 are respectively transmitted to the weight caching unit 312 and the input neuron caching unit 313, and finally transmitted to the operation unit 600.
2. The difference in function setting is that one data processing path for offline selecting weight is set up in the present embodiment more than the first embodiment. Specifically, in addition to the selection that the weight may be selected by the filtering unit 400 and transmitted to the weight caching unit 312, and finally transmitted to the operation unit 600, the weight may be also transmitted to the operation unit 600 directly via the weight caching unit 312, where the latter selection applies to the situation where the weight has been selected offline.

Based on the above settings, the operation device provided by the third embodiment can simultaneously implement data processing where the weight is selected offline and the weight is not selected offline. Referring to FIG. 38A, FIG. 38B, and an operation method performed by an operation device in the first embodiment, the operation method performed by the operation device of the present embodiment, only needs to replace the steps S802 and S804 in the operation method described in the first embodiment with the following steps:

in step S802', transmitting, by the DMA unit 200, the instruction in the storage unit 100 into the instruction caching unit 311;

in step S804"a, transmitting, by the DMA unit 200, the connection array, the feature map composed of the input neurons, and the weight into the filtering unit 400; selecting out, by the filtering unit, the feature map and the corresponding weight of the feature map participating the follow-up operations according to the connection array, and transmitting the input neuron in the selected feature map composed of the input neuron, and the corresponding weight to the input neuron caching unit 313 and the weight caching unit 312 respectively;

in step S804"b, transmitting, by the DMA unit 200, the connection array and the feature map composed of the input neurons in the storage unit 100 to the filtering unit 400; selecting out, by the filtering unit 400, the feature map for performing computation to obtain the output neuron, and transmitting the input neuron into the input neuron caching unit 313; transmitting, by the DMA unit 200, the selected weight from the weight caching unit 312 to the operation unit 600 simultaneously.

The execution process of the above steps is as follows: if the weight is not selected offline, the step S804"a may be performed after the step S802" is completed; if the weight has been selected offline, the step S804"b may be performed after the step S802" is completed.

In an embodiment, the operation device may further include a connection relationship generating unit configured to generate the connection relationship according to the input neuron, the weight, and the output neuron.

In an embodiment, the connection relationship generating unit is independent of the operation device. The connection relationship generating unit may be included in a main processor, and the operation device may be included in a co-processor; or the connection relationship generating unit may be included in a slave processor, and the operation device may be included in a main co-processor.

In a fourth exemplary embodiment of the present disclosure, an electronic device is provided. The electronic device includes a board card. The board card includes a chip package structure. The chip package structure includes a chip. The chip includes an operation device provided by the embodiment of the present disclosure.

The electronic device may include a robot, a computer, a printer, a scanner, a tablet computer, an intelligent terminal, a mobile phone, an automobile data recorder, a navigator, a sensor, a webcam, a cloud server, a camera, a video camera, a projector, a watch, an earphone, a mobile storage, a wearable device, a vehicle, a household electrical appliance, and/or a medical device.

The vehicles may include an airplane, a ship, and/or a car. The household electrical appliance may include a television, an air conditioner, a microwave oven, a refrigerator, an electric rice cooker, a humidifier, a washing machine, an electric lamp, a gas cooker, and a range hood. The medical device may include a nuclear magnetic resonance spectrometer, a B-ultrasonic scanner, and/or an electrocardiograph.

In summary, the embodiment of the present disclosure provides an operation device and an operation method. The structural clipping is implemented by setting the filtering unit between the input neuron and the output neuron, and using the connection array of the feature map composed of the output neuron and the input neuron. And the feature maps and corresponding weights of the artificial neural network participating in the subsequent operations are selected out, which avoids the computational redundancy and memory access caused by all input neurons and weights participating in the network operation. Redundant, and also applicable to the case where the weight is offline filtered and not filtered offline, which solves the problems that the CPU and GPU performance is insufficient, the front-end decoding overhead is large, and the input neurons and weight data are fully exploited. Reusability reduces the memory access bandwidth, reduces the amount of computation and memory, and achieves high efficiency output.

The present disclosure provides an operation device and an operation method. A filtering unit is set between the input neuron and the output neuron, and the structural clipping is implemented by using a connection array of the feature map composed of the output neuron and the input neuron. The feature map and the corresponding weight of the feature map of the artificial neural network participating in the subsequent operations are selected out after structural clipping, which avoids computation redundancy and memory access redundancy caused by all input neurons and weights participating in the network operation, and is applicable to the case where the weight is selected offline and not selected offline. Moreover, the present disclosure solves the problem that the CPU and GPU have inadequate operational performance and the front-end decoding overhead is high, and fully exploits the reusability of input neurons and weights, reduces the memory access bandwidth and the amount of computation and memory, and achieves efficient output.

It should be noted that all of the modules in the embodiment of the disclosure may be hardware structures. Physical implementation of the hardware structures may include but not be limited to physical device, and the physical device may include but not be limited to transistors, memristors, and Deoxyribonucleic Acid (DNA) computers. It should be noted that in the drawings of the present disclosure, the same elements are represented by the same or similar drawing marks. A conventional structure or construction is omitted where it may cause confusion in the understanding of the invention. It should be noted that the shape and size of each part in the draws do not reflect the true size and proportion, but only indicate the contents of the embodiment of the invention.

Those skilled in the art should understand that the modules in the devices of the embodiment may be adaptively changed and placed in one or more different devices of the embodiment. The modules or units or components of the embodiment may be combined into one module or unit or component, and may be divided into a plurality of sub-modules or sub-units or sub-components. In addition to the above characteristics and/or process or that at least some of units are mutually exclusive, all of the characteristics, processes or units of any method or device disclosed in this specification (including accompanying claims, abstracts and drawings) may be combined in any manner. Unless there are clear statements, each feature disclosed in this specification (including accompanying claims, abstracts and drawings) can be replaced by an alternative feature of the same, equivalent or similar purpose.

The purposes, technical solutions, and beneficial effects of the present disclosure are further described above with the specific embodiments in detail. It is to be understood that the above is only the specific embodiment of the disclosure and not intended to limit the disclosure. Any modifications, equivalent replacements, improvements, and the like made within the spirit and principle of the disclosure shall fall within the scope of protection of the disclosure.

What is claimed is:

1. A processing device, comprising:
  a coarse-grained pruning circuit configured to perform coarse-grained pruning on weights of a neural network to obtain pruned weights, wherein the neural network includes a convolutional layer and a weight of the convolutional layer is a four-dimensional matrix (Nfin, Nfout, Kx, Ky), Nfin represents a count of input feature maps, Nfout represents a count of output feature maps, (Kx, Ky) is a size of a convolution kernel, and the convolutional layer has Nfin*Nfout*Kx*Ky weights;
  and an operation circuit configured to train the neural network according to the pruned weight;
  wherein the coarse-grained pruning circuit is configured to:
    select M weights from the weights of the neural network through a sliding window;
    determine that the M weights meet a preset condition, wherein the preset condition is that an information quantity of the M weights is less than a first given threshold;
    and based on a determination that the M weights meet the preset condition,
  set at least a portion of the selected M weights to 0 to obtain a portion of the pruned weights,
  wherein the coarse-grained pruning circuit is further configured to:
  perform coarse-grained pruning on the weight of the convolutional layer, where the sliding window is a four-dimensional sliding window with a size of Bfin*Bfout*Bx*By, Bfin is a positive integer greater than 0 and less than or equal to Nfin, Bfout is a positive integer greater than 0 and less than or equal to Nfout, Bx is a positive integer greater than 0 and less than or equal to Kx, and By is a positive integer greater than 0 and less than or equal to Ky,
  make the sliding window slide Sfin stride in the direction of Bfin, or slide Sfout stride in the direction of Bfout, or slide S stride in the direction of Bx, or slide Sy stride in the direction of By, where Sfin is a positive integer greater than 0 and less than or equal to Bfin, Sfout is a positive integer greater than 0 and less than or equal to Bfout, Sx is a positive integer greater than 0 and less than or equal to Bx, and Sy is a positive integer greater than 0 and less than or equal to By,
  select M weights from the Nfin*Nfout*Kx*Ky weights through the sliding window, and when the M weights meet the preset condition, all or part of the M weights may be set to 0, where M=Bfin*Bfout*Bx*Bv.

2. The processing device of claim 1, wherein
  the information quantity of the M weights is an arithmetic mean of an absolute value of the M weights, a geometric mean of the absolute value of the M weights or a maximum value of the absolute value of the M weights; the first given threshold is a first threshold, a second threshold or a third threshold; and the information quantity of the M weights being less than the first given threshold includes:
  the arithmetic mean of the absolute value of the M weights being less than the first threshold, or the geometric mean of the absolute value of the M weights being less than the second threshold, or the maximum value of the M weights being less than the third threshold.

3. The processing device of claim 1, wherein the coarse-grained pruning circuit and the operation circuit are configured to repeat performing coarse-grained pruning on the weights of the neural network and training the neural network according to the pruned weights until no weight meets the preset condition without losing a preset precision.

4. The processing device of claim 1,
  wherein the neural network includes a fully connected layer and a Long Short Term Memory (LSTM) layer, where a weight of the fully connected layer is a two-dimensional matrix (Nin, Nout), Nin represents a count of input neurons and Nout represents a count of output neurons, and the fully connected layer has Nin*Nout weights;
  a weight of LSTM layer is composed of m weights of the fully connected layer, m is a positive integer greater than 0, and an ith weight of the fully connected layer is (Nin_i, Nout_i), where i is a positive integer greater than 0 and less than or equal to m, Nin_i represents a count of input neurons of the ith weight of the fully connected layer and Nout_i represents a count of output neurons of the ith weight of the fully connected layer;

the coarse-grained pruning unit is specifically configured to: perform coarse-grained pruning on the weight of the fully connected layer, where the sliding window is a sliding window with a size of Bin*Bout, Bin is a positive integer greater than 0 and less than or equal to Nin, and Bout is a positive integer greater than 0 and less than or equal to Nout, make the sliding window slide Sin stride in a direction of Bin, or slide Sout stride in a direction of Bout, where Sin is a positive integer greater than 0 and less than or equal to Bin, and Sout is a positive integer greater than 0 and less than or equal to Bout, select M weights from the Nin*Nout weights through the sliding window, and when the M weights meet the preset condition, all or part of the M weights may be set to 0, where M=Bin*Bout, perform coarse-grained pruning on the weight of the LSTM layer, where the size of the sliding window is Bin_i*Bout_i, Bin_i is a positive integer greater than 0 and less than or equal to Nini, and Bout_i is a positive integer greater than 0 and less than or equal to Nout_i, make the sliding window slide Sini stride in the direction of Bin_i, or slide Sout_i stride in the direction of Bout_i, where Sin_i is a positive integer greater than 0 and less than or equal to Bin_i, and Sout_i is a positive integer greater than 0 and less than or equal to Bout_i, and select M weights from the Bin_i*Bouti weights through the sliding window, and when the M weights meet the preset condition, all or part of the M weights may be set to 0, where M=Bin_i*Bouti.

5. The processing device of claim 1, wherein the operation circuit is specifically configured to:
   retrain the neural network by a back-propagation algorithm according to the pruned weight.

6. The processing device of claim 1, further comprising a quantization circuit configured to quantize the weight of the neural network and/or perform a first operation on the weight of the neural network after the coarse-grained pruning circuit performs coarse-grained pruning on the weight of the neural network, and before the operation circuit retrains the neural network according to the pruned weight to reduce a count of weight bits of the neural network.

7. A neural network operation device, comprising: a first processing device; and one or more second processing devices communicatively connected to the first processing device via a Peripheral Component Interconnect Express (PCIE) bus to transfer data to support operations of a neural network, wherein the neural network includes a convolutional layer and a weight of the convolutional layer is a four-dimensional matrix (Nfin, Nfout, Kx, Ky), Nfin represents a count of input feature maps, Nfout represents a count of output feature maps, (Kx, Ky) is a size of a convolution kernel, and the convolutional layer has Nfin*Nfout*Kx*Ky weights, wherein each of the first processing device and the one or more second processing devices includes:
   a coarse-grained pruning circuit configured to perform coarse-grained pruning on weights of the neural network to obtain pruned weights;
   and an operation circuit configured to train the neural network according to the pruned weight, wherein the coarse-grained pruning circuit is configured to:
   select M weights from the weights of the neural network through a sliding window,
      determine that the M weights meet a preset condition, wherein the preset condition is that an information quantity of the M weights is less than a first given threshold;
      and set at least one of the selected M weights to zero to obtain a portion of the pruned weights based on a determination that the M weights meet the preset condition,
   wherein the coarse-grained pruning circuit is further configured to:
   perform coarse-grained pruning on the weight of the convolutional layer, where the sliding window is a four-dimensional sliding window with a size of Bfin*Bfout*Bx*By, Bfin is a positive integer greater than 0 and less than or equal to Nfin, Bfout is a positive integer greater than 0 and less than or equal to Nfout, Bx is a positive integer greater than 0 and less than or equal to Kx, and By is a positive integer greater than 0 and less than or equal to Ky,
   make the sliding window slide Sfin stride in the direction of Bfin, or slide Sfout stride in the direction of Bfout, or slide S stride in the direction of Bx, or slide Sy stride in the direction of By, where Sfin is a positive integer greater than 0 and less than or equal to Bfin, Sfout is a positive integer greater than 0 and less than or equal to Bfout, Sx is a positive integer greater than 0 and less than or equal to Bx, and Sy is a positive integer greater than 0 and less than or equal to By,
   select M weights from the Nfin*Nfout*Kx*Ky weights through the sliding window, and when the M weights meet the preset condition, all or part of the M weights set to 0, where M=Bfin*Bfout*Bx*Bv.

8. A processing method, comprising performing coarse-grained pruning on weights of a neural network to obtain pruned weights, wherein the neural network includes a convolutional layer and a weight of the convolutional layer is a four-dimensional matrix (Nfin, Nfout, Kx, Ky), Nfin represents a count of input feature maps, Nfout represents a count of output feature maps, (Kx, Ky) is a size of a convolution kernel, and the convolutional layer has Nfin*Nfout*Kx*Ky weights; and
   training the neural network according to the pruned weights;
   wherein the performing coarse-grained pruning on the weights of the neural network to obtain the pruned weights includes:
   selecting M weights from the weights of the neural network through a sliding window,
   determining that the M weights meet a preset condition, wherein the preset condition is that an information quantity of the M weights is less than a first given threshold;
   based on a determination that the M weights meet the preset condition,
   setting at least a portion of the selected M weights to zero to obtain a portion of the pruned weights, and
   wherein the performing coarse-grained pruning further includes:
   performing coarse-grained pruning on the weight of the convolutional layer, the sliding window is a four-dimensional sliding window with a size of Bfin*Bfout*Bx*By, where Bfin is a positive integer greater than 0 and less than or equal to Nfin, Bfout is a positive integer greater than 0 and less than or equal to Nfout, Bx is a positive integer greater than 0 and less than or equal to Kx, and By is a positive integer greater than 0 and less than or equal to Ky, making the sliding window slide Sfin stride in the direction of Bfin, or slide Sfout stride in the direction of Bfout, or slide S stride in the direction of Bx, or slide Sy stride in the direction of By, where Sfin is a positive integer greater than 0 and less than or equal to Bfin, Sfout is a positive integer greater than 0 and less than or equal to Bfout, Sx is a positive integer greater than 0 and less than or equal to Bx, and Sy is a positive integer greater than 0 and less than or equal to By, selecting M weights from the Nfin*Nfout*Kx*Ky weights through the sliding window, and when the M weights meet the preset condition, setting all or part of the M weights to 0, where M=Bfin*Bfout*Bx*By.

9. The processing method of claim 8, wherein the information quantity of the M weights is an arithmetic mean of an absolute value of the M weights, a geometric mean of the absolute value of the M weights or a maximum value of the absolute value of the M weights; the first given threshold is a first threshold, a second threshold or a third threshold; and the information quantity of the M weights being less than the first given threshold includes:

the arithmetic mean of the absolute value of the M weights being less than the first threshold, or the geometric mean of the absolute value of the M weights being less than the second threshold, or the maximum value of the M weights being less than the third threshold.

10. The processing method of claim 8, further comprising repeating performing coarse-grained pruning on the weights of the neural network and training the neural network according to the pruned weights until no weight meets the preset condition without losing a preset precision.

11. The processing method of claim 8, wherein the neural network includes a fully connected layer and a Long Short Term Memory (LSTM) layer, where a weight of the fully connected layer is a two-dimensional matrix (Nin, Nout), Nin represents a count of input neurons and Nout represents a count of output neurons, and the fully connected layer has Nin*Nout weights;

a weight of LSTM layer is composed of m weights of the fully connected layer, m is a positive integer greater than 0, and an ith weight of the fully connected layer is (Nin_i, Nout_i), where i is a positive integer greater than 0 and less than or equal to m, Nin_i represents a count of input neurons of the ith weight of the fully connected layer and Nout_i represents a count of output neurons of the ith weight of the fully connected layer;

the coarse-grained pruning unit is specifically configured to:

performing coarse-grained pruning on the weight of the fully connected layer, where the sliding window is a sliding window with a size of Bin*Bout, Bin is a positive integer greater than 0 and less than or equal to Nin, and Bout is a positive integer greater than 0 and less than or equal to Nout, make the sliding window slide Sin stride in a direction of Bin, or slide Sout stride in a direction of Bout, where Sin is a positive integer greater than 0 and less than or equal to Bin, and Sout is a positive integer greater than 0 and less than or equal to Bout, select M weights from the Nin*Nout weights through the sliding window, and when the M weights meet the preset condition, all or part of the M weights set to 0, where M=Bin*Bout, perform coarse-grained pruning on the weight of the LSTM layer, where the size of the sliding window is Bin_i*Bout_i, Bin_i is a positive integer greater than 0 and less than or equal to Nini, and Bout_i is a positive integer greater than 0 and less than or equal to Nout_i, make the sliding window slide Sini stride in the direction of Bin_i, or slide Sout_i stride in the direction of Bout_i, where Sin_i is a positive integer greater than 0 and less than or equal to Bin_i, and Sout_i is a positive integer greater than 0 and less than or equal to Bout_i, and select M weights from the Bin_i*Bouti weights through the sliding window, and when the M weights meet the preset condition, all or part of the M weights may be set to 0, where M=Bin_i*Bouti.

12. The processing method of claim 8, wherein the training the neural network according to the pruned weight is:

retraining the neural network by a back-propagation algorithm according to the pruned weight.

13. The processing method of claim 8, wherein after performing coarse-grained pruning on the weight of the neural network, and before retraining the neural network, the method further includes:

quantizing the weight of the neural network and/or performing a first operation on the weight of the neural network to reduce a count of weight bits of the neural network.

* * * * *